INVENTORS
B. D. HOLBROOK
BY A. A. LUNDSTROM
G. H. Heydt
ATTORNEY

INVENTORS
B. D. HOLBROOK
BY A. A. LUNDSTROM
G. H. Heydt
ATTORNEY

CURVES A, B, C - Re THOUSANDS OF YARDS

| | | | | | | | |
|---|---|---|---|---|---|---|---|
| CURVE D - | 2910 | 4365 | 5819 | 7274 | 8729 | 10184 | 11639 |
| CURVE E - | 2680 | 4020 | 5360 | 6695 | 8034 | 9374 | 10714 |

INVENTORS
B. D. HOLBROOK
BY A. A. LUNDSTROM
G. H. Heydt
ATTORNEY

INVENTORS
B.D. HOLBROOK
BY A.A. LUNDSTROM
G.H. Heydt
ATTORNEY

PROJECTION ON HORIZONTAL PLANE

ELEVATION ON PLANE OF LINE OF SIGHT

INVENTORS
B. D. HOLBROOK
BY A. A. LUNDSTROM
G. H. Heydt
ATTORNEY

INVENTORS
B. D. HOLBROOK
A. A. LUNDSTROM
BY G. H. Heydt
ATTORNEY

Nov. 10, 1953 B. D. HOLBROOK ET AL 2,658,679

COMPUTER CONTROL DEVICE

Filed Feb. 13, 1945 34 Sheets-Sheet 7

INVENTORS
B. D. HOLBROOK
BY A. A. LUNDSTROM
G. H. Heydt
ATTORNEY

INVENTORS
B. D. HOLBROOK
A. A. LUNDSTROM
BY G. H. Heydt.
ATTORNEY

INVENTORS
B. D. HOLBROOK
BY A. A. LUNDSTROM
G. H. Heydt
ATTORNEY

Nov. 10, 1953 B. D. HOLBROOK ET AL 2,658,679

COMPUTER CONTROL DEVICE

Filed Feb. 13, 1945 34 Sheets-Sheet 10

INVENTORS
B. D. HOLBROOK
A. A. LUNDSTROM
BY G. H. Heydt.
ATTORNEY

COMPUTER CONTROL DEVICE

Filed Feb. 13, 1945 34 Sheets-Sheet 11

INVENTORS
B. D. HOLBROOK
BY A. A. LUNDSTROM
G. H. Heydt
ATTORNEY

INVENTORS
B. D. HOLBROOK
BY A. A. LUNDSTROM
G. H. Heydt
ATTORNEY

Nov. 10, 1953 B. D. HOLBROOK ET AL 2,658,679

COMPUTER CONTROL DEVICE

Filed Feb. 13, 1945 34 Sheets-Sheet 13

INVENTORS
B. D. HOLBROOK
BY A. A. LUNDSTROM

G. H. Heydt
ATTORNEY

INVENTORS
B. D. HOLBROOK
BY A. A. LUNDSTROM
G. H. Heydt.
ATTORNEY

INVENTORS
B. D. HOLBROOK
BY A. A. LUNDSTROM
G. H. Heydt
ATTORNEY

INVENTORS
B. D. HOLBROOK
BY A. A. LUNDSTROM
G. H. Heydt
ATTORNEY

INVENTORS: B. D. HOLBROOK
A. A. LUNDSTROM
BY G. H. Heydt
ATTORNEY

Nov. 10, 1953 B. D. HOLBROOK ET AL 2,658,679

COMPUTER CONTROL DEVICE

Filed Feb. 13, 1945 34 Sheets-Sheet 18

INVENTORS
B. D. HOLBROOK
BY A. A. LUNDSTROM
G. H. Heydt.
ATTORNEY

INVENTORS
B. D. HOLBROOK
BY A. A. LUNDSTROM
G. H. Heydt
ATTORNEY

INVENTORS
B. D. HOLBROOK
A. A. LUNDSTROM
BY G. H. Heydt.
ATTORNEY

INVENTORS
B. D. HOLBROOK
BY A. A. LUNDSTROM
G. H. Heydt
ATTORNEY

INVENTORS
B. D. HOLBROOK
BY A. A. LUNDSTROM
G. H. Heydt
ATTORNEY

INVENTORS
B. D. HOLBROOK
BY A. A. LUNDSTROM
G. H. Heydt
ATTORNEY

Nov. 10, 1953 B. D. HOLBROOK ET AL 2,658,679

COMPUTER CONTROL DEVICE

Filed Feb. 13, 1945 34 Sheets-Sheet 24

INVENTORS
B. D. HOLBROOK
BY A. A. LUNDSTROM
G. H. Heydt
ATTORNEY

INVENTORS
B. D. HOLBROOK
BY A. A. LUNDSTROM
G. H. Heydt
ATTORNEY

INVENTORS
B. D. HOLBROOK
A. A. LUNDSTROM
BY G. H. Heydt.
ATTORNEY

COMPUTER CONTROL DEVICE

Filed Feb. 13, 1945 34 Sheets-Sheet 27

INVENTORS
B. D. HOLBROOK
A. A. LUNDSTROM
BY G. H. Heydt
ATTORNEY

INVENTORS
B. D. HOLBROOK
BY A. A. LUNDSTROM

G. H. Heydt

ATTORNEY

Nov. 10, 1953 B. D. HOLBROOK ET AL 2,658,679

COMPUTER CONTROL DEVICE

Filed Feb. 13, 1945 34 Sheets-Sheet 29

INVENTORS
B. D. HOLBROOK
BY A. A. LUNDSTROM

G. H. Heydt
ATTORNEY

Nov. 10, 1953 B. D. HOLBROOK ET AL 2,658,679

COMPUTER CONTROL DEVICE

Filed Feb. 13, 1945 34 Sheets-Sheet 30

INVENTORS
B.D.HOLBROOK
BY A.A.LUNDSTROM

G.H.Heydt.
ATTORNEY

INVENTORS
B.D. HOLBROOK
A.A. LUNDSTROM
BY
G. H. Heydt.
ATTORNEY

Nov. 10, 1953 B. D. HOLBROOK ET AL 2,658,679

COMPUTER CONTROL DEVICE

Filed Feb. 13, 1945 34 Sheets-Sheet 32

INVENTORS
B. D. HOLBROOK
A. A. LUNDSTROM
BY
G. H. Heydt.
ATTORNEY

Nov. 10, 1953 B. D. HOLBROOK ET AL 2,658,679

COMPUTER CONTROL DEVICE

Filed Feb. 13, 1945 34 Sheets-Sheet 33

INVENTORS
B. D. HOLBROOK
BY A. A LUNDSTROM
G. H. Heydt.
ATTORNEY

INVENTORS
B. D. HOLBROOK
BY A. A. LUNDSTROM
G. H. Heydt
ATTORNEY

Patented Nov. 10, 1953 2,658,679

UNITED STATES PATENT OFFICE 2,658,679

COMPUTER CONTROL DEVICE

Bernard D. Holbrook, Madison, and Alexis A. Lundstrom, East Orange, N. J., assignors to Bell Telephone Laboratories, Incorporated, New York, N. Y., a corporation of New York Application February 13, 1945, Serial No. 577,629

5 Claims. (Cl. 235—61.5)

This invention relates to artillery computers, and particularly to plan prediction computers, with regenerative tracking, in which the tracking and prediction are based upon the relative horizontal and vertical rates of the target with respect to the observation point.

The object of the invention is switching means to energize the appropriate parts of the computer for different conditions of use, to adjust the tracking system automatically or manually, to adapt the computer for use with radar or optical ranging, and to modify the connections of the computer for fire against dive attack by aircraft.

A feature of the invention is a main control switch which in the first position turns the computer off, in the second position energizes enough of the computer to stabilize the associated observing equipment with movements transmitted from an associated gyroscopic stable element, in the third position to also energize those parts of the computer concerned with the generation and correction of the relative rates and in the fourth position to also energize the remainder of the computer.

Another feature of the invention is a rate control switch which, in the first position places the rate generation and correction elements under the control of keys in the observing equipment; in the second position places the rate generation and correction elements under the control of keys on the computer; in the third position disables the elements for automatic correction of rates, but permits manual adjustment of the rates in the computer and automatic matching of the resultant displacements; and a fourth position which permits limited operation when the observing equipment is disabled.

Other features of the invention will be obvious from the following description and drawings.

The present invention is embodied in a computer designed to operate in conjunction with known types of naval director and stable element and the usual ship compass and automatic log. The scope of the invention is not thereby limited to the present embodiment, as the computer may be adapted to operate with other types of directors and stable elements, and the invention may be used in other types of computers.

*The director*

The foundation of the director may be mounted on any prominent part of the ship, such as a fire control tower, pilot house, etc., and supports a base ring and a circular training rack. The carriage may be made of two horizontal plates, spaced apart by side and stiffener plates, and is supported on rollers bearing on the base ring. The carriage may be rotated in train about an axis perpendicular to the deck plane of the ship by a training motor mounted on the carriage and geared to the training rack. The drive from the training motor to the training rack is transmitted through a differential gear, or an electrical equivalent thereof. A handwheel is provided, whereby the trainer may, through the differential gear, add a motion to the training gear. Radial rollers, mounted on the bottom of the carriage and contacting a smooth circular surface of the training rack hold the carriage concentric with the axis of the rack during rotation. Synchronous transmitters of known type rotated by the carriage transmit to the computer voltages defining the position of the carriage. A slewing switch is provided whereby the training motor may be locally controlled by the trainer at the director, or it may be controlled as a follow-up motor by synchronous receivers of known type excited by control voltages transmitted from the computer.

The optical instruments for tracking the target in elevation and train are mounted with the open sights, indicators and control devices on a shelf supported by the carriage. Usually three instruments are provided, one each for the pointer, the trainer and the control officer. Each instrument includes a telescope mounted in an optical box secured to the shelf.

Each optical box is a small metal box having two ring ball bearings to support the telescope for rotation about an axis parallel to the deck plane, and elevation and cross-level shafts driven by elevation and cross-level motors mounted on the carriage.

A slewing switch is provided whereby the elevation motor may be locally controlled by the pointer, or, it may be controlled as a follow-up motor by synchronous receivers of known type excited by control voltages transmitted from the computer. Synchronous transmitters of known type, driven by the elevation motor, transmit to the computer voltages defining the elevation of the target. The cross-level motor is controlled as a follow-up motor by synchronous receivers of known type excited by control voltages transmitted from the stable element.

The telescopes are of known type having a metallic body, mounted in the ring bearings of the optical box, enclosing and supporting the optical system. The optical system includes, in order, an outer glass window, a head prism mounted for rotation about an axis transverse to the axis of the body, an inverting prism, an objective lens, an illuminated cross-line plate, optical filters, and an eyepiece. The head prism inverts the image from top to bottom, the inverting prism inverts the image from right to left, then the objective lens completely inverts the image, focussing the field of view as a real, erect image upon the cross-line plate, which appears through the eyepiece as a virtual, enlarged, erect image.

The cross-level shaft in the optical box is geared to a sector gear attached to the outside of the telescope body, and rotates the telescope body about its longitudinal axis to maintain one of the cross-hairs vertical. This rotation of the telescope body also produces an inclination of the axis of the head prism, and, to correct this inclination, the head prism must be rotated not only in elevation, but also in cross level. In the present standard devices, this added corrective rotation is equal to one-thirtieth of the rotation in cross level. The elevation motor is geared through a differential gear, or an electrical equivalent thereof, to the axis of the head prism and rotates the head prism in elevation plus one-thirtieth of cross level. A handwheel is provided whereby the trainer may, through the differential gear, add a rotation to the other rotations of the head prism.

The range finder, of the usual naval type, is rotatably mounted in a range finder carriage attached to a beam pivotally supported by a standard secured to the director carriage near the axis of rotation. The range knob on the range finder adjusts the range finder to the range of the target, and drives, through a differential gear, synchronous transmitters which transmit to the computer voltages proportional to the position of the transmitter. A synchronous receiver, mounted on the range finder beam, is excited by voltages transmitted from the computer and is coupled by a flexible shaft to the differential gear, so that when the voltages transmitted from the computer are of the proper value, the range finder will be kept adjusted to the range of the target. Shafts, driven by the elevation motor, are geared to the ranger finder to rotate in elevation plus one-thirtieth of cross level the range finder in the carriage. Shafts, driven by the cross-level motor are geared to the beam support to maintain the beam cross-leveled.

The present computer is also adapted for operation in conjunction with other observing instruments, such as the known radio location devices, or a combination of optical and radio instruments.

*The stable element*

The stable element may conveniently be located near the computer, and connected by shafts and gears with the computer. One shaft transmits the director train $B'r$ of the target with respect to the axis of the ship from the computer to the stable element, and other shafts transmit the level L, the angle in the vertical plane containing the line of sight between the horizontal plane and the deck plane, the cross level $Zd$, the angle of tilt of the deck about the line which is the intersection of the deck plane with the vertical plane containing the line of sight, and $L+Zd/30$ to the computer. A synchronous transmitter rotated by the stable element transmits directly to the director a voltage defining cross level $Zd$.

The function of the stable element is to supply to the director and computer corrections which eliminate the effects on these devices due to the pitch and roll of the ship. The pitch of the ship is the angle of inclination of the deck plane with respect to the horizontal plane in the line of the longitudinal axis of the ship, measured in a plane normal to the horizontal plane and the roll is the angle of inclination of the deck plane with respect to the horizontal plane transverse to the longitudinal axis, measured in a plane normal to the deck. The level L is the angle of inclination of the deck plane in the vertical plane including the line of sight and the cross level $Zd$ is the angle of inclination of the deck plane transverse to the plane of the line of sight, measured in a plane normal to the deck.

The stable element includes a sensitive element and a supporting housing.

The sensitive element includes a gyroscope element mounted in a gyroscope case and rotated at high speed about a vertical axis by a small motor. The gyroscope case is equipped with devices to compensate for the effects upon the gyroscope of the earth's rotation and any violent accelerations of the case, and is supported by horizontal stub shafts journaled into a gimbal ring. The gimbal ring is supported by horizontal stub shafts, located at right angles to the shafts supporting the case and journaled in the arms of a vertically mounted fork. The lower end of the fork is journaled in a housing formed by the sides of the level ring. A motor, mounted on this housing and geared to the fork, is controlled by voltages transmitted from the ship compass to maintain the gyroscope oriented with respect to the earth, so that the compensations for earth rotation are correct. Suitable slip rings on the fork and brushes in the housing provide the necessary electrical connections.

The housing formed by the sides of the level ring extends upward and supports two magnet coils with crossed axes above the upper end of the fork. A magnet is mounted on the upper end of the fork, and, when the housing is displaced with respect to the fork, induces voltages in the crossed coils proportional to the errors in level or cross level.

The level ring is supported by horizontal stub shafts journaled into the cross-level ring, which is supported in turn by horizontal stub shafts, located at right angles to the level ring shafts, and journaled into brackets. The brackets are mounted on a conically-shaped casting attached to a large training gear supported on ball bearings. A shaft from the computer is geared to the training gear and rotates the whole assembly in director train. Slip rings and brushes associated with the casting provide the necessary electrical connections with the rotating parts.

A sector gear, attached to the level ring, is geared to a shaft journaled concentrically in one of the stub shafts supporting the cross-level ring, and a second sector gear is attached to the cross-level ring. Follow-up motors, mounted on the brackets, are geared to the level ring shaft and the cross-level ring sector gear and are respectively controlled by the voltages induced in the crossed coils.

The cross-level follow-up motor rotates proportionally to the cross-level and drives a shaft connected to the computer and a synchronous transmitter connected to the cross-level receiver at the director. As the level ring is supported by the cross-level ring and shares the movement of the cross-level ring, the level follow-up motor rotates proportionally to level plus one-thirtieth of cross-level and drives a shaft connected to the computer. The cross-level shaft and the level plus one-thirtieth of cross-level shaft are both geared to a differential gear which rotates a third shaft proportionally to level and is connected to the computer.

Figure 12:
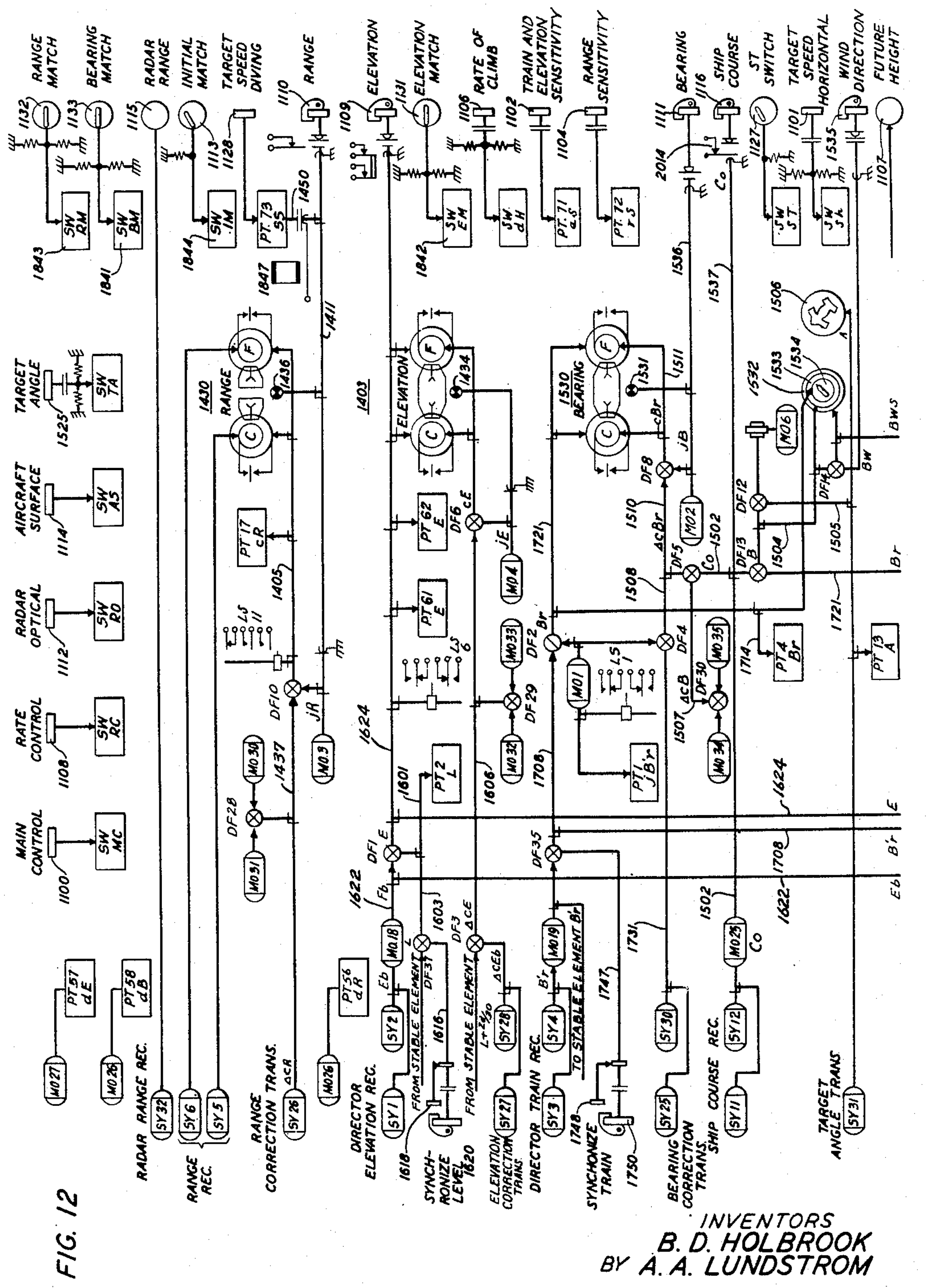
Figure 13:
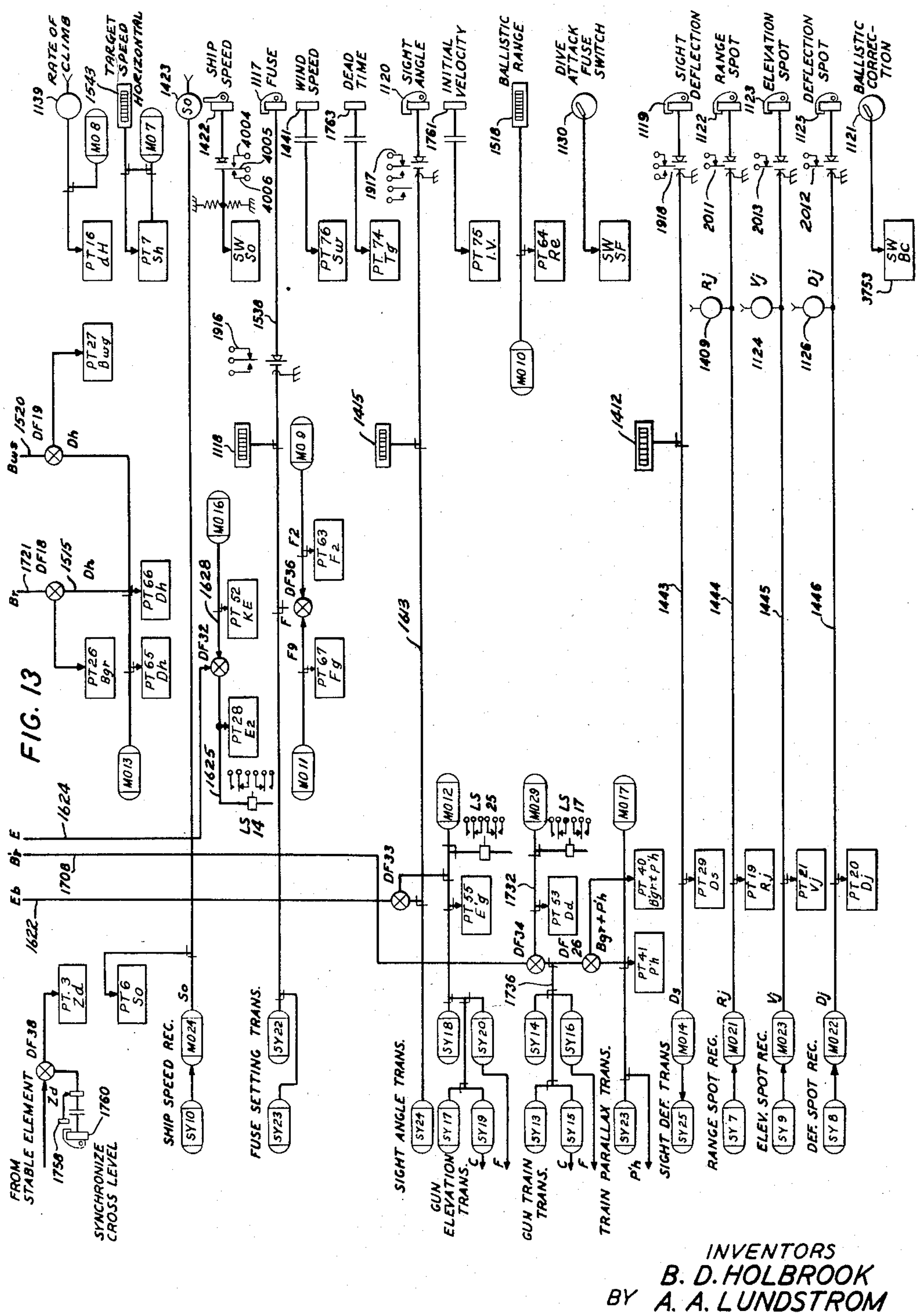
Figure 18:
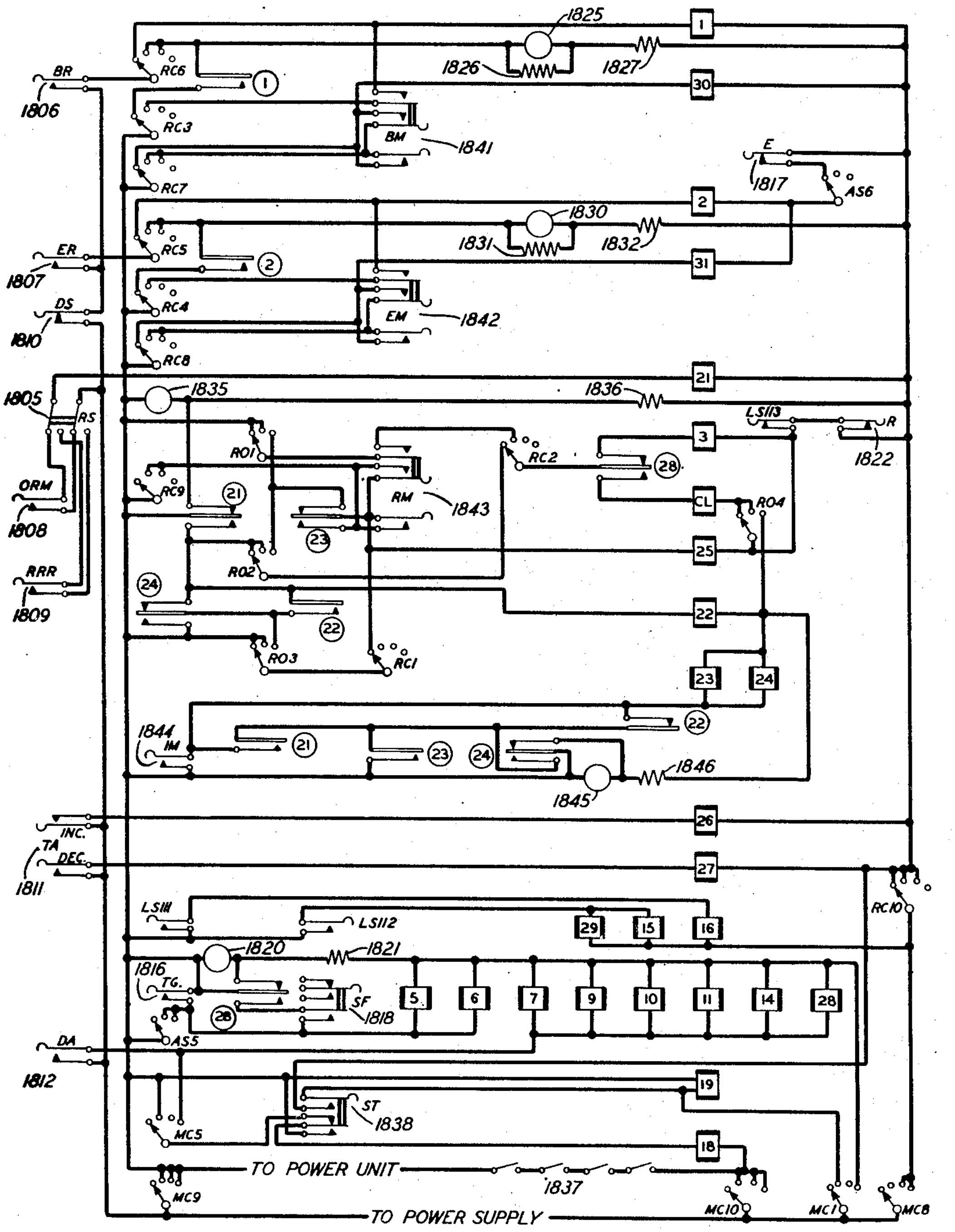
Figure 19:
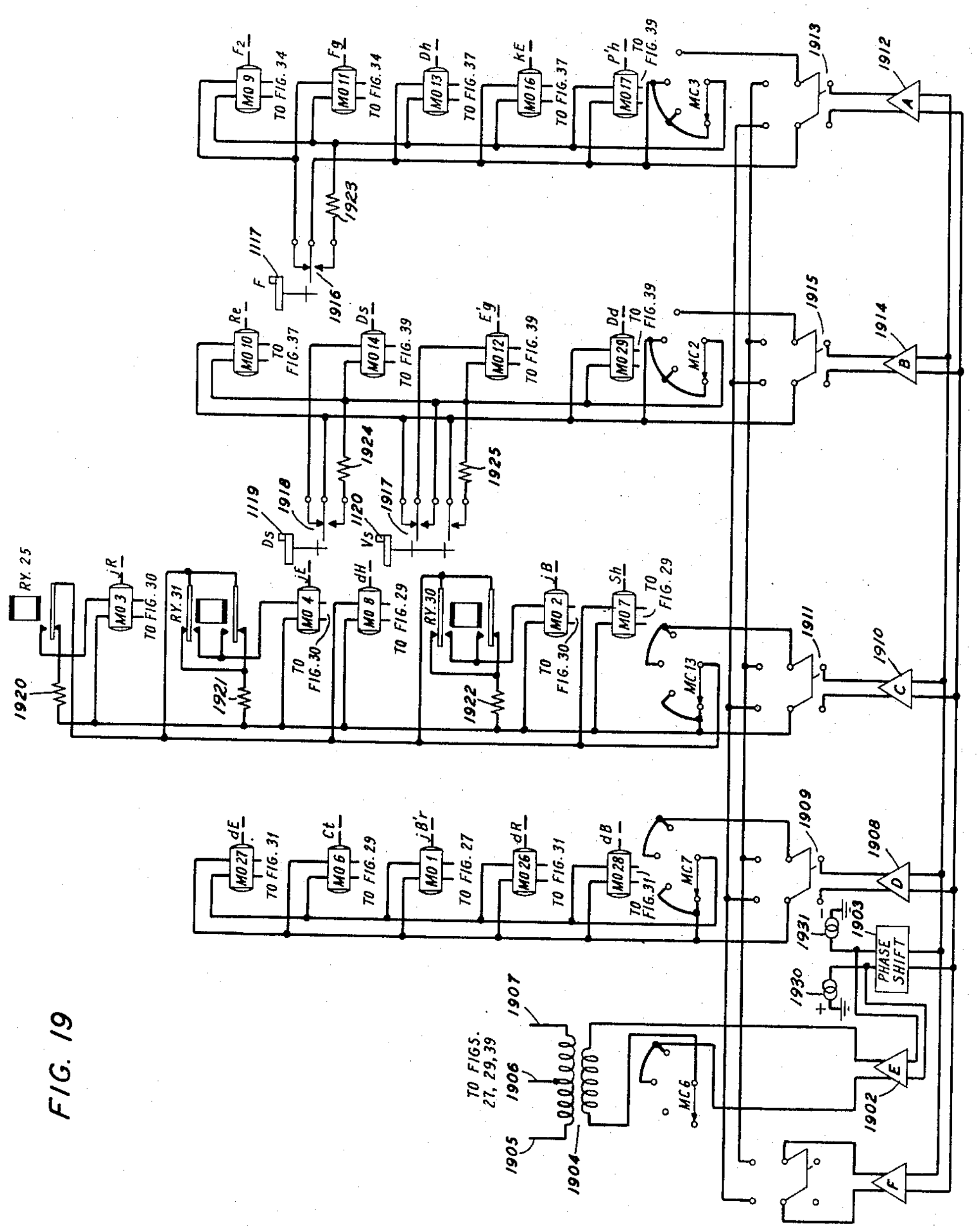
Figure 20:
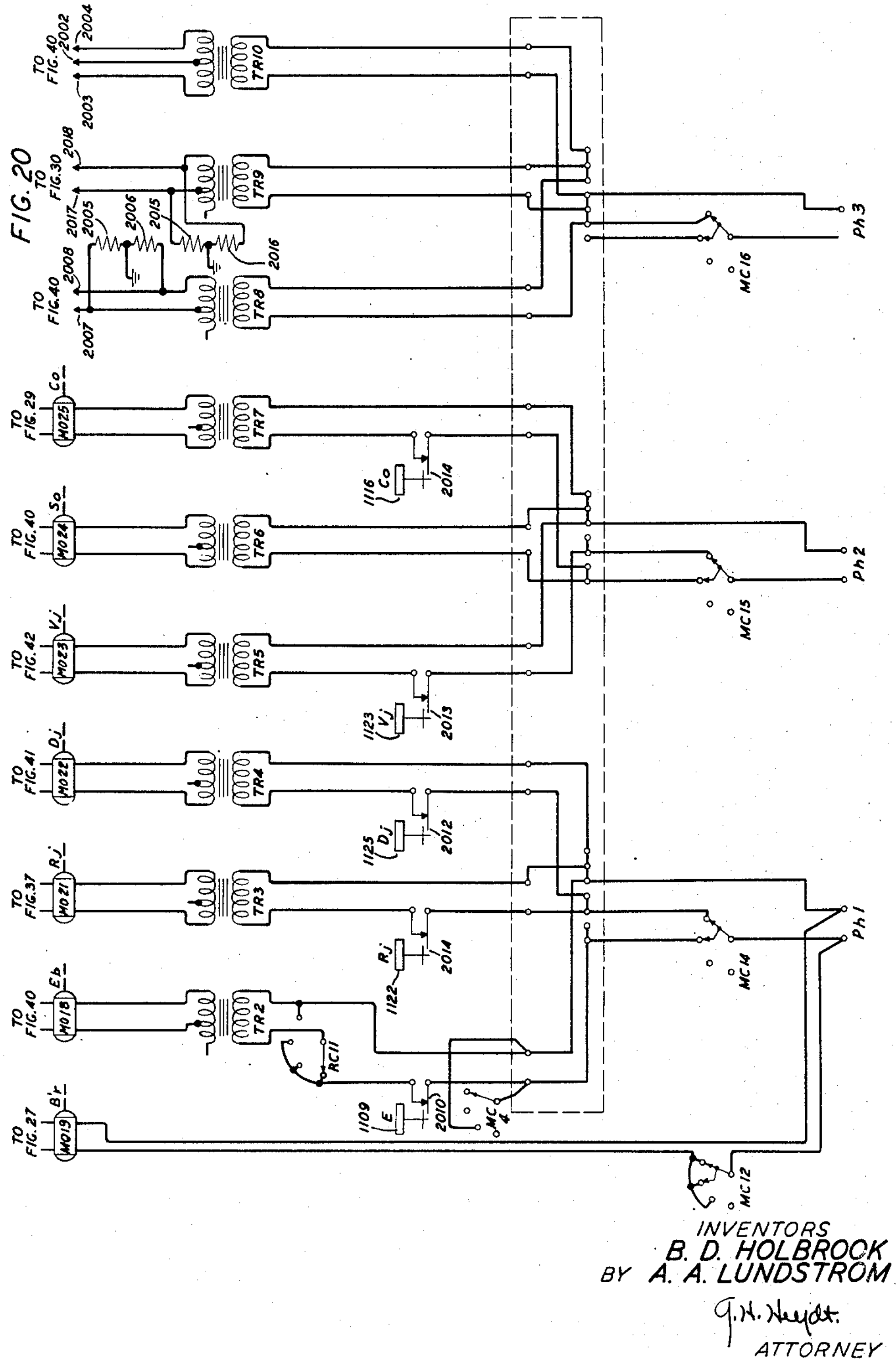
Figure 21:
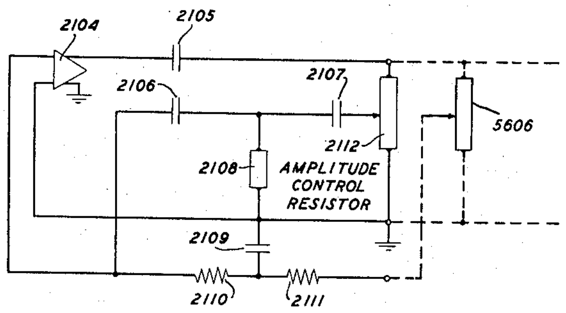
Figure 22:
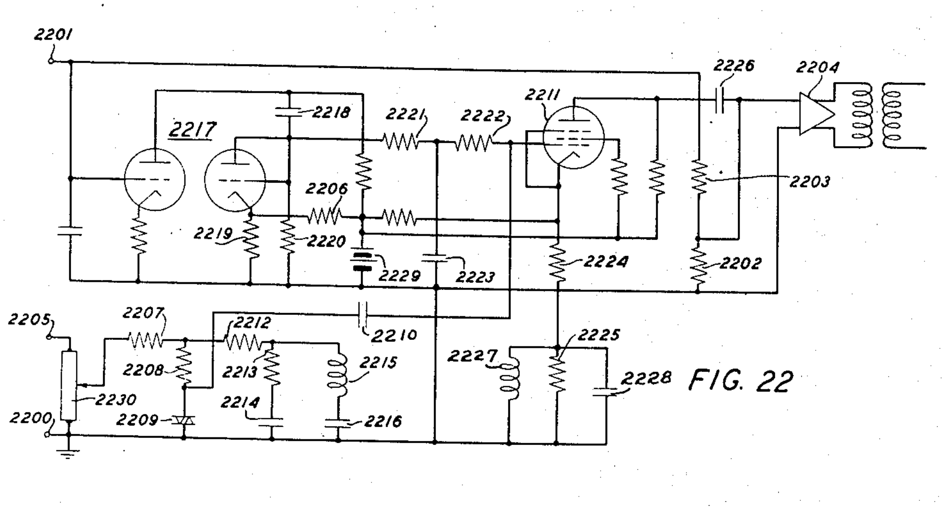
Figure 23:
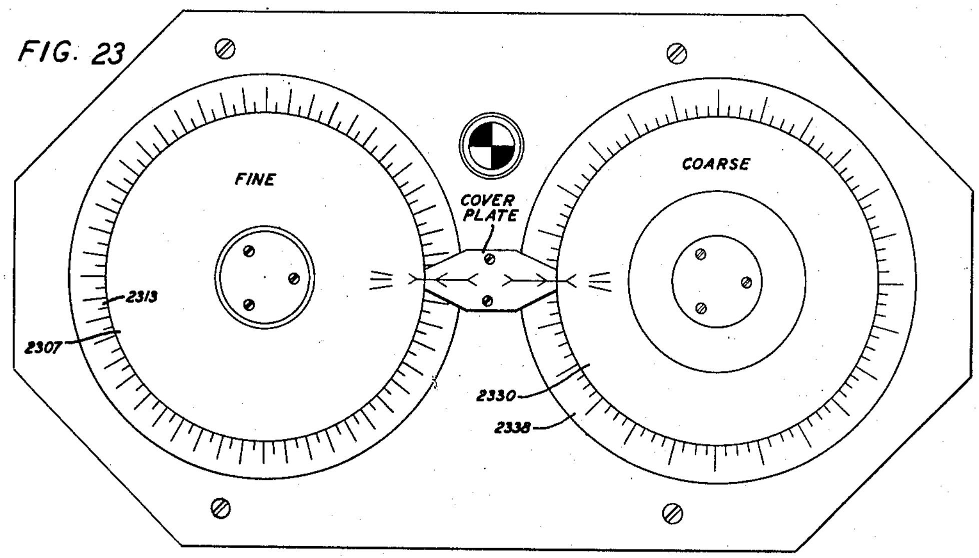
Figure 24:
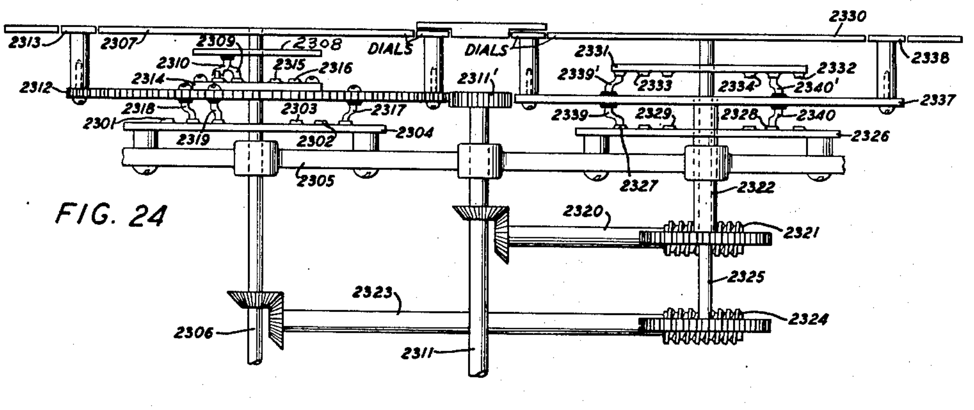
Figure 25:
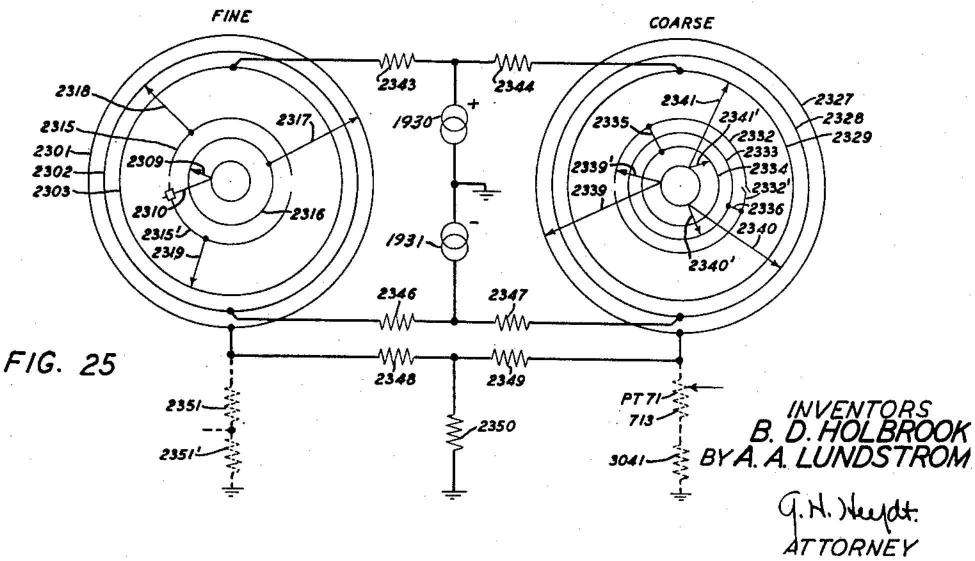
Figure 42:
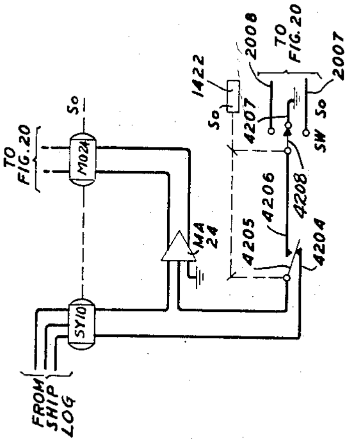
Figure 26:
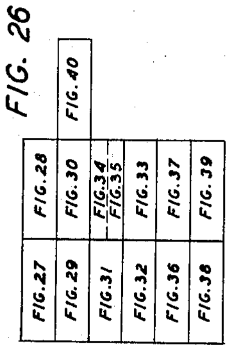
Figure 40:
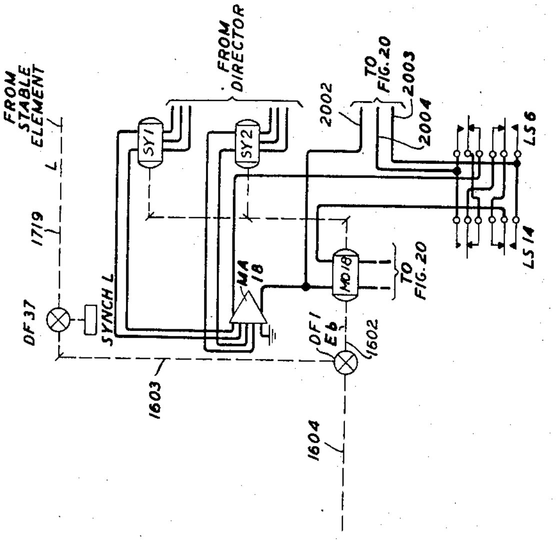
Figure 41:
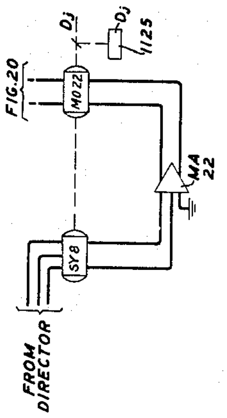

Figs. 12, 13 schematically show the controls and mechanism of the computer;

Figs. 14, 15, 16, 17 schematically show the motors, potentiometers, shafting, gearing and other mechanical details of the computer;

Fig. 18 schematically shows the relay and control circuits;

Fig. 19 schematically shows the exciting circuits of the 210-cycle motors;

Fig. 20 schematically shows the exciting circuits of the 60-cycle motors;

Fig. 21 schematically shows a variable frequency oscillator;

Fig. 22 schematically shows an amplifier for a follow-up motor;

Fig. 23 shows a plan view of the ring matching dials;

Fig. 24 diagrammatically shows the ring matching dials in elevation;

Fig. 25 schematically shows the circuits of the ring matching dials;

Fig. 26 shows a block diagram of the circuit connections;

Figs. 27 to 39 schematically show the circuits used in the computations;

Fig. 40 schematically shows the elevation follow-up system;

Fig. 41 schematically shows the deflection spot follow-up system;

Fig. 42 schematically shows the ship speed follow-up system; and

Figure 43:
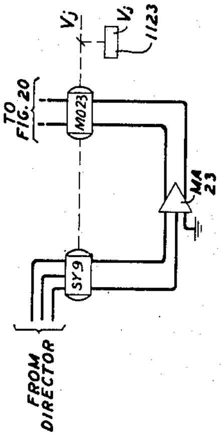

Fig. 43 schematically shows the elevation spot follow-up system.

Before describing the operation of the computer, the quantities involved in the computations and the conventions assumed will be defined.

In the definitions in the next section, the following conventions are understood:

(*a*) Quantities are ordinarily defined in terms of data received by the computer or derived from received data in the process of computation.

(*b*) The reference point of the computation for prediction is a (fictitious) mean gun located in the deck plane vertically below the director.

(*c*) The deck plane is the standard reference plane of the ship.

(*d*) Present position is the observed position of the target at the instant considered; line of sight is the line from the director to the present position.

(*e*) Point of burst is the calculated position of the target at the computed time of burst (time of flight seconds after the present), and may be regarded as the computed future position of the target.

(*f*) Advance position is the position obtained by applying to the point of burst corrections which are equal and opposite to the effects of drift and wind, and a correction equal to the total applied spot, all calculated for the point of burst. Line of advance position is the line from the mean gun to the advance position.

(*g*) Virtual position is the position vertically above the advance position by a distance equal to superaltitude. If the target continues in straight line constant speed motion, and the mean gun is ordered to the virtual position, the point of burst will coincide with the future position; the line from the mean gun to the virtual position is accordingly the ordered gun axis for the mean gun. Note that the ordered gun axis and the line of advance position lie in the same vertical plane.

*Symbols, names and definitions of quantities*

A Target angle. Angle between vertical plane through direction of motion of target with respect to water and vertical plane through line of sight, measured in the horizontal plane clockwise from direction of motion $$(A=180°+B-Ct)$$

($A=0°$ for target moving toward ship in vertical plane through line of sight.)

B True target bearing. Angle between north-south vertical plane and vertical plane through line of sight, measured in the horizontal plane clockwise from north ($B=Br+Co$).

ΔcB Increment of generated bearing. (Bearing correction.) The angle representing the integral with respect to time of angular bearing rate ($\Delta cB=\int dBdt$).

*d*B Angular bearing rate. The time rate of change of true target bearing.

δ*d*B Correction to angular bearing rate. The component of rate correction which is proportional to the difference between relative target bearing and generated relative target bearing.

ʃB Initial setting of, or correction to, generated target bearing.

B*gr* Advance relative target bearing. Angle between vertical plane through fore and aft axis of own ship and vertical plane through line of advance position, measured in the horizontal plane clockwise from the bow $$(Bgr=Br+Dh)$$

B′*gr* Gun train order. Angle between fore and aft axis of own ship and plane through ordered gun axis perpendicular to deck plane, measured in deck plane clockwise from bow $$(B'gr=B'r+Dd)$$

B*r* Relative target bearing. Angle between vertical plane through fore and aft axis of own ship and vertical plane through line of sight, measured in the horizontal plane clockwise from bow ($Br=B'r+jB'r$).

*c*B*r* Generated relative target bearing. Relative target. Bearing generated by the computer as opposed to relative target bearing derived from director train ($cBr=\Delta cBr+jB$).

$\Delta c$B*r* Increment of generated relative target bearing. The angle which is equal to the difference between the increment of generated bearing and ship's course ($\Delta cBr=\Delta cB-Co$).

B'*r* Director train. Angle between fore and aft axis of own ship and vertical plane through line of sight, measured in deck plane clockwise from bow.

*jB'r* Director tilt correction. The correction for the effect of deck tilt, used to derive relative target bearing from director train.

$\Delta c$B'*r* Increment of generated director train (train correction). The angle which is the difference between increment of generated relative target bearing and director tilt correction ($\Delta cB'r=\Delta cBr-jB'r$).

B*w* Wind direction. Angle between north-south vertical plane and direction from which true wind is blowing, measured in the horizontal plane clockwise from north.

($Bw=0°$ for wind blowing from north.)

B*wg* Advance wind angle. Angle between direction from which true wind is blowing and vertical plane through line of advance position, measured in the horizontal plane clockwise from direction from which wind is blowing $$(Bwg=Bws+Dh)$$

($Bwg=0°$ for wind blowing from advance position.)

B*ws* Wind angle. Angle between direction from which true wind is blowing and vertical plane through line of sight, measured in the horizontal plane clockwise from direction from which wind is blowing ($Bws=B-Bw$).

($Bws=0°$ for wind blowing from present position.)

C*o* Ship course. Angle between north-south vertical plane and vertical plane through fore and aft axis of own ship, measured in the horizontal plane clockwise from north to bow of ship.

($Co=0°$ for ship moving toward north.)

C*t* Target course. Angle between north-south vertical plane and vertical plane through direction of motion of target with respect to water, measured in the horizontal plane clockwise from north.

($Ct=0°$ for target moving toward north.)

C4 (E2), C5 (E2), C6 (E2) Empirical functions of Advance Elevation used in calculation of ballistic quantities.

$\delta$C*t* Correction to target course. The component of rate correction which is applied to target course.

D*d* Deck deflection. Angle between vertical plane through line of sight and plane through ordered gun axis perpendicular to deck, measured in deck plane clockwise from intersection with vertical plane containing line of sight.

D*h* Horizontal deflection. Angle between vertical plane through line of sight and vertical plane through line of advance position, measured in the horizontal plane clockwise from plane containing line of sight.

D*j* Deflection spot. Angular deflection of point of burst, measured as the angular deflection of advance position in the slant plane containing the line of advance position and perpendicular to the vertical plane containing that line ("Right" or positive if the advance position is moved to the right).

D*s* Sight deflection. Angle between the vertical plane containing the line of sight and the vertical plane containing the line of advance position, measured in the slant plane which contains the line of sight and which is perpendicular to the vertical plane containing the line of advance position, clockwise from the line of sight ($\sin Ds=\sin Dh \cos E$).

E Target elevation. Angle between the horizontal plane and the line of sight, measured in the vertical plane through the line of sight upward from the horizontal plane ($E=Eb-L$).

*c*E Generated target elevation. Target elevation generated by the computer as opposed to target elevation derived from director elevation ($cE=\Delta cE+jE$).

$\Delta c$E Increment of generated elevation. The angle which represents the integral with respect to time of angular elevation rate ($\Delta cE=\int dEdt$).

*d*E Angular elevation rate. The time rate of change of target elevation.

$\delta d$E Correction to angular elevation rate. The component of rate correction which is proportional to the difference between target elevation and generated target elevation.

*j*E Initial setting of, or correction to, generated elevation.

*k*E Elevation prediction. The angular difference between advance elevation and target elevation (positive when E2 is greater than E).

E*b* Director elevation. Angle between the deck plane and the line of sight, measured in the vertical plane through the line of sight upward from the deck plane.

$\Delta c$E*b* Increment of generated director elevation (elevation correction). The angle which is equal to the sum of increment of generated elevation, level, and 1/30 of cross level $$(\Delta cEb=\Delta cE+L+Zd/30)$$

E'*g* Gun elevation order. Angle between the deck plane and the ordered gun axis, measured upward from the deck plane in the plane perpendicular to the deck plane and containing the ordered gun axis.

E2 Advance elevation. Angle between the horizontal plane and the line of advance position, measured upward from the horizontal plane in the vertical plane through the line of advance position ($E2=E+kE$).

F Fuze setting order. The sum of fuze time and correction for dead time, measured in seconds ($F=F2+Fg$).

F*g* Correction for dead time. The correction in seconds which is added to fuze time to allow for the relative motion of target and shell during dead time.

F2 Fuze time. Numerically equal to time of flight in fire at aircraft targets (for mechanical fuzes).

*f*6(F2) An empirical function of fuze time used in computation for correction for dead time.

*f*1(*d*R), *f*1(*d*E), *f*1(*d*B). Empirical functions of range rate, angular elevation rate, and angular bearing rate used for control of integrators in rate generation.

$f2(Re)$, $f3(Re)$, $f4(Re)$ Empirical functions of ballistic range used in calculation of ballistic quantities.

G*f* Drift distance. The lateral deflection of the point of burst due to rifling, measured in yards as the horizontal displacement of the advance position at right angles to the line of advance position (position for drift to right).

G*j* Lateral spot. The lateral displacement of the point of burst caused by a deflection spot, measured in yards as the horizontal displacement of the advance position at right angles to the line of advance position (positive when the point of burst is displaced to the right on introduction of a "Right" deflection spot) ($Gj = Dj \cdot R2$).

G*w* Cross wind distance. The lateral displacement of the point of burst caused by relative wind, measured in yards as the horizontal displacement of the advance position at right angles to the line of advance position (positive for wind blowing from left across the line of advance position).

H Height. Vertical distance of target above the horizontal plane through the director sights ($H = cR \sin E$).

*d*H Rate of climb. The time rate of change of height.

$\delta d$H Correction to rate of climb. The component of rate correction which is applied to rate of climb.

H*f* Superaltitude. Vertical distance in yards from the advance position to the virtual position, corrected for loss of initial velocity; applied as the correction to compensate for curvature of trajectory in the vertical plane ($Hf = Hfo + Hm$).

H*fo* Basic superaltitude. Superaltitude uncorrected for loss of initial velocity.

H*j* Height spot. See X*j*.

H*p* Height correction for parallax. The correction for parallax due to vertical base to refer the point of computation for prediction to the mean gun position (positive when the point of observation is above the mean gun position).

H*m* Superaltitude correction for loss of initial velocity.

H*t* Height prediction. See X*t*.

H*w* Height correction for wind. See X*w*.

H2 Advance height. Vertical coordinate of advance position in the XYH coordinate system, measured in yards as the vertical distance to the advance position from the horizontal plane through the mean gun ($H2 = H + kH$).

I. V. Initial velocity. The velocity of the shell as it leaves the muzzle of the gun (assumed to be corrected for temperature and gun).

L Level. Angle between the deck plane and the horizontal plane, measured in the vertical plane through the line of sight (positive when deck toward target is tilted down).

P'*h* Unit train parallax. The angle subtended by a base line in the deck plane and extending 100 yards forward from the mean gun, at the projection of the virtual position on the deck plane, measured in the deck plane clockwise from the line of virtual deck range (R'*h*2).

Q*j* Longitudinal spot. The horizontal component of the displacement of the point of burst caused by an elevation spot, measured in yards as the horizontal displacement of the advance position in the vertical plane containing the line advance position (positive when the point of burst is displaced outward on the introduction of a "Down" elevation spot).

Q*w* Tail wind distance. The longitudinal displacement of the point of burst caused by relative wind, measured in yards as the horizontal displacement of the advance position in the vertical plane containing the line of advance position (positive for a wind blowing toward the advance position).

R Range. The distance from the director to the target, measured in yards along the line of sight.

*c*R Generated range. Range generated by the computer as opposed to range observed from the director ($cR = \Delta cR + jR$, used for all computations instead of R).

$\Delta c$R Increment of generated range (range correction). The quantity which represents the integral with respect to time of range rate ($\Delta cR = \int dR dt$).

*c*R*d*E Linear elevation rate. The component of relative velocity of ship and target which is at right angles to the line of sight in the vertical plane containing the line of sight (positive when upward).

*d*R Range rate. The time rate of change of range (positive for relative motion of target away from own ship).

$\delta d$R Correction to range rate. The component of rate correction which is proportional to the difference between range and generated range.

*j*R Initial setting of, or correction to generated range.

*k*R Range prediction. The difference in yards between advance range and generated range (positive when advance range is greater than generated range).

R*e* Ballistic range. An empirical function of advance range and advance elevation which is used in calculation of ballistic quantities. Equal to advance range when $E2 = 0°$.

R*h* Horizontal range. The horizontal projection of generated range ($Rh = cR \cos E$).

*d*R*h* Horizontal range rate. The time rate of change of horizontal range.

$\delta d$R*h* Correction to horizontal range rate. The component of rate correction which is parallel to horizontal range.

*k*R*h* Horizontal range prediction. The difference in yards between advance horizontal range and horizontal range (positive when R*h*2 is greater than R*h*).

R*hd*B Linear bearing rate. The horizontal component of relative velocity of ship and target which is at right angles to the vertical plane containing the line of sight (positive to the right).

R*h*$\delta d$B Correction to linear bearing rate. The horizontal component of rate correction at right angles to horizontal range.

R*h*2 Advance horizontal range. The horizontal projection of advance range ($Rh2 = Rh + kRh$).

*d*R*h*2 Advance horizontal range rate. The time rate of change of advance horizontal range (used only in computation for correction for dead time).

R'*h*2 Virtual deck range. The distance from the mean gun to the projection on the deck plane of the virtual position, measured in yards in the deck plane.

R2 Advance range. The distance from the mean gun to the advance position, measured in yards along the line of advance position ($R2 = cR + kR$).

$dR2$ Advance range rate. The time rate of change of advance range (used only in computation for correction for dead time).

$Rf$ Range spot. The linear displacement of the point of burst, measured in yards as the linear displacement of advance position along the line of advance position (positive when the point of burst is displaced outward on the introduction of an "Out" range spot).

$Sf$ Shell velocity. The average velocity of the shell in the neighborhood of the point of burst (used only in computation for correction for dead time).

$Sh$ Target speed horizontal. The horizontal component of target speed with respect to water.

$\delta Sh$ Correction to target speed horizontal. The component of rate correction which is applied to target speed horizontal.

$Sh\delta Ct$ Correction normal to target speed horizontal. The component of rate correction which is applied at right angles to target speed horizontal.

So Ship speed. The velocity of own ship relative to water.

$Ss$ Diving speed. The velocity of target moving along the line of sight towards own ship ($Ss=-dR$; used only in dive attack).

$St$ Target speed. The velocity of target relative to water (not used explicitly in the computations).

$Sw$ Wind speed. The velocity, assumed to be horizontal, of true wind relative to water.

$a$S Train and elevation sensitivity.

$r$S Range sensitivity.

S1(E2) . . . . S7(E2) Empirical functions of advance elevation used in calculation of ballistic quantities.

$Tf$ Time of flight. Time of flight of shell from mean gun to the point of burst, corrected for loss of initial velocity ($Tf=Tfo+Tm$).

$Tfo$ Basic time of flight. Time of flight without correction for loss of initial velocity (I. V.=2600 F. S.).

$Tg$ Dead time. Time in seconds between setting fuse and firing shell.

$Tm$ Time of flight correction for loss of initial velocity.

$Twc$ Cross wind time. The apparent time in which the cross component of relative wind acts to displace the point of burst if the lateral motion caused by wind is considered to be at the cross wind velocity (derived from the ballistic data).

$Twt$ Tail wind time. The apparent time in which the longitudinal component of relative wind acts to displace the point of burst if the longitudinal motion caused by wind is considered to be at the tail wind velocity $$(Twt=Twc \cdot C6(E2))$$

(Does not exist separately in the mechanism.)

$Twv$ Vertical wind time. The apparent time in which the longitudinal component of relative wind acts to displace the point of burst vertically if the vertical motion caused by wind is considered to be at the tail wind velocity $$(Twv=Twt \cdot S6(E2))$$

(Does not exist separately in the mechanism.)

$Vj$ Elevation spot. Angular change in elevation of point of burst, measured as the angular change of advance position in the vertical plane containing the line of advance position ("Up" or positive if the point of burst is raised).

$Vs$ Sight angle. The difference between gun elevation order and director elevation $$(Vs=E'g-Eb)$$

X, Y, W Coordinates of the virtual position referred to rectangular axes with the origin at the mean gun. The XY plane is horizontal and the YW plane is vertical and contains the line of sight. When facing target, X is positive to the right, Y is positive toward target, and W is postive upward $$(X=kX,\ Y=Rh+kY,\ W=H+Hf+kH)$$

$k$X, $k$Y, $k$H Components of prediction. The total components of corrections in the XYW, coordinate system to compensate for the effects of relative motion of ship and target, drift, relative wind, and deflection and elevation spots. The height correction for parallax is also included. The corrections are positive in the positive directions of X, Y and W $$(kX=Xt+Xf+Xw+Xj,\ kY=Yt+Yf+Yw+Yj,\ kH=Ht+Hw+Hj+Hp)$$

X', Y', W' Coordinates of the virtual position referred to rectangular axes with the origin at the mean gun. The X'Y' plane contains the deck plane, the Y'W' plane is perpendicular to the deck, and the vertical plane through the Y' axis contains the line of sight. Directions are positive in the same senses as in the XYW system.

X'', Y'', W'' Coordinates of the virtual position referred to rectangular axes with the origin at the mean gun, obtained from the XYW system by a rotation about the X axis by an angle equal to level (L). Rotation of the X''Y''W'' system about the Y'' axis by an angle equal to cross level (Z$d$) results in obtaining the X'Y'W' system. Directions are positive in the same senses as in the XYW system.

$Xf$, $Yf$ Corrections for drift. Components of the correction to compensate for the displacement of the point of burst caused by drift of the shell due to rifling, measured in yards as the displacement of the advance position in the XY coordinate system. There is no vertical component at the advance position; H$f$ is applied to obtain the virtual position.

$Xj$, $Yj$, H$j$ Spot corrections. Components of the displacement of the point of burst caused by deflection spot (D$j$) and elevation spot (V$j$), measured in yards as the displacement of the advance position in the XYW coordinate system.

$Xt$, $Yt$, H$t$ Components of basic prediction. Components of corrections to compensate for the displacement of the point of burst caused by relative motion of ship and target, measured in yards as the displacement of the advance position in the XYW coordinate system.

$Xw$, $Yw$, $Hw$ Corrections for wind. Components of the corrections to compensate for the displacement of the point of burst caused by relative wind, measured in yards as the displacement of the advance position in the XYW coordinate system. Relative wind includes true wind and own ship's wind.

X2, Y2, H2 Coordinates of the advance position in the XYW coordinate system.

Z$d$ Cross level. Angle of tilt of deck about a line which is the intersection of the deck plane with the vertical plane through the line of sight (positive if when facing target, deck at left is tilted down).

The operation of the computer when used for the automatic computation of gun orders for continuous fire against aircraft will first be described in detail, then the modifications in the computer necessary for other types of targets, such as diving aircraft, surface targets, etc.; special types of fire, such as selected level; and the control of larger caliber weapons will be described.

Figure 1:
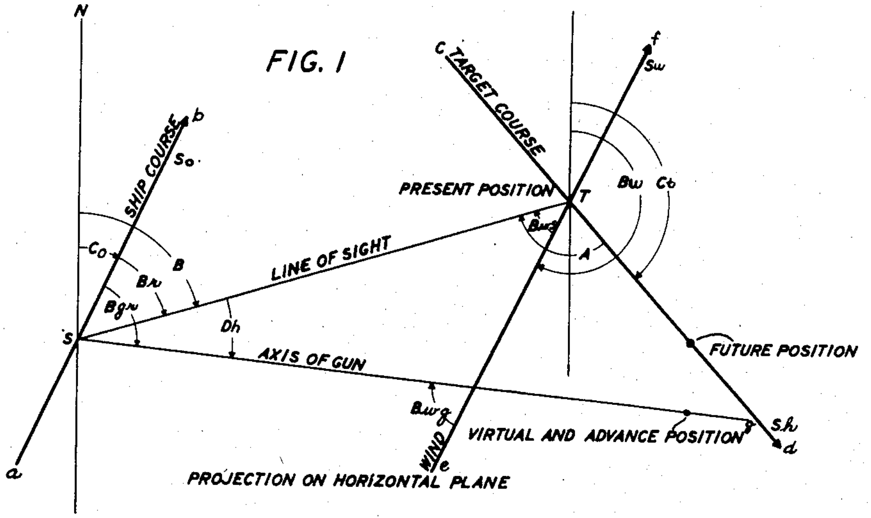
Figs. 1, 1A, 1B show in plan and elevation the relationships, for antiaircraft fire, of own ship and target.
Figure 1A:
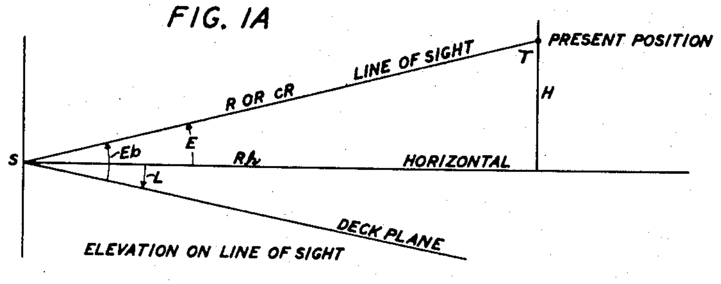
Figure 1B:
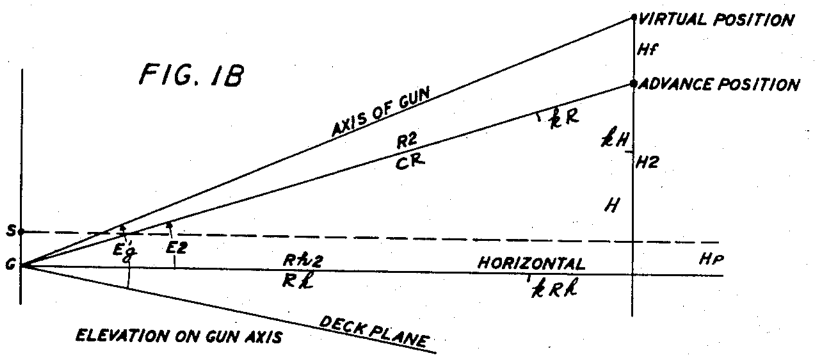

The significance of some of the quantities defined in the glossary above will be more easily appreciated by consideration of Figs. 1, 1A and 1B, which show in plan and elevations the relationships involved in firing from a ship at an aerial target. The ship S (Fig. 1) is moving at a speed So along a course *a—b*, having a bearing Co with respect to north. The projection of the target T is moving at a speed S*h* along a course *c—d*, having a bearing C*t* with respect to north.

The line of sight ST from the director on the ship S to the present position of the target T has a true target bearing B, with respect to north, and a bearing B*r* relative to the axis of the ship, measured in the horizontal plane.

The vertical plane through the target course is at a target angle A, measured in the horizontal plane, to the vertical plane through the line of sight.

A wind, having a true wind speed S*w*, is blowing from e to f, at a true wind direction B*w* with respect to north. The wind angle B*ws* is measured in the horizontal plane from the wind direction to the vertical plane through the line of sight.

As shown in Fig. 1A, the line of sight ST from the director to the present position of the target is at a director elevation E*b* with respect to the deck plane, and a target elevation E with respect to the horizontal plane. The target T is at a range R from the director and a height H above the horizontal plane through the director; and the projection of the target on the horizontal plane is at a horizontal range R*h* from the director.

In Fig. 1, the axis of the mean gun is in the vertical plane through *S—g*, having an advance target bearing B*gr*, measured in the horizontal plane relative to the fore and aft axis of the ship, and a horizontal deflection D*h* measured in the horizontal plane relative to the vertical plane through the line of sight. The vertical plane through the axis of the gun is at an advance wind angle B*wg*, measured in the horizontal plane from the direction from which the wind is blowing. A shell fired along the axis of the gun in the direction of the advance position will be deflected by the wind and other ballistic effects, and, if the computations are correct, will burst on the target when the target reaches the future position.

As shown in Fig. 1B, the advance position is at an advance range R2 from the mean gun G, and advance height H2 above the horizontal plane, and the projection of the advance position is at an advance horizontal range R*h*2 from the mean gun. The line from the mean gun to the advance position has an advance target elevation E2 with respect to the horizontal plane. As the attraction of gravity, and other ballistic effects, cause the shell to travel below the line of the axis of the gun, the axis of the gun is aimed at the virtual position, having the superaltitude H*f* vertically above the advance position. The axis of the gun is thus elevated to the gun elevation order E'*g*, measured with respect to the deck plane.

The broad principles of the theory of the computations will be explained with the aid of the block schematic shown in Fig. 2, in which the apparatus in the computer has been grouped on a functional basis without regard to its actual location in the computer. In this schematic, the principal quantities involved in the computations are represented by the symbols in the glossary, mechanical shaft movements are shown by dotted lines, and voltages by solid lines. Later, a detailed description of the complete computer will be given.

*Director tilt corrector*

The director elevation E*b*, and director train B'*r* of the target are measured by the director with respect to the plane of the deck, which is constantly changing its position due to the rolling and pitching of the ship. For convenience in making the subsequent computations, these angles are corrected to refer to the stable horizontal plane maintained by the stable element. Thus, in Fig. 2, by means of the synchronous transmission systems, the director 1 supplies to the director tilt corrector 2 shaft movements proportional to E*b* and B'*r*.

The stable element 3 supplies to the corrector 2 a shaft movement proportional to the level L, and this movement is combined in a differential gear with the movement proportional to E*b* to produce a shaft movement proportional to the target elevation E.

Figure 3:
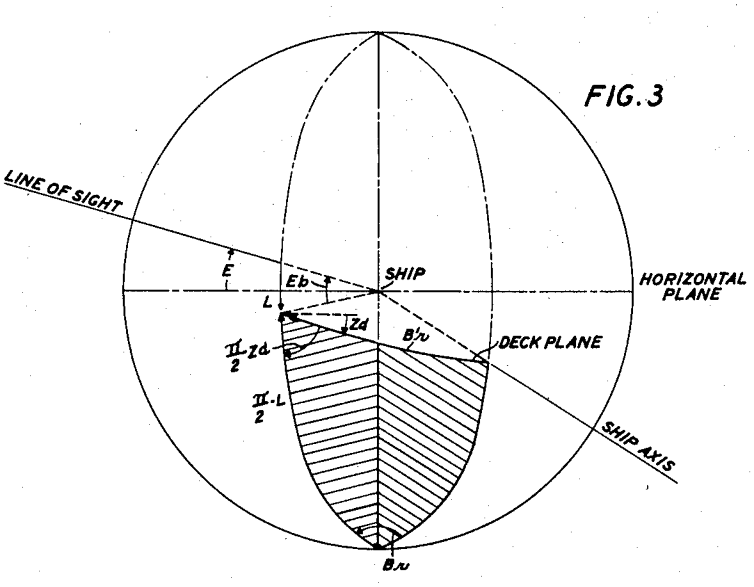
Fig. 3 is a three-dimensional diagram of the angles involved in the director tilt corrector.

The problems involved in correcting the director train B'*r* may be visualized by a consideration of Fig. 3, in which the quantities involved have been projected on a sphere, having the director at the center of the sphere. The vertical plane through the line of sight, the vertical plane through the fore and aft axis of the ship, and the deck plane are projected from the ship to the surface of the sphere to form the spherical triangle shown in heavy line. The director train B'*r* is supplied by the director, the level L and cross level Z*d* are supplied by the stable element, thus, in this triangle the two sides, B'*r* and $$\frac{\pi}{2}-L$$

and the included angle $$\frac{\pi}{2}-Zd$$

are known. The angle B*r* can, therefore, be found.

The customary solution of a spherical triangle of this type is:

$$\cot Br=\frac{\cot B'r\cos L-\sin L\sin Zd}{\cos Zd}$$

This equation is not suitable for solution by the methods used in the present computer, since cot B*r* and cot B'*r* both approach infinity as B*r* and B'*r* approach $\pi$ or zero. The difference, $jB'r=Br-B'r$, never exceeds a comparatively small value. The value $Br-jB'r$ is substituted for B'*r* and the equation is thus transformed to the form:

$$\begin{aligned}&\tan \underline{jB'r}\\&+(-\sin Br\cos Br-\sin^2 Br\tan jB'r+\tan \underline{jB'r})(-\operatorname{vers} Zd)\\&+(-\sin Br\cos Br-\sin^2 Br\tan \underline{jB'r})(\operatorname{vers} L)\\&+(\sin^2 Br-\sin Br\cos Br\tan \underline{jB'r})(-\sin Zd\sin L)=0 \quad (1)\end{aligned}$$

The underlined quantity is obtained from the computation.

Figure 2:
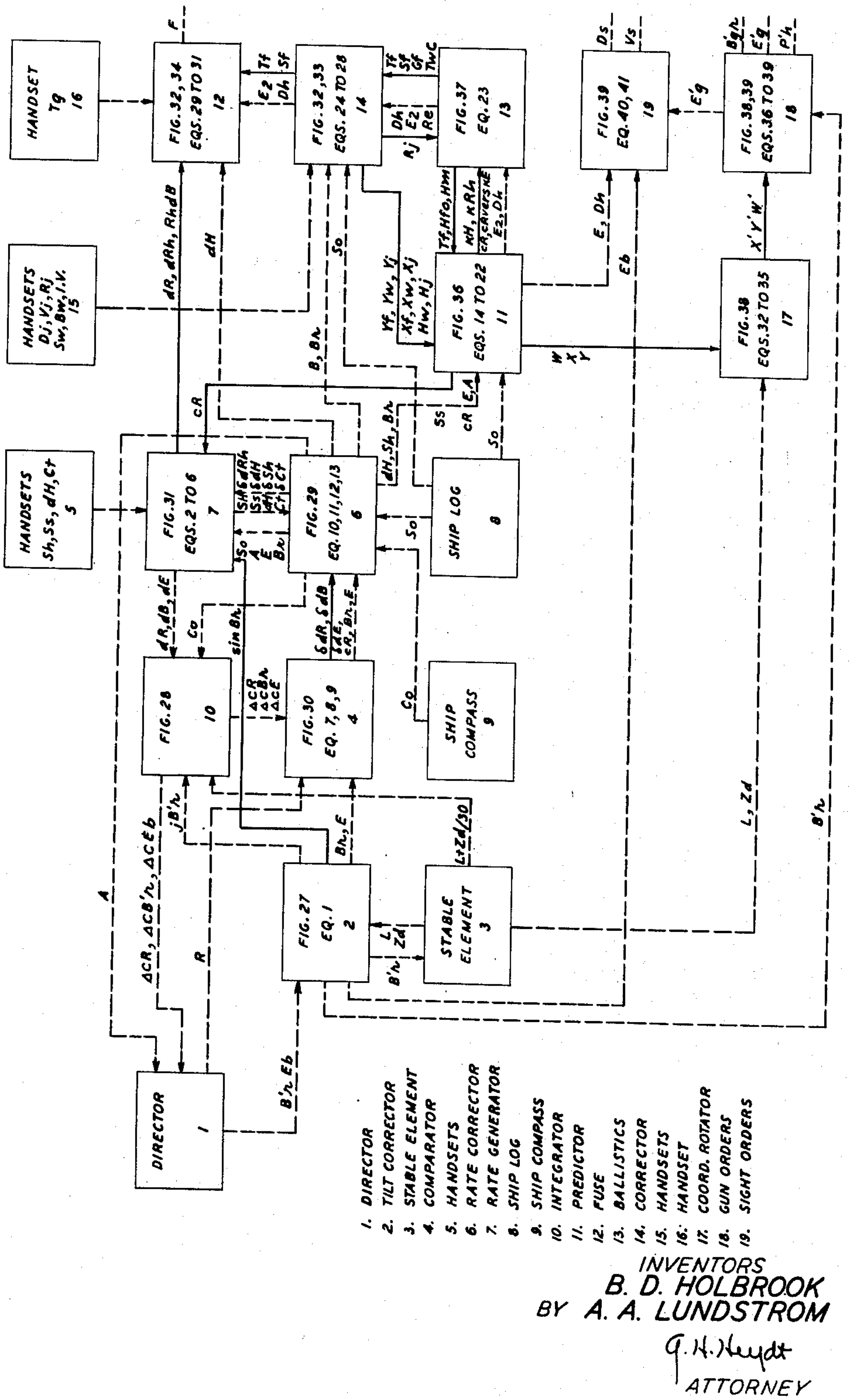
Fig. 2 is a functional block schematic of the computer and associated devices.

The director tilt corrector 2, Fig. 2, continuously solves this equation to produce a shaft movement proportional to $jB'r$. The shaft movement proportional to $jB'r$ is combined in a differential gear with the shaft movement proportional to $B'r$ to produce a shaft movement proportional to $jB'r+B'r=Br$, and a voltage proportional to sin B$r$. The shaft movement proportional to B$'r$ is also supplied to the stable element 3.

*Rate comparator*

The shaft movements proportional to B$r$ and E are supplied by the director tilt corrector to the rate comparison device 4. As the range R is not materially affected by the pitching and rolling of the ship, a shaft movement proportional to R is supplied by a synchronous transmission system directly from the director 1 to the rate comparison device 4.

In the present computer, the prediction is based upon the usual assumption that, during the time of flight of the shell, the motion of the target is in a straight line at uniform speed. For a target moving in a straight line at uniform speed, the course C$t$, the horizontal speed S$h$ relative to the water, and the rate of climb $d$H, of the target are constant, and thus may easily be estimated. Shaft movements proportional to the estimated values of S$h$, $d$H and C$t$ are generated by the computer, combined with shaft movements proportional to own ship speed So and own ship course Co, converted to rates of range $d$R, bearing $d$B and elevation $d$E, integrated, and the resultant displacements $\Delta c$R, $\Delta c$B$r$ and $\Delta c$E compared with the displacements R, B$r$ and E from the director 1 and corrector 2. The differences, if any, between the generated displacements and the measured displacements from the director are fed back to correct the estimated values of S$h$, $d$H and C$t$, until the correct values are attained. The displacements proportional to the corrected values of $\Delta c$R, $\Delta c$B$r$ and $\Delta c$E are supplied to the director to drive the director in tracking the target, and shaft movements and voltages dependent on other quantities derived from these generated quantities are supplied to the predictor.

*Rate generator*

Any values of S$h$, $d$H and C$t$ may be initially set in to the computer and eventually these values will be corrected to the true values. The closer the initial values are to the true values, the less the correction that will be required and the more rapidly the solution will be reached.

Figure 4:
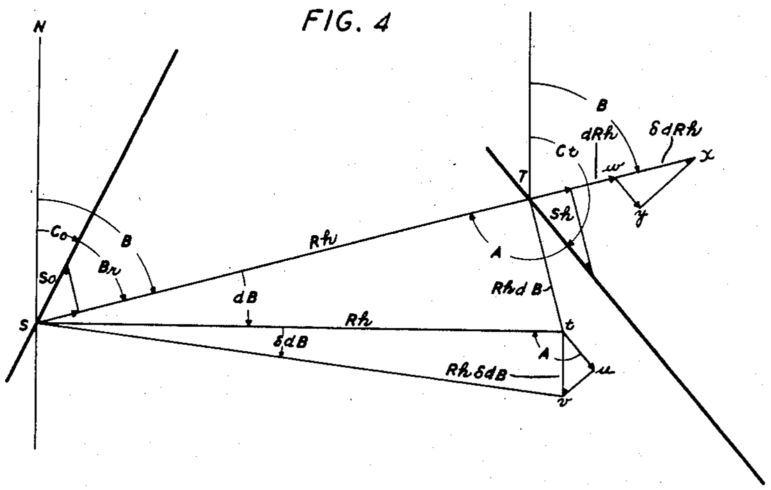
Figs. 4, 4A show in plan and elevation the relationships involved in the determination of the relative linear rates, and corrections to these rates.

In Fig. 4, the speed So of own ship S and the speed S$h$ of the target T have been projected in plan on the horizontal plane through the director. The distance ST from own ship S to the projection of the target T is the horizontal range R$h$.

Own ship S has a speed So at a relative bearing B$r$. The component transverse to the range R$h$ is $So\sin Br$; and the component along the range R$h$ is $-So\cos Br$ (the negative sign indicating that this component decreases the horizontal range).

The target angle A is evidently $B+\pi-Ct$. The component of target speed transverse to the range R$h$ is $Sh\sin(180-A)=Sh\sin A$, and the component along the range R$h$ is $$Sh\cos(180-A)=-Sh\cos A$$

Voltages proportional to $-So\cos Br$ and $-Sh\cos A$ are added to produce a voltage proportional to $d$R$h$, the rate of change of horizontal range.

$$\underline{dRh}=-So\cos Br-Sh\cos A \qquad (2)$$

Voltages proportional to $So\sin Br$ and $Sh\sin A$ are produced in the computer and added to produce a voltage proportional to R$hd$B, the linear deflection rate.

$$\underline{RhdB}=So\sin Br+Sh\sin A \qquad (3)$$

Figure 4A:
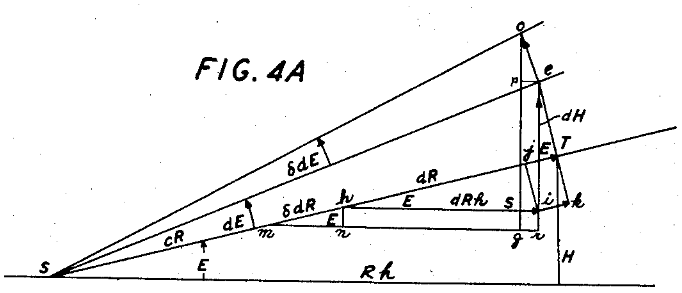

In Fig. 4A, the horizontal speed $d$R$h$ and rate of climb $d$H have been projected in elevation on the vertical plane through the line of sight. The line of sight ST from own ship S to target T is at an elevation E above the horizontal plane, and has a length equal to the range $c$R. With optical range finders, the values of the observed range R usually are not continuous, thus, in the present computation, and in the predictor, the values of the generated range, $c$R, which eventually becomes equal to R and are continuous, are used.

The rate of change of horizontal range, $d$R$h$, has a component $hj=dRh\cos E$ along the range, and a component $ji=-dRh\sin E$ transverse to the range (the negative sign indicating that this component decreases the elevation E).

The rate of climb $d$H has a component $ik=dH\sin E$ along the range and a component $k1=dH\cos E$ transverse to the range.

The rate of change of the range $hT=dR$ is the sum of the components $hj=dRh\cos E$ and $jT=ik=dH\sin E$. Voltages proportional to $-dRh\cos E$ and $-dH\sin E$ are produced in the computer and balanced in the input of a motor amplifier against a voltage approximately proportional to $d$R, controlled by a motor connected to the amplifier. The motor varies the value of $d$R until the output voltage of the amplifier is reduced to zero. The shaft of the motor has thus rotated to the value of $d$R.

$$\underline{dR}-dRh\cos E-dH\sin E=0 \qquad (4)$$

The linear elevation rate, $lT=cRdE$, is the difference of the components $lk=dH\cos E$ and $Tk=ji=dRh\sin E$. Voltages proportional to $dH\cos E$ and $-dRh\sin E$ are supplied to the input circuit of a motor amplifier. As shown in Fig. 2, a voltage proportional to $c$R is supplied by the predictor 11, and this voltage is varied by the motor connected to the amplifier proportionally to $d$E and balanced against the other voltages in the input of the amplifier. When the output voltage of the amplifier is reduced to zero, the shaft of the motor has rotated to the value of $d$E.

$$-cR\underline{dE}+dH\cos E-dRh\sin E=0 \qquad (5)$$

In Fig. 4A, $cR\cos E=Rh$ thus in Fig. 4, $$cR\cos EdB=RhdB$$

A voltage proportional to R$hd$B, Equation 3, is supplied to the input circuit of a motor amplifier. A voltage proportional to $c$R, supplied by the predictor, is modified proportionally to cos $E$ and the modified voltage is varied by a motor connected to the amplifier proportionally to $d$B and balanced against the other voltage in the input of the amplifier. When the output voltage of the amplifier is reduced to zero, the shaft of the motor has rotated to the value of $d$B $$-cR\cos E\underline{dB}+RhdB=0 \qquad (6)$$

The handsets 5, Fig. 2, are adjusted to supply to the rate generator 7 shaft movements proportional to S$h$, $d$H and C$t$. A voltage proportional to sin $Br$ is supplied by the director tilt corrector 2. The ship log 8 supplies a shaft rotation proportional to So. As will be explained below, the rate corrector 6 supplies shaft rotations proportional to A, E and B$r$.

The rate generator 7 continuously solves Equations 2, 3, 4, 5, 6 and supplies to the rate integrator 10, shaft movements proportional to $d$R, $d$B, $d$E, and also supplies to the dead time correction computer voltages proportional to $d$R, $d$H, $d$R$h$ and −R$hd$B.

*Rate integrator*

In the rate integrator 10, the rates $d$R, $d$B, $d$E are integrated, giving $\int dRdt=\Delta cR$, $\int dBdt=\Delta cB$ and $\int dEdt=\Delta cE$. The displacement ΔcB is combined in a differential gear with the bearing Co, transmitted from the ship compass 9 through the rate corrector 6, to produce a shaft rotation proportional to $\Delta cBr=\Delta cB-Co$; and the shaft rotation proportional to Δc$Br$ is combined in a second differential gear with a shaft rotation proportional to $jB'r$ from the director tilt corrector 2 to produce a shaft rotation proportional to $\Delta cB'r=\Delta cBr-jB'r$. The shaft rotation proportional to ΔcE is combined in a differential gear with a shaft rotation proportional to $L+Zd/30$ from the stable element 3 to produce a shaft rotation proportional to $\Delta cEb=\Delta cE+L+Zd/30$. The shaft rotations proportional to ΔcR, ΔcB′$r$ and Δc$Eb$ are transmitted by synchronous transmission systems to the director, to drive the observing instruments.

*Comparator*

Shaft rotations proportional to ΔcR, ΔcB$r$ and ΔcE are supplied by the integrator 10 to the comparator 4. A shaft rotation proportional to R is supplied by the director 1, through a synchronous transmission system to the comparator 4; and shaft rotations proportional to B$r$ and E are supplied by the director tilt corrector 2.

The rotation proportional to ΔcR is supplied through a differential gear to one ring of a ring dial, and the rotation proportional to R is supplied to the other ring of the ring dial. If $d$R has the correct magnitude, the two rings will rotate in synchronism. If $d$R is not of the correct magnitude, the two rings will be out of synchronism, and are arranged to close the circuits of a motor, which through the differential gear, supplies an additional rotation, $j$R, which is algebraically added to ΔcR until the rings are in synchronism.

Similarly, the shaft rotations proportional to ΔcB$r$ and B$r$ are supplied to a second ring dial controlling a second motor; and the shaft rotations proportional to the difference between ΔcE and E are supplied to a third ring dial controlling a third motor.

Thus, $$cR=\Delta cR+jR=R \quad (7)$$

$$cBr=\Delta cBr+jB=Br \quad (8)$$

$$cE=\Delta cE+jE=E \quad (9)$$

The operator at the computer may adjust the handset values of S$h$, $d$H and C$t$ until the $j$R, $j$B and $j$E motors are brought to rest. The values of S$h$, $d$H and C$t$ are then correct, and the derived values supplied to the predictor and fuse computer are also correct.

The values of S$h$, $d$H and C$t$ may also be automatically corrected by the rate corrector 6. The corrective voltages, from the ring dials to the $j$R, $j$B and $j$E motors, are due to the deviations from the correct rates of change of the quantities and may be designated $\delta d$R, $\delta d$B and $\delta d$E.

As shown in Fig. 2, the voltages $\delta d$R, $\delta d$B and $\delta d$E, with shaft rotations proportional to $c$R, B$r$ and E are supplied by the comparator 4 to the corrector 6.

*Rate corrector*

Fig. 4A shows, in the plane through the line of sight from own ship S to target T, the elevation E, generated range $c$R, height $H=cR$ sin $E$ and horizontal range $Rh=cR$ cos $E$. The vector $h$T is the rate of change of range $d$R; i. e. is the rate of climb, or rate of change of height $d$H; $hi$ is the rate of change of horizontal range $d$R$h$.

Let there be an error $\delta d$R in range rate, represented in the figure by $hm$. (The scale is exaggerated to make the drawing clearer.) This error may be resolved into the vertical component $hn=\delta dR$ sin $E$ and the horizontal component $mn=\delta dR$ cos $E$. Also, let there be an error $\delta dE$ in rate of change of angular elevation $d$E; at range $c$R this will cause an error $c$R$\delta d$E in linear elevation rate, represented in the figure by $eo$. This magnitude may be resolved into a vertical component $po=cR\delta dE$ cos $E$ and a horizontal component $ep=-cR\delta dE$ sin $E$, the negative sign being necessary since a positive error $\delta d$E tends to decrease the horizontal range rate $d$R$h$.

The combined effect of the errors $\delta d$R and $\delta d$E is to change the value of $d$R$h$ from $hi$ to $$mq=mn+hi-rq$$

and the value of $d$H from $ie$ to $$qo=qs+sp+po=qs+ie+po$$

Thus the change in $d$R$h$ is $mn-rq$, and on substituting the values of these magnitudes it appears that $$\underline{\delta dRh}=\delta dR \cos E-cR\delta dE \sin E \quad (10)$$

The change in $d$H is $qs+po=hn+po$, whose value is given by $$\underline{\delta dH}=\delta dR \sin E+cR\delta dE \cos E \quad (11)$$

In Fig. 4, the error $\delta d$R$h$ in horizontal range rate $d$R$h$ is shown by the vector $wx$ in line with ST. This vector may be resolved into a component parallel to $$Sh{:}wy=\delta dRh \cos (180°-A)=-\delta dRh \cos A$$

and a component transverse to $$Sh{:}yx=\delta dRh \sin (180°-A)=-\delta dRh \sin A$$

The negative signs indicate that these components decrease S$h$ and C$t$, respectively. Let there be also an error $\delta d$B in rate of change of angular bearing; at horizontal range R$h$ this will cause an error R$h\delta d$B in linear deflection rate, represented in the figure by the vector $tv$. This may be resolved into a component parallel to $$Sh{:}\ tu=Rh\delta dB \cos (A-90°)=Rh\delta dB \sin A$$

and a component transverse to $$Sh{:}uv=Rh\delta dB \sin (A-90°)=-Rh\delta dB \cos A$$

The combined effect of these errors on the value of S$h$ will be the sum of the components $wy$ and $tu$; replacing R$h$ by its value $cR$ cos $E$, this may be written:

$$\underline{\delta Sh}=-\delta dRh \cos A+cR\delta dB \cos E \sin A \quad (12)$$

Likewise, the effect on the lateral measure $Sh Ct$ will be the sum of the transverse components $yx$ and $uv$:

$$\underline{Sh\delta Ct} = -\delta dRh \sin A - cR\delta dB \cos E \cos A \quad (13)$$

In Equations 10 to 13, inclusive, the quantities cR and $E$ are accurately determined by continuous observation of present target position; the angle A, however, depends on the estimated value of C$t$, and is thus usually somewhat in error, at least when rate correction is started, while the voltages $\delta d$R, $\delta d$E, and $\delta d$B, obtained from the ring dial contacts and used also to drive the $j$R, $j$E, and $j$B motors which keep the dials matched, are merely signals indicating whether positive corrections, no corrections, or negative corrections are required in the corresponding rates. These voltages are switched at the ring dial contacts so that they may be present or absent, and if present may be of either sign; but if present they are necessarily of constant amplitude.

Since, however, the circuits of the $j$R, $j$E, and $j$B motors are designed to insure operation of these motors at constant speed (the particular speed depending on the setting of the manually adjusted sensitivity controls $a$S and $r$S), the fraction of time during which one of these ring dial contact voltages is present will be proportional to the average speed with which the associated motor is turning to match its ring dial. Thus though the actual amplitude of any ring dial voltage can be either zero or a fixed magnitude, though of either sign, its average amplitude represents approximately the speed of the motor; accordingly, the algebraic sum of the areas under a curve of ring dial voltage against time, for a given time interval, is proportional to the total motion during that time of the motor, and hence to the total correction required during that time by any differences between the observed and the generated quantities.

Returning now to Equation 10, the voltage $\delta d$R whose average amplitude represents the speed of the $j$R motor, and hence the rate at which range is being corrected, is modified proportionally to cos $E$; the voltage $\delta d$E is modified proportionally to $c$R, and further modified proportionally to —sin $E$. The two voltages thus modified are added in an amplifier according to Equation 10; the average amplitude of the output voltage of this amplifier, $\delta d$R$h$, thus represents the rate at which corrections are being applied to the horizontal range.

Likewise, the voltage $\delta d$R is modified proportionally to sin $E$, and the voltage $\delta d$E is modified proportionally to $c$R, and further modified proportionally to cos $E$. The two voltages thus modified are added in the input circuit of a motor amplifier in accordance with Equation 11; the average amplitude of the output of this amplifier then represents $\delta d$H, the rate at which corrections are to be applied to rate of climb, $d$H. The circuit of this amplifier and its associated motor are designed to insure that the speed of the motor is proportional to the voltage applied to it, over a range sufficiently great to include all correction rates of practical interest. Accordingly, during a given time interval, the average speed of the $d$H motor is proportional to the requisite rate at which corrections are to be applied to this quantity, and the total motion of the $d$H shaft during this interval represents the total correction applicable to this quantity in the given interval. This motion of the shaft repositions the original hand setting of $d$H to a corrected value.

The voltage $\delta d$R$h$ obtained from the amplifier performing the addition required in Equation 10 is modified proportionately to —cos $A$; the voltage $\delta d$B is successively modified proportionally to $c$R, to sin $A$, and to cos $E$. The two voltages thus modified are added in the input circuit of a motor amplifier in accordance with Equation 12; the average amplitude of the output of this amplifier then represents $\delta$S$h$, the rate at which corrections are to be applied to S$h$, the horizontal component of target speed. The circuit of this amplifier and its associated motor operate, as in the case of $d$H motor, so that the motion of the S$h$ shaft, representing the total correction applicable to S$h$, repositions the original hand setting of this quantity to a corrected value.

The voltage $\delta d$R$h$ is also modified proportionally to —sin $A$, and the voltage $\delta d$B is successively modified proportionally to $c$R, to —cos $A$, and to cos $E$; the two voltages thus modified are added in the input circuit of an amplifier in accordance with Equation 13. This amplifier has a feedback path through a potentiometer varying with S$h$; the effect of this is to multiply the sum of the input voltages by 1/S$h$. Thus the output of this amplifier is a voltage whose average amplitude represent $\delta$C$t$, the rate at which corrections are to be applied to target course C$t$. This voltage is applied to an amplifier and associated motor which operate, as in the case of the $d$H motor, so that the motion of the C$t$ shaft, representing the total correction applicable to C$t$, repositions the original hand setting of this quantity to a corrected value.

By a continuation of this process the original settings of the target rate quantities will be brought to their correct values. Rate correction thereupon ceases, since the generated quantities $c$R, $c$E, and $c$B$r$ will then agree with the corresponding observed quantities R, E, and B$r$ without operation of the $j$R, $j$E, and $j$B motors. As the ring dial contacts will then be continually open, the input voltages to the rate corrector ($\delta d$R, $\delta d$E, $\delta d$B) will not be present, so that the $d$H, S$h$, and C$t$ motors will receive no driving voltages and will leave the rates set at the correct values.

The speed with which solution is approached may be controlled by use of the sensitivity controls $a$S and $r$S to vary the speed of the $j$R, $j$E, and $j$B motors. For given offsets of the ring dials, a reduction in the speed of these motors will require that these motors operate during a large fraction of the time to keep the dials in match, and thus increases the average amplitudes of the voltages driving the $d$H, S$h$, and C$t$ shafts. As the speed voltage characteristics of these motors are not affected by the sensitivity controls, they will then effect larger corrections to the target rates, and thus cause the settings of these shafts to approach the true positions more rapidly. This type of control is provided so that the operators can when necessary prevent erratic motion of the position input shafts, due for instance to poor visibility, from affecting the rate solution adversely, and still obtain very rapid solution when accurate tracking is possible.

The circuits by which the input voltages ($\delta d$R, $\delta d$E, and $\delta d$B) reach the rate corrector may be interrupted when desired by the operation of relays controlled by the director operators, thus stopping the process of rate correction. It is necessary thus to prevent rate correction while the director is being moved to pick up a new target, for during this interval the indicated R, E, and B$r$ have, of course, no relation to the position of the target; these relays are also useful when the visibility is poor, as they permit an operator to make a correction of position, necessary for instance to get back on target after momentarily losing it, without introducing a rate correction based on this motion unrelated to the motion of the target.

*Predictor*

Figure 5:
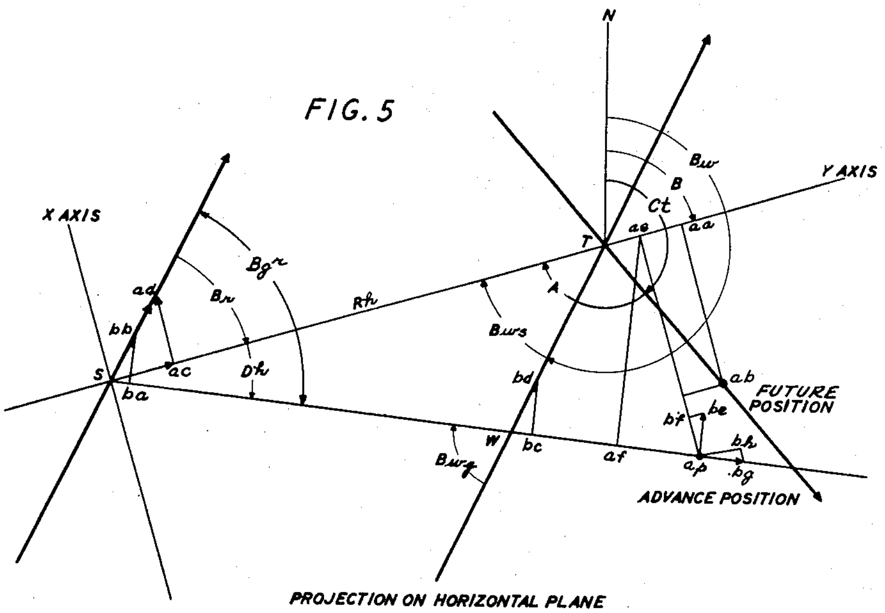
Figs. 5, 5A show in plan and elevation the relationships involved in the determination of the rectangular coordinates.

During the time of flight of the shell T$f$, the target moving with the velocity S$h$, as shown on Fig. 5, will travel the distance $Tab=ShTf$, from the present to the future position. This distance may be resolved into the Y component $$T.aa=ShTf \cos(180-A)=-ShTf \cos A$$

and the X component $$aa.ab=ShTf \sin(180-A)=ShTf \sin A$$

The motion of the ship during the time of flight T$f$ will be $Sad=SoTf$, and this distance may be resolved into a Y component $S.ac=-SoTf \cos Br$, and an X component $SoTf \sin Br$.

Thus, in the absence of all other effects, the Y component of the advance position will be $$Yt=Rh-SoTf \cos Br-ShTf \cos A$$

and the X component will be $$Xt=SoTf \sin Br+ShTf \sin A$$

In addition to the effect upon the shell of the relative velocity of the gun and the target, the shell is also affected by the drift of the shell due to the spin imparted by the rifling, by the wind and by spotting corrections. These effects may respectively be expressed as components Y$f$, Y$w$ and Y$j$, of the Y coordinate, and X$f$, X$w$, X$j$ of the X coordinate.

Thus, the Y coordinate of the projection of the advance and virtual positions on the horizontal plane through the mean gun will be $$Y=Rh-SoTf \cos Br-ShTf \cos A+(Yf+Yw+Yj) \quad (14)$$

Similarly, the X coordinate of the projection of the advance and virtual positions will be $$X=SoTf \sin Br+ShTf \sin A+(Xf+Xw+Xj) \quad (15)$$

In Fig. 1A the vertical or W coordinate of the present position of the target with respect to the horizontal plane through the director S is H which is equal to $cR \sin E$. The director and mean gun usually are not in the same horizontal plane. Thus, as shown in Fig. 1B, usually there will be a vertical parallax H$p$ between the director S and the mean gun G. During the time of flight of the shell T$f$ the altitude of the target will change by the factor $Ht=dHTf$, where $d$H is the rate of climb. The axis of the gun G is directed to the virtual position, having a superaltitude H$f$ above the advance position, and this superaltitude H$f$ may be considered as the algebraic sum of the basic superaltitude H$fo$ for a gun with normal initial velocity, and a correction, H$m$, for loss of initial velocity. There will also be factors H$w$ for the effect of the wind, and H$j$ for the effect of spots. Thus the W coordinate of the virtual position with respect to the horizontal plane through the mean gun is $$W=H+Hf+Ht+Hp+Hw+Hj$$

The factors H$t$, H$p$, H$w$, H$j$ for convenience may be combined into a single factor $k$H.

$$kH=dHTf+Hp+Hw+Hj \quad (16)$$

Thus, $$W=cR \sin E+(Hfo+Hm)+kH \quad (17)$$

and $$H2=H+kH \quad (18)$$

In Fig. 2 voltages proportional to T$f$, H$fo$ and H$m$, as will be described later, are generated in the ballistic computer 13 and supplied to the predictor 11. Voltages proportional to $Yf+Yw+Yj$, $Xf+Xw+Xj$ and $Hw+Hj$ are, as described later, generated in the corrector 14 and supplied to the predictor 11.

Shaft movements proportional to A, B$r$, $c$R, $d$H, E and S$h$ are supplied by the rate corrector 6 and a shaft movement proportional to So is supplied by the ship log 8.

A voltage proportional to $c$R is generated by the shaft movement proportional to $c$R, and fractionated proportionally to $\cos E$ to produce a voltage proportional to $cR \cos E=Rh$.

The voltage proportional to $Tf$ is fractionated proportionately to $-\cos Br$ and the result again fractionated proportionately to So to produce a voltage proportional to $-SoTf \cos Br$.

The voltage proportional to T$f$ is also fractionated proportionately to $-\cos A$, and the result again fractionated proportionately to S$h$ to produce a voltage proportional to $-ShTf \cos A$.

The voltages proportional to R$h$, $-SoTf \cos Br$, $-ShTf \cos A$, $Yf+Yw+Yj$ are supplied to the input circuit of an amplifier, which adds the voltages to produce, according to Equation 14, an output voltage proportional to Y.

The voltage proportional to T$f$ is fractionated proportionally to $\sin Br$ and the result again fractionated proportionally to So to produce a voltage proportional to $SoTf \sin Br$.

The voltage proportional to T$f$ is also fractionated proportionally to $\sin A$ and the result fractionated proportionally to S$h$ to produce a voltage proportional to $ShTf \sin A$.

The voltages proportional to $SoTf \sin Br$, $ShTf \sin A$ and $(Xf+Xw+Xj)$ are supplied to the input circuit of an amplifier, which adds the voltages according to Equation 15 to produce a voltage proportional to X.

The voltage proportional to T$f$ is fractionated proportionally to $d$H and supplied with the voltages proportional to $(Hw+Hj)$ and a voltage proportional to H$p$ to the input circuit of an amplifier which adds the voltages according to Equation 16 to produce an output voltage proportional to $-k$H by selecting the amplifier output lead which provides a reversal in phase of the input voltage.

The voltage proportional to $c$R is fractionated proportionally to $-\sin E$ to produce a voltage proportional to $-cR \sin E=-H$.

The voltages proportional to $-k$H and $-$H are supplied to the input circuit of an amplifier which adds the voltages according to Equation 18 and reverses the voltage phase to produce an output voltage proportional to H2, which is supplied to a meter to indicate the future height of the shell burst, so that firing may be stopped before friendly vessels are endangered.

The voltages proportional to $-cR \sin E$, $-kH$ and $-(Hfo+Hm)$ are supplied to the input circuit of an amplifier which adds these voltages according to Equation 17 to produce an output voltage proportional to W on the output lead carrying the reversed phase.

In Fig. 5, the Y coordinate of the advance or virtual position is $Sap=Rh2$, and the X coordinate is $aeap$. Draw $aeaf$ perpendicular to $Sap$. The horizontal deflection Dh is the angle $aeSap$. Then $aeaf=Y \sin Dh=X \cos Dh$. Thus $$Y \sin \underline{Dh}-X \cos \underline{Dh}=0 \quad (19)$$

The advance horizontal range $Rh2=Sap$ $$Saf+afap=Y \cos Dh+X \sin Dh$$

$$\underline{Rh2}=Y \cos Dh+X \sin Dh \quad (20)$$

The voltage proportional to Y is fractionated proportionally to sin $Dh$; the voltage proportional to $-X$ is fractionated proportionally to cos $Dh$; and the fractionated voltages are supplied to the input circuit of an amplifier having its output circuit connected to a motor. The motor adjusts the value of $Dh$ until the difference of the voltages supplied to the amplifier is reduced to zero and the shaft of the motor has rotated to the value of $Dh$.

Figure 5A:
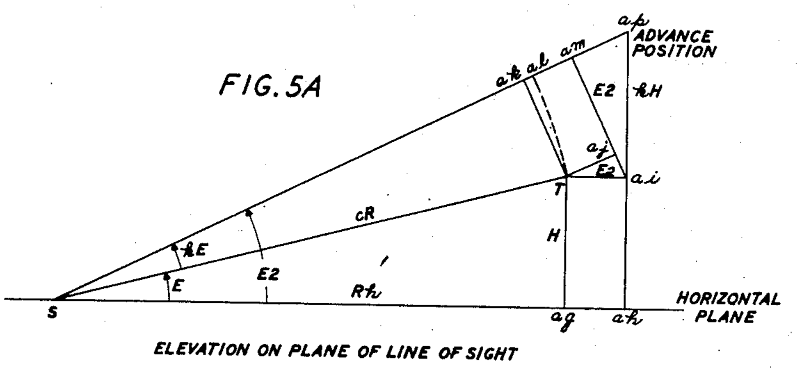

In Fig. 5A, the advance position has been projected to the vertical plane through the line of sight. The present position of the target T is at a horizontal range $Sag=Rh$ and a generated range $ST=cR$ from the director S and at a height $Tag=H$, above the horizontal plane. The advance position $ap$ is at an advance horizontal range $Sah=Rh2$ from the director S, and a future height $ahap=H2=H+kH$, above the horizontal plane through the director. The advance target elevation E2 is the sum of the target elevation E and the elevation prediction $kE$.

Thus, $agah=Rh2-Rh=kRh$.

Draw $Tai$ parallel to $Sah$, then $aiap=kH$. Draw $Taj$ parallel to $Sap$, then angle $ajTai=E2$. Draw $Tak$ and $amai$ perpendicular to $Sap$, then angle $amaiap=E2$. Let $Sal=ST=cR$.

Thus, $$Taj=akam=(Rh2-Rh) \cos E2$$
$$ajai=(Rh2-Rh) \sin E2$$
$$Tak=amaj=cR \sin kE$$
$$akal=cR \text{ vers } kE$$
$$amai=kH \cos E2$$

and $$amap=kH \sin E2$$

As $$amai=amaj+ajai$$

$$kH \cos E2=cR \sin kE+(Rhe-Rh) \sin E2$$

thus $$-cR \sin \underline{kE}-(Rh2-Rh) \sin E2+kH \cos E2=0 \quad (21)$$

The range prediction $$kR=alap=akam-akal+amap$$

Thus, $$\underline{kR}=(Rh2-Rh) \cos E2-cR \text{ vers } kE+kH \sin E2 \quad (22)$$

The voltage proportional to $-WY$ is fractionated proportionally to cos $Dh$; the voltage proportional to $-X$ is fractionated proportionally to sin $Dh$ and both the fractionated voltages supplied to the input circuit of an amplifier. Then, from Equation 20 the output voltage of the amplifier would be proportional to $-Rh2$. But to the input circuit of this amplifier a voltage proportional to $Rh$ is also supplied. Thus the output voltage is proportional to $-(Rh2-Rh)$, that is to $-kRh$.

The voltage proportional to $k$H, Equation 16, is fractionated proportionally to cos $E2$; the voltage proportional to $-(Rh2-Rh)$ is fractionated proportionally to sin $E2$; the voltage proportional to $-c$R is fractionated proportionally to sin $kE$ and the fractionated voltages supplied to the input circuit of an amplifier connected to a motor. The shaft of the motor is connected to one gear of a differential gear, another gear being rotated proportionally to the rotation E, to produce a rotation proportional to $E+kE=E2$. The motor adjusts the values of $k$E and E2 until the output voltage of the amplifier is reduced to zero, the motor shaft has rotated to the angle $k$E and the motion from the differential gear has rotated to the angle E2.

*Ballistic computer*

As shown in Figs. 1 and 1B, the shell is fired in the direction of the virtual position, but due to the ballistic effects, the trajectory of the shell is curved, both vertically and horizontally so that the shell actually bursts at the future position of the target. One of the important steps in the computation of the orders to be sent to the guns is the computation of the ballistic effects.

In general, there are two modes of fire, the so-called rifle fire, in which the weapon has the least elevation which will cause the shell to reach the target; and the so-called howitzer fire, in which the weapon has at large elevation such that the shell will drop on the target. For an advance target elevation of zero, or horizontal fire, the maximum range of both rifle and howitzer fire will be attained with a gun elevation of about 45 degrees. In the present computer only the rifle trajectory is provided for.

The plot of a ballistic quantity will therefore usually be substantially parabolic. For example, in Fif. 6, the basic time of flight, $Tfo$ has been plotted against advance range R2 for three values of target elevation E2, and these curves are substantially parabolic, and have infinite rate of change at maximum range.

*Ballistic computations*

The ballistic computations may be made in either polar or rectangular coordinates, and might be based on either the virtual or the advance position; in the present computer they are based on the advance position, and the polar coordinates E2 and R2 are used; to obtain these from the rectangular coordinates X, Y, and $W-Hf$, it is necessary also to solve for the horizontal deflection D$h$.

In a computer, these ballistic quantities are usually represented by some physical quantity, such as the lift of a cam follower, the voltage selected by the brush of a potentiometer, the current flowing through the brush of an adjustable resistor or other convenient device. In such devices, the radius of the cam surface or the width of the card supporting the winding of the potentiometer or resistor, varies with the ballistic quantity. However, there is usually a physical limitation upon the rate of change of the radius or width which may be used. If the rate of change of the radius of the cam is too great, the cam follower may fail to follow the cam surface, or may jam the mechanism. Similarly, if the rate of change of the width of the card is too great, the resistance wire wound on the card will slip and become loose. Thus, the device must be so constructed that this limitation upon the rate of change of the ballistic quantity is not exceeded.

Figure 6:
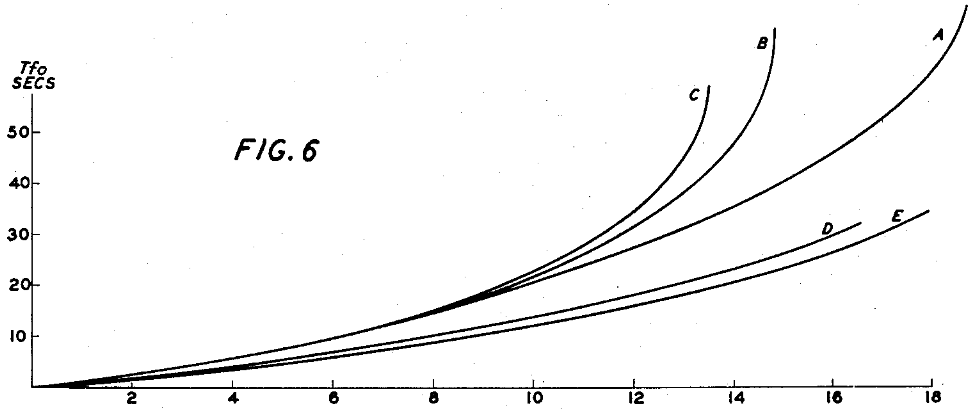
Fig. 6 shows curves illustrating the effect of the use of ballistic range.

In Fig. 6, the rate of change of the function A for $E2=0$ becomes infinite at about 19,000 yards, whereas the rate of change of the function B for $E2=40$ becomes infinite at about 14,800 yards, and the rate of change of the function C for $E2=80$ becomes infinite at about 13,500 yards. Assuming a reasonable maximum slope to be used in the device, the maximum ranges would be, for $E2=0$, 16,000 yards; for $E2=40$, 12,500 yards; and for $E2=80$, 11,250 yards; and to attain these maximum ranges, a separate device must be used for each value of E2, an impracticable arrangement. If only one device be used, then, the maximum range will be limited to the smallest value, which, in the present case, is about 11,000 yards. In computers for controlling antiaircraft fire, in which the terminal velocity of the shell must be considerably greater than the target velocity, a limitation in range of this character is not particularly serious. But, in computers, such as the present computer, for controlling, not only antiaircraft fire, but also fire at extreme range against surface targets, a limitation in range of this character would seriously limit the use of the weapon.

In accordance with the invention, the scale factor used in representing the range is appropriately changed for each value of the target elevation.

For example, in Fig. 6, the curves A, B, C are plotted with a scale factor of 1,000 yards per division. Let the curve B be replotted with a scale factor of about 727 yards per division, as shown by curve D; and the curve C be replotted with a scale factor of about 670 yards per division, as shown by curve E. The rates of change of the curves D and E are thus reduced to less than the limitation imposed by the physical construction of the computing device. Thus, the present computer, constructed in accordance with the invention, and using the same elements to compute the ballistic quantities for all target elevations, can control the fire of the weapons to a maximum range of 16,000 yards for surface targets, diminishing to a maximum range of some 11,000 yards for elevated targets.

A voltage proportional to $k$R, Equation 22, and a voltage proportional to $c$R are supplied to the input circuit of an amplifier, which adds these voltages to produce a voltage proportional to the advance range R2. The output circuit of the amplifier is connected to a motor, rotating the brush of a linear potentiometer. The voltage selected by the brush of this potentiometer will thus be proportional to the rotation of the shaft of the motor. The voltage selected by the brush of the potentiometer is supplied to a fractionating network and is also fractionated proportionally to a function S1 of the target elevation E2 and supplied to the fractionating network. The output voltage of the network, proportional to ReS1(E2) is supplied to the input circuit of the amplifier. The motor rotates until the output voltage of the amplifier is reduced to zero. Let the rotation of the motor shaft, and the voltage selected by the brush of the potentiometer be designated R$e$, the ballistic range. Then, $$ReS1(E2)-R2=0 \tag{23}$$

For a target elevation $E2=0$, $S1=1$, $Re=R2$ and the shaft of the motor rotates proportionally to R2, as required by curve A, Fig. 6. For a target elevation $E2=40$, $S1=.72742$, $Re=1.3747R2$, and the shaft of the motor rotates to a value larger than R2, as required by curve D, Fig. 6. The voltage selected by the wiper of the potentiometer is similarly fractionated for all other values of the target elevation E2.

A voltage proportional to the range spot R$j$ may also be supplied to the input circuit of the motor amplifier to supply a range spot control.

The functions representing the various ballistic quantities are analyzed mathematically and matched by functions of R$e$ and E2. The shaft of the R$e$ motor controls the production of voltages proportional to the required functions of R$e$, and these voltages are then fractionated proportionally to the required functions of E2 and combined in fractionating networks to produce voltages proportional to the shell velocity S$f$, the drift G$f$, the cross wind time T$wc$, the basic superaltitude H$fo$, the basic time of flight T$fo$ and the maximum values of the corrections for loss of initial velocity H$m$ and T$m$. The voltages proportional to the maximum values of H$m$ and T$m$ are then fractionated in handset potentiometers proportionally to the actual value of initial velocity.

*Ballistic corrector*

In Fig. 5, S is the projection of the director and mean gun, and T is the projection of the target on the reference horizontal plane. In the absence of apparent wind, drift, and spots, the projection of the axis of the gun would be trained to the future position. The line of sight to the target T has a bearing B$r$ relative to the axis of the ship, and the projection of the line to the advance position has a relative bearing $Bgr=Br+Dh$. The shaft movement proportional to B$r$ from the rate corrector 6 Fig. 2 is combined in a differential gear with the shaft movement proportional to D$h$, Equation 19, from the predictor 11 to produce a shaft movement proportional to B$gr$.

The wind is assumed to be blowing in the direction from W to T, Fig. 5 at a bearing B$w$. The angle $STW=Bws=(B+180)-Bw$. A shaft movement proportional to B is supplied by the rate corrector 6 Fig. 2 and is combined in a differential gear with a handset shaft movement proportional to B$w$ to produce a shaft movement proportional to B$ws$. The shaft movement proportional to B$ws$ is then combined in a second differential gear with the shaft movement proportional to D$h$ to produce a shaft movement proportional to B$wg$, which is evidently equal to $Bws+Dh$.

The shell, on leaving the muzzle of the gun, will be controlled, not only by the shell velocity, but also by the air velocity due to the movement of the ship, and the wind velocity.

The ship speed S$o$ Fig. 5 has a component $Sba=So \cos Bgr$ in the direction to the advance position, and a component $babb=So \sin Bgr$ transverse to this direction. Similarly, the wind velocity S$w$ has a component $Wbc=Sw \cos Bwg$ in the direction to the advance position and a component $bcbd=Sw \sin Bwg$ transverse to this direction. The sum of the components in the direction to the advance position will be $$So \cos Bgr+Sw \cos Bwg$$

and the sum of the transverse components will be $So \sin Bgr+Sw \sin Bwg$.

The firing tables for the weapon tabulate the yards deflection for a cross wind of ten knots. As this tabular value is $$\text{Yards}\times\frac{1}{\text{10 nautical miles per hour}}=\frac{\text{yards}}{\text{10 nautical miles}}\times\text{one hour}$$

it has the dimension of time and will be designated *Twc*, the cross wind time.

The horizontal displacement G*w*, transverse to the vertical plane through the director and advance position will be $$Gw=TwcSo\sin Bgr+TwcSw\sin Bwg \quad (24)$$

The voltage proportional to T*wc* is fractionated proportionally to $-\sin Bgr$ and then fractionated proportionally to So and the fractionated voltage is supplied to the input circuit of an amplifier. The voltage proportional to T*wc* is also fractionated proportionally to $-\sin Bwg$, then fractionated proportionally to S*w* and the fractionated voltage supplied to the input circuit of the amplifier to obtain a voltage proportional to $-Gw$. The voltage proportional to the drift $-Gf$ is also supplied to the input circuit of the amplifier.

The deflection spot D*j* is an angular deflection of the computed point of burst of the shell which may be arbitrarily introduced by the firing officer. The linear lateral deflection G*j* corresponding to an angular deflection D*j* will be approximately equal to $$DjR2=DjReS1(E2)=DjReS7(E2)$$

A manually adjusted voltage proportional to D*j* is fractionated proportionally to R*e*, then fractionated proportionally to S7(E2) and supplied to the input circuit of the amplifier. The output voltage of this amplifier will then be proportional to the sum of the deflection effects $-Gw-Gf+Gj$.

The range component of the velocities of ship and wind is $(So\cos Bgr+Sw\cos Bwg)$. If T*wt* be the tail wind time, the linear displacement due to this component is $$Twt(So\cos Bgr+Sw\cos Bwg)$$

To derive this quantity directly by the method used in the derivation of the cross wind displacement would entail the generation of a voltage proportional to T*wt*. This difficulty may be avoided by using the available voltage proportional to T*wc* and fractionating this voltage proportionately to $-(So\cos Bgr+Sw\cos Bwg)$ to obtain a voltage proportional to cross wind time multiplied by tail wind velocity. From the firing tables, the ratio of tail wind time to cross wind time may be obtained. This ratio is a function of advance elevation E2, is substantially independent of range, and will be designated C6(E2). Thus $$C6(E2)=\frac{Twt}{Twc}$$

and $$Twc=\frac{Twt}{C6(E2)}$$

Thus $$Qw=-Twt(So\cos Bgr+Sw\cos Bwg)$$

and $$\frac{Qw}{C6(E2)}=-Twc(So\cos Bgr+Sw\cos Bwg) \quad (25)$$

The voltage proportional to T*wc* is fractionated proportionally to So, then fractionated proportionally to $-\cos Bgr$ and the fractionated voltage is supplied to the input circuit of an amplifier. The voltage proportional to T*wc* is also fractionated proportionally to S*w*, then fractionated proportionally to $-\cos Bwg$ and supplied to the input circuit of the amplifier. The output voltage of this amplifier would normally be proportional to $$\frac{Qw}{C6(E2)}$$

However, the output voltage of the amplifier is fractionated proportionally to $$\frac{1}{C6(E2)}$$

and this fractionated voltage is fed back in reversed phase to the input circuit of the amplifier, thus, in effect, multiplying the input voltage by C6(E2) and making the output voltage of the amplifier proportional to Q*w*.

The elevation spot V*j* is an angular change in elevation arbitrarily made by the firing officer. The linear displacement perpendicular to the line from the gun to the advance position corresponding to this angular change is approximately equal to V*j*R2. The horizontal component of this linear displacement is $-VjR2\sin E2$, which may be replaced by $-VjReS1(E2)\sin E2$. But the voltage representing this quantity is to be supplied to the above-described amplifier which, in effect, multiplies the input voltages by C6(E2). Thus to insure accuracy the present voltage must be divided by C6(E2), and will become $$-VjRe\frac{S1(E2)}{C6(E2)}\sin E2$$

The factors S1(E2), sin *E*2, C6(E2) are all functions of advance elevation E2, and thus may be combined in a single function $$S5(E2)=\frac{S1(E2)}{C6(E2)}\sin E2$$

A manually adjusted voltage proportional to V*j* is fractionated proportionally to R*e* and again fractionated proportionally to S5(E2) and supplied to the input circuit of the Q*w* amplifier as $-Qj/C6(E2)$. The output voltage of the Q*w* amplifier will then be proportional to $Qw-Qj$.

The sum of the deflection effects $Gw+Gf-Gj$ is represented by the displacement *apbf*, Fig. 5. The angle *bfapbe* equals *Dh*. This displacement may then be resolved into a Y component $(Gw+Gf-Gj)\sin Dh$ and an X component $-(Gw+Gf-Gj)\cos Dh$. Similarly, the sum of the range effects $Qw-Qj$ is represented by the displacement *apbg*. The angle *bgapbh* also equals *Dh*, thus this displacement may be resolved into a Y component $-(Qw-Qj)\cos Dh$ and an X component $-(Qw-Qj)\sin Dh$. Thus, the components of the displacement from the future position *ab* to the advance position *ap* are $+(Gw+Gf-Gj)\sin Dh-(Qw-Qj)\cos Dh$ and $-(Gw+Gf-Gj)\cos Dh-(Qw-Qj)\sin Dh$, hence $$(Yw)+Yf+Yj)=-(Qw-Qj)\cos Dh+(Gw+Gf-Gj)\sin Dh \quad (26)$$

$$(Xw)+Xf+Xj)=-(Qw-Qj)\sin Dh-(Gw+Gf-Gj)\cos Dh \quad (27)$$

The ballistic quantities T*f* and H*f* are computed as functions of advance position, rather than future position, by formulae which make no allowance for wind. In the absence of wind and spots, the advance and future positions coincide so far as R2 and E2 are concerned. Correction for range wind is made by offsetting the advance position from the future position, and the amount of this offset is so chosen that T*f* and H*f*, computed for the advance position in the absence of wind, have the appropriate values for the future position in the presence of the actual range wind.

The output voltage of the $Qw$ amplifier is proportional to $Qw-Qj$, that is, to $$-Twt(So\cos Bgr+Sw\cos Bwg)-Qj$$

The displacement H*w* is the vertical wind time $Twv$ multiplied by the range components, that is, $$Hw=Twv(So\cos Bgr+SwBwg)$$

Assume that the output of the $Qw$ amplifier is multiplied by a function $$-S6(E2)=-\frac{Twv}{Twt}$$

the output will then be $$Twv(So\cos Bgr+Sw\cos Bwg)+S6(E2)Qj=Hw+S6(E2)Qj$$

The vertical effect H*j* of the elevation spot V*j* will, approximately, be a vertical displacement $VjR2\cos E2=VjReS1(E2)\cos E2$. The horizontal effect $Qj$ of the elevation spot V*j* is $$VjReS1(E2)\sin E2$$

Then, $$Hj-S6(E2)Qj=VjReS1(E2)\ (\cos E2-S6\sin E2)$$

As $S1$, $S6\cos E2$ and $\sin E2$ are all functions of E2, let $$C5(E2)=S1(E2)\ (\cos E2-S6\sin E2)$$

thus $$Hj-S6(E2)Qj=VjReC5(E2)$$

Then $$Hw+Hj=Hw+S6(E2)Qj+Hj-S6(E2)Qj=Hw+S6(E2)Qj+VjReC5(E2) \quad (28)$$

The output voltage proportional to $(Qw-Qj)$ out of the $Qw$ amplifier is fractionated proportionally to $-$S6(E2) and supplied to the input circuit of the *k*H amplifier.

The manually adjusted fractionated voltage proportional to V*j*R*e* is further fractionated proportionally to C5(E2) and also supplied to the input circuit of the *k*H amplifier. The output voltage of the *k*H amplifier will, in part, be proportional to H*w*+H*j*.

*Fuse setting order*

In the present computer the basic fuse time F2 is numerically equal to the computed time of flight T*f* of the shell. A voltage proportional to T*f* is supplied by the ballistic corrector 14, Fig. 2, to the fuse setting computer 12. The voltage proportional to T*f* is supplied to the input circuit of a motor amplifier having its output circuit connected to a motor. A potentiometer having a uniform winding connected to a source of constant voltage has a brush rotated by the motor and connected to the input circuit of the amplifier. The motor will rotate the brush until the sum of the voltages supplied to the input circuit of the amplifier is reduced to zero and the motor has rotated to the value of F2.

If the weapon could be fired at the present instant, the fuse would be correctly set at the basic fuse time F2. But after the fuse is cut the shell is loaded in the weapon and the weapon is fired after the lapse of the dead time T*g*. If the target is receding from the weapon the time of flight is continuously increasing and if the target is approaching the weapon the time of flight is continuously decreasing. Thus, the basic fuse time F2 must be combined with the dead time correction F*g*, corresponding to the change in the time of flight during the dead time T*g* to give the fuse setting order F.

Figure 7:
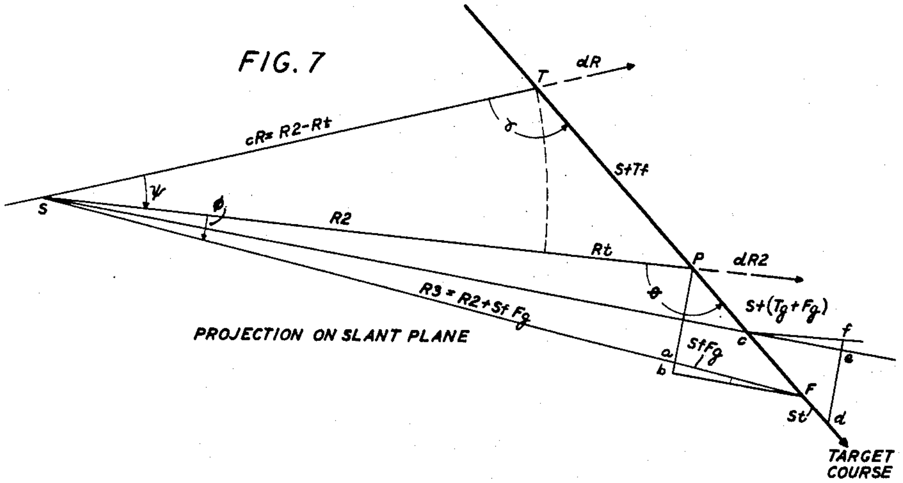
Fig. 7 shows in the slant plane the relationships involved in the determination of the dead time correction.

Fig. 7 shows the slant plane through the ship S and the target course TF passing through the future position P when the dead time T*g* is zero and the corrected future position F when the dead time is T*g*. Let angle $STP=\gamma$, and angle $SPF=\theta$. The distance SP is the advance range R2, and the distance ST is the generated range *c*R. For convenience, let $cR=Rt$, where R*t* is the difference between *c*R and R2.

During the time of flight T*f*, the target, moving at a speed S*t* relative to the weapon will travel the distance $TP=StTf$. During the dead time T*g* the time of flight T*f* has changed an amount F*g* and the dead time T*g* has elapsed. Thus a shell fired after the lapse of the dead time will take a time $Tf+Tg+Fg$ from the present instant to reach the target. During this time interval from the present time the target will travel a distance $TF=St(Tf+Tg+Fg)$. Thus the distance $PF=St(Tg+Fg)$.

Let $Sf$ = the component of shell velocity at advance position along the line of advance position. As $$Sf=\frac{\partial R2}{\partial Tf}(E2\text{ constant})$$

it may be derived from the firing tables for the weapon.

If the shell were fired at the present instant it would take a time T*f* to meet the target at P. Let $Sa=SP$ then the shell will also take the time T*f* to reach *a* and will have at this point a velocity S*f*. But, after the lapse of the dead time T*g*, the time of flight of the shell has changed to $(Tf+Fg)$ thus, the shell will take a time $(Tf+Fg)$ to travel the distance SF. Assuming that the shell velocity S*f* does not change appreciably in the distance *a*F, the distance $aF=SfFg$.

Extend P*a* to *b* and draw *b*F normal to P*b*. Let angle $TSP=\Psi$, and angle $PSF=\Phi$, then, $$\text{Angles } SPa \text{ and } SaP=\frac{\pi}{2}-\frac{\Phi}{2}$$

$$\text{Angle } bPF=\theta+\frac{\Phi}{2}-\frac{\pi}{2}$$

$$\text{Angle } baF=\frac{\pi}{2}-\frac{\Phi}{2}$$

In triangle P*b*F, $$bF=St(Tg+Fg)\sin\left(\theta+\frac{\Phi}{2}-\frac{\pi}{2}\right)$$

in triangle *ab*F, $$bF=LfFg\sin\frac{\pi}{2}-\frac{\Phi}{2}$$

thus $$Fg=\frac{-StTg\cos\left(\theta+\frac{\Phi}{2}\right)}{Sf\cos\frac{\Phi}{2}+St\cos\left(\theta+\frac{\Phi}{2}\right)}=Tg\left[\frac{\dfrac{-St\cos\left(\theta+\frac{\Phi}{2}\right)}{\cos\frac{\Phi}{2}}}{\dfrac{Sf+St\cos\left(\theta+\frac{\Phi}{2}\right)}{\cos\frac{\Phi}{2}}}\right]$$

In Fig. 7, bisect angle PSF by Sc and extend to e. Let $cd$=the target relative velocity $St$. Draw $de$ normal to $ce$.

$$\text{Angle } dce=\text{angle } PcS=180-\left(\theta+\frac{\Phi}{2}\right)$$

Then $$ce=St\cos\left(180-\theta-\frac{\Phi}{2}\right)=-St\cos\left(\theta+\frac{\Phi}{2}\right)$$

Draw $cf$ parallel to R2, and extend $de$ to f.

$$\text{Angle } ecf=\frac{\Phi}{2}$$

thus, $$cf=\frac{ce}{\cos\frac{\Phi}{2}}=-\frac{St\cos\left(\theta+\frac{\Phi}{2}\right)}{\cos\frac{\Phi}{2}}$$

But, as St is the target relative velocity, $cf$ is the component of rate of change of range midway between R2 and R3, and may thus be designated $d$R23.

$$dR23=\frac{St\cos\left(\theta+\frac{\Phi}{2}\right)}{\cos\frac{\Phi}{2}}$$

$$=-St\cos\theta+St\tan\frac{\Phi}{2}\sin\theta$$

The target relative velocity St may be resolved at the target T into the component in the line ST, $-St\cos\gamma=dR$, the present range rate; and at the point P into the component in the line SP, $-St\cos\theta=dR2$, the advance range rate. As $\theta=\Psi+\gamma$, and the angle $\Psi$ is small:

$$dR2-dR=St\,(\cos\gamma-\cos\theta)$$

$$=2St\sin\frac{\Psi}{2}\sin\left(\theta-\frac{\Psi}{2}\right)$$

$$\doteq\Psi St\sin\theta$$

Also, as $\Phi$ is a small angle $$dR23=dR2+\frac{\Phi}{2}St\sin\theta$$

thus $$dR23\doteq dR2+\frac{\Phi}{2\Psi}(dR2-dR)$$

From Fig. 7, approximately $$\frac{\Phi}{\Psi}\doteq\frac{Tg+Fg}{Tf}$$

thus $$dR23\doteq dR2+\frac{Tg+Fg}{2Tf}(dR2-dR)$$

and $$Fg\doteq Tg\frac{\left[dR2+\frac{Tg+Fg}{2Tf}(dR2-dR)\right]}{Sf-\left[dR2+\frac{Tg+Fg}{2Tf}(dR2-dR)\right]}$$

Figure 10:
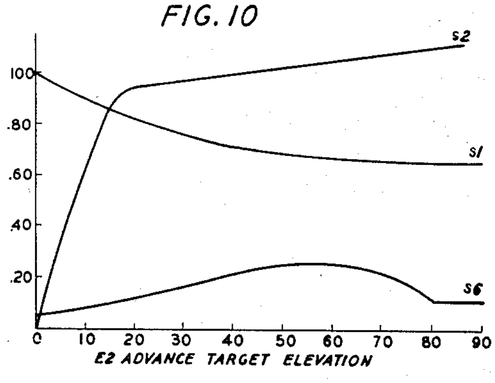
Figs. 10, 10A, 10B, 10C, 10D, 10E show curves of certain functions used in the computation.
Figure 10C:
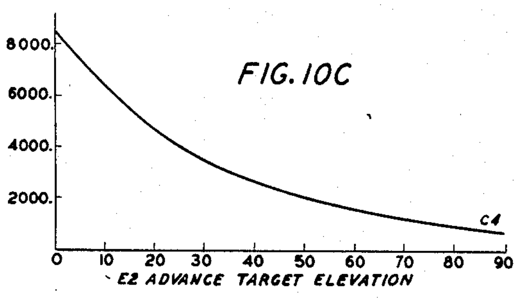
Figure 10D:
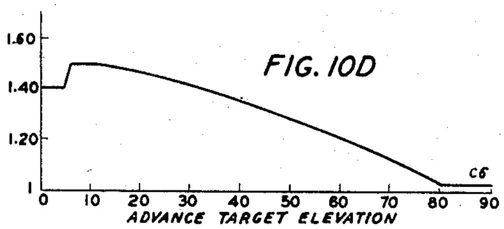
Figure 10A:
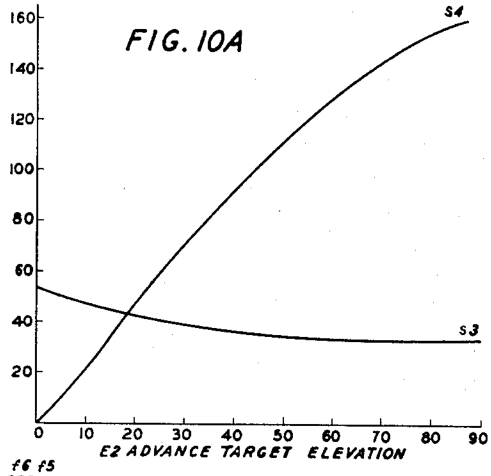
Figure 10B:
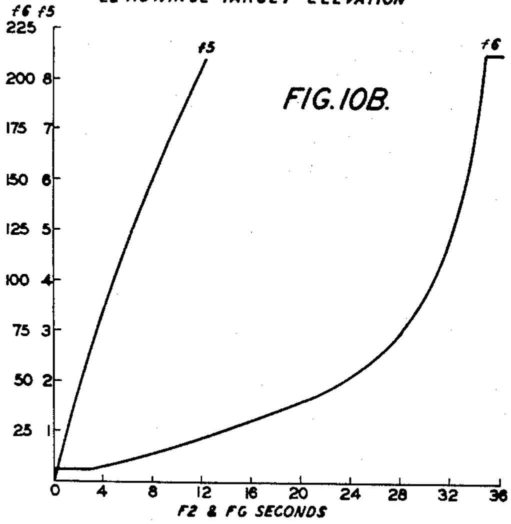

The above expression for $Fg$ is based upon the assumptions that the shell speed has the average value of $Sf$ during the dead time, and that the shell speed is in the assumed direction. Neither of these assumptions is rigorously true. The errors may be reduced by first modifying the value of $Fg$ to the following value.

$$Fg=\frac{.97\,Tg\left[dR2+\frac{Tg(dR2-dR)}{f6(F2)}\right]}{Sf-\left[dR2+\frac{Tg(dR2-dR)}{f6(F2)}\right]}$$

in which $f6$(F2) is the function shown in Fig. 10B. $Fg$ is then further modified by a function $f5(Fg)$ such that, for $Fg$ less than zero, $f5(Fg)=Fg$, and for $Fg$ larger than zero, $f5(Fg)$ varies as shown in Fig. 10B. The expression then has the form:

$$f5(Fg)\frac{1}{.97Tg}\left[Sf-\left[dR2+\frac{Tg(dR2-dR)}{f6(F2)}\right]\right]-dR2-\frac{Tg(dR2-dR)}{f6(F2)}=0 \qquad (29)$$

and $$dR23=dR2+\frac{Tg(dR2-dR)}{f6(F2)} \qquad (30)$$

Figure 7A:
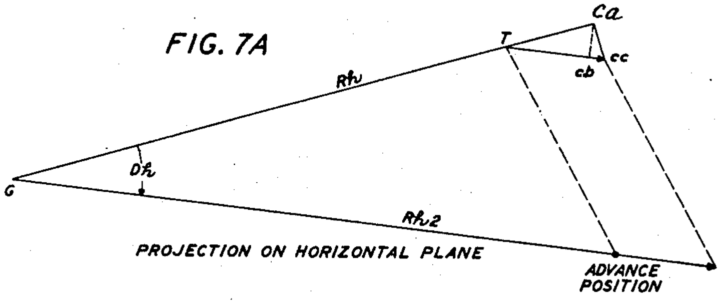
Figs. 7A, 7B show in plan and elevation the relationships involved in the determination of deck deflection and advance range.

In Fig. 7A the mean gun S, present target position T and advance position have been projected on the horizontal plane through the mean gun. Let T$ca$ represent the horizontal range rate $dRh$, and $cacc$ the linear deflection rate R$hd$B. As angles $ca$T$cb$ and $cbcacc$ equal $Dh$, $Tcb$ equals $dRh$ cos $Dh$ and $cbcc$ equals $RhdB$ sin $Dh$. The advance horizontal range rate $dRh2=Tcc=Tcb+cbcc$, thus $$dRh2=dRh\cos Dh+RhdB\sin Dh$$

Figure 7B:
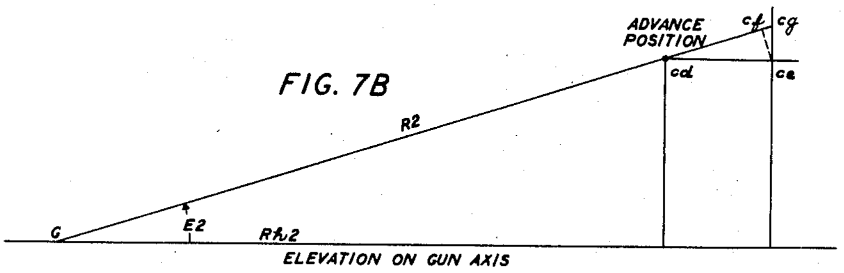

In Fig. 7B, the mean gun G and advance position $cd$ are shown in the vertical plane through the axis of the gun. The advance horizontal range rate $dRh2$ is $cdce$, and the rate of climb $dH$ is $cecg$. As angles $cfcdce$ and $cfcecg$ equal $E2$, $cdcf$ equals $dRh2$ cos $E2$ and $cfcg$ equals $dH$ sin $E2$. The advance range rate $$dR2=cdcg=cdcf+cfcg$$

thus $$dR2=dRh2\cos E2+dH\sin E2$$
$$=dRh\cos Dh\cos E2+RhdB\sin Dh\cos E2+dH\sin E2 \qquad (31)$$

As shown in Fig. 2, voltages proportional to $d$R, $d$R$h$ and −R$hd$B are supplied by the rate generator 7; a shaft movement proportional to $d$H is supplied by the rate corrector 6; a voltage proportional to S$f$ and shaft movements proportional to E2 and D$h$ are supplied by the ballistic corrector 14.

The voltage proportional to $dRh$ is fractionated proportionally to −cos $Dh$, then fractionated proportionally to cos $E2$; the voltage proportional to −R$hd$B is fractionated proportionally to sin $Dh$ then fractionated proportionally to cos $E2$; the shaft motion proportional to $d$H selects a voltage proportional to −$d$H which is fractionated proportionally to sin $E2$. The sum of the fractionated voltages will then be equal to −$d$R2.

The voltage proportional to $d$R and the fractionated voltages proportional to −$d$R2 are supplied to the input circuit of an amplifier. The output voltage will be proportionally to $dR2-dR$. The output voltage is fractionated proportionally to $f6$(F2) and fed back in reverse phase to the input circuit to make the output voltage of the amplifier proportional to $$\frac{1}{f6(F2)}(dR2-dR)$$

The output voltage of this first amplifier is then fractionated proportionally to the hand set value of the dead time Tg to produce a voltage proportional to $$\frac{Tg}{f6(F2)}(dR2-dR)$$

The voltage proportional to $$-\frac{Tg}{f6(F2)}(dR2-dR)$$

the fractionated voltages proportional to $-d$R2, and the voltage proportional to S$f$ are supplied to the input circuit of a second amplifier. The output voltage of this second amplifier will be proportional to $$Sf-dR2-\frac{Tg}{f6(F2)}(dR2-dR)$$

The output voltage of the second amplifier is supplied to the winding of a potentiometer, having a variation in resistance such that the voltage selected by the brush varies with $f5$(F$g$). The voltage selected by this brush is then fractionated proportionately to a handset value of $$\frac{1}{.97Tg}$$

and supplied to the input circuit of a motor amplifier, having its output circuit connected to a motor driving the brush of the $f5$(F$g$) potentiometer. The fractionated voltages proportional to $-d$R2 and the output voltage of the first amplifier are also supplied to the input circuit of this motor amplifier. The voltages supplied to the input circuit of the motor amplifier are proportional to $$(Fg)\frac{1}{.97Tg}\left[Sf-\left[dR2+\frac{Tg(dR2-dR)}{f6(F2)}\right]\right]-dR2-\frac{Tg(dR2-dR)}{f6(F2)}$$

and if the output voltage of the amplifier is not zero, the motor rotates the brush of the $f5$(F$g$) potentiometer until the output voltage is zero and the motor has rotated to the value of F$g$.

The shafts of the F2 motor and the F$g$ motor are connected to a differential gear, which adds the motions to produce a motion proportional to the fuse setting order F, which is transmitted by a synchronous transmission system to the guns.

*Coordinate rotator*

The coordinates WXY, produced by the predictor 11, Fig. 2, are the rectangular coordinates of the virtual position with the origin at the mean gun, the XY plane horizontal and the YW plane vertical through the line of sight. For ease in obtaining the gun orders, these coordinates may be transformed into coordinates W'X'Y' with respect to the deck plane. This transformation may be made in two steps, first the framework of reference is rotated through the level L about the X axis to produce coordinates W''X''Y'', then this framework is rotated through the cross level $Zd$ about the Y'' axis to produce the coordinates W'X'Y'.

Figure 8:
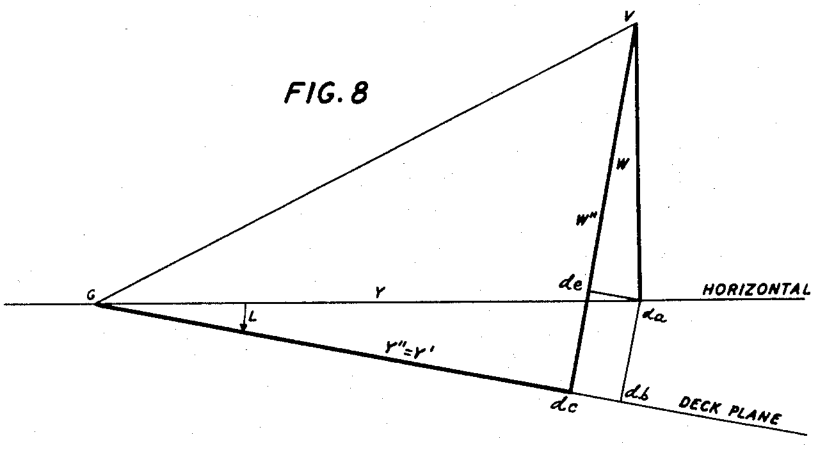
Figs. 8, 8A show in elevation the relationships involved in the rotation of the coordinate system into the deck plane.

In Fig. 8, with the origin of coordinates at G, the mean gun, the virtual position V has the rectangular coordinates YW with respect to the horizontal plane G$da$. Let the framework of reference be rotated about the X axis through the level L to G$db$. Draw V$dc$ normal to G$db$. The rectangular coordinates of the point V with respect to G$db$ will be $Y''=Gdc$ and $W''=Vdc$. Draw $deda$ parallel to G$db$ and $dadb$ normal to G$db$. The angles $deVda$ and $Gdade$ equal $L$.

Then, $Vde=W\cos L$; $deda=W\sin L$; $Gdb=Y\cos L$; $dadb=dedc=Y\sin L$.

$$Y''=Gdc=Gdb-dcdb=Gdb-deda=Y\cos L-W\sin L=-Y\text{ vers }L+Y-W\sin L$$

$$W''=dedc+Vde=Y\sin L+W\cos L=Y\sin L+W-W\text{ vers }L \quad (32)$$

and $X''=X$.

Figure 8A:
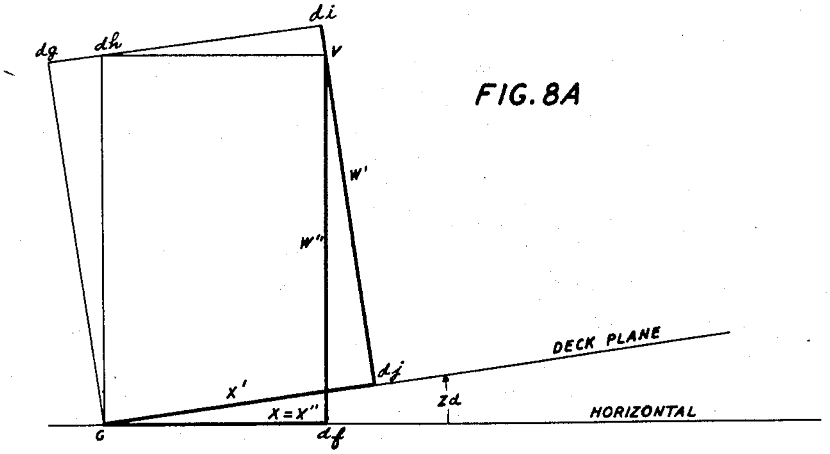

In the plane transverse to the plane through the line of sight and containing the X'' and W'' axes with the origin of coordinates at the mean gun G, the virtual position V has the rectangular coordinates $X=Gdf$, Fig. 8A, and $W''=Vdf$. Draw G$dh$ normal to X'' and in the X'', Y'' plane; G$dg$ and V$dj$ normal to the deck plane and extend V$dj$ to $di$; and draw $dgdhdi$ parallel to the deck plane. Angles $dgGdh$ and $Vdhdi$ equal $Zd$. Then $$Gdg=W''\cos Zd;\ dgdh=W''\sin Zd;\ dhdi=X\cos Zd;\ Vdi=X\sin Zd$$

$$W'=didj-Vdi=Gdg-Vdi=W''\cos Zd-X\sin Zd$$

$$X'=Gdj=dgdi=dgdh+dhdi=W''\sin Zd+X\cos Zd$$

$$Y'=Y''=Y\cos L-W\sin L$$

Thus, $$W'=W''-W''\text{ vers }Zd-X\sin Zd \quad (33)$$

$$X'=W''\sin Zd+X-X\text{ vers }Zd \quad (34)$$

$$Y'=Y-Y\text{ vers }L-W\sin L \quad (35)$$

The predictor 11, Fig. 2, supplies voltages proportional to WXY and the stable element 3 supplies shaft rotations proportional to L, $Zd$, to the coordinate rotator 17.

The voltage proportional to Y is supplied to the input circuit of the Y' amplifier; the voltage proportional to Y is fractionated proportionally to $-$vers $Zd$ and supplied to the input circuit of the Y' amplifier; and the voltage proportional to W is fractionated proportionally to $-\sin L$ and supplied to the input circuit of the Y' amplifier. Thus, by Equation 35, the output voltage of the Y' amplifier will be proportional to Y'.

The voltage proportional to Y is fractionated proportionally to sin L and supplied to the input circuit of the W'' amplifier; the voltage proportional to W is supplied directly to the input circuit of the W'' amplifier, and is fractionated proportionally to $-$vers $L$ and the fractionated voltage supplied to the input circuit of the W'' amplifier. Thus, by Equation 32, the output voltage of the W'' amplifier will be proportional to W''.

The voltage proportional to W'' is supplied directly to the input circuit of the W' amplifier and is fractionated proportionally to $-$vers $Zd$ and supplied to the input circuit of the W' amplifier. The voltage proportional to X is fractionated proportionally to $-\sin Zd$ and supplied to the input circuit of the W' amplifier. Thus, by Equation 33, the output voltage of the W' amplifier will be proportional to W'.

The voltage proportional to W'' is fractionated proportionally to sin $Zd$ and supplied to the input circuit of the X' amplifier. The voltage proportional to X is supplied directly to the input circuit of the X' amplifier and is also fractionated proportionally to $-$vers $Zd$ and supplied to the input circuit of the X' amplifier. Thus, by Equation 34, the output voltage of the X' amplifier, will be proportional to X'.

*Gun orders*

Figure 9:
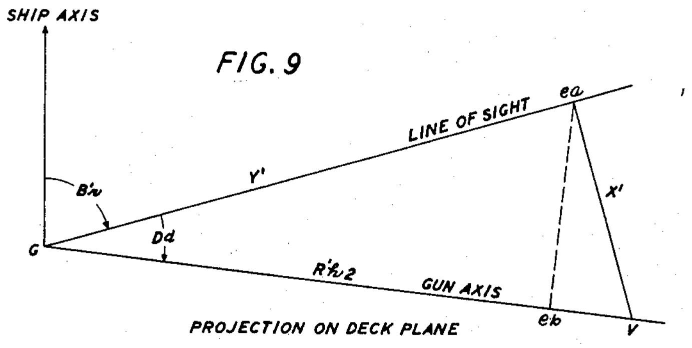
Figs. 9, 9A, 9B show in plan and elevation the relationships involved in the determination of the gun orders.

In Fig. 9, the mean gun G, line of sight, gun axis and virtual position V have been projected on the deck plane. The virtual position V has the coordinates $Gea=Y'$ and $Vea=X'$. Draw $eaeb$ normal to GV. Angle VG$ea$ is the deck deflection D$d$, and equals angle V$eaeb$.

Then, $$eaeb=Y' \sin Dd=X' \cos Dd$$

$$X' \cos \underline{Dd}-Y' \sin \underline{Dd}=0 \quad (36)$$

$$R'h2=GV=Geb+ebV=Y' \cos \overline{Dd}+X' \sin Dd$$

$$\underline{R'h2}=Y' \cos Dd+X' \sin Dd \quad (37)$$

The voltage proportional to X′ is fractionated proportionally to cos $Dd$; the voltage proportional to Y′ is fractionated proportionally to −sin $Dd$ and both fractionated voltages are supplied to the input circuit of the D$d$ motor amplifier. The output circuit of the D$d$ motor amplifier is connected to the D$d$ motor which adjusts the value of D$d$ to make the sum of the voltages supplied to the input circuit of the amplifier equal to zero. The motor shaft has thus, by Equation 36, rotated to the value of D$d$.

The shaft rotation proportional D$d$ and the shaft rotation from the director proportional to B′$r$ are combined in a differential gear to produce a rotation proportional to B′$gr$, the bearing of the gun in the deck plane relative to the axis of the ship and this rotation is sent by synchronous transmission to the guns.

The voltage proportional to Y′ is fractionated proportionally to cos $Dd$; the voltage proportional to X′ is fractionated proportionally to sin $Dd$ and both fractionated voltages are supplied to the input circuit of an amplifier. The output voltage of this amplifier will then, by Equation 37, be equal to R′$h$2, the component of virtual range in the deck plane.

Figures 9A, 9B:
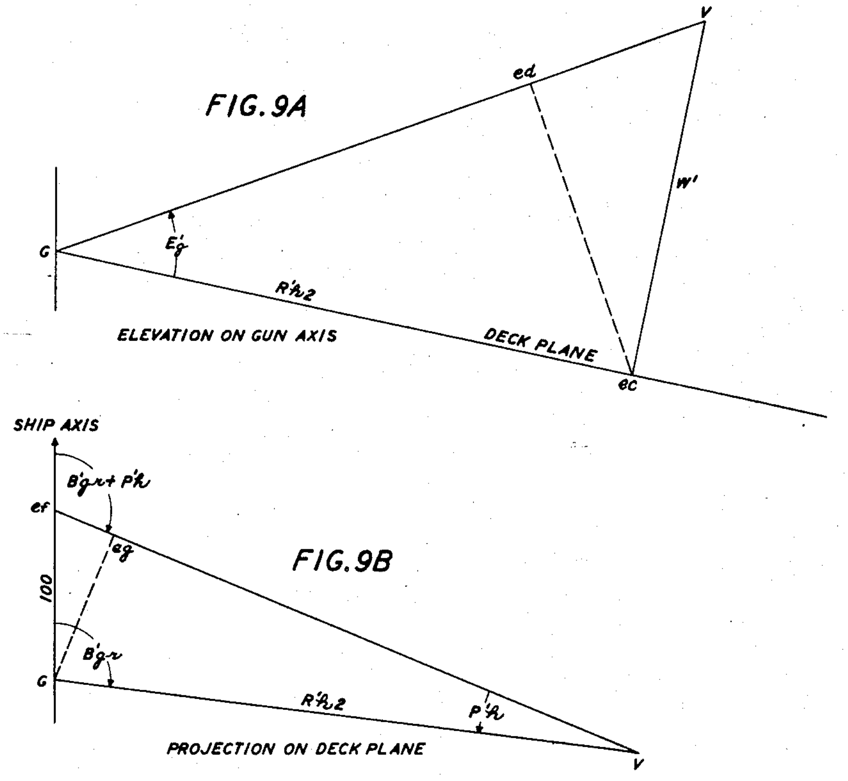

Fig. 9A shows the mean gun G, virtual position V, deck plane G$ec$, and the coordinates $R'h2=Gec$, and $W'=Vec$. Draw $edec$ normal to GV. The angle VG$ec$ is the gun elevation order E′$g$ and is equal to angle V$eced$. Then, $eced=R'h2 \sin E'g=W' \cos E'g$. Thus $$W' \cos E'g-R'h2 \sin E'g=0 \quad (38)$$

The voltage proportional to W′ is fractionated proportionally to cos $E'g$; the voltage proportional to $R'h2$ is fractionated proportionally to −sin $E'g$ and both fractionated voltages are supplied to the input circuit of the E′$g$ motor amplifier. The output circuit of the E′$g$ amplifier is connected to the E′$g$ motor, which adjusts the value of E′$g$ to make the sum of the voltages supplied to the input circuit of the amplifier equal zero. Thus, by Equation 38 the motor shaft has rotated to the value of E′$g$, and this rotation is sent to the guns by synchronous transmission.

In Fig. 9B, the fore and aft axis of the ship, the mean gun G and the virtual position V are projected on the deck plane. The distance G$ef$ is an arbitrary standard value of parallax, which may be taken as 100 yards, and subtends the angle of parallax in train P′$h$. Draw G$eg$ normal to V$ef$. Then $$Geg=Gef \sin (180-B'gr-P'h)=100 \sin (B'gr+P'h)=R'h2 \sin P'h$$

thus $$100 \sin (B'gr+P'h)-R'h2 \sin P'h=0 \quad (39)$$

A voltage proportional to 100 yards is fractionated proportionally to sin $(B'gr+P'h)$; the voltage proportional to −R′$h$2 is fractionated proportionally to sin $P'h$ and both fractionated voltages are supplied to the input circuit of the P′$h$ motor amplifier. The output circuit of the P′$h$ amplifier is connected to the P′$h$ motor. The shaft of the P′$h$ motor directly controls the value of P′$h$, and is combined in a differential gear with the rotation proportional to B′$gr$ to produce a rotation proportional to $B'gr+P'h$. The P′$h$ motor adjusts the value of P′$h$ to make the sum of the voltages supplied to the input circuit of the amplifier equal zero, when, by Equation 39 the shaft of the motor will have rotated to the value of P′$h$.

The rotation proportional to P′$h$ is sent by synchronous transmission to all the guns. At each gun the train order B′$gr$ is combined with an appropriate fraction of the proper sign of the angle of parallax in train P′$h$, depending upon the distance of that gun from the mean gun.

*Sight orders*

At the guns, the gun-sights are continuously sighted on the target so that, if the transmission of data from the computer is interrupted, the firing may be controlled by the gun-sights. The sight orders are approximate values of the angles between the axis of the gun and the line of sight to the target, and insure that the proper target is identified in the sights.

The sight angle V$s$ is the difference between the gun elevation order E′$g$ and the director elevation E$b$, thus $$\underline{Vs}=E'g-Eb \quad (40)$$

As shown in Fig. 2, a shaft motion proportional to E′$g$ is transmitted by the gun order computer 18 to the sight order computer 19 and is there combined in a differential gear with a shaft rotation proportional to E$b$ from the tilt corrector 2 to give a shaft rotation proportional to V$s$, which is transmitted by a synchronous transmission system to the guns.

The sight deflection D$s$ is the angle between the vertical plane through the line of sight and the vertical plane through the axis of the gun measured in the slant plane through the line of sight and perpendicular to the vertical plane through the axis of the gun.

Figure 8B:
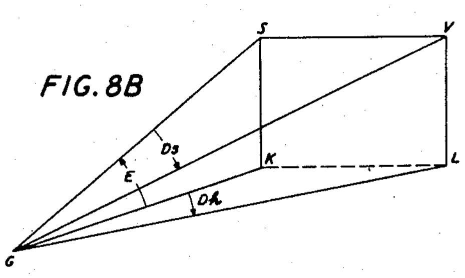
Fig. 8B is a three-dimensional diagram of the relationships involved in the determination of the sight deflection.

In Fig. 8B, GSK is the vertical plane through the line of sight GS; GVL is the vertical plane through the axis of the gun GV; and GSV is the slant plane through the line of sight GS and perpendicular to the plane GVL. Thus, GVS and GLK are right angles, and $SV=KL$. Angle $SGV=Ds$, angle $SGK=E$ and angle $KGL=Dh$.

Then, $$SV=GS \sin Ds$$

Also, $$GK=GS \cos E$$

and $$KL=GK \sin Dh=GS \cos E \sin Dh$$

But, $SV=KL$, thus $GS \sin Dh \cos E=GS \sin Ds$, thus $$\sin Dh \cos E-\sin \underline{Ds}=0. \quad (41)$$

A constant voltage is fractionated proportionally to sin $Dh$, then fractionated proportionally to cos $E$; the constant voltage is also fractionated proportionally to −sin $Ds$ and both fractionated voltages are supplied to the input circuit of the D$s$ motor amplifier. The output circuit of the D$s$ amplifier is connected to the D$s$ motor which adjusts the value of D$s$ until the sum of the voltages supplied to the input circuit of the amplifier has been reduced to zero, when by Equation 41 the shaft of the motor has rotated to the value of D$s$, which is transmitted, by synchronous transmission, to the guns.

*The computer*

In a commercial embodiment of the invention, the computer was made in four similar sections which may be individually transported to the fire control room and there assembled into a unit. Each section includes a substantially cubical casing having a top, a bottom and two sides, and a vertical partition spaced from the face. The motors, shafts, gearing and other mechanical equipment, and the majority of the indicators are mounted on the front of the partition and supported by suitable bosses. The potentiometers are mounted on the rear of the partition, the potentiometer shafts being journaled in the partition. A shelf is hinged to the rear edge of the outer side of each section and supports the amplifiers, networks, cabling and other electrical equipment.

Figure 11B:
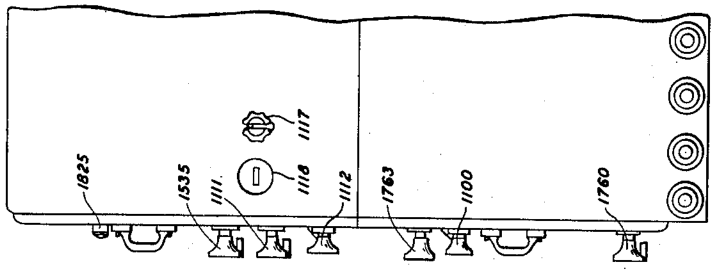
Figs. 11, 11A, 11B are front and side views of a typical computer embodying the invention.
Figure 11:
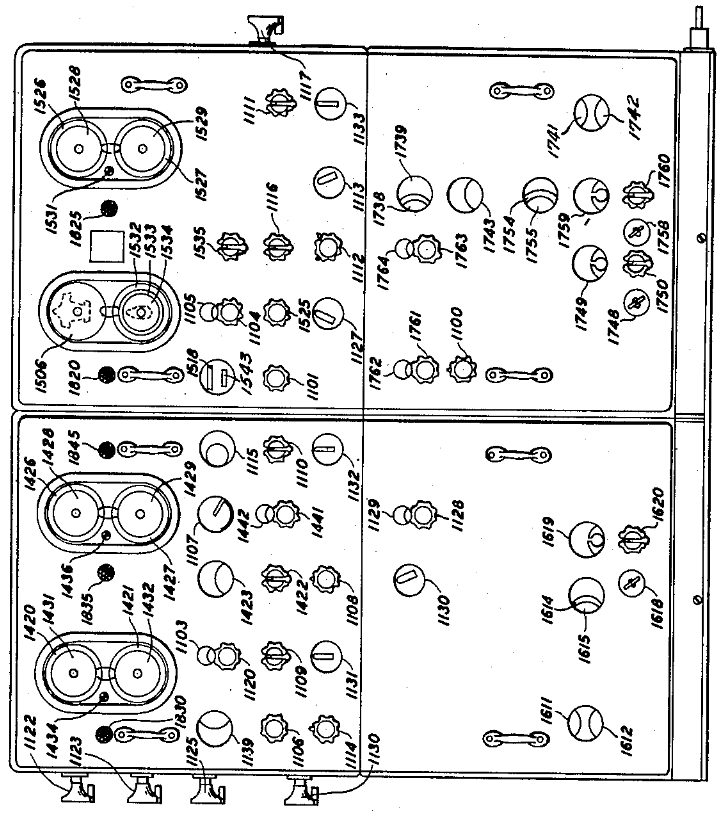
Figure 11A:
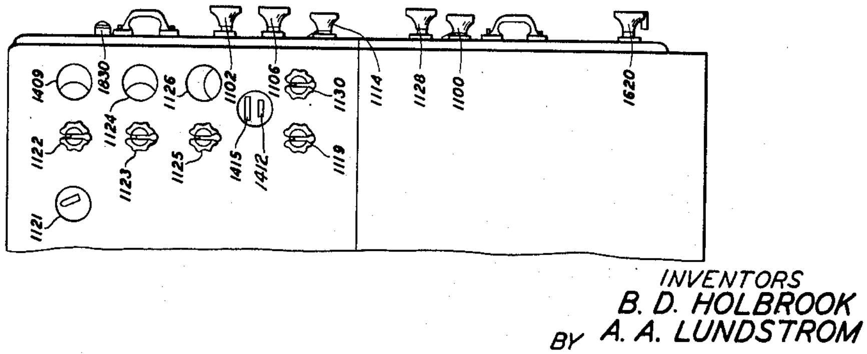

As shown in Figs. 11, 11A, 11B, the front of each section is closed by an armor plate cover carrying the knobs and switch levers, and forming substantially water-tight compartments for the mechanical equipment. The knobs and levers are aligned with their corresponding shafts, but are freely rotatable thereon so that an accidental movement of a knob or lever will not displace the shaft. The knobs and switch levers are equipped with push buttons or levers which, when operated, clutch the knob or lever firmly to the corresponding shaft.

Four types of knobs are used.

*Type A Knob*

The type A knob has an outer casing and an inner lining rotatably mounted upon the cover of the computer. A lever knob is pivoted to the casing and normally folded back into a recess in the casing. When folded forward to the operating position, the lever depresses a spring restored plunger mounted in the lining. The movement of the plunger forces depressions, formed in a disc attached to the end of the plunger, into registry with projections formed on a similar disc mounted on the shaft to be operated. Rotation of the knob will then rotate the shaft. When the lever is folded back, the spring forces the plunger upward drawing the discs out of contact. A cup-shaped member is also mounted upon the end of the plunger, surrounding the discs. A spring supported cylindrical friction member is supported by the cover in alignment with the cup-shaped member. When the lever is folded forward the cup-shaped member is forced into contact with the friction member thus frictionally braking the driven shaft. A switch may be arranged so that the movement of the cup-shaped member operates the switch.

*Type B knob*

The type B knob is similar to the type A knob except that the cylindrical friction member is omitted.

*Type C knob*

The type C knob has an outer casing rotatably mounted upon an inner lining attached to the cover of the computer. A central button, controlling a spring restored plunger, is mounted in the casing. When depressed by the central button the movement of the plunger forces depressions formed in a first disc attached to the plunger into registry with projections formed on a second disc keyed to a spring-operated clutch keyed to the driven shaft. Rotation of the knob will then, through the discs and clutch, rotate the driven shaft.

*Type D knob*

The type D knob is similar to the type C knob except that the spring-operated clutch is removed.

The mechanical equipment of the four sections is diagrammatically shown in Figs. 14, 15, 16, 17, together with the associated knobs, levers and potentiometers. The apparatus has been functionally segregated in the various sections and, in those cases where a shaft must pass from one section to another, connectors are provided in each section so that the shafts may be readily disconnected to permit the sections to be individually removed.

Simplified diagrams of the mechanical equipment are shown in Figs. 12 and 13.

The potentiometer cards are made by winding insulated resistance wire closely and evenly on a strip of suitable material. One edge of the strip is straight and the wire crossing this edge is bared to make a good contact with the brush or brushes. The other edge of the strip is shaped so that the width of the strip will vary to produce the desired functional variation in resistance of the winding. A single card, or a plurality of cards placed end to end, is wrapped around a light drum of suitable material. A continuous binding ring is placed around the card or cards and wedges inserted between the ring and the card to press the card firmly to the drum. A plurality of drums of different diameters are nested together and mounted on the outer portion of a base. Slip rings are insulatingly mounted on the intermediate portion of the base and the potentiometer shaft is journaled in a boss in the center of the base. Brush arms, carrying brushes in contact with the straight edges of the cards and connected to other brushes in contact with the corresponding slip rings, are mounted on the potentiometer shaft and may be driven directly by the shaft or by suitable gearing supported by the base and connecting gears mounted on the shaft and brush arms.

With angular functions of less than a revolution, and non-angular functions, the potentiometer card may be spread out to cover a mechanical travel larger or smaller or equal to the functional range and the brush arm geared up in the ratio of the travel to the range. In the case of functions of a small angle the card may be spread out over a physical angle which is larger than the functional angle but is still only a fraction of a revolution and more than one card may be placed end to end around a drum. In the circuit drawings the cards of potentiometers which are automatically adjusted have been represented by circles surrounded by lines indicating the approximate variations in the widths of the cards. Manually adjusted potentiometers are represented by straight cards but may be formed into circles if desired. In the circuit drawings each card and its associated brushes has been independently shown. Each potentiometer has been given a PT number, e. g., PT28, and the cards numbered to correspond, e. g., 2805, 2806, etc.

With trigonometric functions which extend over a complete revolution two similar cards may be used, placed end to end around one of the drums.

For convenience of reference, the potentiometers used in the computer are tabulated below.

| PT | Function | Functional Range | Actual travel, degrees | Brush Factor | Drums | Cards | Brushes | Slip |
|---|---|---|---|---|---|---|---|---|
| 1 | *j*B'*r* | ±12° | 312 | 13 | 3 | 3 | 3 | 3 |
| 2 | L | ±25.5° | 163 | 3.2 | 3 | 6 | 6 | 6 |
| 3 | Z*d* | ±25.5° | 163 | 3.2 | 4 | 7 | 7 | 7 |
| 4 | B*r* | ±360° | 360 | 1 | 3 | 6 | 8 | 8 |
| 6 | S*o* | 0-45 knots | 150 | 108 per rev | 3 | 6 | 6 | 6 |
| 7 | S*h* | 0-400 knots | 320 | 450 per rev | 5 | 5 | 5 | 5 |
| 13 | A | ±360° | 360 | 1 | 4 | 8 | 10 | 9 |
| 16 | *d*H | −250 to 150 knots | 320 | 450 per rev | 4 | 4 | 4 | 4 |
| 17 | *c*R | 0-36,000 yards | 518 | 25,000 per rev | 5 | 5 | 6 | 6 |
| 19 | R*j* | ±1,800 yards | 324 | 4,000 per rev | 1 | 1 | 1 | 1 |
| 20 | D*j* | ±180 mils | 324 | 400 per rev | 1 | 1 | 1 | 1 |
| 21 | V*j* | do | 150 | 864 per rev | 1 | 1 | 1 | 1 |
| 26 | B*gr* | ±360° | ±360 | 1 | 1 | 2 | 2 | 2 |
| 27 | B*wg* | ±360° | ±360 | 1 | 1 | 2 | 2 | 2 |
| 28 | E2 | −1.5° to 86.7° | 159 | 1.8 | 9 | 17 | 17 | 17 |
| 29 | D*s* | ±199 mils | 324 | 442 per rev | 1 | 1 | 1 | 1 |
| 40 | *B'gr*+*P'h* | ±360° | ±360 | 1 | 1 | 2 | 1 | 1 |
| 41 | P'*h* | ±12° | 288 | 12 | 1 | 1 | 1 | 1 |
| 52 | *k*E | ±42° | 336 | 4 | 2 | 2 | 2 | 2 |
| 53 | D*d* | ±140° | 350 | 1.25 | 4 | 12 | 6 | 9 |
| 55 | E'*g* | −15° to 85° | 330 | 3.3 | 2 | 2 | 2 | 2 |
| 56 | *d*R | ±450 knots | 336 | 950 per rev | 2 | 2 | 2 | 2 |
| 57 | *d*E | ±20°/second | 336 | variable | 2 | 2 | 2 | 2 |
| 58 | *d*B | do | 336 | do | 2 | 2 | 2 | 2 |
| 61 | E | −2.5° to 90° | 333 | 3.6 | 6 | 6 | 6 | 6 |
| 62 | E | −2.5° to 90° | 157 | 1.7 | 4 | 8 | 8 | 8 |
| 63 | F2 | 0-51 seconds | 340 | 54 per rev | 3 | 6 | 3 | 2 |
| 64 | R*e* | 0-18,000 yards | 324 | 20,000 per rev | 7 | 7 | 7 | 7 |
| 65 | D*h* | ±90° | 324 | 1.8 | 7 | 7 | 7 | 7 |
| 66 | D*h* | ±90° | 144 | 0.8 | 2 | 4 | 4 | 4 |
| 67 | F*g* | −6 to 12 seconds | 324 | 20 per rev | 1 | 1 | 1 | 1 |

HANDSET POTENTIOMETERS

| PT | Function | Handset Range | Travel, degrees | Drums | Cards | Brushes |
|---|---|---|---|---|---|---|
| 71 | *a*S | | 270 | 2 | 2 | 2 |
| 72 | *r*S | | 270 | 1 | 1 | 1 |
| 73 | S*s* | 0-450 knots | 270 | 2 | 2 | 2 |
| 74 | T*g* | 2.5-6 seconds | 245 | 2 | 2 | 2 |
| 75 | I.V. | 2,450-2,600 | 270 | 2 | 2 | 2 |
| 76 | S*w* | 0-60 knots | 270 | 2 | 2 | 2 |

*Director tilt corrector*

Figure 17:
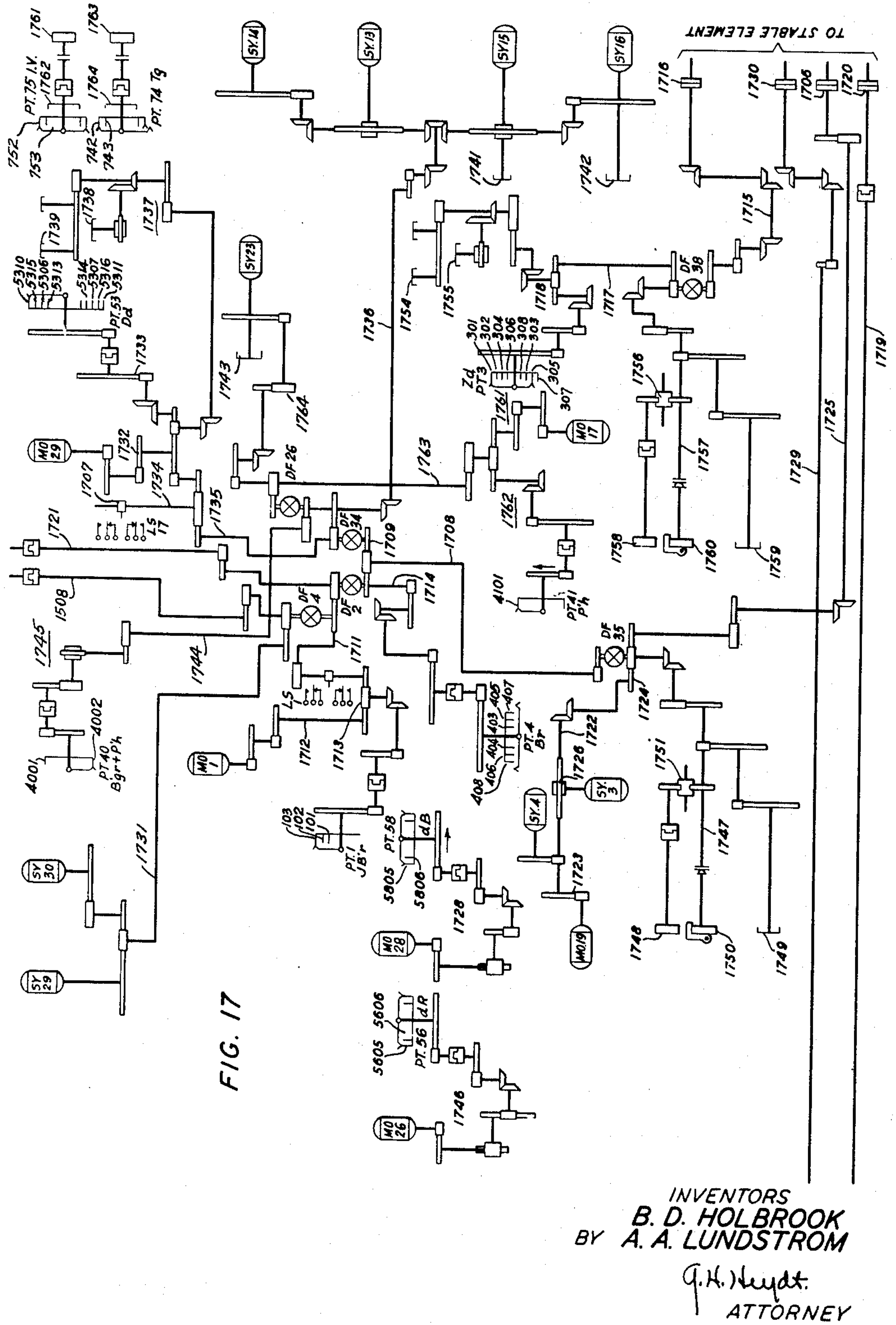
Figure 27:
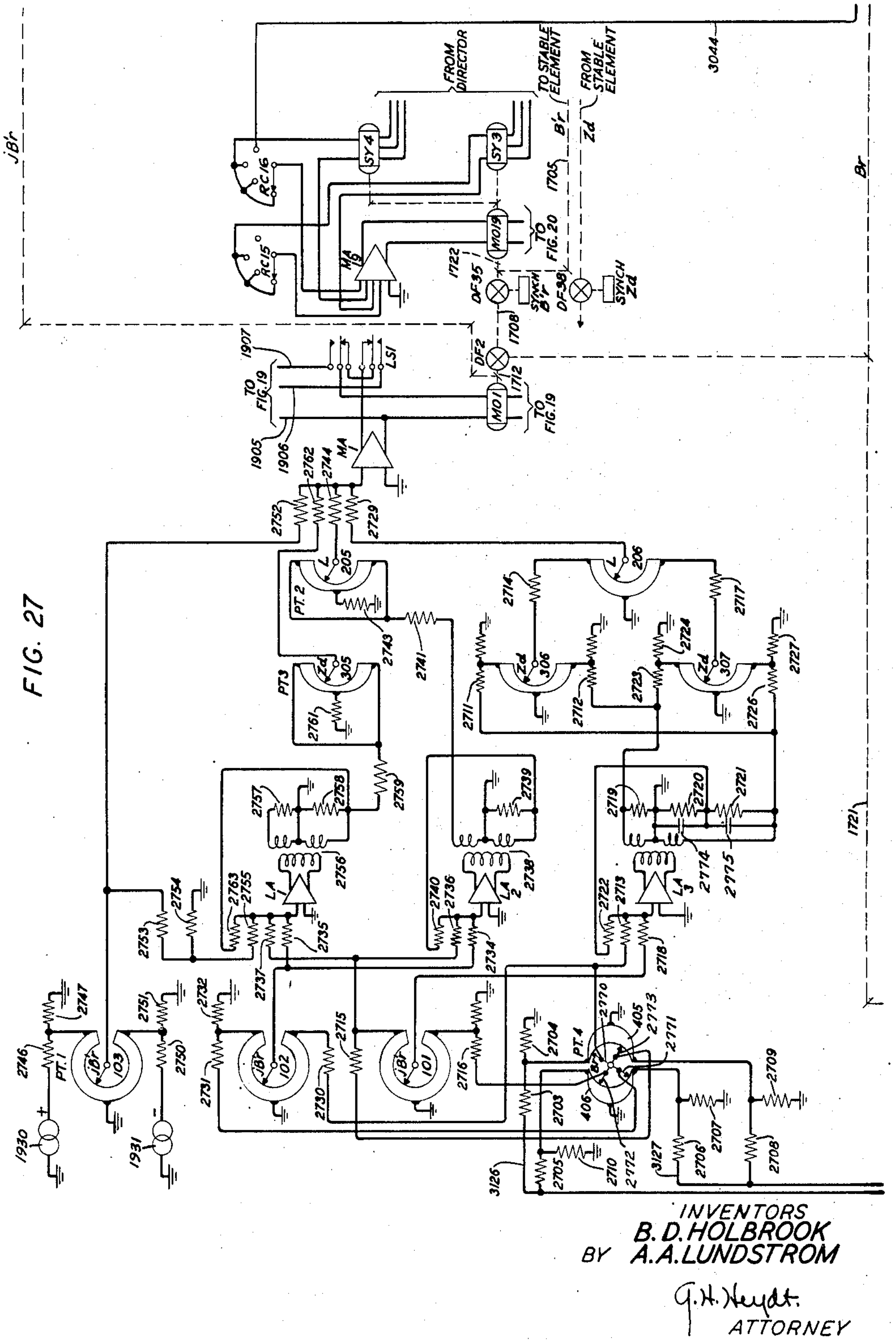

The coarse and fine synchronous transmitters controlled by the training gear of the director are respectively connected to the coarse SY3 and fine SY4 synchronous receivers, Figs. 12, 17 and 27.

In Figs. 12 and 17, the coarse receiver SY3 is geared down by the worm gear 1726 so that the shaft 1722 makes one revolution for 2.5 degrees rotation of the shaft of receiver SY3. The fine receiver SY4 is geared down in the ratio four to one, so that the fine receiver SY4 makes 36 revolutions per revolution of the coarse receiver SY3. The power motor MO19 is geared down by gearing 1723 in the ratio two to nine to shaft 1722. Shaft 1722 is connected through gearing 1724, and the other gears shown, to shaft 1725 which is connected through clutch 1706 to the stable element to orient the stable element in train. The other coarse and fine receivers and follow-up motors used in the computer are similarly geared to each other.

The rotors of the coarse receiver SY3 and the fine receiver SY4 are respectively connected through switches RC15 and RC16, Fig. 27, forming two sections of a four position rate control RC switch, to the input circuit of the follow-up amplifier MA19, of the type shown in Fig. 22.

The rotor of the coarse receiver is grounded at terminal 2200 and is connected by terminal 2201 through resistors 2203 and 2202 to ground, and through resistor 2203 to the input circuit of conventional power stages 2204. The output of the power stages is connected to one winding of the follow-up motor MO19, Fig. 27.

The rotor of the fine receiver is connected to terminals 2200 and 2205, Fig. 22.

The voltage of the fine receiver goes through thirty-six cycles for each cycle of the voltage of the coarse receiver, and it is necessary in order to avoid false settings to prevent the voltage of the fine receiver from affecting the motor during all the cycles preceding the cycle ending with the correct setting. During this last cycle the voltage of the coarse receiver falls to a small value, approaching zero at the correct setting.

Terminals 2200 and 2205 are connected through the winding of potentiometer 2230 which may be adjusted to control the fraction of the voltage of the fine receiver supplied to the remainder of the circuit.

The brush of potentiometer 2230 is connected through resistors 2207, 2208 and non-linear resistor 2209 to ground. The non-linear resistor 2209, which may be a pair of oppositely connected copper-copper oxide couples limits the peak voltage supplied to the remainder of the circuit. The junction of resistors 2208 and 2209 is coupled through capacitor 2210 to the control grid of a vacuum tube 2211.

The resistors 2208 and 2209 are shunted by the network formed by the series resistor 2212, the shunt arm formed by resistor 2213 and capacitor 2214 in serial relationship, and the shunt arm formed by the series resonant circuit including the inductor 2215 and capacitor 2216. This circuit may conveniently be resonated at three times the frequency of the source exciting the synchronous transmitters, so as to reduce any third harmonic voltages supplied by the fine receiver.

The rotor of the coarse receiver is connected by terminal 2201 to the control grid of the left triode of a double vacuum tube 2217. The anode of this amplifying section is coupled by capacitor 2218 to the anode and control grid of the right triode, which is connected as a diode, rectifying the applied voltage to produce a current flowing downward in resistor 2219 and upward in resistor 2220, to produce a negative bias which is supplied through the filter formed by resistors 2221, 2222 and capacitor 2223 to the control grid of vacuum tube 2211. The control grid of vacuum tube 2211 is also biased negatively by the usual self-biasing resistors 2224 and 2225. The anodes and screen grid of vacuum tubes 2211 and 2217 are supplied with power from the source 2229 through the usual coupling resistors and the heaters are supplied with power from the usual transformer (not shown). The source 2229 is also coupled through resistor 2206 to the cathode of the diode section of tube 2217, to bias this cathode positively to a threshold value, so that, when the voltage from the rotor of the coarse receiver falls below this value, the diode is blocked and no longer biases the grid of tube 2211. The constants of the circuit are proportioned so that the bias on the grid of tube 2211 cuts off transmission through this tube until the fine receiver has been moved within less than one cycle of the balance point. By this time, the voltage from the rotor of the coarse receiver has decreased below the threshold bias on the diode section of tube 2217, the bias due to the rectified current disappears, unblocking tube 2211 and permitting the amplified voltage from the fine receiver to be transmitted through tube 2211, capacitor 2226 and the power stages 2204 to the motor.

The inductor 2227 and capacitor 2228 form a resonant circuit tuned to the supply frequency and assist in stabilizing the motion of the follow-up motor.

Thus, one winding of the follow-up motor, MO19, Fig. 27, is supplied with power from the follow-up amplifier MA19, which, for large positional disagreement between the transmitters and receivers, is controlled by the coarse receiver SY3, and for small disagreements is conjointly controlled by the coarse and fine receivers. The other winding of motor MO19 is excited by one phase of the ship power supply, Fig. 20, through the fourth contact of switch MC12, which is the twelfth section of a four-position master control MC switch.

The motor MO19 and shaft 1722, Figs. 17 and 27, are thus rotated proportionally to $B'r$, the angular position of the target as measured in the deck plane.

The shaft 1722, Fig. 17, is connected through gearing 1724, differential gear DF35, shaft 1708, gearing 1709 to the differential gear DF2. The motor MO1 is geared to shaft 1712 and, through gearing 1713 and 1711 to differential gear DF2. As will be later explained, the motor MO1 turns to the angle $jB'r$, and, as the shaft 1708 turns in proportion to $B'r$, and these rotations are added in the differential gear DF2, the shaft 1714 rotates proportionally to $Br$.

Figure 31:
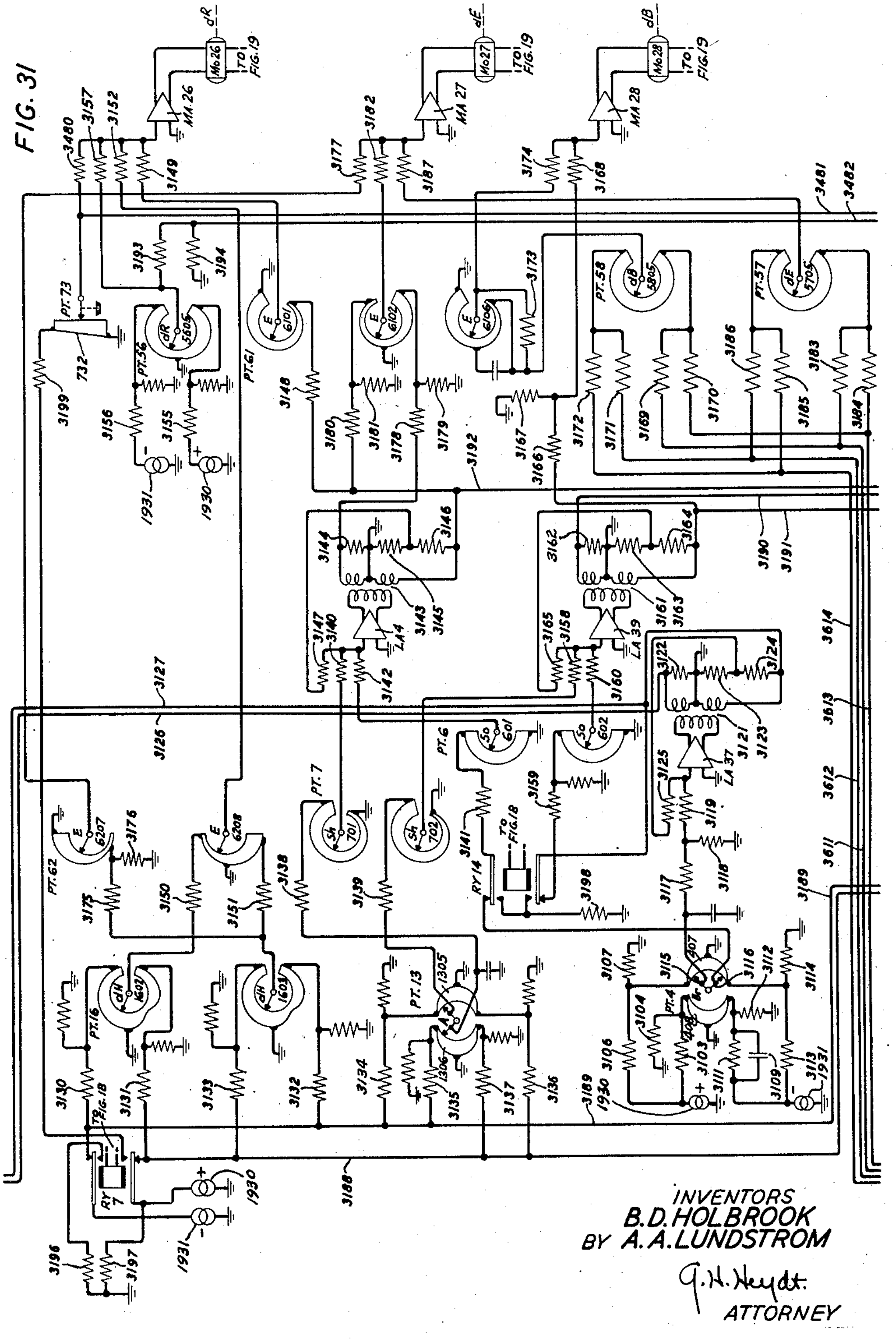

The shaft 1714 through suitable gearing rotates the brushes of potentiometer PT4 of which cards 407 and 408 are shown in Fig. 31.

In the present computer, alternating voltages and currents are used in the computing circuits. These currents may be obtained from any good oscillator having constant frequency and a clean wave, free of harmonics, and a low impedance output. The oscillator should supply two voltages of equal amplitude, opposed in phase to a high degree of accuracy, one phase representing positive quantities and the opposed phase negative quantities. For convenience, the sources of the voltages of the two phases will be shown separately, though both phases should be obtained from a single oscillator. Although these sources are independently shown on the various drawings, it is understood that they are all the "positive" and "negative" phases from a single oscillator source. This provides greater accuracy since the source can vary in amplitude and not impair the accuracy of the solutions obtained by the servo balancing of the various motor amplifiers. To reduce interference from the ship power sources, the frequency of the oscillator is non-harmonic with the frequency of the supply, for example, with a 60 cycle supply of oscillator may have a frequency of 210 cycles.

The grounded source 1930, Fig. 31, is connected to ground through the potential dividing resistors 3103 and 3104. The junction of resistors 3103 and 3104 is connected to ground through one section of the winding of card 408. The source 1930 is also connected to ground through the potential dividing resistors 3106, 3107 and the junction of these resistors is connected to ground through one section of the winding of card 407.

Similarly, the grounded source 1931, of opposite phase, is connected to ground through resistors 3111 and 3112, and the junction of these resistors is connected to ground through the other section of winding of card 408. The source 1931 is also connected to ground through resistors 3113 and 3114 and the junction of these resistors connected to ground through the other section of the winding of card 407. Phase correcting capacitors such as capacitor 3109, may be connected across the resistors, to compensate for the distributed capacitance of the windings of cards 408, 407 and the capacity to ground of all the shielded wiring between various points of the circuit.

As indicated on the drawing, the widths of the potentiometer cards 408 and 407 vary with a modified cosinusoidal function so that the brushes 3115 and 3116 select voltages with respect to ground respectively proportional to the positive sine and negative cosine of $Br$.

The brush 3115 is connected to ground through the potential dividing resistors 3117, 3118 and the junction of resistors 3117, 3118 is connected through resistor 3119 to the input circuit of the line amplifier LA37. Phase corrective capacitors may be connected to the brush 3115 and across resistors 3117.

The line amplifiers used in this computer, such as line amplifier LA37, are stable, high gain, three stage amplifiers of conventional design, which may include band-pass filters tuned to 210 cycles to reduce currents of undesired frequencies.

The output transformer 3121, of amplifier LA37, has two grounded secondary windings connected in serial relationship. The output transformers of all line amplifiers are poled so that the voltage from the upper winding has the same phase as the input voltages, and the voltage of the lower winding is of reversed phase. One winding is shunted by resistor 3122, and the other winding is shunted by resistors 3123 and 3124 in serial relationship. The junction of resistors 3123, 3124 is connected through resistor 3125 to the input circuit of amplifier LA37, to feed back the output voltage in reversed phase to the input circuit. This negative feedback reduces the apparent impedance of the input circuit of amplifier LA37 to a small value, stabilizes the operation of the amplifier, and reduces the gain of the amplifier so that the output voltage has the desired scale factor of volts per unit of the function represented by the output voltage.

Figure 29:
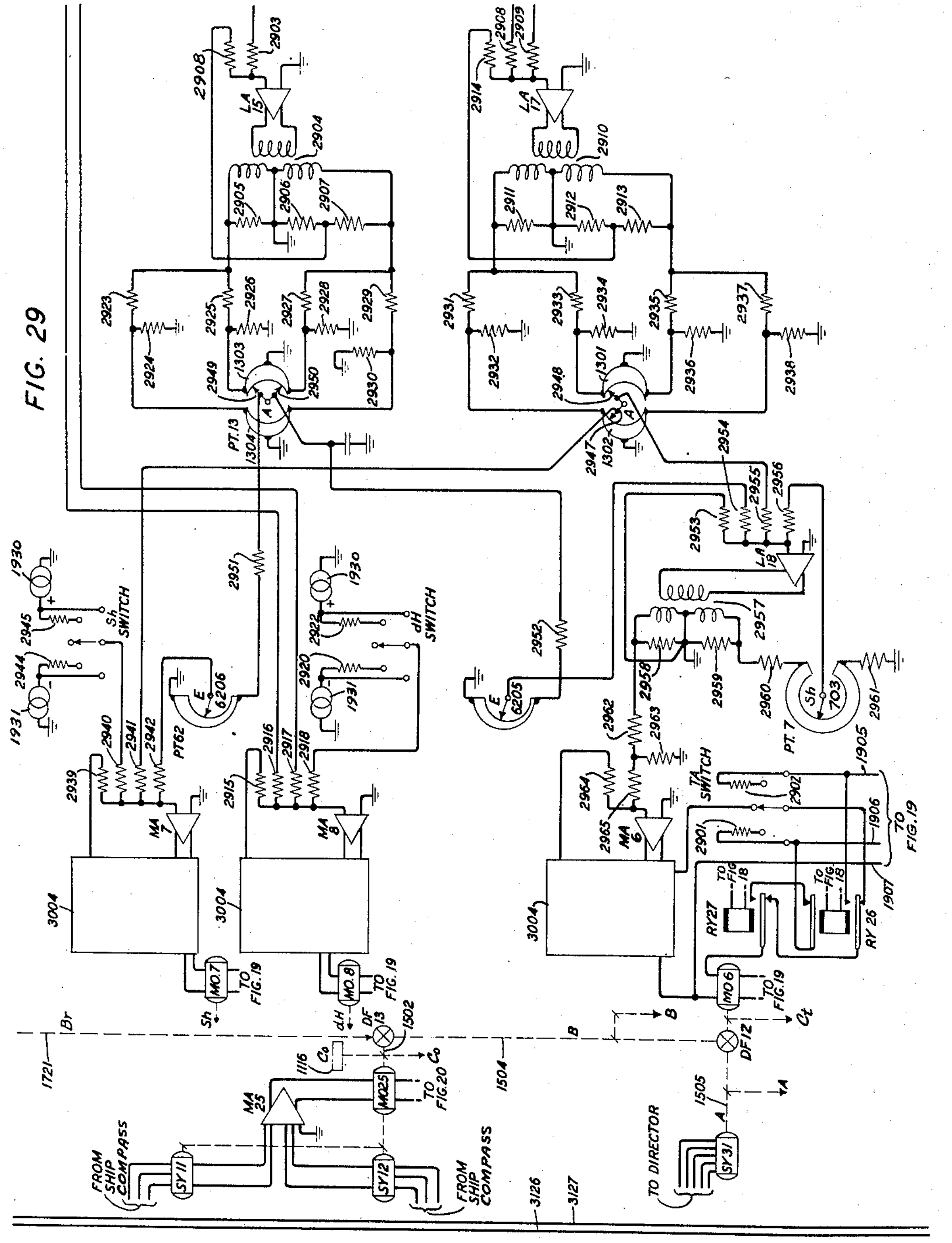

The secondary winding of transformer 3121, having a voltage proportional to sin $Br$, is connected to connections 3126, 3127, Figs. 31, 29, 27.

Connection 3126 is connected to ground through resistors 2705, 2710, Fig. 27 and through resistors 2703, 2704. Connection 3127 is connected to ground through resistors 2706, 2707 and through resistors 2708, 2709. The junctions of resistors 2705, 2710 and resistors 2706, 2707 are connected to the ends of card 406 of potentiometer PT4; the junctions of resistors 2703, 2704 and resistors 2708, 2709 are connected to the ends of card 405 of potentiometer PT4. Cards 405 and 406 are on one drum of potentiometer PT4 and have a variation of resistance such that the voltages on the brushes vary as cosine functions of their angular displacement. The voltage on leads 3126 and 3127 are proportional to +sin $Br$ and −sin $Br$, respectively. These voltages are applied to cards 406 and 405 as just described and then fractionated on these cards according to ±sin $Br$ or ±cos $Br$ by suitably situating four brushes in 90 degree relationships with each other. This drum of PT4 has four brushes 2770, 2771, 2772, 2773, rotated proportionally to B$r$ to select voltages proportional to ±sin² $Br$ and ±sin $Br$ cos $Br$.

The positive sine brush 2770 is connected through resistor 2713 to the input circuit of line amplifier LA3. The cosine brushes 2773, 2772 are respectively connected through resistors 2715, 2716 and the sections of the winding of card 101 of potentiometer PT1 to ground. The winding of card 101 varies in resistance in such a way that the voltage between brush and ground as applied to resistor 2718 at the input of LA3 is a fraction of the voltage applied to the card and resistors 2715 and 2716 which fraction varies in accordance with the negative tangent of the angular motion of the brush. As shown in Fig. 17, the brushes of potentiometer PT1 are geared to gear 1713 so as to rotate through a physical angle equal to 13$j$B'$r$.

One section of the secondary winding of the output transformer of amplifier LA3, Fig. 27, is bridged by resistor 2719 and the other section is bridged by resistors 2720, 2721 in serial relationship. The junction of resistors 2720, 2721 is connected through resistor 2722 to the input circuit of amplifier LA3, to supply voltage of reversed phase to the input circuit. The junction of the two sections of the secondary winding is grounded.

Let the voltages suppled to resistors 2713, 2718 be $e_1$ and $e_2$; the resistances of resistors 2713, 2718 be $r_1$ and $r_2$ and the currents flowing in resistors 2713, 2718 be $i_1$ and $i_2$. Let the voltage across the input circuit of amplifier LA3 be $e_g$; the voltage across one section of the output transformer be $-e_0$; and the voltage across resistor 2720 be $-ke_0$. Let the resistance of resistor 2722 be $r_0$ and the current flowing be $-i_0$. Let $$e_g=\frac{-e_0}{\mu}$$

Then since no current flows in the connection from the junction of resistors 2713, 2722 and 2718 to the grid of LA3, $$i_0+i_1+i_2=0$$

$$i_0=\frac{-ke_0-e_g}{r_0}\qquad i_1=\frac{e_1-e_g}{r_1}\qquad i_2=\frac{e_2-e_g}{r_2}$$

$$\frac{-ke_0-e_g}{r_0}+\frac{e_1-e_g}{r_1}+\frac{e_2-e_g}{r_2}=0$$

$$(r_1r_2)\left(-ke_0+\frac{e_0}{\mu}\right)+r_0\left[e_1r_2+e_2r_1+\frac{e_0}{\mu}(r_1+r_2)\right]=0$$

$$e_0\left[\frac{1}{\mu}\left(\frac{r_0}{r_2}+\frac{r_0}{r_1}\right)-k+\frac{1}{\mu}\right]+\left(e_1\frac{r_0}{r_1}+e_2\frac{r_0}{r_2}\right)=0$$

$$e_0=\frac{-\left(e_1\frac{r_0}{r_1}+e_2\frac{r_0}{r_2}\right)}{-k+\frac{1}{\mu}\left(\frac{r_0}{r_1}+\frac{r_0}{r_2}+1\right)}$$

$$e_0=\frac{-\frac{1}{k}\left(e_1\frac{r_0}{r_1}+e_2\frac{r_0}{r_2}\right)}{1+\frac{1}{\mu}\frac{1}{k}\left(1+\frac{r_0}{r_1}+\frac{r_0}{r_2}\right)}$$

The voltage amplification factor $\mu$ of the three-stage amplifier is about 15,000 times, thus $$\frac{1}{\mu}$$

is very small, hence, $$e_0=\frac{1}{k}\left[e_1\frac{r_0}{r_1}+e_2\frac{r_0}{r_2}\right]\tag{42}$$

The output voltage $e_0$ is thus proportional to the sum of the input voltages $e_1$ and $e_2$, and the scale factor of the output voltage is determined by the relative values of $r_0$, $r_1$, $r_2$ and $k$. If $r_1=r_2$ and $r_0=r_1k$, then $e_0=e_1+e_2$. If $r_0=r_1=r_2$, then $$e_0=\frac{1}{k}(e_1+e_2)$$

If the resistors 2720, 2721 are replaced by the winding of a potentiometer having a brush connected to resistor 2722, the output voltage will be proportional to the sum of the input voltages divided by the potentiometer function.

The output transformers of each of the line amplifiers have in addition to the resistors shown shunting the lower winding additional elements 2774, 2775 such as are shown shunting resistors 2721 and 2720 in the case of LA3, Fig. 27. These elements are necessary to provide phase and amplitude margin in the amplifier for all the frequencies at which $\mu\beta$ is greater than unity. In addition the ratio of the resistances shunting the lower winding of each transformer to that shunting the upper winding is of such value that for the various loads connected to the amplifier the voltages across the two windings of the transformer are equal. This is necessary because these windings have resistance and the upper secondary winding is not in the feedback loop.

The output voltage of line amplifier LA3 is proportional to sin² $Br$—sin $Br$ cos $Br$ tan $jB'r$. The output transformer of amplifier LA3 is connected to ground through resistors 2723, 2724 and through resistors 2726, 2727. The junction of resistors 2723, 2724 is connected to ground through one section of the winding of card 307 of potentiometer PT3, and the junction of resistors 2726, 2727 is connected to ground through the other section of the winding of card 307.

The potential-dividing resistors, such as resistors 2723, 2724 associated with the winding of a potentiometer are not absolutely essential to the operation of the circuit, but are a convenient expedient for reducing the severity of the demands upon the circuit design. By using potential-dividing resistors, the voltage from the source may be higher, thus improving the ratio of this desired voltage to any undesired voltages picked up on the wiring. By presenting a constant load to the source, these resistors reduce the effect upon the source produced by the movement of the potentiometer brushes. Furthermore, it makes possible the adapting of the potentiometer loads to the load capabilities of the line amplifiers so that they can be made of uniform design throughout the computer. By forming an impedance in series with the winding of one potentiometer, these resistors reduce any interactions between the currents in this potentiometer and those in any other potentiometer connected to the same source. Also, capacitors may be shunted across these resistors to correct the phase shifts due to the distributed capacity of the potentiometer cards. To simplify and condense the description of the circuits, many of the resistors shown will not be specifically identified, as their function is obvious.

The shaft 1715, Fig. 17, is connected by the clutch 1716 to the cross level $Zd$ shaft of the stable element, and is geared through differential gear DF38 to shaft 1717, which is geared by gears 1718 to drive the brushes of the $Zd$ potentiometer, PT3, and the dials 1754, 1755, Figs. 11 and 17.

The secondary winding of the output transformer of amplifier LA3, Fig. 27, is also connected through resistors 2711, 2712 to the two sections of card 306 of potentiometer PT3.

The brushes associated with cards 306, 307, respectively, select voltages proportional to $\mp\sin Zd$ and are connected through resistors 2714, 2717, to the ends of card 206 of potentiometer PT2.

Figure 16:
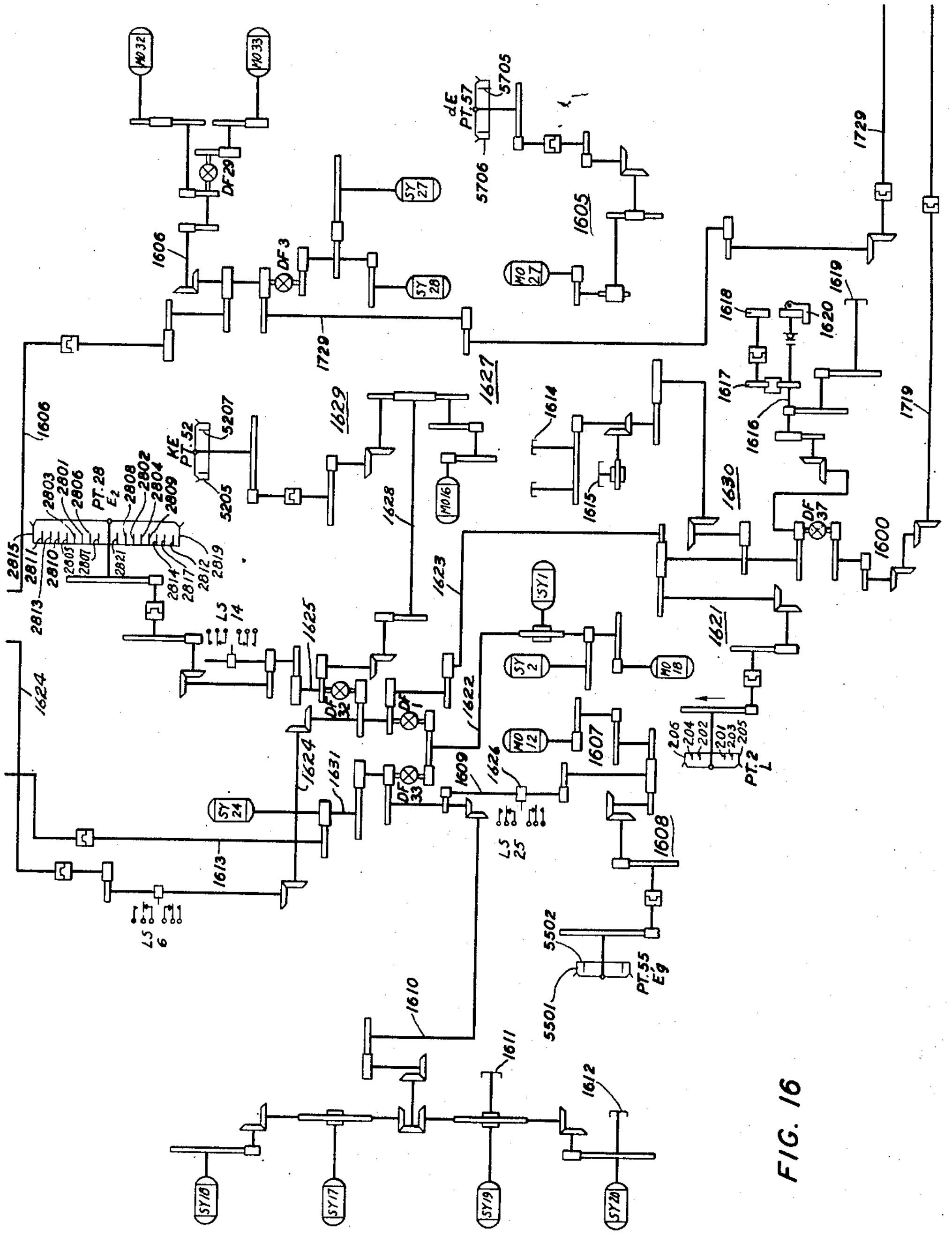

The shaft 1719, Fig. 17, is connected by the clutch 1720 to the level L shaft of the stable element, and is connected by gearing 1600, Fig. 16, to differential gear DF37. Gear DF37 is connected by gearing 1601 to the brushes of the L potentiometer, PT2, and by gearing 1613 to the inner coarse dial 1615 and annular outer fine dial 1614, Figs. 11 and 16.

The brush associated with card 206 selects a voltage proportional to sin $L$, and is connected through resistor 2729, Fig. 27, to the input circuit of motor amplifier MA1.

The voltage supplied to resistor 2729 is proportional to $$\sin Br(\sin Br - \cos Br \tan jB'r)(-\sin Zd)\ \sin L$$

The positive sine brush 2770 associated with cards 405, 406 of PT4 is connected through resistor 2730 to one end of card 102 of PT1 while the negative sine brush 2771 is connected through resistors 2731, 2732 to ground, the junction of resistors 2731, 2732 being connected to the other end of card 102. The winding of card 102 varies in resistance with a tangent function modified for the resistance load on the brush and is grounded at the center. The resistor 2732 equalizes the loads on the two sine brushes.

The brush associated with card 102 is connected through resistor 2734 to the input circuit of line amplifier LA2, and through resistor 2735 to the input circuit of line amplifier LA1.

The negative cosine brush 2773 associated with cards 405, 406 of PT4 is connected through resistor 2715 and through resistor 2736 to the input circuit of line amplifier LA2 and through resistor 2737 to the input circuit of line amplifier LA1.

The secondary winding of output transformer 2738, associated with amplifier LA2, is grounded in the center and one section is shunted by resistor 2739. The free end of this section is connected through resistor 2740 to the input circuit of amplifier LA2.

The output voltage of amplifier LA2 will be proportional to $\sin Br(-\cos Br - \sin Br \tan jB'r)$.

The free end of the other section of the secondary winding of transformer 2738 is connected through resistor 2741 to the ends of card 205 of PT2, the center of this card being grounded through resistor 2743. The winding of card 205 varies in resistance with a versine function modified for the resistance load on its brush. The brush associated with card 205 selects a voltage proportional to vers $L$ and is connected through resistor 2744 to the input circuit of motor amplifier MA1.

The voltage supplied to motor amplifier MA1 will be proportional to $$\sin Br(-\cos Br - \sin Br \tan (jB'r)\ \text{vers}\ L$$

The grounded source 1930 is connected through resistors 2746, 2747 to ground, and the junction of resistors 2746, 2747 is connected to one end of card 103 of PT1. The grounded source 1931 is connected through resistors 2750, 2751 to ground, and the junction of resistors 2750, 2751 is connected to the other end of card 103.

The winding of card 103 varies in resistance in such a way that the voltage on the brush of this card varies according to the tangent of its mechanical displacement divided by 13.

The brush associated with card 103 selects a voltage proportional to tan $jB'r$, is connected through resistor 2752 to the input circuit of motor amplifier MA1, and is connected through resistors 2753, 2754 to ground. The junction of resistors 2753, 2754 is connected through resistor 2755 to the input circuit of line amplifier LA1.

The secondary winding of output transformer 2756, associated with amplifier LA1, is grounded at a center tap, and the sections of the winding are shunted by resistors 2757, 2758. The free end of the lower section is connected through resistor 2763 to the input circuit of amplifier LA1 and through resistor 2759 to the ends of card 305 of potentiometer PT3. The winding of card 305 varies in resistance with a versine function modified for resistance load on the brush and is grounded at the center through resistor 2761. The brush associated with card 305 is connected through resistor 2762 to the input circuit of motor amplifier MA1.

The motor amplifiers used in the present computer, such as motor amplifier MA1, have three stages of high gain voltage amplification with reverse feedback, and a power amplification stage. The reverse feedback loop is designed in accordance with the principles disclosed in United States Patent 2,123,178, July 12, 1938, H. W. Bode, so as to stabilize the operation of the motor.

The output circuit of motor amplifier MA1 is connected through the break springs of limit switch LS1 to one phase winding of a two-phase motor MO1.

In Fig. 19, the sources 1930, 1931, are connected to the power amplifier 1902. The output circuit of power amplifier 1902 is connected through switch MC6 to the primary winding of transformer 1904. The secondary winding of transformer 1904 is in two sections connected to terminals 1905, 1906, 1907.

Terminal 1905, Fig. 27, is connected directly to one end of a winding of motor MO1 and to the output circuit of amplifier MA1. Terminal 1906 is connected to the lower, and terminal 1907 to the upper make spring of limit switch LS1. The output circuit of amplifier MA1 is normally connected through the lower break spring and armature and the upper break spring and armature to the other end of the winding of motor MO1. When motor MO1 is driven by the current from amplifier MA1 to the limit of its travel in either direction, one of the spring combinations of limit switch LS1 is operated, cutting off the current from amplifier MA1 and supplying current of opposite phase from terminal 1906 or 1907 to stop motor MO1 and drive motor MO1, and the attached shafting back from the limiting position.

The sources 1930, 1931, Fig. 19, are also connected through a conventional 90-degree phase shifting network 1903, power amplifier 1908, switch 1909 in its lower position and switch MC7 in its fourth position to the exciting winding of motor MO1.

The voltages supplied to the input circuit of motor amplifier MA1 are proportional to $$\tan jB'r+[\tan jB'r+\sin Br(-\cos Br-\sin Br \tan jB'r)](-\text{vers } Zd)+\sin Br(-\cos Br-\sin Br \tan jB'r)(\text{vers } L)+\sin Br(\sin Br-\cos Br \tan jB'r)(-\sin Zd)(\sin L)$$

and, from Equation 1, the sum of these voltages should be zero. If the sum of these voltages is not zero, current is supplied by amplifier MA1 to motor MO1, exciting motor MO1 to rotate the brushes of potentiometer PT1, varying the value of tan $jB'r$ until the voltages are reduced to zero, and the brushes of potentiometer PT1 have rotated proportionally to $jB'r$. If the values of B'$r$, $Zd$ and L are continually changing, the motor MO1 is continually moving, rotating the brushes of potentiometer PT1 continually to the correct values of $j$B'$r$.

*Rate generator*

Figure 15:
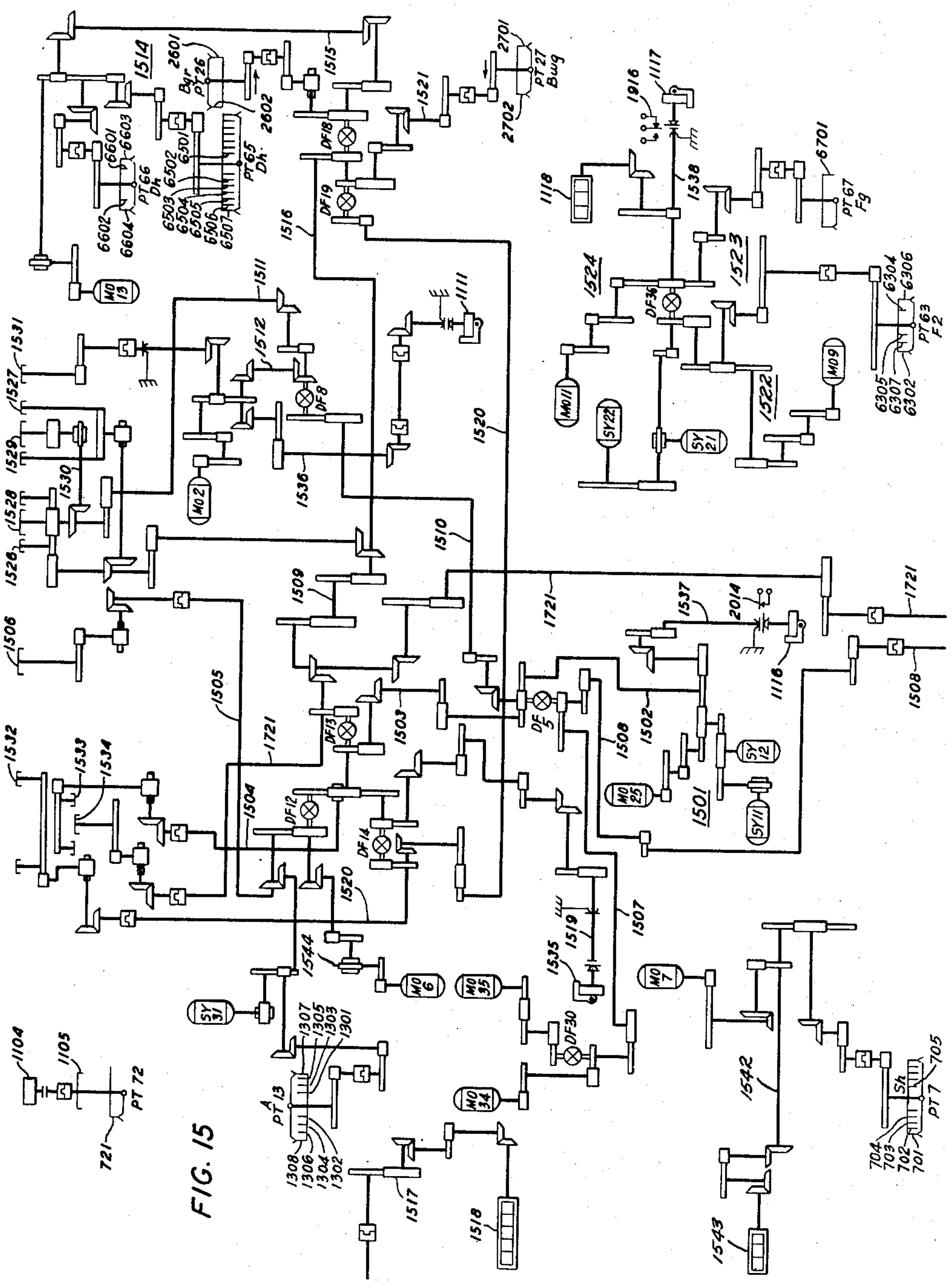

The synchronous transmitters associated with the ship's master compass control the coarse SY12, and fine SY11, receivers, Figs. 15 and 29. The rotors of receivers SY11 and SY12 are connected to the input circuit of follow-up amplifier MA25, of the type shown in Fig. 21. The output circuit of amplifier MA25 is connected to one phase winding of the two-phase motor MO25.

As shown in Fig. 20, the other phase winding of motor MO25 is excited by power from one phase of the ship's three-phase supply, through switch MC15 in the fourth position, the local control switch Co and transformer TR7.

In Fig. 17, differential gear DF2 drives shaft 1721 proportionally to B$r$, and this shaft is geared to differential gear DF13, Fig. 15. Motor MO25, and receivers SY11, SY12 are geared by gearing 1501 to shaft 1502. Shaft 1502 is geared through differential DF5 to shaft 1503 and differential gear DF13, thus rotating shaft 1504 and annular dial 1533, proportionally to the bearing B. Shaft 1504 is geared to differential gear DF12.

In Fig. 19 the output of amplifier 1908 is connected through switches 1909 and MC7 to one phase winding of the two-phase motor MO6. The output of amplifier 1902 is connected through switch M6 and transformer 1904 to terminals 1905, 1906, 1907. Terminal 1907 is connected to one end of the second phase winding of motor MO6, Fig. 29.

Terminal 1906 is connected directly to the first contact of target angle switch TA, and through resistor 2901 to the second contact of switch TA.

Terminal 1905 is connected through resistor 2902 to the fourth contact of switch TA and directly to the fifth contact of switch TA. The blade of switch TA is connected through the break contacts of relays RY26 and RY27 to the other end of the second phase winding of motor MO6. The target angle TA switch is operated by the type C knob 1525, Figs. 11, 12.

When the blade of switch TA, Fig. 29, is moved to the second contact, motor MO6 will rotate at slow speed in one direction, and when switch TA is moved to the first contact, motor MO6 will rotate at full speed. When the blade of switch TA is moved to the fourth contact, motor MO6 will rotate at slow speed in the other direction, and when the blade is moved to the fifth contact, motor MO6 will rotate at full speed.

The type C knob 1525, Figs. 11, 12, 15 of the TA switch, is rotatably mounted on the cover and has a spring-restored central button. When depressed, the button connects the knob to the switch shaft, so that rotation of the knob will rotate the switch shaft. The switch shaft is furnished with double restoring springs, so that, when the pressure on the button is released, the switch will be restored to engagement with the blank center contact.

While an aircraft target may suddenly change its course while approaching the ship, these changes usually do not materially change the speed of the aircraft. Facilities are therefore provided whereby a new value of target angle may be set into the computer by the computer operator, or fire control officer whenever the target is observed to change course.

The target angle slewing control includes a two-position, non-locking key 1811, Fig. 18, conveniently located in the director. If the target changes course so as to decrease the target angle, key 1811 is operated upward, completing a circuit from power supply through switches MC8, RC10, winding of relay RY27, upper springs of key 1811, back to power supply, operating relay RY27. If the change in course increases the target angle, key 1811 is operated downward completing a circuit from power supply through switches MC8, RC10, winding of relay RY26, lower springs of key 1811, back to power supply, operating relay RY26.

The operation of relay RY26, Fig. 29, connects the winding of motor MO6 through the break springs of relay RY27, and the make springs of relay RY26 to connection 1905, causing motor MO6 to increase the target angle; the operation of relay RY27 connects the motor winding through the make springs of relay RY27 and the break springs of relay RY26 to connection 1906, causing motor MO6 to decrease the target angle.

In Fig. 15, the motor MO6 rotating proportionally to the target course angle C$t$ is geared to differential gear DF12 which combines this rotation with the rotation of shaft 1504, proportional to the true target bearing B, thus causing shaft 1505 to rotate proportionally to the target angle A. Shaft 1505 is geared to the synchronous transmitter SY31, to potentiometer PT13 and to the dial 1506, Figs. 11 and 15. Thus, by the operation of the target angle switch TA, the operator can cause the shaft of motor MO6 to rotate to any desired value of the target course angle C$t$, which is indicated as the target angle A as $A=180°+B-Ct$.

In Figs. 12, 16 and 40, the coarse SY1 and fine SY2 synchronous receivers are excited by the elevation transmitters on the director. The rotors of the coarse SY1 and fine SY2 receivers are connected to the input circuit of follow-up amplifier MA18, of the type shown in Fig. 21. The output circuit of amplifier MA18 is connected through the break springs of limit switches LS6 and LS14 to one winding of a two-phase follow-up motor MO18. As shown in Fig. 20, one phase of the power supply is connected through master switch MC14, local switch E, rate control switch RC11 and transformer TR2 to the other phase winding of motor MO18.

In Fig. 16, the receivers SY1 and SY2, and the follow-up motor MO18 are geared to the shaft 1622. The shaft 1622 is geared to the differential gear DF1. The shaft 1623 is driven by shaft 1719 proportionally to the level L and is geared to the differential gear DF1. The shaft 1624 will thus be rotated proportionally to the target elevation E.

Figure 14:
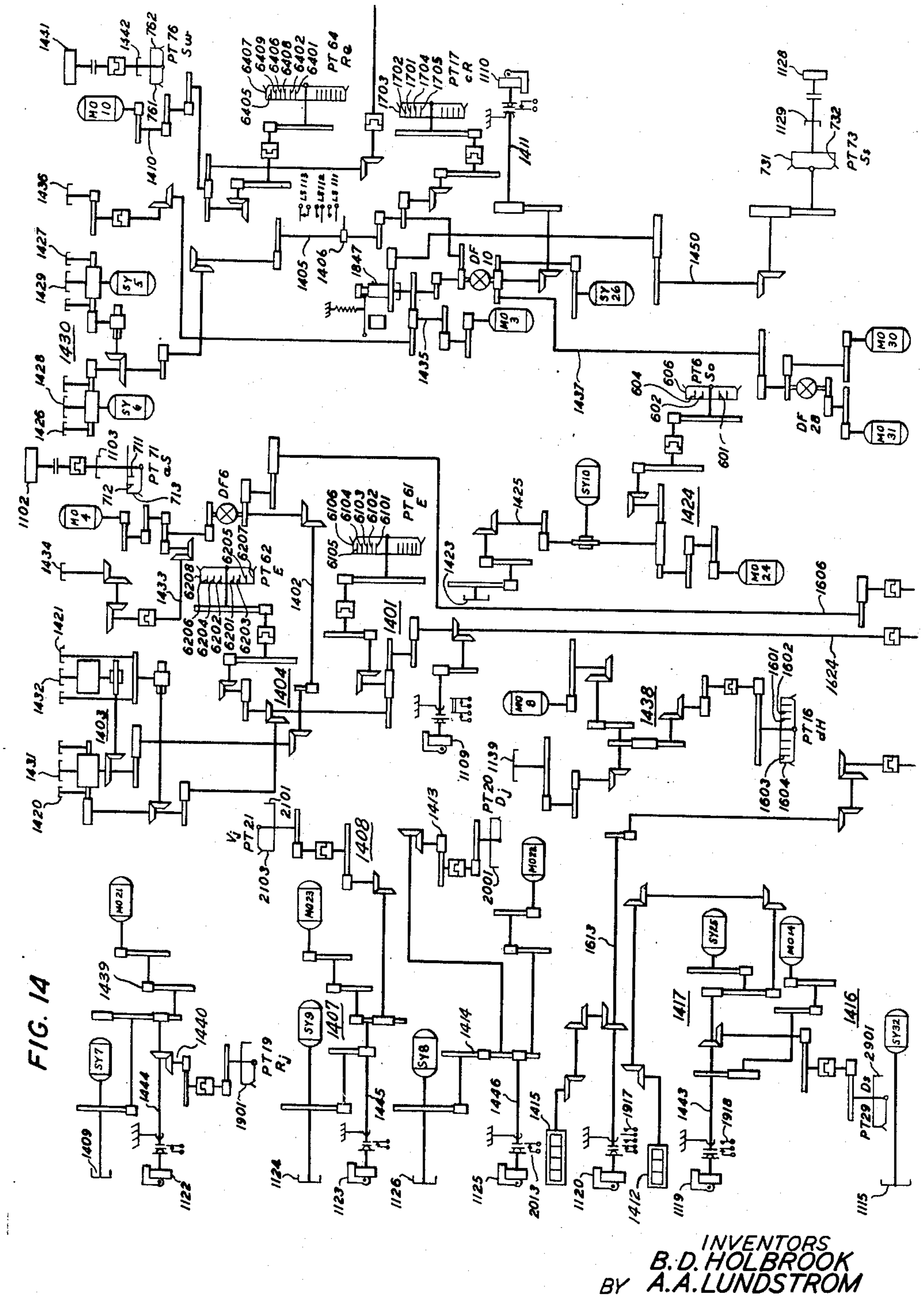

The shaft 1624 is geared by gearing 1401, Fig. 14, to the E potentiometer PT61; by gearing 1404 to the E potentiometer PT62; and is geared to the coarse 1420 and fine 1421 ring dials, Figs. 11 and 14.

The ship's power is connected through master switch MC16, Fig. 20, and transformer TR10 to terminals 2002, 2003, 2004.

Terminal 2004 is connected to the upper make spring of limit switch LS6, Fig. 40, terminal 2002 is connected to one side of a winding of motor MO18, and terminal 2003 is connected to the lower make spring of limit switch LS6. Limit switch LS6 is operated by a cam nut threaded on shaft 1624, Fig. 16. When shaft 1624 has rotated to near the limiting position in one direction, the cam nut operates the upper springs of switch LS6, opening the circuit from the output circuit of amplifier MA18 and connecting terminal 2004 through the upper makes springs of switch LS6, and the break springs of switches LS6 and LS14 to the other end of the winding of motor MO18, thus slowing down motor MO18 and, eventually, reversing its rotation. Similarly, at the other limiting position, the lower springs of limit switch LS6 are operated, connecting terminals 2002 and 2003 to the winding of motor MO18 and driving the motor in the opposite direction.

In Fig. 31, the grounded source 1931 is connected through the upper break springs of relay RY7 and resistors 3134, 3135 to one end of cards 1305 and 1306 of potentiometer PT13, and the grounded source 1930 is connected through the lower break springs of relay RY7 and resistors 3136, 3137 to the other ends of cards 1305 and 1306. The resistances of the windings of cards 1305 and 1306 vary with a sinusoidal function, and the cards are grounded at the points where the function passes through zero.

The brushes associated with cards 1306, 1305, respectively, select voltages proportional to $-\cos A$ and $-\sin A$ and are connected through resistors 3138, 3139 to the ends of cards 701, 702 of potentiometer PT7. The cards 701, 702 provide a linear fractionation of voltages applied to resistors 3138 and 3139 and are grounded at one end.

As will be explained later, the brushes of potentiometer PT7 are adjusted proportionally to the estimated horizontal ground speed $Sh$ of the target.

The brush associated with card 701 selects a voltage proportional to $-Sh \cos A$ and is connected through resistor 3140 to the input circuit of line amplifier LA4.

Brush 3116, of potentiometer PT4, selects a voltage proportional to $-\cos Br$ and is connected through the upper break springs of relay RY14 and resistor 3141 to card 601 of potentiometer PT6.

The synchronous transmitter of the ship's automatic log is connected to the synchronous receiver SY10, Figs. 14 and 42. The rotor of the receiver SY10 is connected, through the break springs 4204 and 4205 of the ship's speed switch So to the input circuit of follow-up amplifier MA24, which may be of the type shown in Fig. 21. The output circuit of amplifier MA24 is connected to one winding of the two-phase follow-up motor MO24.

The ship's power supply is connected through switch MC15, Fig. 20, and transformer TR6 to the other winding of motor MO24.

The ship's power supply is also connected through switch MC16 to the transformer TR8. Resistors 2005, 2006, in serial relationship, are shunted across the secondary winding of transformer TR8, and their junction is grounded.

Terminals 2007, 2008 of transformer TR8 are connected to the contacts of switch So, Fig. 40, contact 4207 being grounded. The blade 4208 of switch So is connected to the make spring 4206. Switch So is operated by the type C knob, 1422.

The outer casing of knob 1422, Figs. 11, 13, 14, 42, is rotatably mounted on the cover. A lever knob is pivoted to the casing and is normally folded into a recess in the casing, so that springs 4204, 4205 are in contact, and motor MO24 is controlled by the receiver SY10. When the lever knob is folded forward, spring 4205 is operated to break contact with spring 4204 and make contact with spring 4206, thus breaking the circuit from the receiver SY10 to the amplifier MA24. The lever also connects the casing to the switch shaft, so that rotation of the knob will rotate the switch shaft and move blade 4208 to one of the outer contacts, connecting the input circuit of amplifier MA24 to terminal 2007 or 2008 and slewing motor MO24 in the desired direction to set the brushes of potentiometer PT6, as indicated by dial 1423, Figs. 11, 13, 14. The shaft operating blade 4208, Fig. 42, is furnished with double restoring springs so that, when the pressure on the lever knob is released, blade 4208 is restored to engagement with contact 4207.

The synchronous receiver SY10, follow-up motor MO24, potentiometer PT6 and dial 1423, with the connecting gearing 1424, 1425 is shown in the center part of Fig. 14.

The winding of card 601, PT6, Fig. 31, has a variation of resistance to provide a linear fractionation of the voltage applied from brush 3116. The brush associated with card 601 selects a voltage proportional to $-So \cos Br$ and is connected through resistor 3142 to the input circuit of line amplifier LA4. The output transformer 3143 has two grounded secondary windings; one shunted by resistor 3144 and the other shunted by resistors 3145, 3146 in serial relationship. The junction of resistors 3145, 3146 is connected through resistor 3147 to the input circuit of amplifier LA4.

The voltages supplied to the input circuit of amplifier LA4 are proportional to $-Sh \cos A$ and $-So \cos Br$, thus, by Equation 2, the output voltage of amplifier LA4 is proportional to $dRh$, the horizontal range rate.

The secondary winding of transformer 3143 is connected through resistor 3148 to one end of the grounded winding of card 6101, potentiometer PT61. The winding of card 6101 has a variation of resistance designed to fractionate the voltage applied from amplifier LA4 in accordance with the cosine of the angular travel of its brush. The brush associated with card 6101 selects a voltage proportional to $-dRh \cos E$ and is connected through resistor 3149 to the input circuit of motor amplifier MA26.

The sources 1931, 1930, Fig. 31, are respectively connected via the break contacts of relay RY7 through resistors 3130, 3131 to the ends of the grounded winding of card 1602, PT16 and through resistors 3132, 3133 to the ends of the grounded winding of card 1603, PT16. The windings of cards 1602, 1603 have a variation of resistance so designed to fractionate the applied voltages in accordance with a linear relation with brush position. As will be explained later, the brushes associated with cards 1601, 1602 are adjusted to select voltages proportional to $d$H, the rate of climb of the target.

The brushes associated with cards 1602, 1603, PT16 are respectively connected through resistors 3150, 3151 to the ends of the grounded winding of card 6208, PT62. Card 6208 has a variation of resistance so designed to fractionate the voltages from cards 1602 and 1603 in accordance with the sine of the angular travel of its brush. The brush associated with card 6208 selects a voltage proportional to $-dH$ sin $E$ and is connected through resistor 3152 to the input circuit of amplifier MA26.

The sources 1930, 1931 are respectively connected through resistors 3155, 3156 to the ends of the grounded winding of card 5605, potentiometer PT56. The winding of card 5605 has a variation of resistance to provide a linear variation of voltage on its brush in accordance with the angular position of its brush. The brush associated with card 5605 is connected through resistor 3157 to the input circuit of amplifier MA26. The output circuit of amplifier MA26 is connected to one winding of a two-phase motor MO26.

The amplifier 1908, Fig. 19, is connected through switches 1909 and MC7 to the other winding of motor MO26.

As shown on the left side of Fig. 17, the shaft of motor MO26 is connected by gearing 1746 to the brushes of potentiometer PT56.

The voltages supplied to the input of amplifier MA26, Fig. 31, are proportional to $$dR-dRh \cos E-dH \sin E$$

and, from Equation 4, these voltages should equal zero. If the sum of these voltages is not equal to zero, current is supplied by the output circuit of amplifier MA26 to motor MO26, causing motor MO26 to move the brushes of potentiometer PT 56 until the voltage is reduced to zero and the brushes of potentiometer PT56 have been moved proportionally to the value of the range rate $d$R for the estimated values of S$h$ and $d$H.

The brush associated with card 702, of potentiometer PT7 selects a voltage proportional to $-Sh$ sin $A$, and is connected through resistor 3158 to the input circuit of line amplifier LA39.

Output transformer 3121 is connected through the lower break springs of relay RY14 and resistor 3159 to one end of the grounded winding of card 602, potentiometer PT6. The winding of card 602 has a variation of resistance to provide a brush voltage which varies linearly with brush position.

The brush associated with card 602 is connected through resistor 3160 to the input circuit of amplifier LA39.

The output transformer 3161 of amplifier LA39 has two grounded windings, one shunted by resistor 3162 and the other shunted by resistors 3163, 3164 in serial relationship. The junction of resistors 3163, 3164 is connected through resistor 3165 to the input circuit of amplifier LA39.

The voltages supplied to the input circuit of amplifier LA39 are proportional to $-Sh$ sin $A$ and $-So$ sin $Br$, thus, from Equation 3, the output voltage of amplifier LA39 is proportional to $-$R$hd$B.

The output transformer 3161 is connected through resistors 3166, 3167 to ground, and the junction of these resistors is connected through resistor 3168 to the input circuit of motor amplifier MA28.

Figure 36:
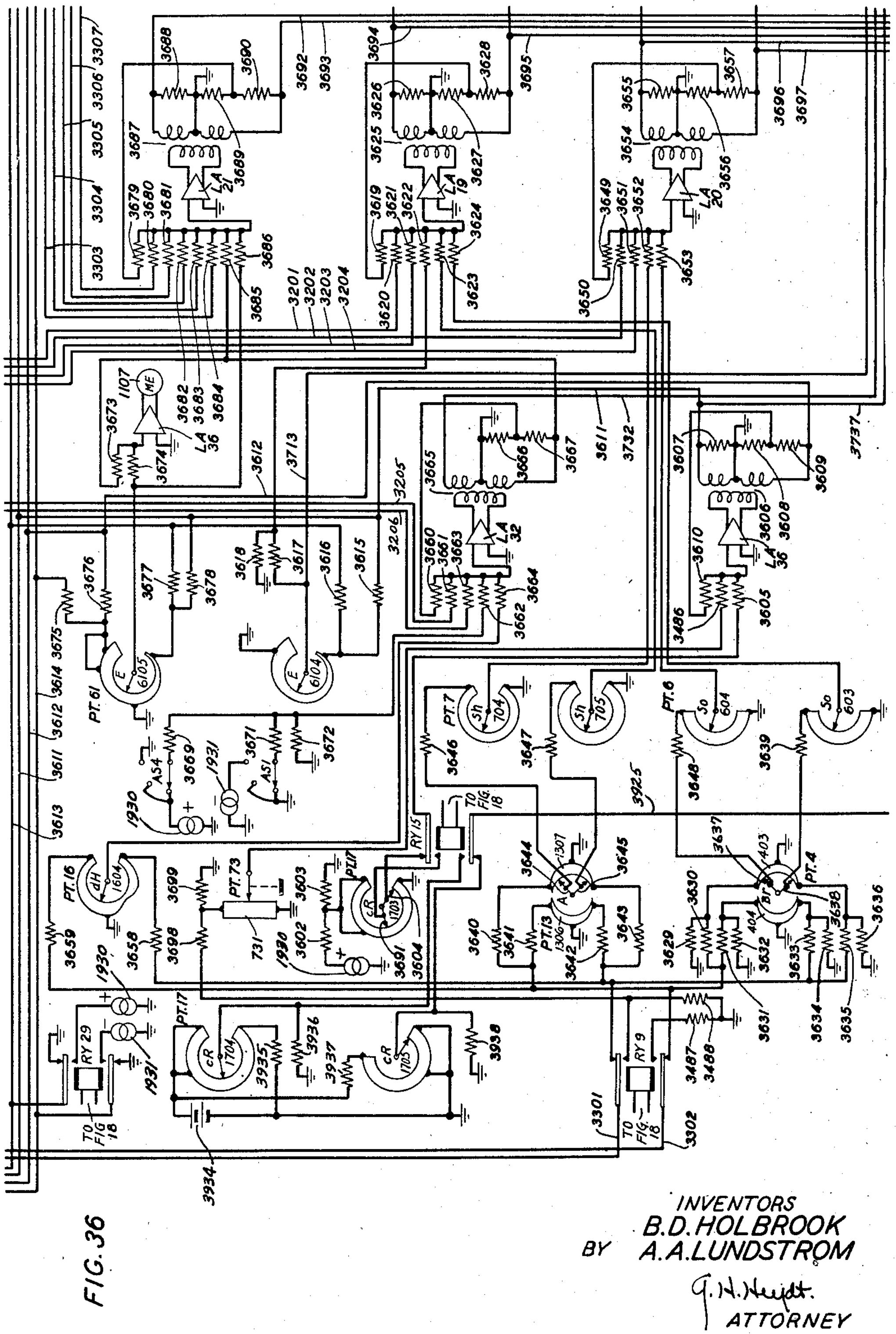

The grounded source 1930, Fig. 36, is connected to ground through resistors 3602, 3603 and the junction of these resistors is connected to one end of the grounded winding of card 1703, potentiometer PT17, whose variation in resistance provides a brush voltage linearly related with its brush position. As explained later, brush 3604 selects a voltage proportional to $c$R, the generated range, and is connected through the break springs of relay RY15 and resistor 3605 to the input circuit of line amplifier LA36.

The output transformer 3606, of LA36, has two grounded secondary windings, one shunted by resistor 3607 and the other shunted by resistors 3608, 3609 in serial relationship. The junction of resistors 3608, 3609 is connected through resistor 3610 to the input circuit of amplifier LA36.

Connections 3613, 3614 are grounded through the break springs of relay RY29.

The secondary winding of transformer 3606 is connected by connections 3611, 3612 respectively through resistors 3169, 3170 and 3171, 3172, Fig. 31, to connections 3613, 3614. The junctions of resistors 3169, 3170 and of resistors 3171, 3172 are connected to the ends of the card 5805, potentiometer PT58, whose resistance varies in such a way that the voltage from amplifier LA36 is fractionated in accordance with the linear relation to the brush position on card 5805.

The brush associated with card 5805 is connected to ground through the winding of card 6106, PT61, which has a variation of resistance such to provide for the selection of voltage by its brush according to the sine function. The condenser from the top of card 6106 to its intermediate tap is so selected as to value and tap position to compensate for unwanted quadrature currents set up due to card capacity to ground and capacity to ground of shielded leads between card brush and amplifier input resistors. It is necessary to run all wiring in coaxial conductors where the outer shell is connected to ground in order to shield the computing voltages from the addition of pick-up voltages which would otherwise produce errors. The brush associated with card 6106 selects a voltage proportional to $-cRdB$ cos $E$ and is connected through resistor 3174 to the input circuit of motor amplifier MA28. The output circuit of amplifier MA28 is connected to one winding of a two-phase motor MO28. Resistor 3173, connected from the free end of the winding of card 6106 to the brush associated therewith reduces the effect upon the voltage selected by the brush associated with card 5805 of the impedance changes due to the movement of the brush associated with card 6106.

The output circuit of amplifier 1908, Fig. 19, is connected through switches 1909 and MC7 to the other winding of motor MO28.

The motor MO28, Fig. 17, is connected by gearing 1728 to drive the brushes of potentiometer PT58.

The voltages supplied to the input circuit of motor amplifier MA28 are proportional to $$+RhdB-cRdB \cos E$$

and, from Equation 6, the sum of these voltages should be zero. If the sum of these voltages is not zero, current is supplied by the output circuit of amplifier MA28 to motor MO28, causing motor MO28 to move the brushes of potentiometer PT58 changing the value of $d$B until the sum of the voltages is reduced to zero, and the brushes of potentiometer PT58 have moved to the value of $d$B.

The brush associated with card 1603, PT16, is connected to ground through resistors 3175, 3176 and the junction of these resistors is connected to ground through the winding of card 6207, potentiometer PT62, which provides a cosinusoidal variation of brush voltage with angular brush position.

The brush associated with card 6207, PT62, selects a voltage proportional to $dH$ cos $E$ and is connected through resistor 3177 to the input circuit of motor amplifier MA27. The output circuit of amplifier MA27 is connected to one winding of the two-phase motor MO27.

The output circuit of amplifier 1908, Fig. 19 is connected through switches 1909 and MC7 to the other winding of motor MO27.

The secondary windings of transformer 3143 are respectively connected to ground through resistors 3178, 3179 and through resistors 3180, 3181. The junction of resistors 3178, 3179 and of resistors 3180, 3181 are connected to the ends of the grounded winding of card 6102 of potentiometer PT61, which provides a sinusoidal variation of its brush voltage for variation in brush position. The brush associated with card 6102 selects a voltage proportional to $-dRh$ sin $E$ and is connected through resistor 3182 to the input circuit of amplifier MA27.

Connections 3611 and 3612 are respectively connected by resistors 3183, 3184 and resistors 3185, 3186 to connections 3613 and 3614. The junctions of resistors 3183, 3184 and of resistors 3185, 3186 are connected to the ends of the grounded winding of card 5705 of potentiometer PT57 whose resistance variation provides a brush voltage which varies linearly with brush position. The brush associated with card 5705 selects a voltage proportional to $-cRdE$ and is connected through resistor 3187 to the input circuit of amplifier MA27.

Motor MO27, Fig. 16, is connected by gearing 1605 to drive the brushes of potentiometer, PT57.

The voltages supplied to the input circuit of amplifier MA27 are proportional to $$+dH \cos E - dRh \sin E - cRdE$$

and, from Equation 5, the sum of these voltages should be zero. If the sum of these voltages is not zero, current is supplied from the output circuit of amplifier MA27 to motor MO27, causing motor MO27 to move the brushes of potentiometer PT57 changing the value of $dE$ until the sum of these voltages is reduced to zero and the brushes of potentiometer PT57 have moved to the value of $dE$.

*Rate integrator*

The oscillator shown in Fig. 21 is of the type described in United States Patent 2,341,067, February 8, 1944, R. O. Wise, assigned to the assignee of the present application, and includes a stable high gain amplifier 2104, having an output coupled by capacitor 2105 to a first network composed of the series capacitors 2106, 2107 and the shunt amplitude control resistor 2108 and to a second network composed of the series resistors 2110, 2111 and the shunt capacitor 2109. Capacitor 2106 and resistor 2110 are connected to the input circuit of amplifier 2104, and the input circuit and the junction of resistor 2108 and capacitor 2109 are grounded.

In a copending application Serial No. 577,622, filed February 13, 1945 by S. Darlington and assigned to the assignee of the present application, it is shown that the frequency of an oscillator of this type depends upon the ratio of the voltages supplied to the first and second networks. The coupling capacitor 2105 is connected through the windings of potentiometers 2112 and 5606 to ground. The brushes of potentiometers 2112 and 5606 are respectively connected to capacitor 2107 and resistor 2111. The output load may be connected across the potentiometer windings.

With the wiper of potentiometer 5606 at midpoint, the brush of potentiometer 2112 is adjusted until the frequency of the oscillator is in the middle of the desired frequency range, which in the present case, is 60 cycles. The movement of the brush of potentiometer 5606 can then vary the frequency of the oscillator from 30 to 90 cycles. For a linear relationship between the movement of the brush of potentiometer 5606 and the resulting frequency of the oscillator, the resistance of the winding of potentiometer 5606 varies with the square of the movement of the brush.

Figure 28:
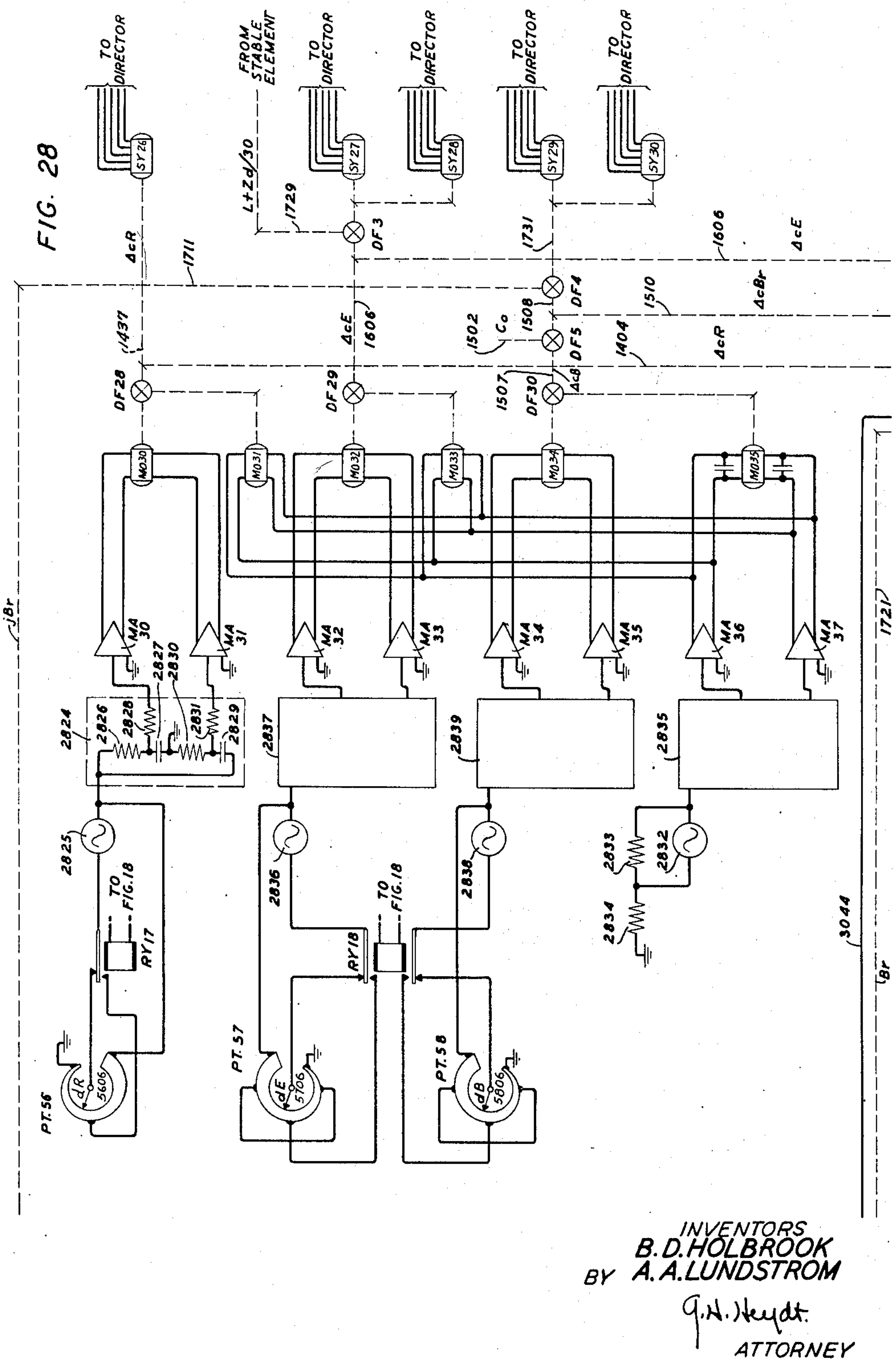

Oscillator 2825, Fig. 28, of the type shown in Fig. 21 is connected to ground through the winding of card 5606 of potentiometer PT56. The brush associated with card 5606 is rotated by motor MO26, Fig. 31, and is connected through the break springs of relay RY17 to oscillator 2825, Fig. 28. The output circuit of oscillator 2825 is connected to the phase splitting network 2824, in which it is grounded through resistor 2826 and capacitor 2827 in serial relationship. The junction of resistor 2826 and capacitor 2827 is connected through resistor 2828 to the input circuit of motor amplifier MA30. The output circuit of oscillator 2825 is also grounded through capacitor 2829 and resistor 2830, and their junction is connected through resistor 2831 to the input circuit of motor amplifier MA31.

The values of resistors 2826, 2830 and capacitors 2827, 2829 are so related that the voltages supplied to amplifiers MA30 and MA31 are 90 degrees out of phase. The output circuits of amplifiers MA30 and MA31 are respectively connected to the windings of a two-phase synchronous motor MO30. Motor MO30 will thus rotate at a speed exactly proportional to the frequency of oscillator 2825, which is determined by the setting of the brush associated with card 5606.

Oscillator 2832 is also of the type shown in Fig. 21. The resistors 2833 and 2834 maintain the frequency of this oscillator at a constant value of 60 cycles. Oscillator 2832 is connected through the phase splitting network 2835, which is similar to network 2824 to the input circuits of motor amplifiers MA36 and MA37. The output circuits of amplifiers MA36, MA37 are respectively connected to the windings of the two-phase synchronous motors MO31, MO33 and MO35. Motors MO31, MO33 and MO35 will thus rotate at speeds proportional to 60 cycles.

The shafts of motors MO30 and MO31 are connected to differential gear DF28, Fig. 14, which drives shaft 1437 at a speed proportional to $dR$. The total rotation of shaft 1437 with time will be the integral of this rate, that is, proportional to $\Delta cR$. Shaft 1437 is geared through differential gear DF10 to the synchronous transmitter SY26, which transmits this value directly to the range determining equipment in the director.

Oscillator 2836, Fig. 28, of the type shown in Fig. 21 is connected to card 5706 of potentiometer PT57, and through the phase splitting network 2837, which is similar to network 2824, to the input circuits of motor amplifiers MA32 and MA33. The brush associated with card 5706 is rotated by motor MO28, Fig. 31.

The output circuits of amplifiers MA32 and

MA33 are connected to the windings of the two-phase synchronous motor MO32.

The shafts of motors MO32 and MO33, Fig. 16, are connected to differential gear DF29, thus driving shaft 1606 proportionally to ΔcE. Shaft 1606 is geared to differential gear DF3.

Shaft 1729, Fig. 17, is connected by clutch 1730 to the stable element and is rotated proportionally to $L+Zd/30$, and is also geared to the differential gear DF3, Fig. 16. Differential gear DF3 is geared to the fine SY27, and coarse SY28, synchronous transmitters which are thus rotated proportionally to $\Delta cEb=\Delta cE+L+Zd/30$, and are connected to the synchronous receivers on the director.

Similarly, oscillator 2838, Fig. 28, of the type shown in Fig. 21, is connected to the card 5806 and the brush associated therewith, of potentiometer PT58, and through the phase splitting network 2839, which is similar to network 2824, to the input circuits of motor amplifiers MA34 and MA35. The output circuits of amplifiers MA34 and MA35 are connected to the windings of the two-phase motor MO34.

Motors MO34 and MO35 are geared to differential gear DF30, Fig. 15, to drive shaft 1507 proportionally to the generated bearing ΔcB. Shaft 1507 is geared to differential gear DF5. Shaft 1502, rotating proportionally to the ship course $Co$, is also geared to differential gear DF5. Shaft 1508 is thus rotated proportionally to $\Delta cBr(\Delta cBr=\Delta cB-Co)$. Shaft 1508 is geared to differential gear DF4, Fig. 17. Motor MO1, rotating proportionally to $jB'r$ is connected by shaft 1712 and gearing 1713 to differential gear DF4. Shaft 1731 is thus rotated proportionally to $\Delta cB'r(\Delta cB'r=\Delta cBr-jB'r)$, and drives the fine SY29 and coarse SY30, synchronous transmitters, which are connected to the director.

Assume the motors MO30, MO31, MO32, MO33, MO34 and MO35, Fig. 28, are two-phase, four-pole synchronous motors, then, at 60 cycles, motors MO31, MO33 and MO35 will rotate at 1800 revolutions per minute. The frequencies of oscillators 2825, 2836, 2838 may be varied from 90 to 30 cycles, thus motors MO30, MO32, MO34 will rotate at speeds between 2700 and 900 revolutions per minute. At 2700 revolutions per minute the outputs of differential gears DF28, DF29, DF30 will be +900 revolutions per minute, proportional to the maximum relative speed of the target in one direction; at 1800 revolutions per minute the outputs of the differential gears will be zero, when the relative speed of the target is zero; and at 900 revolutions per minute, the outputs of differential gears DF28, DF29, DF30 will be —900 revolutions per minute, that is, will rotate in the opposite direction, proportionally to the maximum relative speed of the target in the other direction. The total number of revolutions of the output shafts in any given time interval will be the integrals of these speeds.

*Comparator*

The quantities B$r$, E and R, obtained from the observations, are compared with the corresponding generated quantities $cBr$, cE and cR, in matching ring dials, which may be of the type shown in Fig. 23.

The continuous, concentric slip rings, 2301, 2302, 2303 are insulatingly mounted on a plate 2304, secured to the frame of the device 2305.

A shaft 2306, journaled in the frame 2305, and rotated proportionally to one of the generated quantities, is attached to the central dial 2307, and to a disc 2308, insulatingly supporting the plain brush 2309 and the roller contactor 2310.

The shaft 2311, journaled in the frame 2305, is rotated proportionally to the corresponding quantity from the observations and is geared by gear 2311' to gear 2312, which is rotatably supported by the shaft 2306.

The gear 2312 supports the annular external dial 2313; the plate 2314 insulatingly supporting the complete concentric slip ring 2316, and the two concentric partial slip rings 2315 and 2315'; and insulatingly supports the brushes 2317, 2318, 2319. The brushes 2317, 2318, 2319 are respectively conductively connected to the slip ring 2316 and the partial slip rings 2315 and 2315'.

The shaft 2311 is geared to the shaft 2320, which is geared through the worm gear 2321 to the external shaft 2322, journaled in the frame 2305.

The shaft 2306 is geared to the shaft 2323, which is geared through the worm gear 2324 to the internal shaft 2325 journaled in the shaft 2322.

The worm gears 2321 and 2324 have a gear ratio such that the shafts 2306, 2311 rotate proportionally to the fine synchronous receivers, and the shafts 2322, 2325 rotate proportionally to the coarse receiver. Thus, if an observed quantity, such as the range, is transmitted directly to the ring dials, the shaft of the fine receiver may be geared to the shaft 2311, the shaft of the coarse receiver may be geared to the shaft 2322, and the shaft 2320 and gear 2321 omitted.

The plate 2326 is attached to the frame 2305 and insulatingly supports the complete concentric slip rings 2327, 2328, 2329.

The shaft 2325 is attached to the inner dial 2330, and drives the plate 2331, insulatingly supporting the two concentric partial slip rings 2332, 2332', and the concentric complete slip rings 2333 and 2334. The slip rings 2332 and 2334 are conductively connected by the connection 2335; and the slip rings 2332' and 2333 are conductively connected by the connection 2336.

The shaft 2322 drives the plate 2337 supporting the annular external dial 2338. The plate 2337 also carries the three sets of twin brushes, 2339, 2339', 2340, 2340' and 2341, 2341' which are connected in pairs. Each pair is insulated from the plate 2337 and from the other pairs.

As shown in Fig. 25, slip rings 2301 and 2327 are respectively connected through resistors 2348, 2349 to the grounded resistor 2350; slip rings 2302 and 2328 are respectively connected through resistors 2346, 2347 to the grounded negative source 1931; and slip rings 2303 and 2329 are respectively connected through resistors 2343, 2344 to the grounded positive source 1930.

The source 1930 is connected through resistor 2343, ring 2303, brush 2319 to partial ring 2315'; and through resistor 2344, ring 2329, brushes 2341, 2341', ring 2334, connection 2335 to partial ring 2332. The source 1931 is connected through resistor 2346, ring 2302, brush 2318 to partial ring 2315; and through resistor 2347, ring 2328, brushes 2340, 2340', ring 2333, connection 2336 to partial ring 2332'.

The ends of the partial slip rings 2315, 2315' are separated at the left side a distance slightly larger than the width of contact of the roller contactor 2310, and the left side by a space equal to about 20 degrees. Contactor 2310 is connected through brush 2309, ring 2316, brush 2317, ring 2301 to resistors 2348, 2350. Brush 2309, and contactor 2310 are driven by shaft 2306, rings 2315, 2315′ by shaft 2311. If the shafts 2306 and 2311 are in positional and rotational agreement, the brush 2310 will be mid-way between the ends of the rings 2315, 2315′ and no voltage will be applied to resistors 2348, 2350. If the shafts 2306 and 2311 have a positional disagreement, the contactor 2310 will either be on the partial ring 2315 or the partial ring 2315′. If the contactor 2310 is on ring 2315, the source 1931 is connected to resistors 2348, 2350. Resistor 2348 may be connected, as by dotted resistors 2351, 2351′ to a correction circuit.

The ends of the partial slip rings 2332, 2332′ are separated at the point of agreement by a distance enough larger than the width of the brush 2339′ that this brush may move through the angle equivalent to one-half revolution of the contactor 2310 without touching ring 2332 or 2332′, and at the diametrically opposite point, are overlapped without touching. Brush 2339′ is connected by brush 2339 and ring 2327 through resistor 2349, 2350 to ground. If the shafts 2322 and 2325 are in positional and rotational agreement, the brush 2339′ will be mid-way between the ends of the partial rings 2332, 2332′ and no voltage will be applied to resistors 2349, 2350. If these shafts have a positional disagreement, larger than the angle equivalent to a half-revolution of contactor 2310, the brush 2339′ will be either on the partial ring 2332 or the partial ring 2332′. If brush 2339′ is on ring 2332, the source 1930 will be connected through resistors 2349, 2350 to ground and if the brush 2339′ is on ring 2332′, the source 1931 will be connected through resistors 2349, 2350 to ground. A control voltage may thus be obtained from the voltage drop in resistors 2349, 2350, as by the potentiometer PT71.

In prior matching systems, the current for the corrective motor was drawn from the power source directly through the slip rings and brushes and the circuit from the sources to the motor was of low impedance. The partial rings 2332, 2332′ were separated at diametrically opposite points by spaces longer than the width of brush 2339′, so that brush 2339′ never bridged the gaps between rings 2332, 2332′, as such bridging would short-circuit the power supplies. Thus, the system could be in a stable condition when the brush 2339′ was in the proper space between rings 2332, 2332′, and also when the brush 2339′ was in the other space, thus producing a positional error of 180 degrees.

In the present system, the brush of potentiometer PT71 is connected to the input circuit of a motor amplifier which supplies power to the corrective motor. The system is thus substantially voltage-operated, and only very small currents need be drawn through the brushes and slip rings. The resistors in the circuit may then have fairly high values of resistance, and the rings 2332, 2332′ may overlap at the false balance point, so that, at this point, the brush 2339′ will bridge the rings 2332, 2332′.

The resistors 2344 and 2347 are not of equal resistance, so that, when the brush 2339′ bridges the rings 2332, 2332′, a small current will flow from one of the sources through potentiometer PT71, driving the corrective motor away from the false balance point, through 180 degrees to the correct point of balance.

The shaft 1721, Fig. 17, rotating proportionally to the observed relative bearing Br, is connected through the gearing 1509, Fig. 15, to the outer annular dials 1526, 1527, Figs. 11 and 15 of the ring dials 1530, of the type shown in Fig. 23.

The shaft 1507, Fig. 15, is rotated by differential gear DF30 proportionally to the increments of generated absolute bearing $\Delta cB$, and is connected to differential gear DF5. The shaft 1502 is rotated by motor MO25 proportionally to the ship course Co and is also connected to differential gear DF5. The shaft 1510 will thus be rotated by differential gear DF5 proportionally to the increments of generated relative bearing $\Delta cBr (\Delta cBr = \Delta cB - Co)$, and is connected through differential gear DF8 at which point $jB$ from motor MO2 over shaft 1512 is added to set up generated relative target bearing $$(cBr = jB + \Delta cBr)$$

on shaft 1511 which is connected to the inner dials 1528, 1529, Figs. 11 and 15 of the ring dials 1530.

Shaft 1437, Fig. 14, is rotated proportionally to $\Delta cR$ and is connected through differential gear DF10 to shaft 1405 which is connected to the outer annular dials 1426, 1427 of the ring dials 1430, Figs. 11, 12, 14 of the type shown in Fig. 23. The observed values of the range R are transmitted by the synchronous transmitters on the director to the coarse SY5 and fine SY6 synchronous receivers connected directly to the shafts of the ring dials, 1430, and to the inner dials 1428, 1429, Figs. 11 and 14.

Shaft 1624, Fig. 14, rotating proportionally to the observed value E of target elevation is geared by gearing 1401, 1404, to the outer annular dials 1420, 1421, Figs. 11 and 14 of the ring dials 1403, of the type shown in Fig. 23. Shaft 1606 is geared to differential gear DF6. Shaft 1402 is driven by differential gear DF6 proportionally to the generated value cE of target elevation and is geared to the inner dials 1431, 1432, Figs. 11 and 14 of the ring dials 1403. At this differential gear DF6, $jE$ from MO4 is added to increments of generated elevation $\Delta cE$ on shaft 1606 to make generated elevation $cE (cE = \Delta cE + jE)$ on shaft 1402. The increments of generated elevation ($\Delta cE$) are non-zeroed quantities and can attain only the correct rate of rotation and not correct positional values. The correction to make a zeroed quantity of generated elevation is accomplished by the addition of the quantity $jE$. In addition $jE$ automatically makes up the difference in rates between observed elevation E and generated increments $\Delta cE$.

Figure 30:
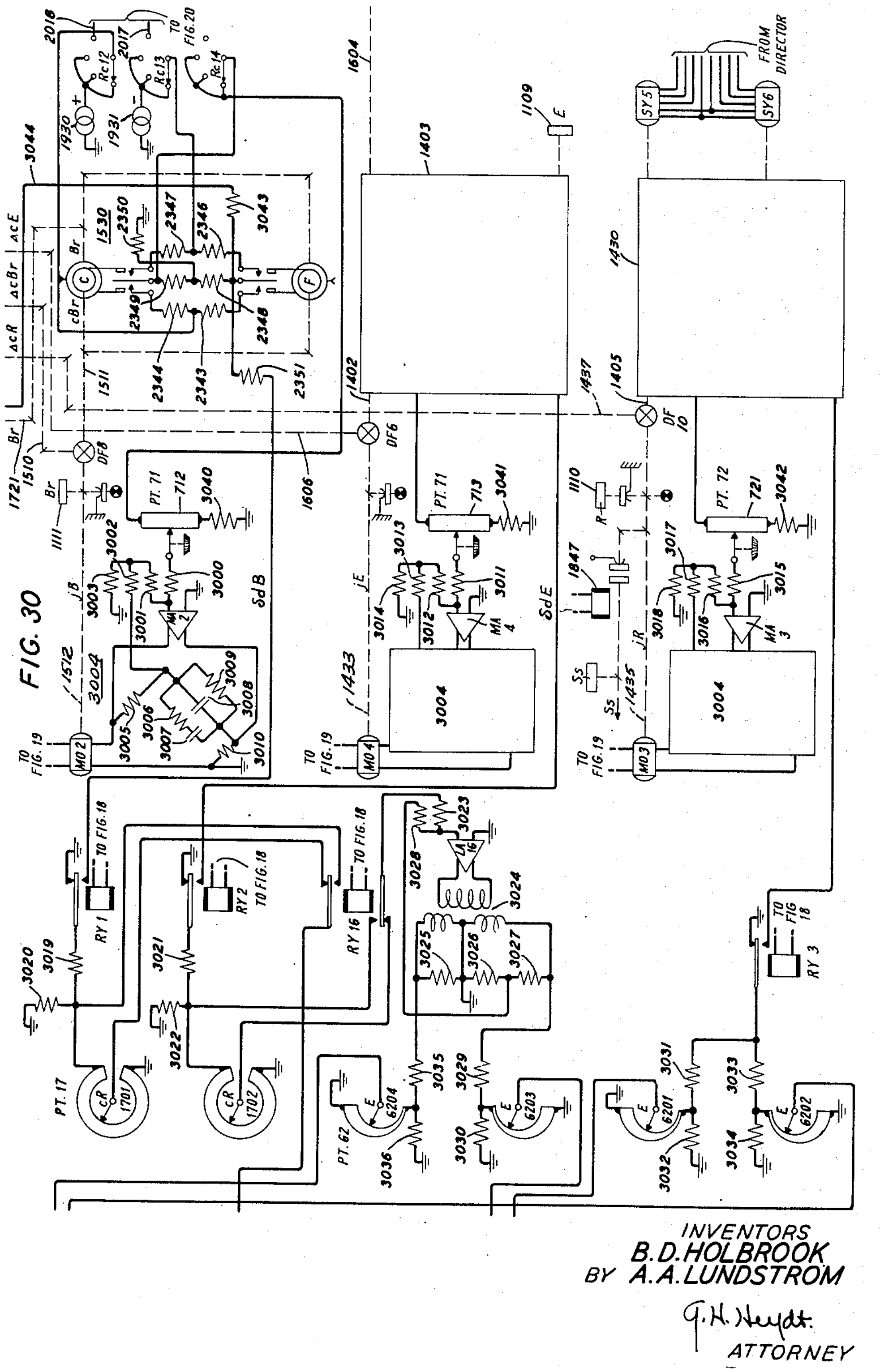

The circuits of the bearing ring dials 1530, Fig. 30, are similar to the circuits shown in Fig. 23 except that the sources 1930, 1931 are connected through switches RC12 and RC13 of the rate control switch; and the coarse control circuit is connected to ground through switch RC14 of the rate control switch, the winding of card 712 of the sensitivity control potentiometer PT71 and resistor 3040.

The brush of potentiometer PT71 is manually adjusted by the type D knob 1102, and dial 1103, Figs. 11, 12, to the desired sensitivity $aS$ and is connected to ground through resistors 3000, 3301, 3003, Fig. 30. The junction of resistors 3000 and 3001 is connected to the input circuit of motor amplifier MA2.

The network formed by the shunt arms made up of resistor 3006 and capacitor 3007, capacitor 3008, and resistor 3009 simulates the impedance of one winding of motor MO2, when the motor is at rest. This network, the winding of motor MO2 and the resistors 3005, 3010 form a Maxwell bridge 3004. The output circuit of amplifier MA2 is connected to the vertices of the bridge at the junction of resistor 3005 and the winding of motor MO2, and the junction of resistor 3010 and the network. One end of resistor 3010 is grounded and one end of resistor 3005 is connected through resistor 3002 to the junction of resistors 3001 and 3002. The conjugate vertices of the bridge are thus connected across the input circuit of the amplifier MA2. The output voltage of amplifier MA2 is thus applied to the winding of motor MO2 but is not fed back to the input of the amplifier. The motion of motor MO2 generates a back electromotive force proportional to the velocity of motion of the motor and, as this voltage is not balanced by the bridge, it is fed back through resistor 3002 to the input circuit of amplifier MA2, thus making the speed of motor MO2 closely proportional to the amplitude of the applied current.

Power from the sources 1930, 1931, Fig. 19, is supplied through network 1903, amplifier 1910, switch 1911, switch MC13 and the make contacts of relay RY30 to the other winding of motor MO2.

The shaft of motor MO2 is connected by gearing 1512, Fig. 15, to differential gear DF8.

Thus, when there is a positional disagreement between shafts 1511 and 1721, motor MO2 is started and adds a motion *j*B to shaft 1511 thus making the motion *c*B*r* of shaft 1511 equal the motion Δ*c*B*r* of shaft 1510 plus the motion *j*B of motor MO2. ($cBr=\Delta cBr+jB$.)

The shaft of motor MO2 is also geared to a solution indicator 1531, Figs. 11 and 15, associated with the ring dials 1530. The motion of this indicator shows that a disagreement exists between the motions of shafts 1510 (Δ*c*B*r*) and 1721 (B*r*), the speed of the motion of the indicator shows how rapidly the system is approaching a solution, that is, how soon Δ*c*B*r* approaches B*r* as to rate of rotation, and when the indicator is at rest it shows that shafts 1511 and 1721 are in positional and velocity agreement.

The coarse dial circuit of the ring dial 1403, Fig. 30, is connected to ground through card 713 of potentiometer PT71, and resistor 3041.

The brushes associated with cards 712 and 713 of PT71 could be separately adjusted to give different sensitivities for the *j*B and *j*E corrections but, as these are both angular corrections, the same sensitivity may be used, thus these brushes are ganged together and controlled by the type D knob 1102 and dial 1103, Figs. 11, 12.

The brush associated with card 713 is connected thrhugh resistor 3011, Fig. 30, to the input circuit of motor amplifier MA4, and through resistors 3012, 3014, to ground. The output circuit of amplifier MA4 is connected to one winding of the two phase motor MO4 through a network similar to network 3004. The feedback from this network is connected through resistor 3013 to the junction of resistors 3012, 3014.

The coarse dial circuit of ring dials 1430, Fig. 30, is connected to ground through card 721 of potentiometer PT72, and resistor 3042. The brush associated with card 721 is manually adjusted by the type D knob 1104 and dial 1105, Figs. 11, 12, to the desired sensitivity *r*S for the range correction and is connected through resistor 3015, Fig. 30, to the input circuit of motor amplifier MA3, and through resistors 3016, 3018, to ground. The output circuit of amplifier MA3 is connected to one winding of the two-phase motor MO3 through a network similar to network 3004. The feedback from this network is connected through resistor 3017 to the junction of resistors 3016, 3018.

Amplifier 1910, Fig. 19, is connected through switches 1911 and MC13 and the make springs of relay RY31 to the other winding of motor MO4 and through the make springs of relay RY25 to the other winding of motor MO3.

Motor MO4, Fig. 30, thus rotates proportionally to *j*E, and motor MO3 rotates proportionally to *j*R. The shaft of motor MO3 is geared to differential gear DF10.

The shaft of motor MO4, Fig. 14, is connected by gearing 1433 to the solution indicator 1434, Figs. 11 and 14, and to differential gear DF6, Fig. 14. Thus when there is a positional disagreement between shafts 1624 and 1606, motor MO4 is started and adds a motion *j*E through differential gear DF6 to the motion of shaft 1606 thus making the motion of shaft 1402 equal to $$cE\ (cE=\Delta cE+jE)$$

Similarly, the shaft of motor MO3, Fig. 14, is connected by gearing 1435 to the solution indicator 1436, Figs. 11 and 14, and to differential gear DF10, Fig. 14. When there is a positional disagreement between the motion of shaft 1405 and the motions of the receivers SY5, SY6, motor MO3 is started and adds a motion *j*R through differential gear DF10 to the motion Δ*c*R of shaft 1437 thus making the motion of shaft 1405 equal to *c*R ($cR=\Delta cR+jR$).

*Rate Corrector*

The slip ring associated with the fine correction brush of the bearing ring dial 1530, Fig. 30, generates corrections proportional to momentary velocity differences between relative bearing (B*r*) and generated bearing (*c*B*r*) and is designated as δ*d*B and is connected through resistor 2351, make spring of relay RY1, and resistors 3019 and 3020 to ground. The junction of resistors 3019, 3020 is connected to ground through the winding of card 1701, potentiometer PT17. The brush associated with card 1701 is rotated proportionally to *c*R to select a voltage proportional to *c*Rδ*d*B and is connected through the upper break spring of relay RY16 and resistor 2903, Fig. 29, to the input circuit of line amplifier LA15. The secondary winding of the output transformer 2904 of amplifier LA15 has two grounded sections, one shunted by resistor 2905, and the other shunted by resistors 2906, 2907, in serial relationship. The junction of resistors 2906, 2907 is connected through resistor 2908 to the input circuit of amplifier LA15.

The slip ring associated with the fine correction brush of the elevation ring dial 1403, Fig. 30, is connected through the make spring of relay RY2, resistors 3021, 3022, to ground. The junction of resistors 3021, 3022, is connected through the winding of card 1702, potentiometer PT17. The brush associated with card 1702 selects a voltage proportional to *c*Rδ*d*E and is connected through the break springs of relay RY16 and resistor 3023 to the input circuit of line amplifier LA16. The output transformer 3024 of line amplifier LA16 has two grounded secondary windings one shunted by resistor 3025 and the other shunted by resistors 3026, 3027 in serial relationship. The junction of resistors 3026, 3027, is connected through resistor 3028 to the input circuit of amplifier LA16.

The cam nut 1408, Fig. 14, on the *c*R shaft 1405, operates the limit switch LS112 at a range of about 22,500 yards. The operation of limit switch LS112, Fig. 18, completes a circuit from the power supply through switch MC8, winding of relay RY16, limit switch LS112, and switch MC9 to the power supply, operating relay RY16. The operation of relay RY16, Fig. 30, disconnects the brush associated with card 1701, PT17 from, and connects the junction of resistors 3019, 3020 to resistor 2903, Fig. 29; and disconnects the brush associated with card 1702, Fig. 30, from and connects the junction of resistors 3021, 3022 to resistor 3023. Thus, for ranges greater than 22,500 yards, the voltages supplied to amplifiers LA15, Fig. 29 and LA16, Fig. 30 are respectively proportional to $\delta d$B and $\delta d$E multiplied by the value for a range of 22,500 yards.

The end of one winding of transformer 3024 is connected to ground through resistors 3029, 3030. The junction of resistors 3029, 3030, is connected through the winding of card 6203, PT62, to ground. The winding of card 6203 has a variation of resistance to provide a brush voltage proportional to the sine of the angular brush position. The brush associated with card 6203 selects a voltage proportional to $cR\delta dE$ sin $E$ and is connected through resistor 2906, Fig. 29, to the input circuit of line amplifier LA17.

The output transformer 2910 of line amplifier LA17, has two grounded secondary windings. One winding is shunted by resistor 2911, and the other winding is shunted by resistors 2912, 2913, in serial relationship. The junction of resistors 2912, 2913, is connected through resistor 2914 to the input circuit of line amplifier LA17.

The slip ring associated with the fine correction brush of the range ring dial 1430, Fig. 30, is connected through the make springs of relay RY3, resistors 3031, 3032, to ground. The junction of resistors 3031, 3032, is connected to ground through the winding of card 6201, potentiometer PT62. The winding of card 6201 has a variation of resistance to provide a brush voltage proportional to the cosine of the angular brush position. The brush associated with card 6201 selects a voltage proportional to $\delta dR$ cos $E$, and is connected through resistor 2909, Fig. 29, to the input circuit of line amplifier LA17.

The voltages supplied to the input circuit of line amplifier LA17, thus are respectively proportional to $\delta dR$ cos $E - cR\delta dE$ sin $E$, and from Equation 10 the output voltage of line amplifier LA17 is thus proportional to $\delta dRh$.

The slip ring of the range ring dial 1430, Fig. 30, is also connected through the make springs of relay RY3 and resistors 3033, 3034, to ground. The junction of resistors 3033, 3034, is connected to ground through the winding of card 6202, potentiometer PT62. The winding of card 6202 has a variation of resistance to provide a brush voltage proportional to the sine of the angular brush position. The brush associated with card 6202 selects a voltage proportional to $\delta dR$ sin $E$, and is connected through resistor 2917, Fig. 29, to the input circuit of motor amplifier MA8.

One winding of output transformer 3024, Fig. 30, is connected through resistors 3035, 3036, to ground. The junction of resistors 3035, 3036, is connected to ground through the winding of card 6204, potentiometer PT62. The winding of card 6204 has a variation of resistance to provide a brush voltage proportional to the cosine of the angular brush position. The brush associated with card 6204 selects a voltage proportional to $cR\delta dE$ cos $E$ and is connected through resistor 2916, Fig. 29, to the input circuit of amplifier MA8. The output circuit of amplifier MA8 is connected to one winding of the two-phase motor MO8 through a network similar to the network 3004, Fig. 30. The feedback from the network is connected through resistor 2915, Fig. 29, to the input circuit of amplifier MA8.

The output circuit of amplifier 1910, Fig. 19, is connected through switch 1911, switch MC13, to the other winding of the motor MO8.

Thus from Equation 11 the shaft of motor MO8 will be rotated proportionally to the required correction $\delta d$H, in the rate of climb of the target. The shaft of motor MO8, Fig. 14, is connected by gearing 1438 to the brushes of potentiometer PT16, and to the $d$H dial 1139, Figs. 11 and 14.

The source of power 1931, Fig. 29, is connected directly to the first contact of the $d$H switch and through resistor 2920 to the second contact of this switch. Similarly, the source 1930 is connected directly to the fifth contact of the switch, and through resistor 2922 to the fourth contact of the switch. The blade of the $d$H switch is connected through resistor 2918 to the input circuit of motor amplifier MA8. The sources 1931 and 1930 are of opposite polarity. When corrective voltages are being received from the ring dial, the $d$H switch is on the blank third contact and does not supply any voltage to the input circuit of motor amplifier MA8. To obtain an initial setting of the shaft of motor MO8, the blade of the $d$H switch is moved by the type C knob, 1166, Figs. 11, 12, to the second, or fourth, contact thus supplying a reduced voltage from the source 1931, Fig. 29, or the source 1930 to the input circuit of amplifier MA8, thus rotating the motor MO8 at slow speed. If the $d$H switch is moved to the first, or fifth, contact the motor MO8 will be rotated in one direction or the other at full speed.

One winding of output transformer 2910, Fig. 29, is connected to ground through resistors 2931, 2932 and through resistors 2933, 2934. The other winding of transformer 2910 is connected to ground through resistors 2935, 2936, and through resistors 2937, 2938. The junctions of resistors 2933, 2934, and of resistors 2935, 2936 are respectively connected to the ends of the windings of card 1301, potentiometer PT13. Similarly the junctions of resistors 2931, 2932, and of resistors 2937, 2938, are connected to the ends of the winding of card 1302. The windings of cards 1301 and 1302 have a variation of resistance so designed to provide a sinusoidal variation of brush voltage with its brush position and are grounded at the points where the function passes through zero. The brush 2947 selects a voltage proportional to $-\delta dRh$ cos $A$ and is connected through resistor 2941 to the input circuit of a motor amplifier MA7.

One winding of output transformer 2904 is connected to ground through resistors 2923, 2924, and through resistors 2925, 2926. The other winding of transformer 2904 is similarly connected to ground through resistors 2927, 2928, and through resistors 2929, 2930. The junctions of resistors 2925, 2926, and of resistors 2927, 2928, are connected to the ends of the windings of card 1303, potentiometer PT13. The junctions of resistors 2923, 2924, and of resistors 2929, 2930, are similarly connected to the ends of card 1304. The windings of cards 1303 and 1304 have a variation of resistance so designed to provide a brush voltage proportional to the sine of angular brush position and are grounded at the points where the function is zero. The brush 2949 selects a voltage proportional to sin $A$, and is connected through resistor 2951, and the winding of card 6206, potentiometer PT62, to ground. The winding of card 6206 has a variation of resistance so designed to provide a brush voltage proportional to the cosine of brush position. The brush associated with card 6206 selects a voltage proportional to $cR\delta dB \sin A \cos E$ and is connected through resistor 2942 to the input circuit of motor amplifier MA7.

The output circuit of motor amplifier MA7 is connected through a network similar to the network 3004, Fig. 30, to one winding of the two-phase motor MO7, Fig. 29, the feedback connection from the network being connected through resistor 2939 to the input circuit of amplifier MA7.

The output circuit of amplifier 1910, Fig. 19, is connected through switch 1911, switch MC13 to the other winding of motor MO7.

Thus, in accordance with Equation 12, the winding of motor MO7 has been supplied with voltages proportional to the correction $\delta Sh$, the appropriate correction in the horizontal speed of the target, and the shaft of motor MO7 is thus rotated in accordance with these voltages. The shaft of motor MO7, Fig. 15, is connected by gearing 1532 to the brushes of potentiometer PT7, and to the counter indicator 1533, Figs. 11, 13 and 15.

Brush 2950 of potentiometer PT13, Fig. 29, is connected through resistor 2952 to the winding of card 6205, potentiometer PT62. The winding of card 6205 has a variation of resistance so designed to provide a brush voltage proportional to the cosine of brush position. The brush associated with card 6205 selects a voltage proportional to $-cR\delta dB \cos A \cos E$ and is connected through resistor 2954 to the input circuit of line amplifier LA18.

The source 1931 is connected directly to the first contact of the $Sh$ switch and through resistor 2944 to the second contact of the $Sh$ switch. The source 1930 is connected directly to the fifth contact of this switch and through resistor 2945 to the third contact of this switch. The blade of the $Sh$ switch is connected through resistor 2940 to the input circuit of motor amplifier MA7. The $Sh$ switch is controlled by knob 1101, Figs. 11 and 12, to operate similarly to the $dH$ switch and is initially used to rotate the shaft of the motor MO7 to the estimated value of the speed $Sh$ of the target.

The output transformer 2957, Fig. 29, of the line amplifier LA18, has two grounded secondary windings respectively shunted by resistors 2958 and 2959.

Brush 2948 of potentiometer PT13 selects a voltage proportional to $-\delta dRh \sin A$ and is connected through resistor 2955 to the input circuit of amplifier LA18. Thus, by Equation 13 the voltages supplied to the input circuit of amplifier LA18 are proportional to $Sh\delta Ct$. One output winding of transformer 2957 is connected to ground through resistor 2960, the winding of card 703, of potentiometer PT7 and resistor 2961. The brush associated with card 703 selects a voltage proportional to the target speed $Sh$, and is connected through resistor 2956 to the input circuit of amplifier LA18. The output voltage of amplifier LA18 is thus divided proportionally to $Sh$ and thus becomes proportional to the correction to target course angle $\delta Ct$.

The other winding of transformer 2957 is connected to ground through resistors 2962 and 2963. The junction of resistors 2962, 2963, is connected through resistor 2965 to the input circuit of the motor amplifier MA6.

The output circuit of motor amplifier MA6 is connected through a network similar to the network 3004, Fig. 30, the third contact and blade of the TA switch, the break contact of relay RY26, the break springs of relay RY27 to one winding of the two-phase motor MO6. The shaft of motor MO6 will thus be rotated through the required correction $\delta Ct$ in the target course angle $Ct$. The shaft of motor MO6, Fig. 15, is connected by gearing 1534 to differential gear DF12.

The resistances of resistors 3040, 3041, 3042, Fig. 30, are so proportioned with respect to the supply voltage that for disagreements between the coarse rings and brushes sufficient voltage will be supplied to motors MO2, MO3, MO4, to cause the motors to run at full speed irrespective of the settings of the brushes of potentiometers PT71, PT72. The trainer, pointer and ranger in the director are supplied with hand wheels which, through the appropriate differential gears or equivalent mechanisms can add motions to the motions of the train, elevation and range-finder drive motors. These adjustments change the values of B, E and R, and if these changes cause a positional disagreement of the coarse dials, will cause motors MO2, MO3, MO4 to follow up, at full speed, on the motions of the hand wheels. When the coarse dials are in agreement but the fine dials are in positional disagreement the resistances of the circuit are so proportioned that motors MO2, MO3, MO4 follow up the motions of the hand wheels at speeds determined by the settings of the brushes of potentiometers PT71, PT72. When the brushes of potentiometers PT71, PT72, are at the top, the motors run at full speed and for other settings at reduced speeds diminishing to one-twentieth of full speed when the brushes are at the bottom of the potentiometers. Thus even without any adjustment of the rates the motors MO2, MO3, MO4 follow up on the adjustments made by the hand wheels.

If one of the director operators finds that frequent operation of the hand wheel is required to follow the target this is an indication that the rates should be adjusted. The trainer is furnished with a bearing rate BR, key 1806, Fig. 18, and the pointer is furnished with an elevation rate ER, key 1807. The present computer is designed to work with either a radar or an optical range finder, thus the ranger is furnished with a double-pole double-throw range selector RS, switch 1805, which is operated to select either the optical range mark key 1808 or the radar range rate key 1809.

When operating without rate correction, the bearing rate correction circuit is grounded through resistor 3019, Fig. 30, and the break springs of relay RY1; the elevation rate correction circuit is grounded through resistor 3021 and the break springs of relay RY2; and the range rate correction circuit is grounded through resistors 3031, 3033, and the break springs of relay RY3.

For full automatic operation against aircraft, with radar ranging and optical training and elevation the main control switch MC, Fig. 18, is on the fourth contact, the rate control switch RC is on the first contact, the radar optical switch RO is on the second contact, the aircraft surface switch AS is on the first contact, and the range selector switch 1805 is in the lower position.

When the bearing rate key 1806 is operated, a circuit is completed from the ship's power supply through director slew key 1801, bearing rate key 1806, rate control switch RC6, winding of relay RY1, switches RC10, MC8, to power supply, operating relay RY1.

When the elevation rate key 1807 is operated, a circuit is completed from the power supply, key 1801, key 1807, switch RC5, winding of relay RY2, switch AS6, elevation key 1817, switches RC10, MC8, to power supply, operating relay RY2.

When the radar range rate key 1809 is operated, a circuit is completed from power supply, switches 1805, 1809, winding of relay RY21, switches RC10, MC8, to power supply, operating relay RY21.

The operation of relay RY21 completes a circuit from the power supply, switch MC9, upper make springs of relay RY21, switches RO2, RC2, lower break springs relay RY28, winding of relay RY3, limit switch LS113, range key 1822, switches RC10, MC8, to power supply operating relay RY3.

The operation of relay RY1 completes a circuit from power supply, switches MC9, RC3, lower make springs of relay RY1, signal lamp 1825 and resistor 1826 in parallel, resistor 1827, switches RC10, MC8, to power supply, lighting the signal lamp 1825, Figs. 11 and 18, to notify the computer and plotting personnel that corrections are being made in the bearing rate.

The operation of relay RY2 completes a circuit from power supply, switches MC9, RC4, lower make springs of relay RY2, signal lamp 1830 and resistor 1831 in parallel, resistor 1832, switches RC10, MC8, to power supply, lighting the elevation rate correction signal lamp 1830, Figs. 11 and 18.

A circuit is completed from power supply, switch MC9, signal lamp 1835, resistor 1836, switches RC10, MC8, to power supply. The signal lamp 1835 is shunted by the upper break springs of relay RY21. The operation of relay RY21 opens this shunt path, lighting the range rate correction signal lamp 1835, Figs. 11 and 18. The shafts of motors MO6, MO7, MO8, Fig. 29, have initial displacements, Ct1, Sh1, dH1, either due to some previous use of the computer or by use of the Ct, Sh and dH switches to set in the estimated values of Ct, Sh, dH. By appropriate coordinate transformations these initial displacements of the shafts of motors MO6, MO7, MO8, produce corresponding displacements dR1, dE1, dB1, of the shafts of motors MO26, MO27, MO28, Fig. 31, and of the brushes of potentiometers PT56, PT57, PT58, Fig. 28. The positions of the brushes of these potentiometers cause the speeds of motors MO30, MO32, MO34, and shafts 1437, 1606, 1510, to be proportional to dR1, dE1, dB1. Shafts 1437, 1606, 1510, produce displacements of the rings of the coarse ring dials 1430, 1403, 1530, Fig. 30, proportional to the increments of displacement ΔcR, ΔcE, ΔcB. The receiver SY5 and shafts 1604, 1721, produce displacements of the brushes of the coarse ring dials proportional to R, E, B. If there is a positional disagreement between the rings and brush of a dial, due to inequality between the generated and observed displacements, the appropriate motor MO3, MO4 or MO2 rotates adding a displacement jR, jE or jB to the increments of generated displacement ΔcR, ΔcE or ΔcB.

When the generated displacements cR, cE, cB are within a few degrees of equality with the observed displacements R, E, B, the brushes of the coarse dials move into the spaces between the partial rings, and the motors MO3, MO4, MO2 are no longer under the control of the coarse dials.

Even though the generated displacements cR, cE, cB are substantially equal to the observed displacements, the rates dR, dE, dB based on the existing or estimated values of Ct, Sh, dH may not be equal to the rates $\dot{R}$, $\dot{E}$, $\dot{B}$, from the observations and this inequality will produce a positional disagreement between the roller contactor and rings of one or more of the fine ring dials. The currents δdR, δdE, δdB from the ring dials, after appropriate coordinate transformations, are supplied to the motors MO6, MO7, MO8, Fig. 29, to change the initial displacements of the shafts of these motors, thus changing the displacements of the shafts of motors MO26, MO27, MO28, Fig. 31, and the values of dR, dE, dB.

In order to simplify the explanation of the type of regenerative tracking embodied in the present computer, assume that the target is moving with unaccelerated speed along the line of sight, so that the angular rates dE, dB are zero, and the range rate dR is constant. The coordinate transformations from Ct, Sh, dH to dR also may be ignored by considering dR to be controlled by the ring dials.

The transmitter SY26, Fig. 28, rotates one gear of the differential gear in the range-finder drive at the rate dR. The other gear of the differential gear adjusts the ranger finder at the rate R which, when dR is correct, will equal St, the target velocity in the line of sight. If dR is not correct in order to keep the range finder on target, the hand wheel is operated, producing through the differential gear, a displacement δR of the range finder which is transmitted to the ring dial by the receiver SY6, Fig. 30. This change in displacement causes a corrective current to produce a change δdR in the rate dR and a change δcR in the displacement cR to match the change δR.

An approximate or estimated rate dR1 is initially set in the computer and as the solution proceeds the rate correction δdR is added to this rate to give the intermediate values dR which will eventually become equal to dR, the correct rate.

The rate correction circuit responds only to changes in the displacement of the range finder and is active only while changes are being made, thus no information as to the total displacement of the range finder is required in the rate circuit.

In aided tracking the rate correction should be proportional to the change in displacement, that is $$\delta dR = k\delta cR \qquad (43)$$

where $k$ is a factor of proportionality.

The generated rate at any instant is equal to the initial rate plus the rate correction.

$$\overline{dR} = dR1 + \delta dR \qquad (44)$$

Since the shafts connected to the ring dial are continuously rotating and their displacements are measured from arbitrary zeros, the difference in displacement of the contactor and rings of the dial may be specified by the integral of the difference of the velocities of the shafts.

$$\delta cR = \int_0^t (\dot{R} - \dot{c}R)\,dt \qquad (45)$$

Thus, $$\overline{dR} = dR1 + \int_0^t (\dot{R} - \dot{c}R)\,dt \qquad (46)$$

Differentiating, $$\dot{\overline{dR}} = k(\dot{R} - \dot{c}R) \qquad (47)$$

But for continuous tracking the director operator manipulates his hand wheel to make $\overline{R}=St$ and $c\overline{R}=\overline{dR}$, thus $$\dot{\overline{dR}}=k(St-\overline{dR}) \quad (48)$$

Solving, $$\overline{dR}=dR1+(St-dR1)(1-\epsilon^{-kt}) \quad (49)$$

where $\epsilon=2.71828$ . . . .

The generated rate $\overline{dR}$ is equal to the initial rate $dR1$ at time $t=0$, and ultimately becomes equal to the target rate $St$. The approach to the correct solution is exponential and the time required to reach a solution depends upon the constant $k$ and the difference between the initial rate $dR1$ and the target speed $St$.

Let $$T=\frac{1}{k}$$

then Equation 47 may be written $$T\cdot\dot{\overline{dR}}+\overline{dR}=St \quad (50)$$

By analogy to an electric circuit consisting of a resistor and inductor in series, and the operational solution for such a circuit, Equation 49 may be written $$\overline{dR}(t)=\frac{1}{T}\int_0^t \epsilon^{-\frac{t}{T}} St(t-\tau)d\tau \quad (51)$$

In Equation 51 the weighting function is $$\frac{1}{T}\epsilon^{-\frac{t}{T}}$$

thus the data are weighed exponentially, the greatest weight being given to present data and progressively less weight to past data.

Since $St(t)$ may be any function of time, it may be considered as made up of three components, the initial setting $dR1$; a correction $(St-dR1$ applied at time $t=0$; and a variation $A \sin wt$ commencing at $t=0$ corresponding to a sinusoidal error in tracking, of amplitude A and angular velocity $wt$.

$$\overline{dR}(t)=dR1+(St-dR1)\left(1-\epsilon^{-\frac{t}{T}}\right)+\frac{A\sin wt}{\sqrt{1+w^2T^2}}-\frac{AwT\epsilon^{-\frac{t}{T}}}{1+w^2T^2} \quad (52)$$

At the start of the tracking, the tracking error in displacement is usually small compared with the error in the rate $dR$. It is therefore desirable to have the time constant T as small as practicable to give rapid convergence to the true rate. When sufficient time has elapsed so that the exponential terms in Equation 52 are negligible, then $$\overline{dR}(t)=St+\frac{A\sin wt}{\sqrt{1+w^2T^2}} \quad (53)$$

For the remainder of the settling time, it is desirable to have the time constant T as large as practical so as to reduce the effect of the tracking errors as expressed by the term $$\frac{A\sin wt}{\sqrt{1+w^2T^2}}$$

In a typical embodiment of Fig. 25, resistors 2343, 2346, were about 2500 ohms, resistor 2344 about 30,000 ohms, resistor 2347 about 27,000 ohms, resistor 2348 about 60,000 ohms, resistor 2349 about 350,000 ohms, resistor 2350 about 10,000 ohms and resistor 2351 about 10,000 ohms.

When the coarse dials are out of balance, full operating voltages are developed across resistors 3040, 3041, 3042, Fig. 30 and the jR, jE, jB motors MO3, MO4, MO2, turn at full speeds. As the brushes of the fine dials make several rotations for partial rotations of the coarse dials, any adjustments of the rate circuits in this interval are ineffective.

When a coarse dial is in balance but a fine dial is out of balance, a fairly large voltage will be supplied to the rate correction circuit through resistor 2351, Fig. 25. The sensitivity of the rate correction circuits, that is, the speed of the $\overline{Ct}$, $\overline{Sh}$, $\overline{dH}$ motors, will depend upon the attenuation in the circuit, such as provided by resistor 2351 and any subsequent amplification.

When the coarse dial is in balance but the fine dial is out of balance, voltage is applied through the networks formed by resistors 2348, 2349, 2350, to the windings of potentiometers PT11 or PT12. Owing to the large attenuations in these networks, the jR, jE, jB motors will rotate at slow speeds. The speeds of these motors are further controlled by the settings of the brushes of the potentiometers. The sensitivities of these motors, that is, the speed for a given applied voltage depends upon the attenuations in the networks, the settings of the potentiometer brushes, and any other attenuations or amplifications in the circuits.

The rate correction circuits are adjusted only during the period that the fine dials are out of balance. The motors jR, jE, jB eventually restore the fine dials to balance, thus, the lengths of time during which the rate correction circuits are being adjusted and the extents of such adjustments depend upon the speeds of the jR, jE, jB motors.

Let the motors MO6, MO7, MO8, Fig. 29, have initial settings $Ct1$, $Sh1$, $dH1$, which, during the period of adjustment, take intermediate values $\overline{Ct}$, $\overline{Sh}$, $\overline{dH}$, and eventually reach the correct values $Ct$, $Sh$, $dH$. During the adjustment period, the outputs of differentials DF28, DF29, DF30, Fig. 28, will have intermediate values of rates of rotation of $\overline{dR}$, $\overline{dE}$, $\overline{dB}$, which eventually reach the correct values $dR$, $dE$, $dB$.

The displacements of motors MO3, MO4, MO2, Fig. 30, will then be $$jR=\int_0^t(dR-\overline{dR})dt,\ jE=\int_0^t(dE-\overline{dE})dt$$

$$jB=\int_0^t(dB-\overline{dB})dt$$

Differentiating with respect to time $$\dot{j}R=dR-\overline{dR},\ \dot{j}E=dE-\overline{dE},\ \dot{j}B=dB-\overline{dB}$$

From Equations 2, 3, 4, 5, 6

$$dR=dRh\cos E+dH\sin E$$

$$dE=\frac{1}{cR}[dH\cos E-dRh\sin E]$$

$$dB=\frac{1}{Rh}[Sh\sin A+So\sin Br]$$

$$dRh=-Sh\cos A-So\cos Br$$

$$A=Br+Co+180-Ct$$

$$\overline{dR}=\overline{dRh}\cos E+\overline{dH}\sin E$$

$$\overline{dE}=\frac{1}{cR}[\overline{dH}\cos E-\overline{dRh}\sin E]$$

$$\overline{dB}=\frac{1}{Rh}[\overline{Sh}\sin\overline{A}+So\sin Br]$$

$$\overline{dRh}=-\overline{Sh}\cos\overline{A}-So\cos Br$$

$$\overline{A}=Br+Co+180-Ct$$

Thus $$\dot{j}R=(dRh-\overline{dRh})\cos E+(dH-\overline{dH})\sin E \quad (54)$$

$$\dot{j}E=\frac{1}{cR}[(dH-\overline{dH})\cos E-(dRh-\overline{dRh})\sin E] \quad (55)$$

$$\dot{j}B=\frac{1}{Rh}[Sh\sin A-\overline{Sh}\sin\overline{A}] \quad (56)$$

Let the corrections made to C$t$1, S$h$1, $d$H1 be $j$C$t$, $j$S$h$, $jd$H, so that $$\overline{Ct}=Ct1+jCt;\ \overline{Sh}=Sh1+jSh;\ \overline{dH}=dH1+jdH$$

Differentiating $$\dot{\overline{Ct}}=j\dot{C}t \quad (57)$$

$$\dot{\overline{Sh}}=j\dot{S}h \quad (58)$$

$$\dot{\overline{dH}}=j\dot{d}H \quad (59)$$

From Equations 2 to 9 it may be shown that $$j\dot{C}t=\frac{1}{\overline{Sh}}[-(r\dot{j}R\cos E-e\dot{j}EcR\sin E)\sin A-b\dot{j}BcR\cos\overline{A}\cos E]c \quad (60)$$

$$j\dot{S}h=[-(r\dot{j}R\cos E-e\dot{j}EcR\sin E)\cos\overline{A}+b\dot{j}B\sin\overline{A}cR\cos E]s \quad (61)$$

$$j\dot{d}H=[r\dot{J}R\sin E+ejEcR\cos E]h \quad (62)$$

where $r$=sensitivity of $j$R integrator
$e$=sensitivity of $j$E integrator
$b$=sensitivity of $j$B integrator
$c$=sensitivity of $j$C$t$ integrator
$s$=sensitivity of $j$S$h$ integrator
$h$=sensitivity of $jd$H integrator Let $r=e=b=k$ and substituting $$j\dot{C}t=kc\frac{Sh}{\overline{Sh}}\sin(\overline{A}-A) \quad (63)$$

$$j\dot{S}h=ks[Sh\cos(A-\overline{A})-\overline{Sh}] \quad (64)$$

$$j\dot{d}H=kh(dH-\overline{dH}) \quad (65)$$

Substituting Equations 57, 58, 59 into Equations 63, 64, 65 and simplifying, $$\dot{\overline{Ct}}+kc\frac{Sh}{\overline{Sh}}\sin(\overline{Ct}-Ct)=0 \quad (66)$$

$$\dot{\overline{Sh}}+ks\overline{Sh}-ksSh\cos(\overline{Ct}-Ct)=0 \quad (67)$$

$$\dot{\overline{dH}}+khdH-khdH=0 \quad (68)$$

From Equations 66, 67, 68, letting $ks=kc=a$, $$(\overline{Ct}-Ct)=\tan^{-1}\left[\frac{\sin(Ct1-Ct)}{\cos(Ct1-Ct)+\frac{\epsilon^{at}-1}{Sh1/Sh}}\right] \quad (69)$$

$$\frac{\overline{Sh}}{Sh}=\frac{Sh1}{Sh}\sin(Ct1-Ct)\sin(\overline{Ct}-Ct)\epsilon^{-at}+\cos(\overline{Ct}-Ct)\left[1-\left[1-\frac{Sh1}{Sh}\cos(Ct1-Ct)\right]\epsilon^{-at}\right] \quad (70)$$

$$\frac{\overline{dH}}{dH}=1-\left(1-\frac{dH1}{dH}\right)\epsilon^{-at} \quad (71)$$

The time constant $$\frac{1}{a}$$

is controlled by the settings of the brushes of the $a$S potentiometer PT71, Fig. 30, and the $r$S potentiometer PT72. Potentiometer PT71 may be adjusted by knob 1102, Figs. 11, 12, 14 and the setting is indicated on dial 1103, Figs. 11 and 14. Potentiometer PT72 may be adjusted by knob 1104, Figs. 11, 12, 15 and the setting is indicated on dial 1105, Figs. 11, 15.

The computer will automatically solve for the correct target rates for any target angle which is within ±180 degrees of the correct value. Thus, in blind tracking of an invisible target by radio location, when it is impossible to estimate the target angle, it is not necessary to set in an approximately true value of the target angle.

If the target horizontal speed S$h$ is initially incorrect, it will affect the speed of solution for target course angle C$t$ but will not affect the value of C$t$ if it is initially set at the true value.

If the target course angle C$t$ is initially incorrect, it will affect the speed of solution for target speed S$h$, even when S$h$ is initially set at the true value. If C$t$ is initially set at the correct value, the values of $\overline{Sh}$ approach the value S$h$ exponentially.

The values of $\overline{dH}$ approach the value $d$H exponentially and independently of the values of C$t$ and S$h$.

The solution times might be excessive except for the controls of the time constants supplied by the sensitivity potentiometers PT71, PT72, Fig. 30. These controls may be manipulated to reduce the time constants during the initial stages of the solutions so as to reduce the solution time, then to increase the time constants during the later stages of the solution to increase the smoothing of the solution in the increased suppression of unwanted perturbations that may be superposed on the wanted observed data.

When a solution has been reached the motors MO30, MO31, Fig. 14, rotate shaft 1437 at the speed $d$R to produce the increment of displacement ΔcR which is transmitted by transmitter SY26 to drive the range finder; the motor MO3 produces a displacement $j$R, which is added in differential gear DF10 to the displacement of shaft 1437 to produce a displacement $c$R of shaft 1405 which is geared to the brushes of the $c$R potentiometer PT17.

The motors MO32, MO33, Fig. 16, rotate shaft 1606 at a speed $d$E to produce a displacement Δ$c$E which is combined in differential gear DF3 with the displacement $L+Zd/30$ of shaft 1729 to produce a displacement Δ$c$E$b$ which is transmitted by the transmitters SY27, SY28 to the director; the receivers SY1, SY2, are controlled by the director to produce a displacement from motor MO18 proportional to E$b$ which is combined in differential gear DF1 with the displacement L of shaft 1623 to produce a displacement E of shaft 1624 and, through gears 1401, 1404, Fig. 14, corresponding displacements of the brushes of potentiometers PT61, PT62.

The motors MO34, MO35, Fig. 15, rotate shaft 1507 at a speed $d$B to produce a displacement Δ$c$B, which is combined in differential gear DF5 with the displacement Co of shaft 1502 to produce a displacement Δ$c$B$r$ of shaft 1508, which is, in turn, combined in differential gear DF4, Fig. 17, with the displacement $jB'r$ of shaft 1712 to produce a displacement $\Delta cB'r$ of shaft 1731 which is transmitted by transmitters SY29, SY30 to the director. The receivers SY3, SY4 are controlled by the director to produce a displacement $B'r$ of shaft 1708, which is combined in differential gear DF2 with the displacement $jB'r$ of shaft 1712 to produce a displacement of shaft 1714, and the brushes of potentiometer PT4, proportional to $Br$.

*Predictor*

The secondary winding of transformer 3606, Fig. 36, is connected by connection 3614 through resistor 3615, and card 6104 to ground; the junction of resistor 3615 and card 6104, PT61, is connected through resistor 3616 by connection 3613 through the upper springs of relay RY29 to ground or source 1930. The winding of card 6104 produces a cosinusoidal variation of the applied voltage at the associated brush which is connected to ground through resistors 3617, 3618. The brush associated with card 6104 is thus at a voltage proportional to $cR$ cos $E$, that is, to the horizontal range, $Rh$. The junction of resistors 3617, 3618 is connected through resistor 3622 to the input circuit of line amplifier LA19.

As explained below in connection with the basic ballistic circuit, the connections 3301, 3302 have voltages proportional to $Tf$, the time of flight, and are respectively connected through break springs of RY9, resistors 3633, 3634 and resistors 3635, 3636, and through resistors 3630, 3629 and resistors 3631, 3632 to ground. The junctions of resistors 3629, 3630 and of resistors 3635, 3636 are connected to the ends of the windings of card 403, potentiometer PT4. The junctions of resistors 3631, 3632, and of resistors 3633, 3634 are connected to the ends of the windings of card 404, PT4. The windings of cards 403, 404 produce sinusoidal variations in brush voltage, and are grounded at the points where the function passes through zero. The brush 3638, of potentiometer PT4 is thus at a voltage proportional to $-Tf$ cos $Br$ and is connected to ground through resistor 3639 and the winding of card 603, potentiometer PT6.

The winding of card 603 produces a linear variation of the applied voltage at its associated brush which is connected through resistor 3624 to the input circuit of amplifier LA19.

The connections 3301, 3302 are respectively connected through the break springs of relay RY9, resistors 3642, 3643 and resistors 3640, 3641 to the ends of the windings of cards 1307, 1308 of potentiometer PT13. The windings of cards 1306, 1307 produce sinusoidal variations of brush voltage, and are grounded at the points where the functions pass through zero. The brush 3645 is thus at a voltage proportional to $-Tf$ cos $A$ and is connected to ground through resistor 3647, and the winding of card 705, potentiometer PT7. The winding of card 705 produces a linear variation of voltage at the brush which is connected through resistor 3623 to the input circuit of amplifier LA19.

As will be explained later in connection with Fig. 32, the connections 3201, 3203 together have voltages proportional to $Yf+Yw+Yj$ and are respectively connected through resistors 3620, 3621 to the input circuit of amplifier LA19. The output transformer of amplifier LA19 has two grounded secondary windings one winding being shunted by resistor 3626, and the other winding being shunted by resistors 3627, 3628 in serial relationship. The junction of resistors 3627, 3628 is connected through resistor 3619 to the input circuit of amplifier LA19. Thus in accordance with Equation 14, the output voltage of amplifier LA19 will be proportional to the Y coordinate of the virtual position.

Brush 3637, of potentiometer PT4, is at a voltage proportional to $Tf$ sin $Br$ and is connected to ground through resistor 3648 and the winding of card 604, potentiometer PT6. The winding of card 604 produces a linear variation of the applied voltage at its associated brush which is connected through resistor 3653 to the input circuit of line amplifier LA20.

Brush 3644, of potentiometer PT13 is at a voltage proportional to $Tf$ sin $A$ and is connected to ground through resistor 3646 and the winding of card 704, potentiometer PT7. The winding of card 704 produces a linear variation in its brush voltage proportional to $Sh$ and the brush is connected through resistor 3652 to the input circuit of amplifier LA20.

As will be explained later in connection with Fig. 32 the connections 3202, 3204 together have voltages proportional to $Xf+Xw+Xj$ and are respectively connected through resistors 3650, 3651 to the input circuit of amplifier LA20.

The output transformers 3654 of amplifier LA20, has two grounded secondary windings. One winding is shunted by resistor 3655 and the other winding is shunted by resistors 3656, 3657. The junction of resistors 3656, 3657 is connected through resistor 3649 to the input circuit of amplifier LA20. Thus in accordance with Equation 15 the voltage of transformer 3654 will be proportional to the X coordinate of the virtual position.

Connections 3301, 3302 are respectively connected through the break springs of relay RY9 and resistors 3658, 3659 through the sections of the windings of card 1604, potentiometer PT16 to ground. The winding of card 1604 produces a linear variation of voltage at its associated brush proportional to $TfdH$ which is connected through resistor 3664 to the input circuit of amplifier LA32.

The source 1930 is connected through the first or second contact of the aircraft surface switch AS4, and resistors 3669, 3672 to ground. The junction of resistors 3669, 3672 is connected through resistor 3671 and the first or second contact of switch AS1, to ground and through resistor 3662 to the input circuit of amplifier LA32. The resistances of resistors 3669, 3671, 3672 are selected so that the voltage supplied to the input circuit of amplifier LA32 for switch AS in the first or second positions is proportional to $Hp$, the vertical height of the director above the mean gun plane, to correct the vertical components of advance and virtual positions for the effect of the vertical parallax when elevations are measured at the director as is the case for example in fire at aircraft targets.

As will be explained later in connection with Fig. 32, the connections 3205, 3206 together have voltages proportional to $Hw+Hj$ and are respectively connected through resistors 3661, 3663 to the input circuit of amplifier LA32.

The output transformer 3665 of amplifier LA32, has two grounded secondary windings and one winding is shunted by resistors 3666, 3667 in serial relationship. The junction of resistors 3666, 3667 is connected through resistor 3660 to the input circuit of amplifier LA32. Thus, in accordance with Equation 16 the voltage of transformer 3665 will be proportional to $kH$.

The secondary winding of transformer 3665 is connected through resistor 3673 to the input circuit of the meter amplifier LA36, and through resistor 3685 to the input circuit of line amplifier LA21.

The secondary winding of transformer 3606 is connected by connection 3612 through resistor 3676, and card 6105, PT61 to ground; the junction of resistor 3676 and card 6105 is connected through resistor 3675 by connection 3614 and the lower springs of relay RY29 to ground or source 1931, and connection 3611 is connected through resistor 3678, and card 6105 to ground; the junction of resistor 3678 and card 6105 is connected through resistor 3677 by connection 3613 and the upper springs of relay RY29 to ground or source 1930. The winding of card 6105 produces from the applied voltage a sinusoidal variation of this voltage at its brush and is grounded at the point where the function passes through zero. The brush associated with card 6105 is thus at a voltage proportional to $cR \sin E$, that is, to H, and is connected through resistor 3674 to the input circuit of meter amplifier LA36, and also through resistor 3686 to the input circuit of line amplifier LA21. The output circuit of meter amplifier LA36 is connected to a meter 1107. Preferably, the output stage of meter amplifier LA36 is in push-pull, and the meter has a center zero, so as to indicate positive and negative values. Thus, in accordance with Equation 18, the meter 1107, Figs. 11, 12, 36, will indicate the future height, H2.

As explained later in connection with Fig. 33, the connection 3303 has a voltage proportional to $Hm$, the connections 3304, 3305, 3306, 3307 together have a voltage proportional to $Hfo$, and these connections are respectively connected through resistors 3684, 3683, 3682, 3681, 3680 to the input circuit of line amplifier LA21. The output transformer 3687 of amplifier LA21 has two grounded secondary windings, one winding being shunted by resistor 3688 and the other winding being shunted by resistors 3689, 3690, in serial relationship. The junction of resistors 3689, 3690 is connected through resistor 3679 to the input circuit of amplifier LA21. Thus, in accordance with Equation 17, the voltage of transformer 3687 will be proportional to W, the vertical coordinate of the virtual position.

Figure 37:
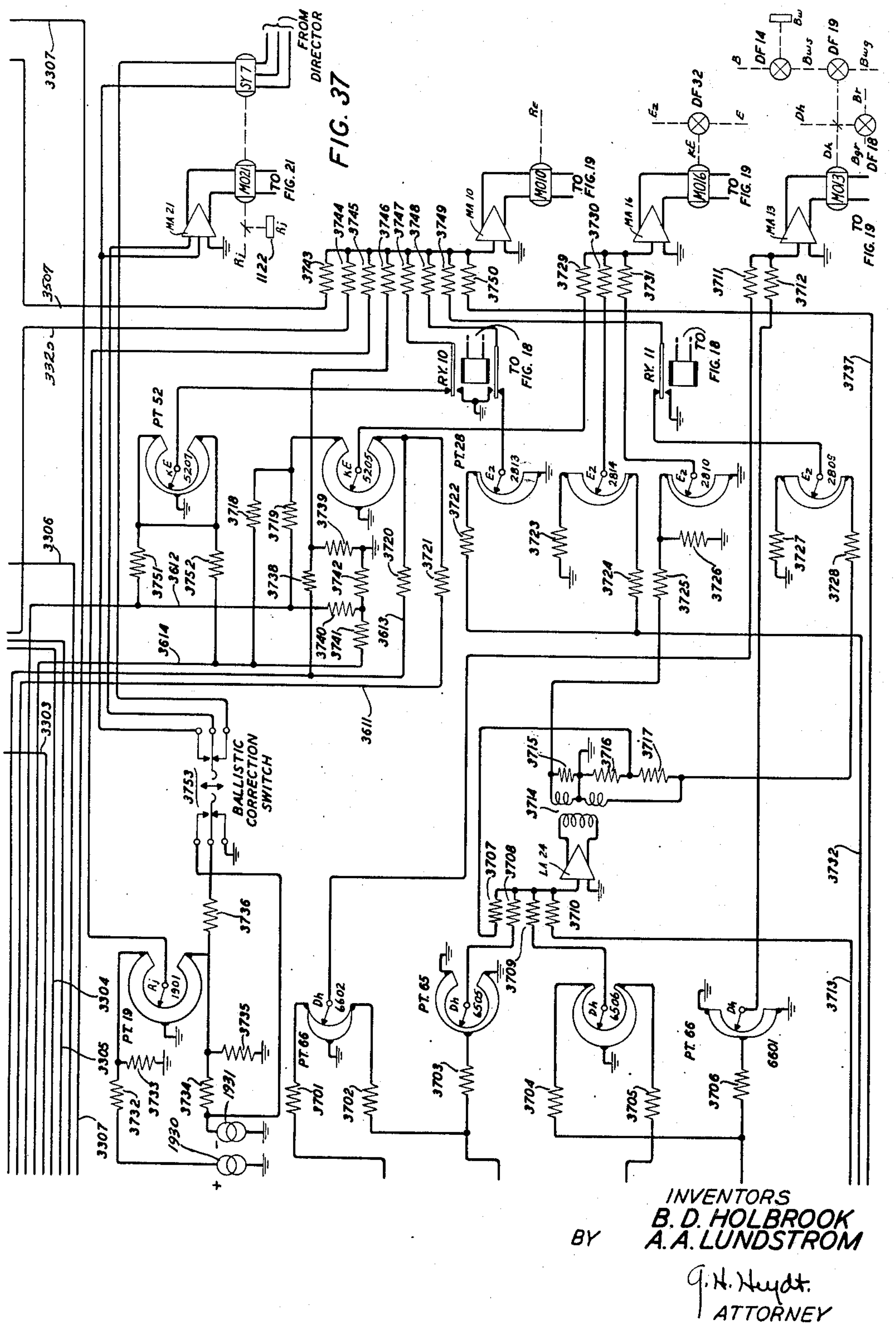

The windings of transformer 3625 are respectively connected through resistors 3701, 3702, Fig. 37, to the ends of the windings of card 6602, potentiometer PT66. The winding of card 6602 modifies the applied voltage to produce a sinusoidal variation of this voltage at its brush, and is grounded at the point where the function is zero. The brush associated with card 6602 is connected through resistor 3711 to the input circuit of motor amplifier MA13.

One winding of transformer 3654, Fig. 36, is connected through resistor 3706, Fig. 37, to the mid-point of the winding of card 6601, potentiometer PT66. The winding of card 6601 modifies the applied voltage to produce a cosinusoidal variation of brush voltage, and the ends of the winding are grounded. The brush associated with card 6601 is connected through resistor 3712 to the input circuit of motor amplifier MA13. The output circuit of motor amplifier MA13 is connected to one winding of the two-phase motor MO13.

The sources 1900, 1901 are connected through the phase shifting network 1903 to the input circuit of the power amplifier 1912, Fig. 19. The output circuit of amplifier 1912 is connected through switch 1913, in its lower position, the main control switch MC3, in its fourth position, to the other winding of motor MO13.

From Equation 19 the voltages supplied to the input circuit of amplifier MA13, Fig. 37, should equal zero. If the sum of these voltages is not equal to zero, motor MO13 will move the brushes associated with cards 6601, 6602 until the sum of these voltages has been reduced to zero, at which point the brushes have been displaced to a position proportionate to $Dh$, the horizontal deflection.

Motor MO13, Fig. 15, is connected by gearing 1514 to the brushes of potentiometers PT65 and PT66 and is connected by shaft 1515 to the differential gear DF18. Shaft 1721, having a position proportional to $Br$, is connected by shafts 1509 and 1516 to another gear of the differential gear DF18. The third gear of differential gear DF18 is geared to the brushes of potentiometer PT26, which will thus be displaced to a position proportional to the advance relative target bearing $Bgr$, ($Bgr=Br+Dh$).

One winding of transformer 3625, Fig. 36, is connected through resistor 3703, Fig. 37, to the mid-point of the winding of card 6505, potentiometer PT65. Card 6505 has a winding which varies the applied voltage to produce a cosinusoidal function of this voltage at its brush, and is grounded at the ends. The brush associated with card 6505 is thus at a voltage proportional to $Y \cos Dh$ which is connected through the resistor 3708 to the input circuit of line amplifier LA24.

The windings of transformer 3654, Fig. 36, are respectively connected through resistors 3704, 3705, Fig. 37, to the ends of the winding of card 6506, potentiometer PT65. The winding of card 6506 modifies the applied voltage to produce a sinusoidal variation of brush voltage and is grounded at the point where the function is zero. The brush associated with card 6506 is thus at a voltage proportional to $X \sin Dh$ which is connected through resistor 3709 to the input circuit of line amplifier LA24. Thus in accordance with Equation 20, the voltages supplied to the input circuit of line amplifier LA24 are proportional to $Rh2$, the advance horizontal range.

The brush associated with card 6104, Fig. 36, is at a voltage proportional to $cR \cos E$, that is to $Rh$, and is connected by connection 3713 through resistor 3710, Fig. 37, to the input circuit of line amplifier LA24. The voltages supplied to amplifier LA24 will thus be proportional to $(Rh2-Rh)$. The output transformer 3714 of amplifier LA24, has two grounded secondary windings, one shunted by resistor 3715, and the other shunted by resistors 3716, 3717 connected in serial relationship. The junction of resistors 3716, 3717 is connected through resistor 3707 to the input circuit of amplifier LA24. Connection 3611 is connected through resistors 3721, 3720 to connection 3613 and connection 3612 is connected through resistors 3719, 3718 to connection 3614. The junctions of resistors 3718, 3719 and of resistors 3720, 3721 are respectively connected to the ends of the winding of card 5205, potentiometer PT52. The winding of card 5205 modifies the applied voltage to produce a sinusoidal variation of brush voltage, and is grounded at the point where the function is zero. The brush associated with card 5205 is thus at a voltage proportional to $-cR$ sin $kE$, and is connected through resistor 3729 to the input circuit of motor amplifier MA16.

One winding of transformer 3714 is connected through resistors 3725, 3726 to ground. The junction of resistors 3725, 3726 is connected through the winding of card 2810, PT28 to ground. The winding of card 2810 modifies the applied voltage to produce a sinusoidal variation of brush voltage. The brush associated with card 2810 is thus at a voltage proportional to $-(Rh2-Rh)$ sin $E2$, which is connected through resistor 3731 to the input circuit of amplifier MA16.

One winding of output transformer 3665, Fig. 36, is connected by connection 3732 through resistor 3724, the winding of card 2814, Fig. 37, and resistor 3723 to ground. The brush associated with card 2814 is at a voltage proportional to $kH$ cos $E2$, which is connected through resistor 3730 to the input circuit of amplifier MA16. The output circuit of amplifier MA16 is connected to one winding of the two-phase motor MO16.

The output circuit of amplifier 1912, Fig. 19, is connected through the lower contacts of switch 1913, the fourth contact of switch MC3 to the other winding of motor MO16.

The voltages supplied to the input circuit of amplifier MA16, Fig. 37, are proportional to $-cR$ sin $kE-(Rh2-Rh)$ sin $E2+kH$ cos $E2$ and, by Equation 21, the sum of these voltages should be zero. If the sum of these voltages is not equal to zero, the output voltage from amplifier MA16 will cause motor MO16 to move the brushes of potentiometers PT28 and PT52 until the sum of the voltages has been reduced to zero, at which point the brushes of potentiometer PT52 have been displaced to the value of $k$E.

Motor MO16, Fig. 16, is connected by gearing 1627 to shaft 1628, and through gearing 1629 to the brushes of potentiometer PT52. Shaft 1628 is geared to one gear of differential gear DF32, and shaft 1624 at a position proportional to E is also geared to one gear of differential gear DF32. Shaft 1625 is connected to the third gear of differential gear DF32 and is geared to the brushes of potentiometer PT28, rotating these brushes to a position proportional to $E2=E+kE$.

*Basic ballistics*

The cR line amplifiers in the present computer have a maximum linear variation of output voltage proportional to about 14,000 yards, while the weapons controlled by the computer have a maximum range of 18,000 yards. Thus, the circuit must be switched, as explained below, to accurately compute for ranges between 14,000 and 18,000 yards.

Equations 5 to 13 are rigorously correct up to a maximum range of some 22,500 yards, and, up to this range, the time constants of the rate correctors are fixed by the sensitivity controls. Above 22,500 yards the circuit is switched, as explained below, to cut off the $c$R terms. The resulting equations, while not linear, will produce accurate adjustments of the rates up to 36,000 yards, though the time constant will vary with range.

The shaft 1405, Fig. 14, rotating proportionally to $c$R, is threaded and engages a cam nut 1406, displacing the nut proportionally to $c$R. The nut has a lever which, at about 13,500 yards, operates a small single-pole snap switch, limit switch LS111, then at about 22,500 yards operates a second single-pole snap switch, limit switch LS112, and at about 36,000 yards operates a third single-pole snap switch LS113.

The $c$R potentiometer PT17 has a scale factor of 25,000 yards per revolution. Card 1703, Fig. 36, is shaped to extend over about 23,000 yards, the space between the ends of the card being filled by an insulating spacer. The winding of card 1703 is tapped at 14,000 yards, which, for the scale factor used, is equivalent to an output voltage of the cR amplifier LA36, of 25 volts. Two brushes, 3604, 3691, are associated with card 1703; brush 3691, being displaced an angular distance equivalent to about 13,000 yards ahead of brush 3604.

In Fig. 18 the two sides of the ship's power supply are connected to the blades of switches MC8, MC9, two sections of the main control MC switch. The third and fourth contacts of switch MC8 are connected through the windings of relays RY15, RY29 switch LS111 to the second, third and fourth contacts of switch MC9; and through the winding of relay RY16 and switch LS112 to the same contacts. When the computer is on, the main control MC switch is on the fourth contact, thus, the operation of switch LS111 will operate relays RY15, RY29, and the operation of switch LS112 will operate relay RY16.

The ship's power is also connected through the lever and contacts of switch MC8, the lever and contacts RC10 of the rate control RC switch, contacts of switch 1822 controlled by range knob R, switch LS113, winding of relay RY25, contact and lever of rate control switch RC1, lever and contact of radar-optical switch RO3, and contacts and lever of switch MC9 to the ship's power. For automatic operation switches RC1 and RC10 are on the first contact. For radar ranging, switch RO3 is on the first or second contact. Thus, relay RY25 is held operated by switch LS113.

For ranges up to about 13,500 yards, brush 3604, Fig. 36, is connected through the break springs of relay RY15 and resistor 3605 to the input circuit of amplifier LA36, and the output voltage of the amplifier rises from zero to about 24 volts. When brush 3604 reaches 13,000 yards, brush 3691 will pass the grounded zero. At about 13.500 yards the limit switch operates relay RY15, disconnecting brush 3604, and connecting brush 3691, through the make springs of relay RY15 and resistor 3605 to the input circuit of amplifier LA36. The output voltage of amplifier LA36 drops nearly to zero, then rises with the motion of brush 3691 for about 14,000 yards or 25 volts, when brush 3691 passes the tap in the winding of card 1703, and the voltage remains steady at this value for about 9,000 yards.

The connections 3611, 3612, from the output transformer 3606, of amplifier LA36, are connected to the various loads, such as card 6105, of PT61, through resistors, such as resistors 3678, 3676. The connections 3613, 3614, from the springs of relay RY29 are also connected to the various loads, as by resistors 3677, 3675. Relays RY15 and RY29 are operated together, at about 13,500 yards, by the limit switch. The operation of relay RY29 connects connection 3613 to the source 1930 and connection 3614 to a source 1931 of equal voltage and opposite polarity. The resistances of the various resistors and loads are so proportioned that the sources 1930, 1931 supply constant voltages, to the proper scale factors, equal to the voltages which, just prior to the switching, were supplied by connections 3611, 36 2, and to these constant voltages, will be added any increases in the voltages from connections 3611, 3612. Thus, for ranges up to about 13,500 yards, brush 3604 supplies to amplifier LA36 a voltage proportional to cR; after the operation of relay RY15, for ranges from 13,500 to 27,000 yards, brush 3691 supplies to amplifier LA36 a voltage proportional to cR−13,000, while the simultaneous operation of relay RY29 supplies directly to the loads a voltage proportional to +13,000 yards; for ranges from 27,000 to 36,000 yards, brush 3691 is on the short-circuited portion of the winding of card 1703 and the voltages supplied to the loads are constant at the value proportional to 27,000 yards.

One winding of output transformer 3606 is connected by connection 3737 through resistor 3750, Fig. 37, to the input circuit of motor amplifier MA10.

When relay RY29, Fig. 36, is operated, the source 1930 is connected by connection 3613 and resistors 3738, 3739, Fig. 37, to ground. The junction of resistors 3738, 3739 is connected through resistor 3746 to the input circuit of amplifier MA10. Connection 3612 is connected to ground through resistors 3740, 3742 and connection 3614 is connected through resistor 3741 to the junction of resistors 3740, 3742 to maintain constant the loads on the secondary windings of transformer 3606, Fig. 36, when relay RY29 operates.

When the range potentiometer PT17 is driven to a range of 36,000 yards, the cam nut operates limit switch LS113, Fig. 18, thus releasing relay RY25. As shown in Fig. 19, the release of relay RY25 disconnects the exciting winding of motor MO3 and substitutes resistor 1920 as a dummy load for amplifier 1910. The cam nut 1406 blocks the shaft 1405, Fig. 14, thus preventing the brushes of potentiometer PT17 from moving. The motion of shaft 1437 is then transmitted through differential gear DF10 and gearing 1435 and rotates the rotor of motor MO3.

The voltages supplied to resistors 3746, 3750, Fig. 37, will together be proportional to cR.

The winding of transformer 3714 is connected to ground through resistor 3728, the winding of card 2809 of potentiometer PT28, and resistor 3727. The winding of card 2809 has a variation of resistance such that the voltage appearing at the brush is the applied voltage modified according to a cosinusoidal function. The brush associated with card 2809 selects a voltage proportional to $(Rh2-Rh)$ cos $E2$, and is connected through the break springs of relay RY11 and resistor 3749 to the input circuit of amplifier MA10.

Connections 3612, 3614 are respectively connected through resistors 3751, 3752 to both ends of the winding of card 5207 of potentiometer PT52. The winding of card 5207 is grounded where the function is zero and has a variation in resistance such that the voltage applied modified according to a versinusoidal function is present on the connection to the brush. The brush associated with card 5207 selects a voltage proportional to $-cR$ vers $kE$ and is connected through the break springs of relay RY10 and resistor 3747 to the input circuit of amplifier MA10.

Connection 3732 is connected to ground through resistor 3722 and the winding of card 2813, potentiometer PT28. The winding of card 2813 has a variation of resistance which produces on its brush a sinusoidal modification of the applied voltage. The brush associated with card 2813 selects a voltage proportional to $kH$ sin $E2$ and is connected through the break springs of relay RY10 and resistor 3748 to the input circuit of amplifier MA10.

Thus, by Equation 22 the voltages supplied to resistors 3747, 3748, 3749 are together proportional to $k$R.

The fire control officer at the director is supplied with a range spotting control which moves a synchronous transmitter connected to the receiver SY17. The control winding of the receiver SY7 is connected through the right-hand break springs of the ballistic correction, BC, switch 3753 to the input of the follow-up amplifier MA21, of the type shown in Fig. 22. The output circuit of amplifier MA21 is connected to one winding of the two-phase follow-up motor MO21.

Power is supplied from the ship's power through switch MC 4, Fig. 20, contacts associated with the range spot knob R$j$ and transformer TR3 to the other winding of motor MO21.

Receiver SY7, Fig. 14, drives the range spot R$j$ dial 1409, Figs. 11, 13, 14, is geared by gearing 1439 to motor MO21, and by gearing 1440 to the brushes of the range spot potentiometer PT19.

The source 1930, Fig. 37, is connected to ground through resistors 3732, 3733. The source 1931 is connected to ground through resistors 3734, 3735 and through resistor 3736 and the left break springs of the BC switch 3753. The junctions of resistors 3732, 3733 and of resistors 3734, 3735 are connected to the ends of the winding of card 1901, PT19. The winding of card 1901 has a linear variation of resistance and is grounded at midpoint. The brush associated with card 1901 selects a voltage proportional to R$j$, the range spot and is connected through resistor 3745 to the input circuit of amplifier MA10.

Thus, the voltages supplied to resistors 3745 to 3750 are proportional to $cR+kR+Rj$, that is, to R2.

From Equation 23 $R2=Res1(E2)$. As shown in Fig. 10, $s1(E2)$ varies from 1.009 to .66948. The card might be shaped to give the function starting at .66948, and a resistor connected in series with the card to represent the values from zero to .66948, but a more efficient procedure is to modify Equation 23 to the form $$R2=Re[.66948+s1(E2)-.66948]$$

and to shape the potentiometer card to the function $[s1(E2)-.66948]$, adding the constant term by separate connections.

This permits the use of a lower maximum voltage for a given voltage scale factor and simpler shaping in tandem card connections.

Figure 35:
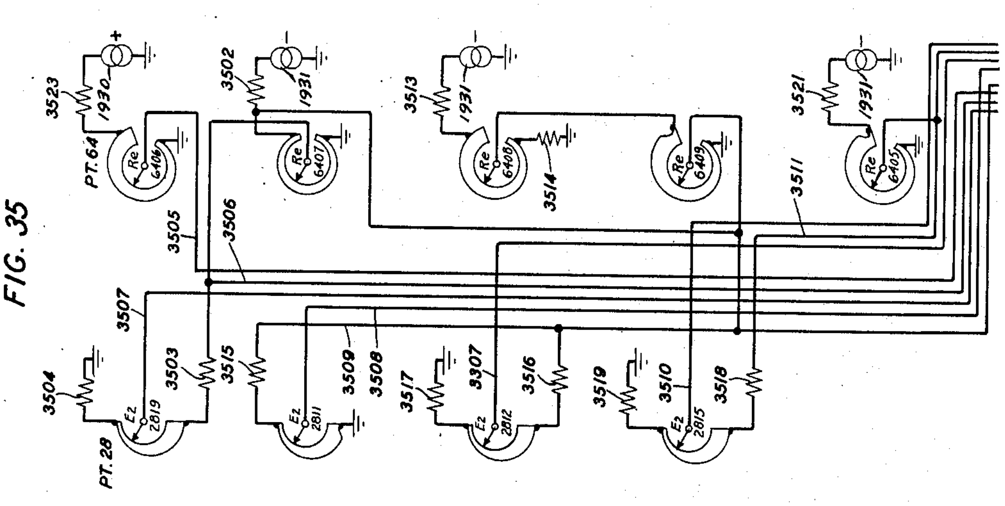

The source 1931, Fig. 35, is connected to ground through resistor 3502 and the winding of card 6407, potentiometer PT64. The winding of card 6407 produces on its brush a linear variation of the applied voltage. The brush associated with card 6407 is connected to ground through resistor 3503, the winding of card 2819, potentiometer PT28, and resistor 3504; and by connection 3506, through resistor 3322, Fig. 33. The brush associated with card 2819 is connected by connection 3507 through resistor 3743, Fig. 37, to the input of amplifier MA10; and through resistors 3323, 3322, Fig. 33, to ground. Resistor 3324 is connected in series with resistor 3323 and the combination is shunted by resistors 3317, 3318, 3319 in series. The junction of resistors 3318, 3319 is grounded through resistors 3320, 3321 in series. The junction of resistors 3317, 3318 is connected by connection 3325 through resistor 3744, Fig. 37, to the input circuit of amplifier MA10.

Figure 33:
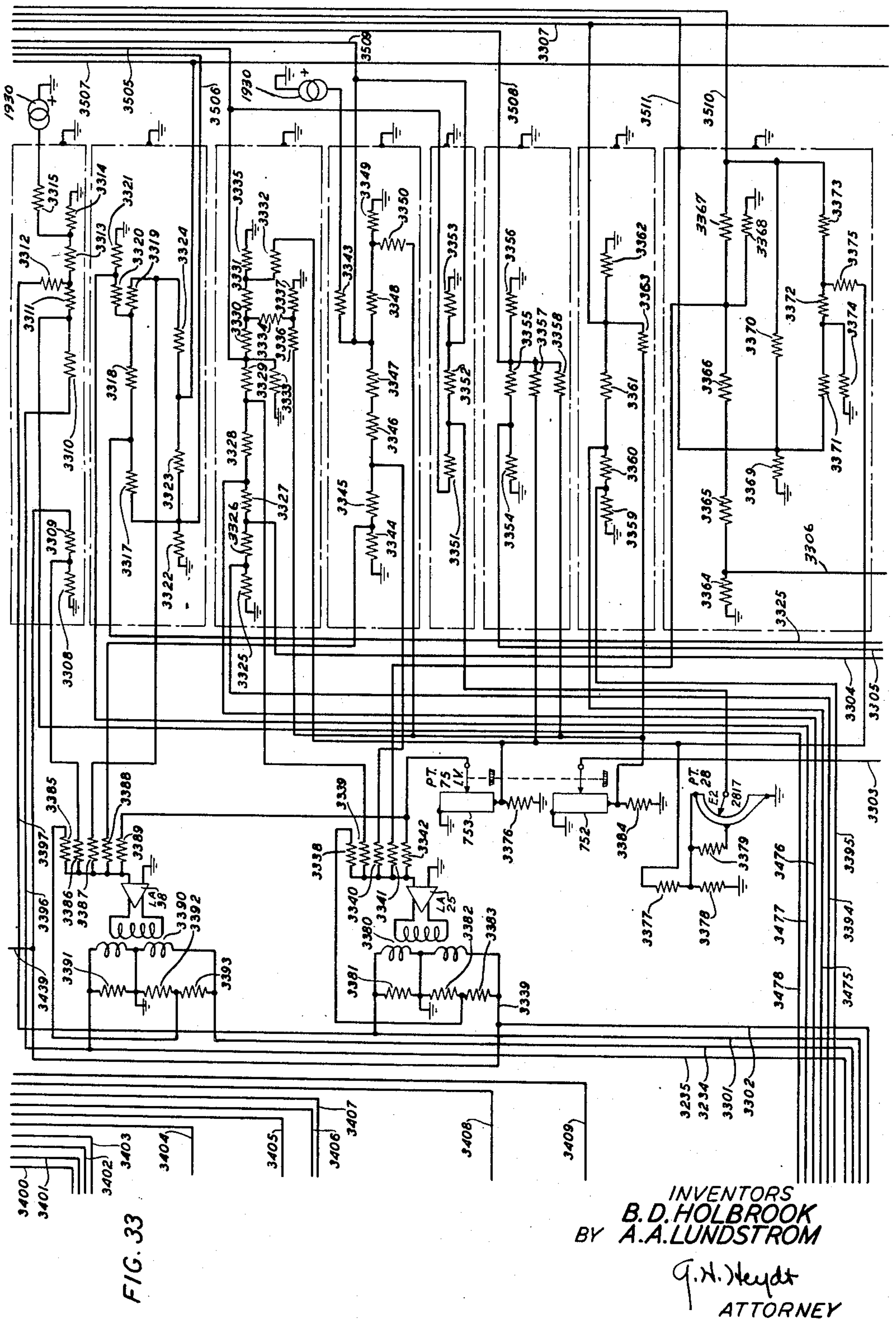

Owing to the interconnection of connections 3506, 3507 in the network formed by resistors 3317 to 3324, Fig. 33, a small part of the voltage from connection 3507 is impressed on connection 3325. The winding of card 2819, Fig. 35, produces a variation in its brush voltage proportional to $[s1(E2)-.66948]$. The small resistor 3504 compensates for the leak voltage in the network. In some cases, the winding of card 2819 may also be slightly modified to more exactly compensate for the leak voltage.

Thus, the voltages supplied to resistors 3743, 3744, Fig. 37, are approximately proportional to $-[.66948Re+Res1(E2)-.66948Re]$. The output circuit of amplifier MA10 is connected to one winding of the two-phase motor MO10.

The sources 1900, 1901, Fig. 19, are connected through the network 1903, amplifier 1914, switch 1915, switch MC2 to the other winding of motor MO10.

Motor MO10, Fig. 14, is connected by gearing 1410, to the brushes of potentiometer PT64, and by gearing 1517, Fig. 15, to the ballistic range counter 1518, Figs. 11, 13, 15.

The voltages supplied to the input circuit of amplifier MA10 are proportional to $$R2-[.66948Re+Re[s1(E2)-.66948]]$$

and the sum of these voltages should be zero. If the sum of these voltages is not zero, motor MO10 is started, rotating the brushes of potentiometer PT64 until the sum of the voltages is zero at which point the brushes of potentiometer PT64 have been rotated proportionally to Re, which is indicated on the ballistic range counter.

Figure 10E:
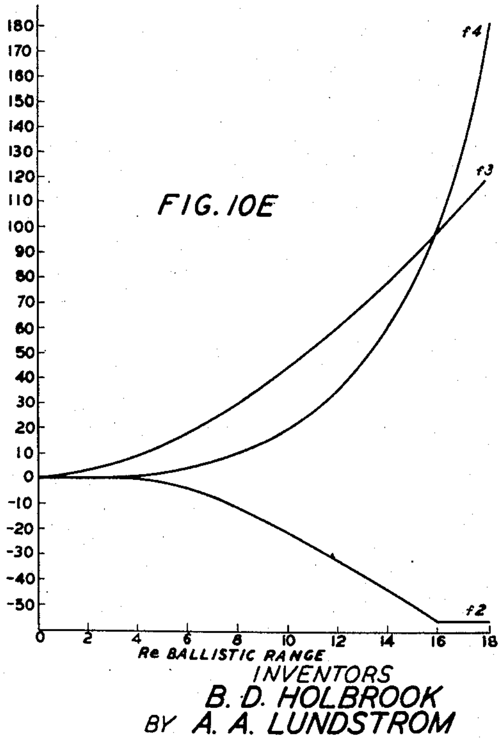

In the present computer, the various ballistic quantities, as tabulated in the firing tables, are matched, by conventional mathematical procedure, by three functions of the ballistic range Re, and seven functions of advance target elevation E2. The three functions, $f2(\text{Re})$, $f3(\text{Re})$ and $f4(\text{Re})$, of ballistic range are shown in Fig. 10E, and the seven functions $s1(\text{E2})$, $s2(\text{E2})$, $s6(\text{E2})$, $s3(\text{E2})$, $s4(\text{E2})$, $c4(\text{E2})$, $c6(\text{E2})$, are shown in Figs. 10, 10A, 10C, 10D. In addition, three other functions $s5$, $s7$, $c5$, of advance target elevation E2 are used. These functions are combinations of the other functions, thus, $$s5(E2)=\frac{s1(E2)}{c6(E2)}(\sin E2)$$

$$c5(E2)=s1(E2)[\cos E2-s6(E2)\ (\sin E2)]$$

and very nearly $s7(E2)=s1(E2)$.

Source 1930 is grounded through resistor 3523 and the winding of card 6406, potentiometer PT64, Fig. 35. Card 6406 has a winding which varies in resistance to produce a voltage proportional to the function $f2(\text{Re})$, Fig. 10E at its brush when the brush associated with card 6406, (Fig. 35) is rotated in accordance with the ballistic range Re and is connected to connection 3505.

The function $f4(\text{Re})$, Fig. 10E, has a rapid rate of change with ballistic range and cannot easily be represented by a single potentiometer card as the rapid change in width of the card would cause the winding to slip. This difficulty may be avoided by using the product of two functions in place of the single function. From an inspection of the curve as plotted in Fig. 10E, the function resembles an exponential function, thus, it may be divided into a single exponential function, and a second function which together with the exponential function will give the desired function. Or, two functions each equal to $\sqrt{f4(Re)}$ may be used. Card 6408, of potentiometer PT64, Fig. 35, has a winding varying in resistance with an exponential function. The source 1931 is connected to ground through resistor 3513, the winding of card 6408 and resistor 3514. The brush associated with card 6408 is grounded through the winding of card 6409. The winding of card 6409 has a variation in resistance such that the voltage selected by the brush associated with card 6409 varies in accordance with the function $f4(\text{Re})$. The brush associated with card 6409 is connected to connection 3509.

The source 1931, Fig. 35, is connected to ground through resistor 3521 and the winding of card 6405. The brush associated with card 6405, Fig. 35, connects a voltage proportional to $f3(\text{Re})$, Fig. 10E to connection 3511 by virtue of the resistance variation of the winding of card 6405.

Connection 3509 is grounded through resistor 3515 and the winding of card 2811, potentiometer PT28, Fig. 35. The winding of card 2811 varies the applied voltage to produce a voltage at its brush in accordance with function $s4(\text{E2})$, Fig. 10A multiplied by the applied voltage and a voltage scale factor. The brush associated with card 2811, Fig. 35, is rotated proportionally to E2 connecting in combination with cards 6408 and 6409 a voltage proportional to $s4(\text{E2})f4(\text{Re})$ to connection 3508.

Connection 3509 is also grounded through resistor 3516, the winding of card 2812, potentiometer PT28 and resistor 3517. The winding of card 2812 varies in resistance to produce a modification of the applied $f4(\text{Re})$ voltage in accordance with function $c4(\text{E2})$, Fig. 10C. The brush associated with card 2812, Fig. 35, is rotated proportionally to E2 to select a voltage proportional to $c4(\text{E2})f4(\text{Re})$ and is connected to connection 3307.

Connection 3511 is grounded through resistor 3518, the winding of card 2815, potentiometer PT28, and resistor 3519. The winding of card 2815 varies in resistance to produce a modification of the applied $f3(\text{Re})$ voltage in accordance with function $s3(\text{E2})$, Fig. 10A. The brush associated with card 2815, Fig. 35, is rotated proportionally to E2 to select a voltage proportional to $s3(\text{E2})f3(\text{Re})$ and is connected to connection 3510.

Thus, the potential with respect to ground of connection 3307 is $-c4(\text{E2})f4(\text{Re})$; of connection 3505 is $f2(\text{Re})$; of connection 3506 is $-\text{Re}$; of connection 3507 is $-s1(\text{Re})$; of connection 3508 is $-s4(\text{E2})f4(\text{Re})$; of connection 3509 is $-f4(\text{Re})$; of connection 3510 is $-s3(\text{E2})f3(\text{Re})$; and of connection 3511 is $-f3(\text{Re})$, each to a suitable voltage scale factor.

The total time of flight of the shell, T$f$, is equal to the basic time of flight for standard conditions, T$fo$, plus the added time of flight, T$m$, due to any difference between the standard initial velocity of the shell and the actual initial velocity as affected by wear of the gun, temperature, etc. In the present computer $$Tfo=-23.266f2(Re)+s3(E2)f3(Re)+5.143f4(Re)\text{ seconds}\quad(72)$$

$$Tm=[-.666f2(Re)+.042s3(E2)f3(Re)+.005s4(E2)f4(Re)+1.023s2(E2)(-f2(Re)+.803f4(Re))]\frac{\text{standard-actual I.V.}}{100}\text{ seconds}\quad(73)$$

Connection 3505 is further connected to ground through four parallel paths, resistors 3329, 3328, 3327, 3326, 3325, Fig. 33, in serial relationship;

resistor 3333; resistors 3330, 3331, 3335 in serial relationship; and, from the junction of resistors 3330, 3331 through resistors 3334, 3337 in serial relationship.

The junction of resistors 3328, 3329 has a potential proportional to $-23{,}266f2(Re)$ and is connected through resistor 3339 to the input circuit of line amplifier LA25.

Connection 3510 is connected to ground through five paths, resistors 3367, 3366, 3365, 3364 in serial relationship; from the junction of resistors 3367, 3366 through resistor 3368; resistors 3370, 3369; resistors 3373, 3372, 3371, 3369; and from the junction of resistors 3372, 3371 through resistor 3374.

The junction of resistors 3366, 3367 has a potential proportional to $-s3(E2)f3(Re)$ and is connected through resistor 3341 to the input circuit of line amplifier LA25.

Connection 3509 is connected to ground through two parallel paths, resistors 3347, 3346, 3345, 3344; and resistors 3348, 3349. A source of voltage 1930, of opposite phase to the source 1931, Fig. 35, is connected from ground through resistor 3343, Fig. 33, to the junction of resistors 3347, 3348.

The junction of resistors 3345, 3346 has a potential proportional to $-5.143f4(Re)$ and is connected through resistor 3340 to the input circuit of line amplifier LA25.

Thus, in accordance with Equation 72, the voltages supplied to resistors 3339, 3340, 3341 are together equal to $-Tfo$.

The junction of resistors 3331, 3335 is connected to ground through resistor 3332 in series with the parallel combination of resistor 3376 and card 753 of potentiometer PT75, thus applying a voltage proportional to $.666f2(Re)$ to the winding of card 753.

The junction of resistors 3372, 3373 is connected to ground through resistor 3375 in series with the parallel combination of resistor 3376 and card 753, thus applying an additional voltage proportional to $.042s3(E2)f3(Re)$ to the winding of card 753.

Connection 3508 is connected to ground through two parallel paths, resistors 3355, 3354 in serial relationship, and resistor 3356.

The junction of resistors 3355, 3356 is connected to ground through resistor 3357 in series with the parallel combination of resistor 3376 and card 753, thus applying a further additional voltage proportional to $.005s4(E2)f4(Re)$ to the winding of card 753.

Connection 3505 is further grounded through resistors 3351, 3352, 3353 in series. Connection 3509 is grounded through resistor 3353. The junction of resistors 3351, 3352 has a potential proportional to $-[f2(Re)+.803f4(Re)]$, and is connected to the brush associated with card 2817 of potentiometer PT28.

A portion of the winding of card 2817 is shunted by resistor 3379, and the whole winding is shunted by resistor 3378. The unshunted end of card 2817 is connected to ground and the other end of the card is connected to ground through resistor 3377 in series with the parallel combination of resistor 3376 and card 753. The winding of card 2817 has a variation in resistance such that, in combination with the resistances of resistors 3377, 3378, 3379, it produces an additional voltage across the winding of card 753 which varies the voltage applied to the brush of card 2817 in accordance with the function $1.023s2(E2)$.

The voltage across the winding of card 2817 is portional to $$-1.023s2(E2)(-f2(Re)+.0803f4(Re))$$

Thus, from Equation 73 the voltage across card 753 is proportional to the maximum value of $Tm$. The brush assocaited with card 753 is adjusted by the type D knob 1761, Figs. 11, 13, 17, to the actual value of the initial velocity as indicated by the dial 1762, Figs. 11, 17, and is connected through resistor 3342, Fig. 33, to the input circuit of amplifier LA25.

The output transformer 3380, of amplifier LA25, has two grounded secondary windings, one shunted by resistor 3381, and the other shunted by resistors 3382, 3383 in serial relationship. The junction of resistors 3382, 3383 is connected through resistor 3338 to the input circuit of amplifier LA25.

The potentials of the connections 3301, 3302 are thus proportional to $Tfo+Tm$, that is to $Tf$. As previously explained, connections 3301, 3302 connect transformer 3380 to the potentiometer cards of Fig. 36.

The superaltitude $Hf$ is the sum of the basic superaltitude, $Hfo$, for standard initial velocity and the correction, $Hm$, for loss of initial velocity. In the present computer, $$Hfo=-883.73f2(Re)+260.04f3(Re)+c4(E2)f4(Re)+14.657s4(E2)f4(Re)\text{ yards} \quad (74)$$

$$Hm=[-287.86f2(Re)+230.75f4(Re)+.0874c4(E2)f4(Re)+2.2792s4(E2)f4(Re)]\frac{\text{standard}-\text{I.V.}}{100}\text{ yards} \quad (75)$$

The junction of resistors 3326, 3327, Fig. 33, has a potential proportion to $883.73f2(Re)$ and is connected by connection 3304 through resistor 3683, Fig. 36, to the input circuit of line amplifier LA21.

The junction of resistors 3364, 3365, Fig. 33, has a potential proportional to $260.04f3(Re)$ and is connected by connection 3306, through resistor 3681, Fig. 36, to the input circuit of amplifier LA21.

Connection 3307, Figs. 33 and 35, has a potential proportional to $c4(E2)f4(Re)$ and is connected through resistor 3680, Fig. 36, to the input circuit of amplifier LA21.

The junction of resistor 3354, 3355, Fig. 33, has a potential proportional to $14.657s4(E2)f4(Re)$ and is connected by connection 3305, through resistor 3682, Fig. 36, to the input circuit of amplifier LA21.

Thus, to resistors 3680, 3681, 3682, 3683, are supplied voltages which together are proportional to $Hfo$.

The junction of resistors 3334, 3337, Fig. 33, is connected to ground through resistor 3336, in series with the parallel combination of resistor 3384 and the winding of card 752, potentiometer PT75, thus applying a voltage proportional to $287.86f2(Re)$ to the winding.

The junction of resistors 3348, 3349, is connected to ground through resistor 3350 in series with the parallel combination of resistor 3384 and card 752, applying an additional voltage proportional to $230.75f4(Re)$ to card 752.

Connection 3307 is connected to ground through two parallel paths, resistor 3362, and resistors 3359, 3360, 3361 in serial relationship. The junction of resistors 3361, 3362 is connected to ground through resistor 3363 in series with the parallel combination of resistor 3384 and card 752, applying a further additional voltage proportional to $.0874c4(E2)f4(Re)$ to card 752.

The junction of resistors 3355, 3356 is connected to ground through resistor 3358 in series with the parallel combination of resistor 3384 and card 752, applying a further voltage proportional to $2.2792s4(E2)f4(Re)$ to card 752.

The brushes of potentiometer PT75 are manually adjusted by knob 1761, Figs. 11, 13, 17, to the actual value of the initial velocity, as shown by dial 1762, Figs. 11 and 17, thus, by Equation 75, the brush associated with card 752, Fig. 33, selects a voltage proportional to H*m*, and is connected by connection 3303 through resistor 3384, Fig. 36, to the input circuit of amplifier LA21. Thus, amplifier LA21 is supplied with voltages which together are proportional to H*f*.

In the present computer, $$Twc=(6.1497Tf-4.433Tm)-.0073s1(Re)+ .000003Re-25.004f4(Re)\frac{\text{yards}}{10\text{ knots}} \quad (76)$$

One winding of transformer 3380, Fig. 33, is connected to ground through resistors 3309, 3308. The junction of resistors 3309, 3308 has a potential proportional to 6.1497T*f* and is connected through resistor 3386 to the input circuit of line amplifier LA38.

The brush associated with card 753 is also connected through resistor 3389 to the input circuit of amplifier LA38 and supplies a voltage proportional to $-4.433Tm$.

Connection 3506 is grounded through resistor 3322; connection 3507 is grounded through resistors 3323, 3322, and resistors 3317, 3318, 3319, 3324 are connected in serial relationship across resistor 3323, thus the junction of resistors 3319, 3324 has a potential proportional to $$-.0073s1(Re)+.00000Re$$

and is connected through resistor 3387 to the input circuit of amplifier LA38.

The junction of resistors 3344, 3345 has a potential proportional to $-25.004f4(Re)$ and is connected through resistor 3388 to the input circuit of amplifier LA38.

Thus, by Equation 76, the output voltage of amplifier LA38 will be proportional to T*wc*.

The output transformer 3390, of amplifier LA38, has two grounded secondary windings, one shunted by resistor 3391 and the other shunted by resistors 3392, 3393 in serial relationship. The junction of resistors 3392, 3393 is connected through resistor 3385 to the input circuit of amplifier LA38.

The secondary windings of transformer 3390 are connected to connections 3234, 3235.

Figure 32:
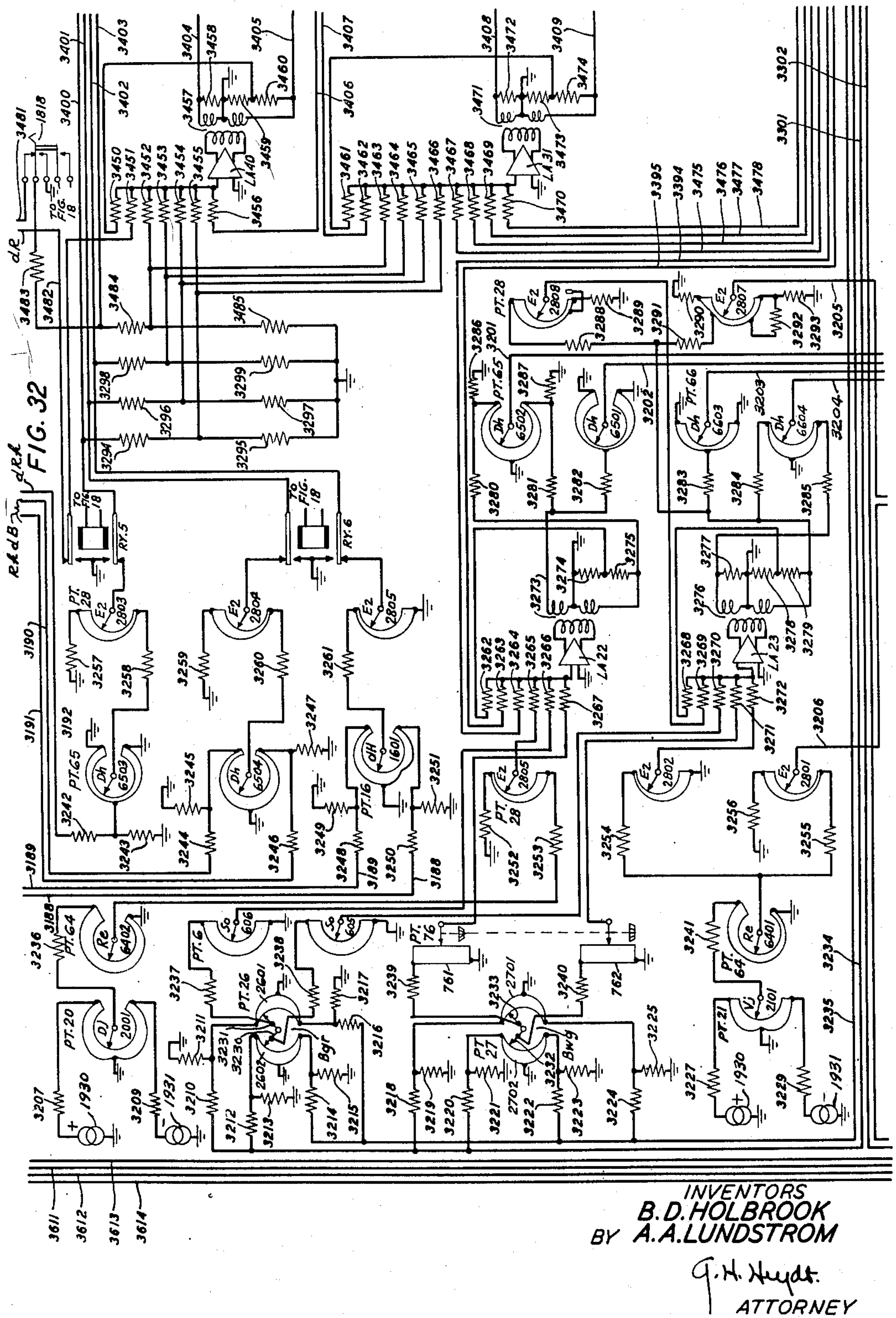

Connection 3234 is connected to ground through resistors 3210, 3211, Fig. 32, and through resistors 3212, 3213. Connection 3235 is connected to ground through resistors 3214, 3215 and through resistors 3216, 3217. The junctions of resistors 3210, 3211 and 3216, 3217 are connected to the ends of the winding of card 2601, potentiometer PT26. The junctions of resistors 3212, 3213 and 3214, 3215 are connected to the ends of the winding of card 2602. The windings of cards 2601, 2602 have variations of resistance which produce sinusoidal variations of the applied voltage at their brushes and are grounded at the points where the functions are zero.

Connection 3234 is connected to ground through resistors 3218, 3219 and through resistors 3220, 3221. Connection 3235 is connected to ground through resistors 3222, 3223 and through resistors 3224, 3225. The junctions of resistors 3218, 3219 and 3224, 3225 are connected to the ends of the winding of card 2701, potentiometer PT27. The junctions of resistors 3220, 3221 and 3222, 3223 are connected to the ends of card 2702. The windings of cards 2701, 2702 have variations of resistance which produce sinusoidal variations of the applied voltage at their brushes and are grounded at the points where the functions are zero.

In Fig. 15, shaft 1515, rotating proportionally to D*h* is geared to differential gears DF18 and DF19, shaft 1516 rotating proportionally to B*r* is geared to differential gear DF18, thus the brushes of potentiometer PT26, which are driven by differential gear DF18, will rotate proportionally to $Bgr(Bgr=Br+Dh)$.

Shaft 1504, rotating proportionally to B, is geared to differential gear DF14. By means of the B*w* knob 1535, Figs. 11, 12, 15, shaft 1519 is rotated proportionally to the bearing of the wind B*w*, and this shaft is geared also to differential gear DF14. Shaft 1520, which is driven by differential gear DF14, will thus be rotated proportionally to B*ws*, $(Bws=B-Bw)$.

Shaft 1505 rotates the dial 1506 proportionally to the target angle A, and shaft 1721 rotates the dial 1534 proportionally to the relative target bearing B*r*. Shaft 1504 rotates the inner annular dial 1533 proportionally to the true target bearing B, and shaft 1520 rotates the outer annular dial 1532 proportionally to the wind angle B*ws*. The dials 1506, 1532, 1533, 1534, Fig. 11, have a common zero index on the line joining the centers of the dials. The zero index represents the trace of the vertical plane containing the line of sight on the horizontal plane. The target angle A is roughly the angle between the head-to-tail axis of the target and the plane of the line of sight, thus, if a representation of the target be painted on dial 1506, with the head-to-tail axis aligned with the zero of the dial, the representation will be rotated to about the same aspect as the real target as seen from the ship. Similarly, if a representation of the ship be painted on dial 1534, with the fore and aft axis aligned with the zero of the dial, the representation will be rotated to the aspect of the ship with respect to the line of flight. The edges of dails 1506, 1534 are angularly graduated, thus, the angle A may be read on dial 1506, and the bearing B*r* on dial 1534, at the zero index.

The inner annular dial 1533 is also angularly graduated, with the zero graduation marked North, thus the angle B may be read at the zero index, and the angle C*o* may be read on dial 1533 at the zero of dial 1534.

The outer annular dial 1532 has a zero line which is set by the type A knob 1535, Figs. 11, 12, 15, to the angle B*w* on the dial 1533, and is thus set at the angle B*ws* with respect to the zero axis.

The rotation of shaft 1520 is combined with the rotation of shaft 1515 in differential gear DF19 to drive gearing 1521 and the brushes of potentiometer PT27 proportionally to $$Bwg(Bwg=Bws+Dh)$$

Brush 3231, Fig. 32 is connected to ground through resistor 3237 and the winding of card 606, potentiometer PT6. The brush of card 606 selects linear variation of the voltage applied to the card. The brushes of potentiometer PT6 are manually adjusted by knob 1422 Fig. 42, controlling switches 4295, 4298, causing motor MO24 to rotate to the actual value of ship's own speed, So, as shown by dial 1423, Fig. 11. The brush associated with card 696, Fig. 32, provides a voltage proportional to $-Twc$ sin $BgrSo$, and is connected through resistor 3266 to the input circuit of line amplifier LA22.

Brush 3233 provides a voltage proportional to $Twc$ sin $BWG$ and is connected to ground through resistor 3239 and the winding of card 761 of potentiometer PT76. The brush associated with card 761 is manually adjusted by knob 1441, Figs. 11, 13, 14, to the value as shown on dial 1442, Figs. 11, 14, of $Sw$, the horizontal velocity of the wind with respect to the water, to select a voltage proportional to $-Twc$ sin $BwgSw$ and is connected through resistor 3267, Fig. 32, to the input circuit of amplifier LA22.

Thus, in accordance with Equation 24, the voltages supplied to resistors 3266, 3267 are together proportional to $-Gw$.

In the present computer $$Gf = -39.35f2(Re) + .0394c4(E2)f4(Re) \text{ yards} \quad (77)$$

The junction of resistors 3325, 3326, Fig. 33 is connected by connection 3394 through resistor 3264, Fig. 32, to the input circuit of amplifier LA22, and supplies a voltage proportional to $39.35f2(Re)$ to the input circuit of amplifier LA22.

The junction of resistors 3359, 3360, Fig. 33 is connected by connection 3395 through resistor 3263, Fig. 32, to the input circuit of amplifier LA22, and supplies a voltage proportional to $-.0394c4(E2)f4(Re)$ to the input circuit of amplifier LA22. Thus in accordance with Equation 77, the voltages together proportional to the drift $-Gf$, have been supplied through the resistors 3263, 3264 to the input of LA22.

The fire control officer at the director is furnished with a deflection spot knob controlling a synchronous transmitter connected to the synchronous receiver SY8, Figs. 14 and 41. The control winding of the synchronous receiver SY8 is connected to the input circuit of a motor amplifier MA22, which may be of the type shown in Fig. 22. The output circuit of motor amplifier MA22 is connected to one winding of a two-phase motor MO22.

The power from the ship supply is connected through switch MC14, Fig. 20, the make springs of switch $Dj$, and the primary winding of transformer TR4. The secondary winding of transformer TR4 is connected to the other winding of the two-phase motor MO22.

Motor MO22, Fig. 14 is connected by gearing 1414 to the synchronous receiver SY8 and the dial 1126, and by the gearing 1413 to the brushes of potentiometer PT20. Motor MO22 will run until it has positioned the control winding of SY8 to the zero output voltage point at which position the brushes of PT20 and dial 1126 will correspond to the position of the deflection spot knob in the director.

The sources of voltages 1930, 1931, Fig. 32, are respectively connected through resistors 3207, 3209, to the ends of the winding of card 2001, of potentiometer PT20, which is grounded at a midpoint. The brush associated with card 2001 is connected to ground through resistor 3236 and the winding of card 6402, potentiometer PT64. The winding of cards 2001 and 6402 have such a variation of resistance that the brush associated with card 6402 provides a voltage proportional to $DjRe$ and is connected to ground through resistor 3253, the winding of card 2806, potentiometer PT28 and resistor 3252. The winding of card 2806 having zero degrees of (E2) at the junction with resistor 3252 has a variation of resistance such that the potential of the winding varies in accordance with the function $s1(E2)$. The brush associated with card 2806 will thus provide a voltage proportional to $Gj$, and is connected through resistor 3265 to the input circuit of line amplifier LA22. The output transformer 3273, of amplifier LA22, has two secondary windings, one winding being shunted by resistors 3274, 3275 in serial relationship. The junction of resistors 3274, 3275 is connected through resistor 3262 to the input circuit of amplifier LA22.

The voltages of the windings of transformer 3273 are thus proportional to $-Gw = Gf + Gj$.

Brush 3230, PT26 is connected to ground through resistor 3238 and the winding of card 605, potentiometer PT6. The winding of card 605 has such a variation of resistance that the brush associated with card 605 provides a voltage proportional to $-Twc$ cos $BgrSo$ and is connected through resistor 3270 to the input circuit of line amplifier LA23. Brush 3232, PT 27 selects a voltage proportional to cos $Bwg$ of the applied $-Twc$ voltage and is connected to ground through resistor 3240 and the winding of card 762, potentiometer PT76. The winding of card 762 has a linear variation of the applied voltage. The brush associated with card 762 manually adjusted to a position corresponding to the wind speed, $Sw$, provides a voltage $-Twc$ cos $BwgSw$ and is connected through resistor 3271 to the input circuit of line amplifier LA23.

The fire control officer in the director is furnished with an elevation spot knob controlling a synchronous transmitter connected to the synchronous receiver SY9, Figs. 14 and 43. The control winding of the synchronous receiver SY9 is connected to the input circuit of the motor amplifier MA23, which may be of the type shown in Fig. 22. The output circuit of motor amplifier MA23 is connected to one winding of the two-phase follow-up motor MO23. One phase of the ship's supply is connected through the blade and fourth contact of switch MC15, Fig. 20, the contacts of switch $Vj$, and the primary winding of transformer TR5. The secondary winding of transformer TR5 is connected to the other winding of motor MO23. Motor MO23, Fig. 14, is connected by gearing 1407 to the dial 1124 and the receiver SY9, and by gearing 1408 to the brush of potentiometer PT21. MO23 will run to position the control winding of SY9 to the zero output voltage point at which position the brushes of PT21 and dial 1124 will correspond to the position of the elevation spot knob in the director.

The sources 1930, 1931, Fig. 32, are respectively connected to ground through resistors 3227, 3229, and the two halves of the windings of card 2101, potentiometer PT21. The winding of card 2101 has a linear variation of voltage. The brush associated with card 2101 is connected to ground through resistor 3241 and the winding of card 6401, potentiometer PT64. The winding of card 6401 has a linear variation of voltage proportional to $Re$ times the voltage from resistor 3241.

The brush associated with card 6401 is connected to ground through resistor 3254, and the winding of card 2802, potentiometer PT28. The potential of the winding of card 2802 varies the applied voltage in accordance with the function $s5(E2)$ which is proportional to the sin $E2$ multiplied by the ratio of function $s1$, Fig. 10, to function $c6$, Fig. 10D. The brush associated with card 2802 is connected through resistor 3272 to the input circuit of amplifier LA23. The output transformer 3276 associated with amplifier LA23, has two grounded secondary windings, one winding being shunted by resistor 3277, and the other winding being shunted by resistors 3278, 3279 in serial relationship. The junction of resistors 3278, 3279 is connected through resistor 3268 to the input circuit of amplifier LA23. One winding of transformer 3276 is connected to ground through resistor 3288, the winding of card 2808, potentiometer PT28, and resistor 3289. The winding of card 2808 has a variation in resistance such that, in combination with the resistance of resistor 3289, the voltage of the brush varies in accordance with function $c6$, Fig. 10D. The brush associated with card 2808, Fig. 32, is connected through resistor 3269 to the input circuit of amplifier LA23.

Thus, in accordance with Equation 25, the output voltage of transformer 3276 wil be proportional to $Qw-Qj$.

The output winds of transformer 3273 are respectively connected to ground through resistors 3280, 3286 and through resistors 3281, 3287. The junctions of resistors 3280, 3286 and of resistors 3281, 3287 are connected to the ends of the windings of card 6502, potentiometer PT65. The winding of card 6502 has a sinusoidal variation of voltage and is grounded at the point where the function is zero.

The winding of transformer 3276 is connected to ground through resistor 3283, and the halves of the winding of card 6603, potentiometer PT66. The potential of the winding of card 6603 supplies to its brush a cosinusoidal variation of the applied voltage and is grounded at both ends. The brushes associated with cards 6502, 6603 are respectively connected by connections 3201, 3203 to the input circuit of line amplifier LA19, Fig. 36, and, in accordance with Equation 26, together supply voltages proportional to $$Yw+Yf+Yj$$

One winding of transformer 3273 is connected to ground through resistor 3282 and the halves of the winding of card 6501. The potential of the winding of card 6501 supplies to its brush a cosinusoidal variation of the applied voltage and is grounded at the two ends.

The windings of transformer 3276, Fig. 32, are respectively connected to ground through resistors 3284, 3285 and the two halves of the windings of card 6604, potentiometer PT65. The brushes associated with cards 6501, 6604 are rotated proportionally to the horizontal deflection, $Dh$, and are connected by connections 3202, 3204 to the input circuit of amplifier LA20, Fig. 36. Thus, in accordance with Equation 27, as previously described, these connections supply voltages which together are proportional to $$Xw+Xf+Xj$$

The winding of transformer 3276, Fig. 32, is connected to ground through resistor 3291 and the parallel paths formed by one section of the winding of card 2807, potentiometer PT28, and resistor 3290, and by the other section of the winding of card 2807 and resistor 3293. A portion of the winding of card 2807 is shunted by resistor 3292. The winding of card 2807 has a variation in resistance such that, in combination with the resistances of resistors 3290, 3292, 3293, the potential of the brush will vary in accordance with the function $s6(E2)$, Fig. 10.

The brush associated with card 6401, potentiometer PT64, is connected to ground through resistor 3255, the winding of card 2801, potentiometer PT28, and resistor 3256. The winding of card 2801 has a variation in resistance such that, in combination with the resistor 3256, the voltage supplied to its brush will vary in combination in accordance with the function $c5(E2)$.

The brushes associated with cards 2801, 2807, are respectively connected by connections 3206, 3205, to the input circuit of amplifier LA32, Fig. 36, and, as previously explained, in accordance with Equation 28, the connections together supply voltages proportional to $Hw+Hj$.

*Fuze setting order*

One winding of transformer 3143, Fig. 31, having a potential proportional to $dRh$ is connected to ground by connection 3192 and resistors 3242, 3243, Fig. 32. The junction of resistors 3242, 3243 is connected to a center tap in the winding of card 6503, potentiometer PT65. The winding of card 6503 has a variation of resistance such that it modifies the applied $dRh$ voltage cosinusoidally with $Dh$ and is grounded at both ends. The brush associated with card 6503, is connected to ground through resistor 3258, the winding of card 2803, potentiometer PT28, and resistor 3257. The winding of card 2803 has a variation of resistance such that it modifies the applied voltage $dRh$ cos $Dh$ cosinusoidally with E2. The brush, associated with card 2803, provides a voltage proportional to $-dRh$ cos $Dh$ cos $E2$, and is connected through the lower break springs of relay RY5 and resistors 3294, 3295 to ground. The junction of resistors 3294, 3295, is connected through resistor 3455 to the input circuit of line amplifier LA40.

The windings of transformer 3161, Fig. 31, having potentials proportional to $RhdB$ are respectively connected to ground by connections 3190, 3191 through resistors 3244, 3245, Fig. 32, and resistors 3246 and 3247. The junctions of resistors 3244, 3245 and of resistors 3246, 3247 are respectively connected to ground through the halves of the winding of card 6504, potentiometer PT65. The winding of card 6504 has a variation of resistance such that it modifies the applied voltage sinusoidally. The brush associated with card 6504 is connected to ground through resistor 3260, the winding of card 2804, potentiometer PT28 and resistor 3259.

The winding of card 2804 has a variation of resistance such that it provides at its brush the applied voltage modified sinusoidally. The brush associated with card 2804 provides a voltage proportional to $-RhdB$ sin $Dh$ cos $E2$, and is connected through the upper break springs of relay RY6 to ground through resistors 3296, 3297. The junction of resistors 3296, 3297 is connected through resistor 3454 to the input circuit of amplifier LA40.

The sources 1930, 1931, Fig. 31 are respectively connected to ground by connection 3188, 3189 resistors 3250, 3251, Fig. 32 and resistors 3248, 3249. The junctions of resistors 3248, 3249, and of resistors 3250, 3251, are respectively connected to the ends of the winding of card 1601, potentiometer PT16. The winding of card 1601 provides at its brush a linear variation of the applied voltage and is connected to ground at an intermediate tap. The brush associated with card 1601 is connected to ground through resistor 3261 and the winding of card 2805, potentiometer PT28. The winding of card 2805 provides at its brush a sinusoidal variation of the applied voltage. The brush associated with card 2805 is connected to ground through the lower break springs of relay RY6 and resistors 3298, 3299. The junction of resistors 3298, 3299 is connected through resistor 3453 to the input circuit of amplifier LA40, and supplies a voltage proportional to $dH \sin E2$.

Thus in accordance with Equation 31, the voltages supplied to resistors 3453, 3454, 3455 are together proportional to $-dR2$.

The brush associated with card 5605, potentiometer PT56, Fig. 31, is connected to ground through resistors 3193, 3194. The junction of resistors 3193, 3194 has a potential proportional to $dR$ and is connected by connection 3482 through the upper break springs of relay RY5, Fig. 32, through resistor 3451 to the input circuit of amplifier LA40.

The output transformer 3457 of amplifier LA40 has two grounded secondary windings one shunted by resistor 3458 and the other shunted by resistors 3459, 3460 in serial relationship.

The junction of resistors 3459, 3460 is connected through resistor 3450 to the input circuit of amplifier LA40. The winding of transformer 3380, Fig. 33, having a potential proportional to $Tf$, is connected by connection 3439 through the first contact and blade of switch AS3 and resistors 3427, 3438, Fig. 34, to the input circuit of motor amplifier MA9. The source 1931 is connected to ground through resistors 3419, 3420. The junction of resistors 3419, 3420 is connected through the winding of card 6302, potentiometer PT63. The winding of card 6302 provides at its brush a linear variation of voltage. The brush associated with card 6302, is connected through resistor 3421 to ground, and through resistor 3437 to the input circuit of amplifier MA9. The output circuit of amplifier MA9 is connected to one winding of the two-phase motor MO9.

The output circuit of amplifier 1912, Fig. 19, is connected through the lower contacts and blades of switch 1913, and the fourth contact and blade of switch MC3 to the other winding of motor MO9.

Motor MO9, Fig. 15, is connected by gearing 1522, and gearing 1523 to the brushes of potentiometer PT63. If the output voltage of amplifier MA9 is not equal to zero, motor MO9 will rotate the brush associated with card 6302 until the output voltage has been reduced to zero and the motor MO9 has rotated to a position proportional to F2, the basic fuse time.

Figure 34:
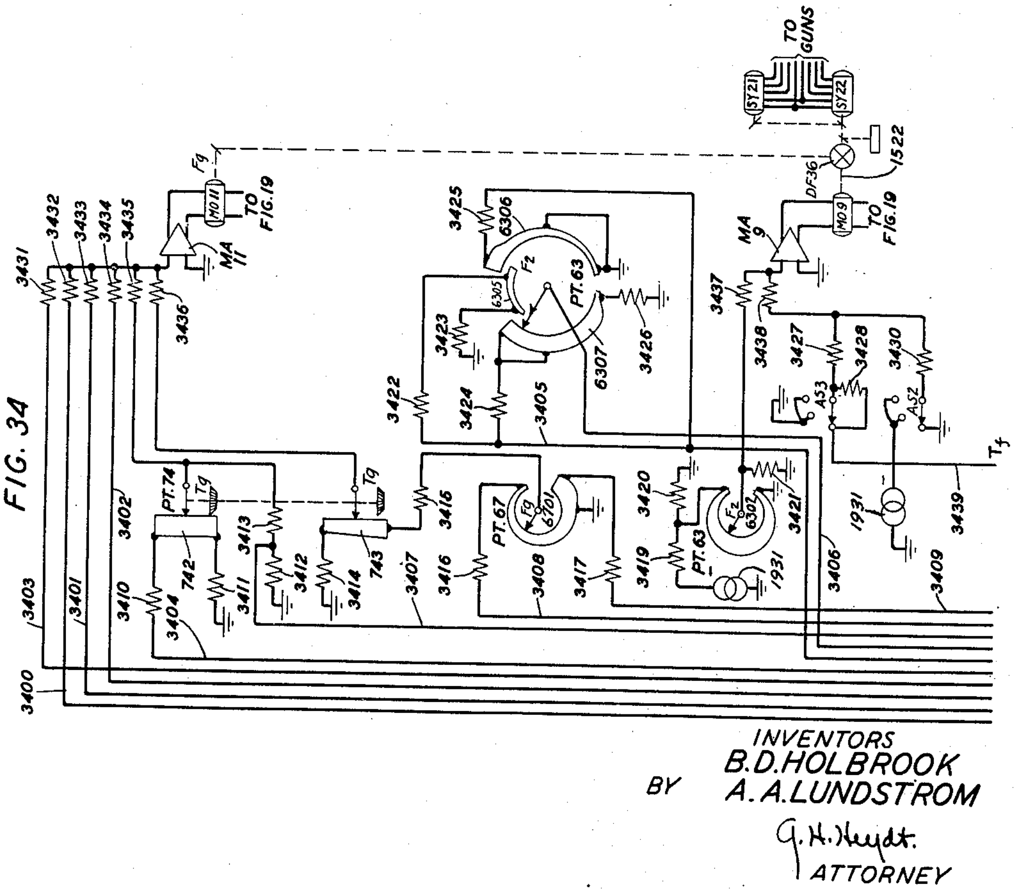

One winding of transformer 3457, Fig. 32, is connected to ground by connection 3405, through three parallel paths, resistor 3425, Fig. 34, and the winding of card 6306, potentiometer PT63; and through resistor 3422, the winding of card 6305 and resistor 3423; and through resistor 3424, the winding of card 6307 and resistor 3426. In Fig. 10B, the function $f6(F2)$ is plotted against F2 in seconds. From this curve it is evident that the function $f6(F2)$ has a rather wide range of variation, and a rather rapid rate of change. Thus some difficulty would be experienced in shaping a single potentiometer card to all the values of this function. However, if the potentiometer card is divided into three sections, and the voltages applied to each section are appropriately chosen, and the ends of the sections are suitably overlapped, it will be found that the function may be derived from three potentiometer cards of convenient size. The variations in resistance of the cards 6305, 6306, 6307 are so related to the resistances of the resistors 3422, 3423, 3424, 3425, 3426 that the potential applied to brush connection 3406 beginning with zero at the right-hand ground, varies in accordance with the function $f6(F2)$. The brushes associated with cards 6305, 6306, 6307 are connected by connection 3406 through resistor 3456, Fig. 32 to the input circuit of amplifier LA40. The output voltage of transformer 3457 will thus be proportional to $$\frac{dR2-dR}{f6(F2)}$$

One winding of transformer 3457 is connected to ground by connection 3404, resistor 3410, Fig. 34, the winding of card 742, potentiometer PT74, and resistor 3411. The brush associated with card 742 is manually adjusted by the type D knob 1763, Figs. 11, 13, 17, to the value of the dead time $Tg$, as shown by dial 1764, Figs. 11, 17, is connected through resistor 3435, Fig. 34 to the input circuit of motor amplifier MA11, and through resistors 3413, 3412 to ground.

The potentiometer PT74 is designed to handle values of the dead time $Tg$ from 2.5 to 6.0 seconds. The resistances of the resistor 3411 and the winding of card 742 are so proportioned that their junction has a brush voltage proportional to 2.5 seconds; the resistances of resistor 3410, the winding of card 742 and resistors 3411 and 3412 are so proportioned that the junction of resistor 3410 and card 742 has a brush voltage proportional to 6.0 seconds.

The junction of resistors 3412, 3413 has a potential proportional to $$\frac{Tg(dF2-dR)}{f6(F2)}$$

and is connected by connection 3407 through resistor 3462, Fig. 32, to the input circuit of line amplifier LA31. The junctions of resistors 3294, 3295 of resistors 3296, 3297 and of resistors 3298, 3299 are respectively connected through resistors 3466, 3465 and 3464 to the input circuit of line amplifier LA31 and together supply a voltage proportional to $dR2$. Thus, in accordance with Equation 30 the voltages supplied to the resistors 3462, 3464, 3465, 3466 are together equal to $dR23$.

In the present computer $$Sf=+12.401Twc-32.213Tf+861.92 \\ -.02288Re-.02798s1(E2)Re+297.6f2(Re) \\ -.0316c4(E2)f4(Re) \text{ yards per second}$$

The secondary winding of transformer 3390, Fig. 33, has a potential proportional to $Twc$ and is connected to ground through resistors 3310, 3311, 3313, 3314. The secondary winding of transformer 3380 has a potential proportional to $Tf$ and is connected to ground by connection 3397 through resistor 3312 to the junction of resistors 3311, 3313. The source 1930 is connected through resistor 3315 to the junction of resistors 3313, 3314. The junction of resistors 3310, 3311 will have a potential proportional to $$+12.401Twc-32.213Tf+861.92$$

and is connected by connection 3478 through resistor 3470, Fig. 32, to the input circuit of amplifier LA31.

The junction of resistors 3320, 3321, Fig. 33, has a potential proportional to $$-.02288Re-.02798s1(E2)Re$$

and is connected by connection 3477 through resistor 3469, Fig. 32, to the input circuit of amplifier LA31.

The junction of resistors 3327, 3328, Fig. 33, has a potential proportional to 297.6$f2$(Re) and is connected by connection 3476 through resistor 3468, Fig. 32, to the input circuit of amplifier LA31.

The junction of resistors 3360, 3361, Fig. 32, has a potential proportional to $$-.0316c4(E2)f4(Re)$$

and is connected by connection 3475 through resistor 3467, Fig. 32, to the input circuit of amplifier LA31. The output voltage of amplifier LA31 will thus be proportional to $Sf-dR23$.

The output transformer 3471 of amplifier LA31, has two grounded secondary windings, one shunted by resistor 3472 and the other shunted by resistor 3473, 3474. The junction of resistor 3473, 3474 is connected through resistors 3461, to the input circuit of amplifier LA31.

The secondary windings of transformer 3471 are respectively connected by connections 3408, 3409 through resistors 3416, 3417, Fig. 34, through the sections of the winding of card 6701, potentiometer PT67. The winding of card 6701 varies its brush voltage in accordance with the function $f5(Fg)$ and is grounded at the point where the function passes through zero. The brush associated with card 6701 is connected to ground through resistor 3415, the winding of card 743, potentiometer PT74 and resistor 3414. The winding of card 743 varies its brush voltage in accordance with $$\frac{1}{Tg}$$

The brush associated with card 743 is manually adjusted by the type D knob, 1763, Figs. 11, 13, 17 to select a voltage proportional to $$\frac{1}{Tg}$$

and is connected through resistor 3436 to the input circuit of motor amplifier MA11.

The output circuit of motor amplifier MA11 is connected to one winding of the two-phase motor MO11. The output circuit of amplifier 1912, Fig. 19, is connected through the lower blades and contacts of switch 1913, the fourth contact and blade of switch MC3 and the break springs of switch 1916 to the other winding of motor MO11.

Motor MO11, Fig. 15, is connected by gearing 1524, to the brush of potentiometer PT67.

The voltage supplied to resistor 3436, Fig. 34, is proportional to $$\frac{f5(Fg)}{.97Tg}(Sf-dR23)$$

The voltages, supplied by connections 3400, 3401, 3402 to resistors 3432, 3433, 3434 are together proportional to $d$R2. The voltage supplied to resistor 3435 is proportional to $$\frac{Tg(dF2-dR)}{f6(F2)}$$

thus, in accordance with Equation 29, the output voltage of amplifier MA11 should be zero. If this output voltage is not equal to zero, motor MO11 rotates the brush of potentiometer PT67 until the output voltage has been reduced to zero and the brush of potentiometer PT67 has been rotated to the value of $Fg$.

Motor MO9 is connected by gearing 1522 to the differential gear DF36. Motor MO11 is also connected by gearing 1524 to differential gear DF36. Differential gear DF36 adds the rotations of motors MO9 and MO11 to produce a rotation proportional to the fuze setting order F, which is transmitted by the synchronous transmitters, SY21 and SY22 to the various guns, and is indicated on the fuze counter 1118, Figs. 11, 13, 15.

*Coordinate rotator*

Figure 38:
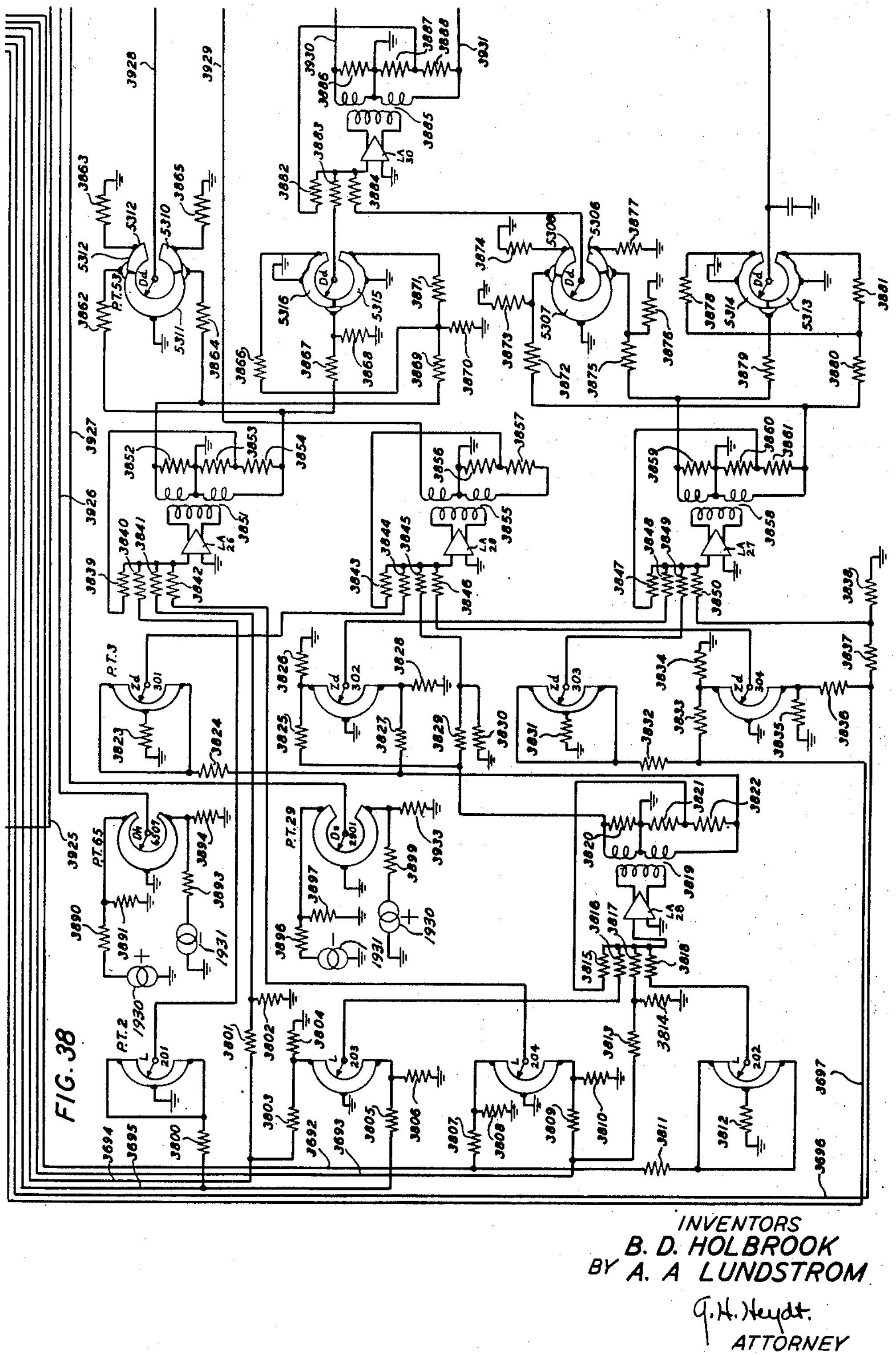

The output windings of transformer 3625, Fig. 36, having a potential proportional to Y, are respectively connected by connections 3694, 3695, to ground through resistors 3803, 3804, Fig. 38, and resistors 3805, 3806. The junctions of resistors 3803, 3804, and 3805, 3806 are respectively connected to the ends of the winding of card 203, potentiometer PT2. The winding of card 203 produces a sinusoidal variation of its brush voltage, and is grounded at the point where the function passes through zero. The brush associated with card 203, is connected through resistor 3816 to the input circuit of line amplifier LA28.

One winding of transformer 3687, Fig. 36, is connected by connection 3693 to ground through resistors 3813, 3814, Fig. 38. The junction of resistors 3813, 3814, is connected through resistor 3817 to the input circuit of amplifier LA28. The other winding of transformer 3687, Fig. 36, is connected by connection 3692 to ground through resistor 3811, Fig. 38, the sections of the winding of card 202, potentiometer PT2, and resistor 3812. The winding of card 202 produces a brush voltage varying in accordance with a versine function. The brush associated with card 202 is connected through resistor 3818 to the input circuit of amplifier LA28. The output transformer 3819 of amplifier LA28, has two grounded secondary windings, one shunted by resistor 3820 and the other shunted by resistors 3821, 3822, in serial relationship. The junction of resistors 3821, 3822 is connected through resistor 3815 to the input circuit of amplifier LA28. Thus, in accordance with Equation 32, the output voltage of transformer 3819 will be proportional to W''.

One winding of transformer 3819 is connected to ground through resistors 3829, 3830. The junction of resistors 3829, 3830 is connected through resistor 3845 to the input circuit of line amplifier LA29. The windings of transformer 3819 are respectively connected to ground through resistors 3825, 3826, and resistors 3827, 3828. The junctions of resistors 3825, 3826 and of resistors 3827, 3828 are respectively connected to the ends of the windings of card 302, potentiometer PT3. The winding of card 302 produces a sinusoidal variation of its brush voltage, and is grounded at the point where the function passes through zero. The brush associated with card 302 is connected through the resistor 3848 to the input circuit of line amplifier LA27.

The other winding of transformer 3819 is connected to ground through resistor 3824, the sections of the windings of card 301, potentiometer PT3, and resistor 3823. The winding of card 301 varies its brush voltage with a versine function. The brush associated with card 301 is connected through resistor 3844 to the input circuit of line amplifier LA29.

The windings of transformer 3654, Fig. 36, having a potential proportional to X, are respectively connected by connections 3696, 3697 to ground through resistors 3836, 3835 and resistors 3833, 3834. The junctions of resistors 3833, 3834 and of resistors 3835, 3836 are respectively connected to the ends of the winding of card 304, potentiometer PT3. The winding of card 304 produces a sinusoidal variation of its brush voltage and is grounded at the point where the function passes through zero. The brush associated with card 304 is connected through resistor 3846 to the input circuit of line amplifier LA29.

The output transformer 3855, associated with amplifier LA29, has two secondary windings, one winding being shunted by resistors 3856, 3857 in serial relation. The junction of resistors 3856, 3857 is connected through resistor 3843 to the input circuit of amplifier LA29. Thus, in accordance with Equation 33, the output voltage of transformer 3855 will be proportional to W'.

Connection 3696, having a potential proportional to X is connected to ground through resistors 3837, 3838. The junction of resistors 3837, 3838 is connected through resistor 3850 to the input circuit of amplifier LA27. Connection 3697 having a potential proportional to −X, is connected to ground through resistor 3832, the sections of the winding of card 303, potentiometer PT3, and resistor 3831. The winding of card 303 varies its brush voltage with a versine function. The brush associated with card 303 is connected through the resistor 3849 to the input circuit of amplifier LA27. The output transformer 3858, associated with amplifier LA27, has two secondary windings one shunted by resistor 3859, and the other shunted by resistors 3860, 3861, in serial relation. The junction of resistors 3860, 3861 is connected through resistor 3847 to the input circuit of amplifier LA27. Thus, in accordance with Equation 34, the output voltage of transformer 3858 will be proportional to X'. Connection 3694 having a potential proportional to Y, is connected to ground through resistors 3801, 3802. The junction of resistors 3801, 3802 is connected through resistor 3841 to the input circuit of line amplifier LA26. Connection 3695 having a potential proportional to −Y is connected to ground through resistor 3800 and the sections of the winding of card 201, potentiometer PT2. The winding of card 201 varies its brush voltage with the versine function and is grounded at the point where the function passes through zero. The brush associated with card 201 is connected through the resistor 3840 to the input circuit of amplifier LA26. Connections 3692, 3693 having potentials proportional to W are respectively connected to ground through resistors 3809, 3810 and resistors 3807, 3808. The junctions of resistors 3807, 3808 and resistors 3809, 3810 are respectively connected to the ends of the windings of card 204, potentiometer PT2. The winding of card 204 produces a sinusoidal variation of its brush voltage and is connected to ground at the point where the function passes through zero. The brush associated with card 204 is connected through resistor 3842 to the input circuit of amplifier LA26. The output transformer 3851 associated with amplifier LA26 has two grounded secondary windings, one shunted by resistor 3852 and the other shunted by resistors 3853, 3854, in serial relationship. The junction of resistors 3853, 3854, is connected through resistor 3839 to the input circuit of amplifier LA26. Thus in accordance with Equation 35, the output voltage of transformer 3851 will be proportional to Y'.

One winding of transformer 3858 is connected through resistors 3880, 3881 to one end of the winding of card 5313, potentiometer PT53; and through resistors 3880, 3878 to one end of the winding of card 5314. The other winding of transformer 3858 is connected through resistor 3879 to the other ends of the windings of cards 5313, 5314. The windings of cards 5313, 5314 produce cosinusoidal variations of brush voltage and are grounded at the point where the function passes through zero. The brush associated with cards 5314, 5313, selects a voltage approximately proportional to $X'$ cos $Dd$ and is connected through resistor 3917, Fig. 39 to the input circuit of motor amplifier MA29.

One winding of transformer 3851, Fig. 38, is connected through resistor 3864 to the junction of cards 5310, 5311, potentiometer PT53; and the other winding of transformer 3851 is connected through resistor 3862 to the junction of cards 5311, 5312. The ends of cards 5310, 5312 are respectively connected to ground through resistors 3865, 3863. The windings of cards 5310, 5311, 5312 produce sinusoidal variations of brush voltage and the winding of card 5311 is grounded at the point where the function passes through zero. The brush associated with these cards selects a voltage approximately proportional to $-Y'$ sin $Dd$ and is connected by connection 3928 through resistor 3916, Fig. 39, to the input circuit of motor amplifier MA29. The output circuit of amplifier MA29 is connected through the lower break springs and the upper break springs of limit switch LS17 to one winding of a two-phase motor MO29.

The output circuit of amplifier 1914, Fig. 19, is connected through the lower contacts and blades of switch 1915, the fourth contact and blade of switch MC2 to the other winding of the motor MO29.

Figure 39:
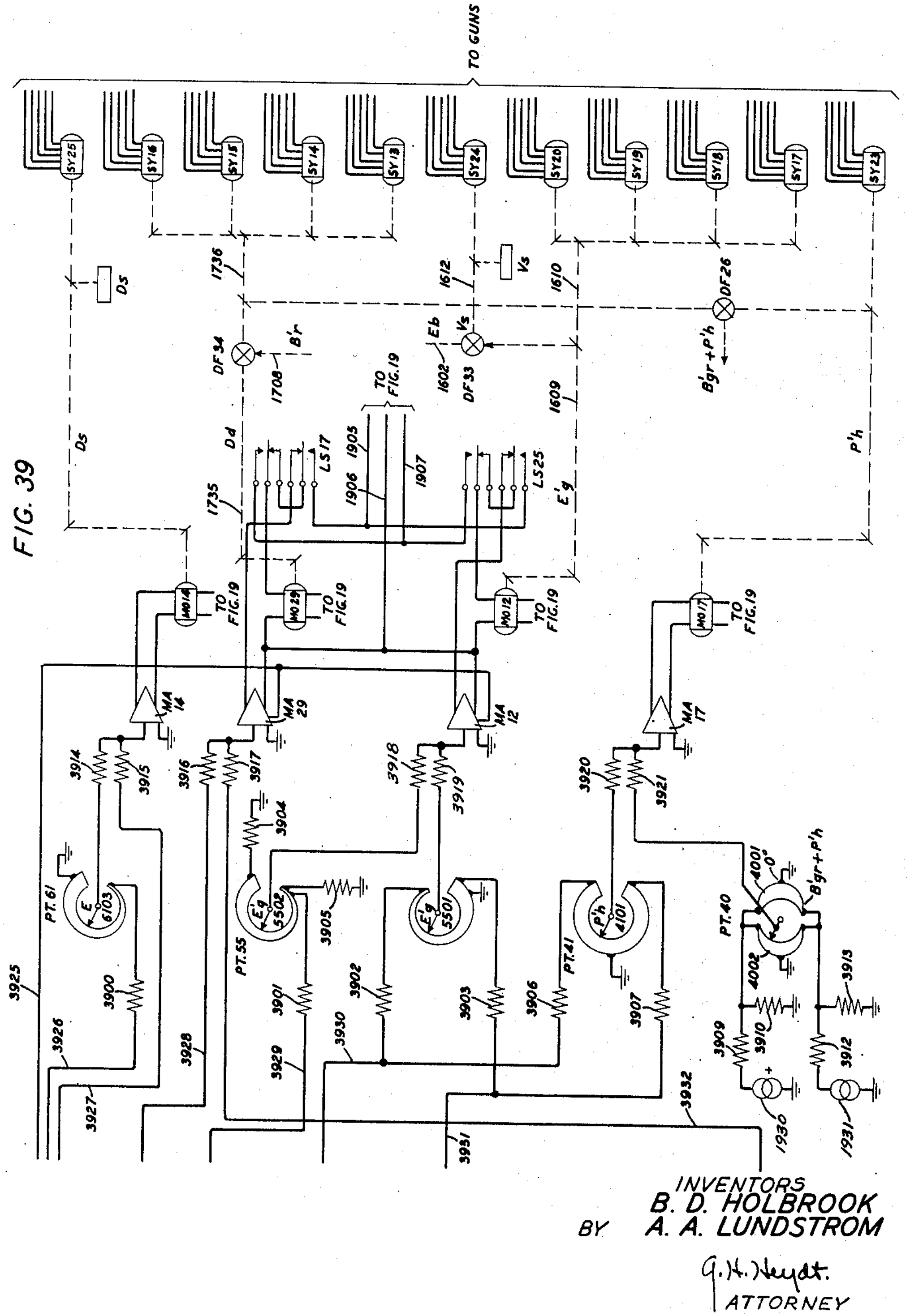

In accordance with Equation 36, the voltages supplied to the input circuit of amplifier MA29, Fig. 39, should equal zero. If the output voltage of this amplifier is not equal to zero, motor MO29 will rotate the brushes of potentiometer PT53, Fig. 38, until the sum of these voltages has been reduced to zero and the motor has rotated the brushes to a position proportional to $Dd$, the deck deflection.

Motor MO29, Fig. 17, is connected by gearing 1732, 1733 to the brushes of potentiometer PT53. Motor MO29 is also connected by gearing 1732 to shaft 1734. Shaft 1734 is threaded and carries a cam nut 1707, having a lever which at one end of the travel of the nut operates the upper springs of limit switch LS17, and at the other end of the travel of the nut operates the lower springs of limit switch LS17.

The ends of the secondary windings of transformer 1904, Fig. 19, are effectively connected by connections 1905, 1907, to the make springs of limit switch LS17, Fig. 39, and the common path is connected by connection 1906 to one side of the winding of motor MO29. When the limit switch LS17 is operated at either end of the travel of the cam nut, the voltage from the output of amplifier MA29 is cut off from the winding of motor MO29 and a voltage of opposite polarity is supplied by the connection 1905 or 1907 to slow down motor MO29 and rotate it back from the spring position.

Motor MO29, Fig. 17, is connected by gearing 1732, 1737 to the inner fine dial 1738, and the outer concentric coarse dial 1739, Figs. 11, 17.

Motor MO29 is connected by gearing 1732 and shaft 1735 to the differential gear DF34. Shaft 1708, rotating proportionally to B'r, is connected by gearing 1709 to differential gears DF34. Differential gear DF34 combines the rotation of shafts 1708 and 1735 to produce a rotation of shaft 1736 proportional to $B'gr (B'gr=Dd+B'r)$. Shaft 1736 is geared to the coarse transmitter SY15 and the fine transmitter SY16, which are connected to corresponding receivers at the gun. The rotations of the coarse and fine receivers are indicated on the dials 1741, 1742, Figs. 11, 17. The shaft 1736 also drives the duplicate coarse transmitter SY13 and the duplicate fine transmitter SY14.

The windings of transformer 3851, Fig. 38, are respectively connected to ground through resistors 3867, 3868 and resistors 3869, 3870. The junction of resistors 3867, 3868 is connected to a tap in the middle of the winding of card 5315, potentiometer PT53. The junction of resistors 3869, 3870 is connected through resistors 3866, 3871 to the ends of the winding of card 5315. The winding of card 5315 produces a cosinusoidal variation of brush voltage, and is grounded at the points where the function passes through zero. The brush associated with card 5315 selects a voltage proportional to $Y'$ cos $Dd$, and is connected through resistor 3883 to the input circuit of line amplifier LA30.

The windings of transformer 3858 are respectively connected to ground through resistors 3872, 3873 and resistors 3875, 3876. The junction of resistors 3875, 3876 is connected to the ends of the windings of cards 5306, 5307, potentiometer PT53. The junction of resistors 3872, 3873 is connected to the ends of the windings of cards 5307, 5308. The winding of card 5307 produces a sinusoidal variation of brush voltage, extending over 180 degrees, and is grounded at the point where the function passes through zero. The windings of cards 5306, 5308 produce sinusoidal variations of brush voltage respectively extending over 50 degrees. The windings of cards 5306, 5308 are respectively connected to ground through resistors 3877, 3874, producing brush voltages equivalent to 40 degrees. The brush associated with cards 5306, 5307, 5308 selects a voltage proportional to $X'$ sin $Dd$, and is connected through resistor 3884 to the input circuit of line amplifier LA30. The output transformer 3885 associated with amplifier LA30 has two grounded secondary windings, one shunted by resistor 3886, the other shunted by resistors 3887, 3888, connected in serial relationship. The junction of resistors 3887, 3888 is connected through resistor 3882 to the input circuit of amplifier LA30. Thus in accordance with Equation 37 the output voltage of transformer 3885 will be proportional to $R'h2$.

One winding of transformer 3855 is connected by connection 3929 through resistor 3901, Fig. 39, to a tap in the winding of card 5502, potentiometer PT55. The right-hand section of the winding of card 5502 produces a cosinusoidal variation of brush voltage extending over 15 degrees, and is grounded through resistor 3905. The brush voltage produced at resistor 3905 is equivalent to 75 degrees. The other section of the winding of card 5502 produces a cosinusoidal variation of brush voltage extending over 85 degrees and is grounded through resistor 3904. The brush voltage produced at resistor 3904 is equivalent to 5 degrees. The brush associated with card 5502, selects a voltage approximately proportional to $W'$ cos $E'g$ and is connected through resistor 3918 to the input circuit of motor amplifier MA12.

The windings of transformer 3885, Fig. 38, are respectively connected by connections 3930, 3931 through resistors 3902, 3903, Fig. 39, to the ends of the winding of card 5501, potentiometer PT55. The winding of card 5501 is grounded at the point where the function passes through zero, the right-hand section of the winding producing a sinusoidal variation of brush voltage extending over 15 degrees, and the left-hand section of the winding producing a sinusoidal variation of brush voltage extending over 85 degrees. The brush associated with card 5501, selects a voltage approximately proportional to $R'h2$ sin $E'g$ and is connected through resistor 3919 to the input circuit of amplifier MA12. The output circuit of amplifier MA12 is connected through the break springs of the limit switch LS25 to one winding of the two-phase motor MO12.

The output circuit of amplifier 1914, Fig. 19, is connected through the lower contacts and blades of switch 1915, the fourth contact and blade of switch MC2, and the break springs of switch 1917 to the other winding of motor MO12. Motor MO12, Fig. 16, is connected by gearing 1607, 1608 to the brushes of potentiometer PT55.

In accordance with Equation 38 the sum of the voltages supplied to amplifier MA12 should be equal to zero. If the sum of these voltages is not equal to zero, motor MO12, Fig. 39, will rotate the brushes of potentiometer PT55 until the sum of the voltages has been reduced to zero, and the brushes of potentiometer PT55 have been rotated to a position proportional to $E'g$, the gun elevation order.

Motor MO12, Fig. 16, is connected by gearing 1607 to shaft 1609, which is geared to shaft 1610. Shaft 1610 is geared to the coarse transmitter SY19, and the fine transmitter SY20, which are respectively connected to corresponding receivers in the gun turrets. The settings of these receivers are respectively indicated by the dials 1611, 1612, Figs. 11, 16. The shaft 1610 also drives the duplicate transmitters SY17, SY18.

The shaft 1609 is threaded to drive a cam nut 1623, having a lever which operates the limit switch LS25, at the limits of the travel of the cam nut.

The make springs of the limit switch LS25, Fig. 39, are respectively connected to the connections 1905, 1907; and one side of the winding of motor MO12 is connected to connection 1906. Connections 1905, 1906, 1907 are connected to the secondary winding of transformer 1904, Fig. 19. When the cam nut reaches a limit of its travel, the lever will operate one, or the other, of the spring combinations of limit switch LS25, Fig. 39, thus disconnecting the output of amplifier MA12 from the winding of motor MO12, and substituting a voltage of opposite polarity, so as to slow motor MO12 to rest, and back off the motor from the limiting position.

The shaft 1609, rotating to a position proportional to $E'g$, Fig. 16, is geared to differential gear DF33. Shaft 1622, rotating to a position proportional to $Eb$, is also geared to differential gear DF33. The shaft 1631 is driven by differential gear DF33, and, in accordance with Equation 40, will rotate to a position proportional to $Vs$, the sight angle. Shaft 1631 drives the synchronous transmitter SY24, which is connected to a corresponding receiver at the guns. Shaft 1613 is geared to shaft 1631 and drives the counter, 1415, Figs. 11 and 14, to indicate the sight angle.

The sources 1930, 1931, Fig. 39, are respectively connected to ground through resistors 3909, 3910 and resistors 3912, 3913. The junctions of resistors 3909, 3910 and resistors 3912, 3913 are respectively connected to the ends of the windings of cards 4001, 4002, potentiometer PT40. The windings of cards 4001, 4002 produce a sinusoidal variation of brush voltage and are grounded at the points where the function passes through zero. The resistances of resistors 3909, 3910, 3912, 3913 are so selected that the voltage selected by the brush associated with cards 4001, 4002, is approximately proportional to 100 sin $(B'gr+P'h)$ and is connected through resistor 3921 to the input circuit of motor amplifier MA17.

The windings of transformer 3885, Fig. 38, are respectively connected by connections 3930, 3931 through resistors 3906, 3907, Fig. 39, to the ends of the winding of card 4101, potentiometer PT41. The winding of card 4101 produces a sinusoidal variation of brush voltage, and is grounded at the point where the function passes through zero. The brush, associated with card 4101, selects a voltage approximately proportional to $-R'h2$ sin $P'h$ and is connected through resistor 3920 to the input circuit of amplifier MA17. The output circuit of amplifier MA17 is connected to one winding of the motor MO17.

The output circuit of amplifier 1912, Fig. 19, is connected through the lower contacts and blades of switch 1913, the fourth contact and blade of switch MC3 to the other winding of motor MO17.

Motor MO17, Fig. 17, is connected by gearing 1761, 1762 to the brush of potentiometer PT41. Motor MO17 is connected by gearing 1761 to shaft 1763 which is connected by gearing 1764 to drive the synchronous transmitter SY23, which is connected to a corresponding receiver at the guns, and the dial 1743, Figs. 11, 17, which indicates P'$h$, the parallax in train due to a 100-yard base in deck plane.

The shaft 1763, rotating to a position proportional to P'$h$, is connected to differential gear DF26. Shaft 1736, rotating to a position proportional to B'$gr$, is also connected to differential gear DF26. The shaft 1744, which is driven by differential gear DF26, will thus be rotated to a position proportional to $B'gr+P'h$ and is connected by gearing 1745 to drive the brushes of potentiometer PT40.

From Equation 39 the sum of the voltages supplied to the input circuit of amplifier MA17, Fig. 39, should equal zero. If the sum of these voltages is not equal to zero, motor MO17 will rotate the brushes of potentiometers PT40, PT41, until the sum of these voltages has been reduced to zero, and the brush of potentiometer PT40 has been rotated to a position proportional to $B'gr+P'h$, and the brush of potentiometer PT41 has been rotated to a position proportional to P'$h$.

The sources 1930, 1931, Fig. 38, are respectively connected to ground through resistors 3890, 3891 and resistors 3893, 3894. The junctions of resistors 3890, 3891, and of resistors 3893, 3894 are respectively connected to the ends of the windings of card 6507, potentiometer PT65. The winding of card 6507 produces a sinusoidal variation of brush voltage, and is grounded at the point where the function passes through zero. The brush associated with card 6507 is connected to ground by connection 3926, resistor 3900, Fig. 39, and the winding of card 6103, potentiometer PT61. The brush associated with card 6103 selects a voltage proportional to sin $Dh$ cos $E$ and is connected through resistor 3914 to the input circuit of motor amplifier MA14.

The sources 1931, 1930, Fig. 38, are respectively connected to ground through resistors 3896, 3897 and resistors 3899, 3933. The junctions of resistors 3896, 3897, and of resistors 3899, 3933, are respectively connected to the ends of the winding of card 2901, potentiometer PT29. The winding of card 2901 produces a sinusoidal variation of brush voltage and is grounded at the point where the function passes through zero. The brush associated with card 2901 selects a voltage approximately proportional to $-$sin $Ds$ and is connected by connection 3927 through resistor 3915, Fig. 39, to the input circuit of amplifier MA14. The output circuit of amplifier MA14 is connected to one winding of the two-phase motor MO14. The output of amplifier 1914, Fig. 19, is connected through the lower contacts and blades of switch 1915, the fourth contact and blade of switch MC2 and the break contacts of switch 1918 to the other winding of motor MO14.

Motor MO14, Fig. 14, is connected by gearing 1416, 1417 to the synchronous transmitter SY25, which is connected to a corresponding receiver at the guns and transmits D$s$, the sight deflection. The motor MO14 is also connected by gearing 1416, 1417 to the counter 1412, Figs. 11, 14, and by gearing 1416, 1418 to the brush of potentiometer PT29.

In accordance with Equation 41 the sum of the voltages supplied to the input circuit of amplifier MA14, Fig. 39, should equal zero. If the sum of these voltages is not equal to zero, motor MO14 will rotate the brush of potentiometer PT29, Fig. 38, until the sum of the voltages has been reduced to zero, and the brush of potentiometer PT29 has been rotated to the value of D$s$, the sight deflection.

*Sensitivity control*

Equation 38 is $$W'\cos E'g-R'h2\sin E'g=0$$

Consider the conditions approaching the correct value of E'$g$, when the angular error is $\delta$, and the angle is $E'g+\delta$, producing an error voltage $v$ millivolts, and let the scale factor be $k$ millivolts per yard, then $$k[W'\cos(E'g+\delta)-R'h2\sin(E'g+\delta)]=v$$

$$k[W'(\cos E'g\cos\delta-\sin E'g\sin\delta)-R'h2(\sin E'g\cos\delta+\cos E'g\sin\delta)]=v$$

as $\delta$ is a small angle $\cos\delta\approx1$ and $\sin\delta\approx\delta$, thus $$k[W'\cos E'g-R'h2\sin E'g-\delta(W'\sin E'g+R'h2\cos E'g)]=v$$

but $$W'\cos E'g-R'h2\sin E'g=0$$

thus $$-k\delta(W'\sin E'g+R'h2\cos E'g)=v$$

as $$W'=cR\sin E'g \text{ and } R'h2=cR\cos E'g$$

$$-k\delta(cR\sin^2 E'g+cR\cos^2 E'g)=v$$

or $$k\delta\, cR=v$$

That is, the voltage $v$ supplied to the restoring motor for the same angular error $\delta$, varies with the generated range $c$R.

A similar analysis may be made of Equation 36.

This change in sensitivity may be counteracted by producing a compensating change in the magnitude of the error voltage. A controllable losser pad may be inserted at some convenient place in the transmission path of the error voltage, or the amplification of some amplifier tube in the transmission path may be controlled.

In the present computer, this change in sensitivity is found to be negligible for ranges of less than 10,000 yards.

A grounded source of direct voltage 3934, Fig. 36, is connected to ground through two parallel paths: resistor 3937 and the winding of card 1705, potentiometer PT17, and the winding of card 1704 and resistor 3935. The brush associated with card 1705 is aligned with brush 3604, is connected to ground through the load resistor 3938, and is connected to the lower break spring of relay RY15. The brush associated with card 1704 is aligned with brush 3691, is connected to ground through the load resistor 3936 and is connected to the lower make spring of relay RY15. The winding of card 1705 is grounded at the points corresponding to 0 and 10,000 yards, so that no voltage is delivered in this region. The winding of card 1705 extends over about 0 to 13,500 yards, the remainder of the card being blank. Thus, between 10,000 yards and 13,500 yards, the brush associated with card 1705 delivers a voltage through the springs of relay RY15 to connection 3925. The winding of card 1704 extends over the region from 13,000 to 36,000 yards, but is connected to the source 3934 at the points corresponding to 23,000 and 36,000 yards, so that a constant voltage is delivered in this region. Relay RY15 operates at about 13,500 yards, thus the brush associated with card 1704 delivers to connection 3925 a voltage which rises between 13 500 yards and 23,000 yards and is constant between 23,000 yards and 36,000 yards.

Connection 3925 is connected to the gain controls of the motor amplifiers MA29, MA12, Fig. 39.

The fully automatic operation of the computer, with radar ranging and optical pointing and training has been given above. The various controls, switches, relays, etc. for placing the computer in operation, and the modifications of the circuits and apparatus for other types of fire will now be described.

The various controls are used for the following purposes:

(1) To arrange the circuits as required for the desired mode of operation.

(2) To introduce quantities required for the initial conditions of operation.

(3) To control the automatic correction of rates, and to introduce the required corrections for non-automatic correction of rates.

(4) When computer is not in use, to disable the drive of certain potentiometers by the stable element, and to enable these drives in synchronism with the stable element.

(5) To introduce quantities normally received by synchronous receivers; and to transmit by synchronous transmitters to the guns, certain quantities normally computed by the computer.

(6) To make certain tests.

Certain adjustments are made by means of knobs mounted on the covers, others by rotary and lever switches and synchronizing latches.

The MC, RC, RO and AS rotary switches are operated by the usual knobs and pointers, are heavily detented to prevent accidental operation and are attached by simple dog clutches to the switch shafts.

The BC and SF switches are operated by simple handles, mounted in recesses in the covers, which actuate simple locking type switches bearing on the switch levers.

The handles of the ST, IM, BM, EM, RM switches are similar to the handles of BC and SF switches, but the switches controlled are non-locking.

*Main control, MC switch, 4 position rotary*

Controlled by knob 1100, Figs. 11 and 12, sections 1, 5, 8, 9, 10 shown on Fig. 18, sections 2, 3, 6, 7, 13 shown on Fig. 19, sections 4, 12, 14, 15, 16 shown on Fig. 20.

POSITION 1.—OFF

In this position, circuit to plate supply contactor in power supply unit is open, preventing the application of plate voltage to the amplifiers and oscillators in the computer; and the circuits to the exciting windings of the motors are open.

POSITION 2.—STABILIZE

In this position, only enough of the computer mechanism is energized to drive the stable element in train and to transmit a motion proportional to $L+Zd/30$ to the director, to stabilize the director while tracking or searching for a target with radar equipment at ranges beyond the range limit of the computer.

In Fig. 18, the power supply is connected through switch MC10, second position through the plate supply contactor in the power unit, the safety switches 1837 closed by protective covers on the doors supporting the amplifier equipment, switch MC9, second position to the power supply. The plate supply contactor connects the rectifiers in the power unit to the plates of the amplifiers and oscillators in the computers. The switches 1837 prevent the application of plate voltage to the amplifiers when the doors supporting the amplifiers have been opened to examine or repair an amplifier, thus protecting the personnel.

In Fig. 20, the power supply is connected through switch MC12, second, third and fourth positions, to the exciting winding of the $B'r$ motor MO19. The motor MO19 Fig. 27, is thus rotated in synchronism with the receivers SY3 and SY4. The motor MO19, Fig. 17, rotates shaft 1725, driving the stable element in train. The shaft 1729, Figs. 17, 16, drives the transmitters SY27, SY28, to cause a rotation proportional to $L+Zd/30$ at the director. Switch MC4, Fig. 20, in position 2 short-circuits the primary winding of transformer TR2, the energizing circuit of which is open at switch MC14, to the $Eb$ motor MO18 to retard any movement of this motor.

A circuit is completed from the power supply, Fig. 18, through switch MC1, second position, relay RY17, switch MC9, second position, to power supply, operating relay RY17. A circuit is completed from power supply through switch MC10, second position, relay RY18, break contacts of stop time ST switch 1838, switch MC5, second position, switch MC9, second position to power supply operating relay RY18.

The operations of relays RY17, RY18, Fig. 28, disconnects the leads from the brushes associated with cards 5606, 5706, 5806 and connects taps in the windings of these cards to the oscillators 2825, 2836, 2838, so that these oscillators generate voltages having a frequency of sixty cycles, the same as oscillator 2832. Motors MO30 to MO35, inclusive, are thus all driven at the same speed, and the shafts 1404, 1606, 1507 are not rotated. The motion of shaft 1729 is thus transmitted by differential gear DF3 unchanged to transmitters SY27, SY28.

Normally, the level L dials 1614, 1615, Fig. 16, and the level L potentiometer PT2 are driven by the shaft 1719 from the stable element, through gearing 1600, 1621, 1630 and differential gear DF37. The planet gears of differential gear DF37 are geared to shaft 1616, and this shaft is normally held motionless by the latch 1617 controlled by the latch lever 1618, Figs. 11 and 16. In the stabilize position, the latch lever is turned to "Out" releasing the latch 1617 and permitting shaft 1616 to rotate. The friction load of potentiometer PT2, dials 1614, 1615 and the apparatus driven by shaft 1603 is much larger than the load of shaft 1616, thus, when the latch 1617 is "Out," the motion of shaft 1719 will be transmitted by differential gear DF37 to shaft 1616 and dial 1619 and shaft 1603 and the brushes of potentiometer PT2 will be at rest, reducing the wear on the potentiometers. The dial 1619 will register what rotation of shaft 1719 has occurred since the latch was turned to "Out." Even if some slight movement of the brushes of potentiometer PT2 should occur, this movement will be subtracted from the registration of dial 1619, so that dial 1619 always registers the difference between the rotations of shaft 1719 and the brushes of potentiometer PT2. To resynchronize the system the lever of the type A knob 1620, Figs. 11 and 16, is folded forward, clutching the knob 1620 to shaft 1616. The knob 1620 is rotated, adding a motion to the motion of shaft 1719 which is transmitted by differential gear DF37 to potentiometer PT2, shaft 1623 and dials 1614, 1615 until dial 1619 is rotated back to zero, indicating that synchronism has been attained. The lever knob 1618 is turned to "In" engaging the latch 1616, and the lever of knob 1620 is folded back.

Similarly, the lever 1748, Fig. 17, when turned to "Out," opens the latch 1751, releasing the shaft 1747 so that the train B'r shaft 1725 rotates the dial 1749 and the brushes of potentiometer PT4 are at rest. The system is resynchronized by the type A knob 1750. Lever knob 1748, dial 1749 and knob 1750 are also shown in Fig. 11.

In the same way, the lever knob 1758, dial 1759, and type A knob 1760 control the synchronizing of the Zd potentiometer PT3 and the dials 1754, 1755, with the shaft 1715. Dials 1754, 1755, knob 1758, dial 1759 and knob 1760 are shown in Fig. 11.

In the present computer, the gearing of the stable element is so chosen that full revolutions of the shafts 1715, 1719, 1725 are respectively equal to 3 degrees of Zd, L and Br. The computer is designed to handle variations of ±25.5 degrees in Zd and L, and of 360 degrees in Br. The dials 1759, 1619, 1749 are geared so that complete revolutions of the dials represent 108 degrees of Zd and L, and 360 degrees of Br, thus, the complete variation of any of these quantities will not cause more than one revolution of the corresponding dial. The shafts 1757, 1616, 1747, respectively, make full revolutions for values of 3 degrees of Zd and L, and 10 degrees of Br. To restore the system to synchronism, it may be necessary to turn the synchronizing knobs 1760, 1620, 1750 through a number of revolutions before the corresponding dials 1759, 1619, 1749 are restored to zero, thus, in effect, giving a fine and coarse control of the synchronization.

Power is supplied through switch MC7, Fig. 19, in positions 3 and 4 to the exciting windings of the dE motor MO27, the Ct motor MO6, the jB'r motor MO1, the dR motor MO26 and the dB motor MO28.

Power is supplied through switch MC13, Fig. 19, in positions 3 and 4 to the exciting windings of the dH motor MO8 and the Sh motor MO7, and depending upon the conditions of relays RY25, RY31, RY30 to the exciting windings of the jR motor MO3, the jE motor MO4 and the jB motor MO2, or to the dummy loads formed by the resistors 1920, 1921, 1922.

Power is supplied through switch MC14, Fig. 20, in positions 3 and 4 if the Rj and Dj switches are not operated to the exciting windings of the Rj and Dj motors and if the E switch is not operated and the switch RC11 is in positions 1, 2 or 3 to the exciting winding of TR2.

Power is supplied through switch MC15, Fig. 20, in positions 3 and 4 to transformer TR6, supplying the exciting winding of the So motor MO24; and, if the Vj and Co switches are not operated, to transformers TR5, TR7 supplying the exciting windings of the Vj motor MO23 and the Co motor MO25.

Power is supplied through switch MC16, Fig. 20, in positions 3 and 4 to transformers TR8, TR9 and TR10.

When the main control MC switch is in the second, or stabilize position, the lever knobs 1618, 1748, 1758, Fig. 11 should be in "Out" position to reduce wear on the L, B'r and Zd potentiometers.

Before the MC switch is moved to the third position, the knobs 1620, 1750, 1760 must be manipulated to bring the dials 1619, 1749, 1759 into synchronism, and the latch knobs 1618, 1748, 1758 turned to "In."

POSITION 3.—RATE CONTROL

In this position of the MC switch, only the mechanism for director tilt correction, and for operation of the rate system is energized. This permits a target beyond the range of the computer to be tracked with rate control and correction, without causing any wear on the potentiometers used only in the computation of prediction, ballistics, gun orders, etc.

The circuit to the plate supply contactor, through switches MC10, MC9, Fig. 18, is maintained in the third and fourth positions of the main control MC switch.

The excitation circuit for the B'r motor, MO19, Fig. 20, through switch MC12 is maintained in the third and fourth positions of the main control MC switch, the bridging contacts of the switch lever insuring that the circuit is not opened during the switching.

Power is supplied through switch MC6, Fig. 19, to the limit switches of the jB' motor MO1, Fig. 27, the E'g motor MO12 and the Dd motor MO29, Fig. 39, and the target angle A switch, Fig. 29, for slewing the Ct motor MO6.

The circuit of relay RY17, Fig. 18, is opened by switch MC1 and the circuit of relay RY18 is opened by switch MC5, releasing relays RY17 and RY18, connecting the brushes of potentiometers PT56, PT57, PT58, Fig. 28, to the oscillators 2825, 2836, 2838 and causing motors MO30, MO32, MO34 to commence generating the motions ΔcR, ΔcE, ΔcB.

A circuit is prepared through switches MC8 and MC9 for the operation of relays RY15, RY16, RY25 and RY29 by the range limit switches LS111, LS112, LS113, controlled by the cam nut on the generated range shaft.

A circuit is prepared through switches MC8, RC10, and the target angle A switch 1811, in the director, for the operation of relays RY26, RY27. Circuits are also operated through switches MC8, RC10 for respectively operating relays RY1, RY2, RY21, RY3 and lighting signal lamps 1825, 1830, 1835 when the keys 1806, 1807, 1808 at the director, or the keys 1841, 1842, 1843 at the computer are operated; for operating relays RY22, RY23, RY24 and lighting lamp 1845 when the initial match key 1844 is operated; for the operation of relay RY30 through switch RC7; and for the operation of relay RY31 through key 1817 and switches AS6, RC8 and MC9.

POSITION 4.—ON

In this position the entire computer is operative. The various circuits closed by the operation of the MC switch to the fourth position have previously been described in connection with the detailed circuit descriptions.

*Rate control, RC, switch*

A four-position rotary switch, operated by knob 1108, Figs. 11 and 12, and having sections 1 to 10, Fig. 18; sections 12, 13, 14, Fig. 30, and sections 15, 16, Fig. 27. This switch is used to prepare circuits as required for solution of rate control and for "Local" operation.

In all positions, except the "Local" four position, this switch prepares the following connections:

(*a*) Switch RC11, Fig. 20, prepares a circuit to transformer TR2 for the excitation of the E*b* motor MO18; this circuit is completed when the E switch 2010 is closed and switches MC4, MC14 are in the third, "Rate control" or fourth, "On" positions.

(*b*) The circuit is completed from the synchronous receivers SY3, SY4, Fig. 27, to the follow-up amplifier MA19, putting the B'*r* follow-up motor MO19 under the control of the receivers.

(*c*) The circuit is completed from the sources 1930, 1931, Fig. 30, to the ring dials 1530, putting the jB motor MO2 under the control of the ring dials 1530; provided that switch MC13, Fig. 19 is in the third or fourth position, and relay RY30 is operated, so as to connect the exciting winding of motor MO2 to the sources 1930, 1931. The operating circuit of relay RY30, Fig. 18 is from the power supply, switch MC8, third or fourth positions, switch RC10 first, second, third positions, winding of relay RY30, switch RC7, first position, or switch 1841 and switch RC7, second and third positions, switch MC9, second, third and fourth positions to power supply.

POSITION 1.—AUTOMATIC

In this position, as described in detail hereinbefore, the rate correction circuits are controlled by the range selector switch 1805, Fig. 18, the director slew key 1810, the range rate keys 1808, 1809, the elevation rate key 1807 and the bearing rate key 1806, all under the control of the director operators.

POSITION 2.—SEMIAUTOMATIC

In this position the matching and rate correction circuits are under the control of the computer personnel.

The bearing match switch 1841, elevation match switch 1842, and range match switch 1843, Figs. 12 and 18 are three-position, non-locking switches, respectively controlled by the lever knobs 1133, 1131, 1132, Figs. 11, 12.

The circuit from switch 1806 to relay RY1 is opened by switch RC6, and the circuit to relay RY30 is opened by switch RC7, thus preventing operation of these relays by the director personnel.

Circuits are prepared from power supply through switches MC8, RC10, thence through the winding of relay RY1, the upper make springs of switch 1841 and switches RC3, MC9 to power supply; and through the winding of relay RY30, the center make springs of switch 1841, and switches RC7, MC9 to power supply. The operation of switch 1841 to the upper, or match and rate position, will operate relays RY1 and RY30; the operation of switch 1841 to the lower, or match position, will operate only relay RY30.

The operation of relay RY1, Fig. 30, connects the bearing ring dials 1530 to the rate correction circuits, to produce desired corrections in the quantities S*h*, *d*H, C*t*, and the rates *d*R, *d*E, *d*B.

The operation of relay RY30, Fig. 19, supplies excitation to the *j*B motor, MO2, Fig. 30, so that, under the control of the ring dials 1530, this motor will produce a rotation *j*B to match the ring dials.

Whenever the trainer at the director is trained on the target, he operates switch 1806, completing a circuit from power supply through switches MC8, RC10, resistor 1827, bearing signal lamp 1825 in parallel with resistor 1826, switches RC6, 1806 to power supply, lighting signal lamp 1825 to notify the computer personnel thus providing a guide to the operation of switch 1841.

The circuit from switch 1807 to relay RY2 is opened by switch RC5 and the circuit to relay RY31 is opened by switch RC8, to prevent operation by the director personnel.

Circuits are prepared from power supply through switches MC8, RC10, 1817, AS6, thence through the winding of relay RY2, the upper make springs of switch 1842, switches RC4, MC9 to power supply; and through the winding of relay RY31, the center make springs of switch 1842, switches RC8, MC9 to power supply. The operation of switch 1842 to the upper, or match and rate position, will operate relays RY2 and RY31; the operation of switch 1842 to the lower, or match position, will operate only relay RY31.

The operation of relay RY2, Fig. 30, connects the elevation ring dials 1403 to the rate correction circuits.

The operation of relay RY31, Fig. 19, supplies excitation to the *j*E motor, MO4, Fig. 30, so that, under the control of the ring dials 1403, this motor will produce a rotation *j*E to match the ring dials.

The operating circuit of relays RY2, RY31, is prepared by the elevation switch 1817 and the aircraft surface switch AS6. If either of these switches is operated, as for example in fire at a surface target, match and rate corrections in elevation are prevented.

POSITION 3.—MANUAL

In this position, the circuit of rate correction relay RY1, Fig. 18, is opened by switches RC6, RC3; the circuit of relay RY2 is opened by switches RC4, RC5; and the circuit of relay RY3 is opened at switch RC2, thus disabling the rate correction system.

Circuits are prepared from power supply, Fig. 18, switches MC8, RC10, winding of relay RY30, switches 1841, RC7, MC9 to power supply; from power supply, switches MC8, RC10, key 1817, switch AS6, winding of relay RC31, switch 1842, switches RC8, MC9 to power supply; from power supply, switches MC8, RC10, key 1822, limit switch LS113, winding of relay RY25, switch 1843, switches RC9, MC9 to power supply. The operation of the bearing match BM switch 1841 operates relay RY30; the operation of the elevation match EM switch 1842 operates relay RY31; and match and rate corrections in elevation and in bearing are prevented.

The operation of the range control circuit with the radar range finder in semiautomatic operation will be described at this time, and the operation with the optical range finder will be described below. The radar-optical RO switch will be in the first or second position for radar range use.

A circuit is prepared from ship's power through switches MC8 in positions 3 or 4, RC10 in positions 1, 2 or 3, range knob switch 1822, LS113; thence by two parallel paths, one through the winding of relay RY3, lower break springs relay RY28, switch RC2 in position 2, upper make springs of range match switch 1843, switches RO1 in positions 1 or 2, MC9 to power supply; and the other through winding of relay RY25, center make springs of switch 1843, switches RC9, MC9 to power supply. The operation of switch 1843 to the upper, or match and rate position, will operate relays RY3 and RY25; the operation of switch 1843 to the lower, or match position, will operate only relay RY25.

The operation of relay RY3, Fig. 30, connects the range ring dials 1430 to the rate correction circuits.

The operation of relay RY25, Fig. 19, supplies excitation to the $j$R motor MO3, Fig. 30, which, under the control of the ring dials 1430 produces a rotation $j$R to match the ring dials.

If the ranger at the director sets switch 1805, Fig. 18, to the type of range finder in use, and operates the corresponding switch 1808, or 1809, a circuit is completed from power supply through switches MC8, RC10, winding of relay RY21, switches 1805, 1808, 1809 to power supply, operating relay RY21. The operation of relay RY21 removes a shunt from the range signal lamp 1835, lighting the signal lamp 1835 to notify the computer personnel that the range finder at the director is set to target range, thus providing necessary information for the operation of switch 1843.

The operation of relay RY30, Fig. 19, connects the power supply to the exciting winding of the $j$B motor MO2; the operation of relay RY31 connects the power supply to the exciting winding of the $j$E motor MO4; and the operation of relay RY25 connects the power supply to the exciting winding of the $j$R motor MO3.

With the motors MO2, MO4, MO3, Fig. 30, excited, the ring dials 1530, 1403, 1430 will control these motors to match the rotations of shafts 1511, 1402, 1405 to the rotations of shafts 1721, 1604 and receivers SY5, SY6.

When the dials are matched, the matches may be maintained by manipulation of the S$h$, $d$H and C$t$ switches, Fig. 29, controlling the S$h$ motor MO7, the $d$H motor MO8 and the C$t$ motor MO6.

POSITION 4.—LOCAL

In this position, the circuits of the computer are modified for operation when data from the director is not available, due to the director, or the synchronous transmissions therefrom, being out of service.

For fire against surface targets, the knob 1106, Fig. 11, may be turned, operating the $d$H switch, Fig. 29, to slew the $d$H motor MO8 to zero, as shown by the dial 1139, Figs. 11 and 14.

The type A elevation E knob, 1109, Figs. 11, 12, 14, 18, 20 first operates switches 1817, Fig. 18 and 2010, Fig. 20. The operation of switch 1817, Fig. 18, opens the operating circuit of relays RY2 and RY31, preventing the transmission, to the rate correction circuits, of voltage from the E ring dials 1403, Fig. 30; and preventing the application of power to the exciting winding of the $j$E matching motor MO4, Figs. 19 and 30. The operation of switch 2010, Fig. 20, prevents the application of power to the exciting winding of the E$b$ follow-up motor MO18.

The operation of knob 1109, Fig. 14, connects the knob to the driven shaft, and applies a friction brake to the shaft, thus braking shaft 1624. For fire against surface targets, the knob is turned until the dials 1420, 1421 read zero. For fire against aircraft targets, the $d$H switch, Fig. 29, may be operated to slew the $d$H motor MO8 to a desired value of $d$H, thus causing the shaft 1606, Fig. 14 to rotate proportionally to the generated elevation $\Delta c$E and the knob 1109 may be continually manipulated to keep the dial 1420 matched with the dial 1431.

With shaft 1624, Fig. 16, braked, the motion of shaft 1623, proportional to the level L can back up through the differential gear DF1 into the motor MO18, rotating shaft 1622 proportionally to $Eb=E+L$. The shaft 1609 is rotated by motor MO12 proportionally to E$'g$, and this motion is combined in differential gear DF33 with the motion of shaft 1622, thus, shafts 1631, 1613 and the synchronous transmitter SY24 are rotated proportionally to $Vs=E'g=Eb$.

The type A range R knob 1110, Figs. 11, 12, 14, 18, first operates switch 1822, Fig. 18, opening the operating circuit of relays RY3 and RY25, preventing the transmission, to the rate correction circuits, of voltage from the ring dial 1430, Fig. 30; and preventing the application of power to the exciting winding of the $j$R matching motor MO3, Figs. 19 and 30.

The operation of knob 1110, Fig. 14, connects the knob to the driven shaft 1411, and applies a friction brake to this shaft. The shaft 1437 is rotated by motors MO30, MO31 proportionally to $\Delta c$R, and is geared to differential gear DF10. The shaft 1411 is also geared to differential gear DF10, thus, by manipulation of knob 1110, shaft 1405 may be rotated to any desired value of $c$R, as shown by dials 1426, 1436.

The ship's power supply is connected through switch MC16, Fig. 20 to the primary winding of transformer TR9. The secondary winding of transformer TR9 is grounded through resistors 2015, 2016 and is connected by connections 2018, 2017, to the fourth contacts of switches RC12, RC13, Fig. 30.

The operation of switches RC12, RC13 to the fourth position disconnects the ring dials 1530 from the sources 1930, 1931 and connects them to the connections 2018, 2017.

The operation of switch RC14 disconnects the ring dials 1530 from the winding of card 712, potentiometer PT71, thus preventing operation of the $j$B matching motor MO2.

The operation of switches RC15, RC16, Fig. 27 to the fourth position disconnects the follow-up amplifier MA19 from the synchronous receivers SY3, SY4 and connects it by connection 3044, and resistor 3043, Fig. 30, to the fine dial of the ring dials 1530, so that motor MO19, Figs. 17 and 27 will drive to keep the ring dials matched since Br is introduced manually onto the jB shaft.

The operation of the type A relative bearing Br knob, 1111, Figs. 11, 12 and 15, connects the knob to shaft 1536, which is connected by gearing 1512 to differential gear DF8. Shaft 1507 is rotated by motors MO34, MO35 proportionally to ΔcB, and this rotation is combined in differential gear DF5 with a rotation of shaft 1502 proportional to Co, to produce a rotation of shaft 1510 proportional to ΔcBr. The knob 1111 is manipulated to produce a rotation of shaft 1536 proportional to jB and this rotation is combined in differential gear DF8 with the rotation of shaft 1510 to produce a rotation of shaft 1511 proportional to $cBr=\Delta cBr+jR$. The ring dials 1530 drive motor MO19, Fig. 17, to keep the dials matched, so that the rotation of shaft 1721, proportional to Br, is equal to cBr. The rotation of shaft 1721 is combined in differential gear DF2 with the rotation proportional to jB'r of shaft 1712, thus the rotation of shaft 1708, and motor MO19, is proportional to $$B'r=\Delta cBr+jR-jB'r$$

and this rotation drives the stable element in train.

Switches RC5, RC6, RC7, RC8, RC9, RC10, Fig. 18, prevent the operation of signal lamps 1830, 1825, relays RY30, RY31, RY25 signal lamp 1835 and relays RY26, RY27, RY1, RY2, RY3.

The radar-optical RO switch is a three-position rotary switch, operated by knob 1112, Figs. 11, and 12, and having four sections RO1, RO2, RO3, RO4, Fig. 18.

In general, the changes in radar range data are supplied continuously to the computer; whereas the optical range finder is only adjusted when the ranger detects an error in coincidence, thus, the changes in optical range data are discontinuous, when the ranger is satisfied with the adjustment of the optical range finder, he operates key 1808 to notify the computer personnel. The radar optical switch modifies the circuits of the computer to handle the data most advantageously.

POSITION 1.—RADAR RANGE, RADAR TRAIN AND ELEVATION

In this position, switches RO1, RO2 place relay RY3, and switch RO3 places relay RY25, under the control of the range rate key 1809, in the director, or the range match key 1843 in the computer, in a manner similar to the control of relays RY1 and RY30 by keys 1806 and 1841 and the control of relays RY2 and RY31 by keys 1807 and 1842. Switch RO4 maintains the circuit to the dive attack clutch 1847 which will be described later.

POSITION 2.—RADAR RANGE, OPTICAL TRAIN AND ELEVATION

The circuits in this position are the same as in position 1.

POSITION 3.—OPTICAL RANGE, OPTICAL TRAIN AND ELEVATION

After selection of a target, the director and range finder are slewed to the target. During this slewing operation, very large changes in the bearing elevation and range rates may be produced, thus any correction of the rates during a slew will be impractical. However, the time required to adjust the computer will be decreased if the range ring dials are matched during the slew. During optical ranging, the range selector switch 1805, Fig. 18, is operated to the switch 1809. In order to prevent matching in elevation and bearing during a slew, the director slew key 1810 may also be operated.

By means of knob 1113, Figs. 11, 12, the initial match, IM, switch 1844, Fig. 18, is operated by the computer operator. With the MC switch in fourth position, and the RC switch in first, second or third position, that is, any position but the fourth "local" position, a circuit is completed from the power supply through switches MC8, RC10, 1822, LS113, RO4, the windings of relays RY23, RY24 in parallel, switches 1844, MC9, operating relays RY23, RY24. Relay RY23 locks up through the break springs of relay RY22 and the make springs of relay RY23; relay RY24 locks up through the break springs of relay RY22 and the make springs of relay RY24. A circuit is also completed from power supply through switches MC8, RC10, 1822, LS113, RO4, resistor 1846, signal lamp 1845 in parallel with the break springs of relay RY24, switch MC9 to power supply. The operation of relay RY24 removes the short circuit and lights signal lamp 1845, Figs. 11 and 18.

Relay RY3 has an operating circuit from relay RY3, break contacts of relay RY28, switches RC2, RO2, break contact of relay RY23, switches RC1, RO3, make contact of relay RY24 which is prepared by the operation of relay RY24, but opened by the operation of relay RY23, to prevent the operation of relay RY3, thus preventing the transmission of voltage from the range ring dial 1406, Fig. 30, to the rate correction circuit.

When the rate control RC switch is in the second, "semi-automatic" or third, "manual" position, the operation of relay RY23 completes a circuit from power supply through switches MC8, RC10, 1822, LS113, relay RY25, lower make springs relay RY23, switch RC9, switch MC9 to power supply, operating relay RY25, to supply power to the exciting winding of the jR motor MO3, Fig. 19.

When the rate control RC switch is in the first, "automatic" position, the operation of relay RY24, Fig. 18, completes the above circuit through switches RC1, RO3, make contact of relay RY24. Thus, for all positions of the RC switch, except the fourth, "local" position relay RY25 is operated, supplying excitation to the jR motor MO3 to produce continuous matching of the ring dials, while holding relay RY3 unoperated so that rate correction is prevented.

When the slew is completed and the ranger is satisfied with the setting of the range finder on the target, he operates the optical range mark key 1808, Fig. 18, completing a circuit from the power supply through key 1808, switch 1805, relay RY21, switches RC10, MC8 to power supply, operating relay RY21.

The operation of the break springs of relay RY21 removes the short circuit from the range signal lamp 1835, Figs. 11 and 18, lighting this lamp to signal that the optical range key 1808 is operated. The operation of the lower make springs of relay RY21 completes a circuit in parallel with the lower break springs of relay RY22 to keep relays RY23, RY24 locked up. The operation of the upper make springs of relay RY21 completes a circuit from the power supply through switches MC8, RC10, 1822, LS113, RO4, relay RY22, upper make springs of relay RY21, switch MC9 to power supply operating relay RY22, which locks up through the upper make contact of relay RY22 and the upper make contact of relay RY24, and at the lower break springs opens the circuit through which relays RY23, RY24 were operated.

When the mark key 1808 in the director is released, relay RY21 is released, the upper make springs placing a short circuit across the signal lamp 1835, and the lower break springs opening the locking circuit of relays RY23, RY24, releasing relays RY23, RY24.

The release of the upper make springs of relay RY23 opens the locking circuit of relay RY25, which releases, removing the excitation from motor MO3, Fig. 19, stopping the ring dial matching. The upper break springs prepare a path for the subsequent operation of relay RY3, so that subsequently corrections from the range ring dials may be connected to the rate correction circuit.

The release of the upper make springs of relay RY24 opens the locking circuit of relay RY22, releasing RY22. The release of the lower break springs of relay RY24 short-circuits the signal lamp 1845, extinguishing the signal lamp to indicate that the initial matching condition has ended.

Each subsequent operation of the mark key 1808 will operate relay RY21, lighting the signal lamp 1835, and incidentally operating relay RY22. The operation of relay RY22 is now without effect, as relays RY23, RY24 are released.

With the rate control switch in the first "automatic" position, the operation of relay RY21 completes circuits from power supply through switch MC9, upper make springs relay RY21, upper break springs relay RY24, switches RO3, RC1, relay RY25, and through upper break springs relay RY23, switches RO2, RC2, upper break springs relay RY28, relay RY3, thence through switches LS113, 1822, RC10, MC8 to power supply operating relays RY3, RY25. The operation of relay RY3, Fig. 30, connects the ring dial 1430 to the rate correction circuit; and the operation of relay RY25, Fig. 19, supplies excitation to the $f$R matching motor MO3, thus matching the ring dials, and correcting the rates as long as the mark key 1808, Fig. 18 is closed.

With the rate control RC switch in the second "semi-automatic" or third "manual" positions, if the mark key 1808 is closed operating relay RY21, the only useful effect will be to light the range signal lamp 1835.

If the initial match key 1844 is inadvertently operated after the closure of key 1808 has operated relays RY21, RY22, relays RY23, RY24 will operate, but will not lock up, since their locking path is opened at the lower break springs of relay RY22, thus the signal lamp 1845 will fail to light. As the circuit of relay RY3 is then opened at the upper break springs of relay RY23, rate correction will be prevented while key 1844 is manually held operated.

*Aircraft-surface AS switch*

The aircraft surface switch is a three-position rotary switch, controlled by knob 1114, Figs. 11, 12, and having sections AS5, AS6, Fig. 18, sections AS2, AS3, Fig. 34, and sections AS1, AS4, Fig. 36. This switch is used (*a*) to control the fuze setting order to permit the use of combined time and contact fuze action against aircraft targets, and of contact fuze action only against surface targets; (*b*) to control the correction for vertical parallax to modify the position of the reference point for certain types of selected level operation; and (*c*) to disable the elevation rate correction circuits and elevation ring dial matching when fire is directed at surface targets.

POSITION 1.—AIRCRAFT

In this position, the operation of the fuze setting circuit is as previously described. The $Fg$ motor MO11, Fig. 34, positions its shaft proportionally to the dead time correction; time of flight, T$f$ voltage is supplied by connection 3439 to the input circuit of motor amplifier MA9, causing the F2 motor MO9 to position its shaft proportionally to $F2=Tf$, thus setting the synchronous transmitters SY21, SY22 to the proper fuze order $F=F2+Fg$ for time fuzes. A positive voltage, H$p$, of magnitude proportional to the height of the director above the mean gun plane, is supplied by the source 1930, Fig. 36, to the input circuit of the line amplifier LA36, to correct the W components of the advance and virtual positions for the effect of virtual parallax when the target elevation is computed with respect to the director, as is the case in fire at aircraft targets. The circuit to the relays RY2, RY31, Fig. 18 is prepared at switches AS5, AS6, permitting their operation as required to give rate correction and dial matching in elevation.

POSITION 2.—SURFACE DIRECTOR

In this position, the computer is adapted for fire with contact fuzes against surface targets and the gun orders are based upon target elevation as measured at the director.

A circuit is completed from the power supply through switch MC1, Fig. 18, windings of relays RY5, RY6, in parallel, switch AS5, switch MC9 back to power supply, operating relays RY5, RY6.

The operation of relays RY5, RY6, Fig. 32, breaks the connections to the brushes of the potentiometer PT28, and grounds the connections to line amplifiers LA31, LA40, and to motor amplifier MA11, Fig. 34, thus, in effect making the range rate $d$R and the advance range rate $d$R2, zero so far as MA11 is concerned and causing motor MO11 to rotate the position $Fg=O$.

The operation of switches AS2, AS3, Fig. 34, grounds the connection 3439 through resistor 3428, and grounds the source 1931 through resistors 3430, 3427. The junction of resistors 3430, 3427 is connected through resistor 3438 to the input circuit of motor amplifier MA9, and applies a voltage proportional to the longest time of the fuze, in the present case, to 50 seconds, thus causing motor MO9 to rotate the transmitters SY21, SY22 to the position representing 50 seconds. The fuze order thus transmitted to the fuze setter receivers causes the receivers to set the fuzes in the "safe" position, thus disabling the time fuze, and leaving the burst of the shell under the control of the contact fuze.

The vertical parallax H$p$ voltage is unchanged, so that the gun orders will be based on elevation measured at the director.

The operating circuit of relays RY2, RY31, Fig. 18, is opened by switch AS6, to prevent any inadvertent rate correction or dial matching based on the elevation component of target position.

POSITION 3.—SURFACE STABLE ELEMENT

The fuze setter is driven to the "safe" position by the operation of switch AS5, Fig. 18, and switches AS2, AS3, Fig. 34; and the operating circuit of relays RY2, RY31 is held open by switch AS6, Fig. 18.

Facilities are provided in the stable element whereby the level, or cross level, shaft may be locked at a selected angle, such as zero, and a firing switch will be operated by the stable element when the motion of the ship causes the plane through the stable element parallel to the deck plane to pass through this selected value.

In firing with level, or cross level, selected at the stable element, the vertical parallax should be measured down from the plane of the mean gun to the water level. The switches AS1, AS4, Fig. 36, ground the source of negative voltage 1931 through resistor 3671 and resistors 3669, 3672. The junction of resistors 3669, 3671 is connected to the input circuit of the line amplifier LA32, and supplies a negative voltage, *Hp*, proportional to the vertical parallax from the plane of the mean gun to the water line, to correct the W components of the advance and virtual positions of the target.

*Standby controls*

These controls may be used to preset certain values when the computer is standing by, or to introduce certain quantities when the computer is controlled locally by the computer personnel, due to disablement of the associated devices or the synchronous transmission systems.

*Bearing Br knob*

As previously described, knob 1111, Figs. 11, 12, is used to set in a desired value of bearing when transmission from the director is inoperative. With the rate control, RC, switch in fourth, "Local," position, the knob 1111, when engaged drives the *j*B shaft, 1536, to control, through the ring dials 1530, the B'*r* follow-up motor MO19.

*Elevation E knob*

As previously described, knob 1109, Figs. 11 and 12, is used to set in a desired value of elevation in controlling fire against surface targets, or when transmission from the director is inoperative. The knob, when engaged, opens the operating circuit of relays RY2, RY31, Fig. 18, to prevent rate correction and matching; opens the exciting circuit of the E*b* follow-up motor MO18, Fig. 20; and drives the *j*E shaft 1624, Fig. 12, to set the elevation to zero on the ring dials 1403.

*Range R knob*

As previously described, knob 1110, Figs. 11 and 12 may be used to set in a desired value of range when transmission from the director is inoperative. The knob 1110, when engaged, opens the operating circuit of relays RY3, RY22, RY23, RY24, RY25 and clutch 1847, Fig. 18, and drives the *j*R shaft 1411, Fig. 14, to set in a desired value of range on the ring dials.

The limit switch LS113, Fig. 18, is operated when the range shaft is driven past 35,000 yards, opening the operating circuit of relays RY3, RY25. The radar range is continuously transmitted to the synchronous receiver SY32, Figs. 12 and 14 and is indicated on the dial 1115, Figs. 11, 12 and 14. When this dial again indicates a range less than 35,000 yards, or transmission is switched to the optical range finder, knob 110, Figs. 12 and 14, is engaged and turned until the ring dials 1430 read below 35,000 yards, thus releasing the limit switch LS113, preparing the circuit for relays RY3, RY25.

*Ship speed So knob*

The ship speed knob So, 1422, Figs. 11, 13, 14, 42, as previously described, may be used to set in ship speed when normal transmission is inoperative.

*Ship course Co knob*

The type A ship course knob 1116, Figs. 11, 12, 15, 20, 29, is used to set in ship course when transmission from ship compass is inoperative, and operates switch 2014, Figs. 12, 15, 20 opening the exciting circuit of the follow-up motor MO25, Figs. 15, 20, 29; and engages shaft 1537, permitting a desired value of ship course Co to be set in on shaft 1537, as indicated on the ship dial 1534, Figs. 11, 15.

*Fuze F knob*

The type A fuze knob 1117, Figs. 11B, 13, 15, 19, is used to set in a fuze order for transmission to the guns if the computer fails, and operates switch 1916, Figs. 13, 15, 19, to cut off the excitation from the F2 motor MO9 and the *Fg* motor MO11, Figs. 19 and 34, and substitute the dummy load formed by resistor 1923; and engages shaft 1538, permitting a desired value of the fuze F to be set in on the counter 118, Figs. 11B, 13, 15 and the transmiters SY21, SY22 and setting the brushes of potentiometers PT63, PT67.

*Sight deflection Ds knob*

The type A sight deflection knob, 1119, Figs. 11A, 13, 14, 19, is used to set in a desired value of sight deflection for transmission to the guns if the computer fails. Knob 1119 operates switch 1918, Figs. 13, 14, 19, opening the exciting circuit of the Ds motor MO14 and substituting the dummy load formed by resistor 1924; and engages shaft 1443, Figs. 13, 14, permitting a desired value of sight deflection to be set in the computer, as indicated by the counter 1442, Figs. 11A, 14, and to be sent to the guns by the transmitter SY25, Figs. 13, 14.

*Sight angle Vs knob*

The type A sight angle knob 1120, Figs. 11A, 13, 14, is used to set in a desired value of the sight angle Vs for transmission to the guns if the computation of E'*g* fails. The knob operates switch 1917, Figs. 13, 14, 19, cutting off the excitation from the E'*g* motor MO12, short-circuiting the exciting winding to produce dynamic braking of motor MO12, and substituting the dummy load formed by resistor 1925. Knob 1120, Figs. 13, 14, engages shaft 1613, permitting a desired value of sight angle to be set in on the counter 1415, Figs. 11A, 13, 14, and the transmitter SY24, Fig. 16.

*Spot controls*

Range, elevation and deflection spot controls are provided, so that these quantities may be set into the computer locally if transmission of these quantities from the director is inoperative.

In some cases, as in repelling a torpedo bombing attack during an engagement with another ship, it may be desirable to temporarily divert guns of major caliber to repel the bombing attack, without diverting to this use, the directors and computers normally used for the control of these guns. The range, elevation and deflection spot controls, in conjunction with the ballistic correction BC switch may be used for this purpose. The circuits of the computer are thereby modified so that, in conjunction with suitable conversion tables, satisfactory gun orders for selected fuze operation may be given to the guns of major caliber.

*Range spot Rj knob*

The type A range spot knob 1122, Figs. 11A, 13, 14, 20, 37, operates switch 2011, opening the exciting circuit of the *Rj* follow-up motor MO21, Figs. 20, 37, to prevent the operation of this motor by the receiver SY7, and engages the shaft 1444, Figs. 13, 14, so that a desired value of range spot may be set in, as indicated by the dial 1409, Figs. 11A, 13, 14.

*Ballistic correction BC switch*

The ballistic correction switch 3753, Figs. 13, 37, is a two-position locking switch controlled by the switch knob 1121, Fig. 11A.

POSITION 1.—MAJOR CALIBER

In position 1, switch 3753 is operated to the upper contacts. The left-hand springs connect the source 1931 to ground, through resistors 3734, 3736 in parallel and resistor 3735, thus changing the voltage scale so that the lower section of the winding of card 1901 has a voltage drop proportional to 12,000 yards, and the right-hand springs open the circuit from the receiver SY7 to follow-up amplifier MA21 and short-circuit the input to follow-up amplifier MA21, thus disabling the control of motor MO21 by receiver SY7 to prevent the introduction of erroneous values of *Rj* from the director.

POSITION 2.—NORMAL

In position 2, as shown in Fig. 37, the source 1931 is connected to ground through resistor 3734 and resistors 3735, 3736 in parallel. In this position, both sections of the winding of card 1901 have voltage drops proportional to 1,800 yards. The receiver SY7 is connected to the input circuit of the follow-up amplifier MA21, so that motor MO21 may be controlled from the director.

In a typical computer, the two sections of the winding of card 1901 had resistances of about 5,680 ohms, resistors 3732, 3734 had resistances of about 29,250 ohms, and resistors 3733, 3735, 3736, respectively, had resistances of about 3,150, 8,070 and 5,160 ohms.

The dial 1409, Fig. 11A, is graduated ∓1,800 yards in black for the normal position of the BC switch, and +1,800–12,000 yards in red for use when the BC switch is in position 1.

*Elevation spot Vj knob*

The type A elevation spot knob 1123, Figs. 11A, 13, 14, 20, operates switch 2013, opening the exciting circuit of the *Vj* follow-up motor MO23, to prevent the operation of this motor by the receiver SY9, Figs. 13, 14, 43, and engages shaft 1445, Figs. 13, 14, so that a desired value of elevation spot may be set in, as indicated by dial 1124, Figs. 11A, 13, 14.

*Deflection Spot Dj knob*

The type A deflection spot knob 1125, Figs. 11A, 13, 14 20, 41 operates switch 2012, opening the exciting circuit of the *Dj* follow-up motor MO22, to prevent operation of this motor by the receiver SY8, Figs. 13, 14, 41, and engages shaft 1446, Figs. 13, 14, so that a desired value of deflection spot may be set in, as indicated by dial 1126, Figs. 11A, 13, 14.

*Stop Time ST Switch*

The stop time switch is used in testing to stop generation of ΔcB, ΔcE and ΔcR so that values desired for test purposes may be set in. The stop time switch is a two-position switch, operated by switch lever 1127, Figs. 11A, 12. In the normal position, the stop time switch 1838, Fig. 18, prepares a circuit for the operation of relay RY18, when switches MC5, MC10 are in the second, "stabilize" position, but, normally, for the third, "Rate control" and fourth "On" positions of switches MC8, MC9, MC10, holds open the operating circuit of relays RY17, RY18. With switches MC8, MC9, MC10 in the third or fourth position, and switch RC10 in the first, second or third position, the operation of switch 1838 completes a circuit from power supply, switches MC8, RC10, upper make springs of switch 1838 winding of relay RY17, switch MC9 to power supply, operating relay RY17; and from power supply, switch MC10, winding of relay RY18, lower make springs of switch 1838, switch MC9 to power supply, operating relay RY18. The operating of relays RY17, RY18, Fig. 28, as previously described, sets the frequency of the oscillators 2825, 2836, 2838 at 60 cycles and stops the rotations of the ΔcR shaft 1437, the ΔcE shaft 1606 and the ΔcB shaft 1507.

*Selected fuze operation*

When controlling the fire of major caliber weapons, or when the fuzes of the shells for the regular weapon are not continuously set by the automatic fuze setter, the fuzes may be preset to some convenient fuze numbers, the weapon loaded and, when the computed time of flight becomes equal to a selected fuze number, fired by the computer personnel. The firing of the weapon may conveniently be controlled by the firing keys which are furnished with the stable element. When firing with selected fuzes, the dead time *Tg* should be zero.

The dead time dial 1764, Fig. 11, has a zero mark, but is only graduated from 2.5 to 6 seconds. The zero dead time cannot conveniently be obtained by setting the brushes of potentiometer PT74 to zero, because the winding of card 743 varies with $$\frac{1}{Tg}$$

and unduly wide cards would be required. Thus, when the dead time *Tg* dial 1764 is turned to zero, a cam on the driven shaft operates switch 1816, Fig. 18, completing a circuit from power supply through switch MC1, windings of relays RY5, RY6 in parallel, switches 1816, MC9, back to the power supply, operating relays RY5, RY6. The operation of relays RY5, RY6, Fig. 32, cuts off the voltages normally supplied to the input circuit of line amplifier LA40, reducing the signal voltages supplied to the input circuit of motor amplifier MA11, Fig. 34, to zero, driving the *Fg* motor MO11 to zero position. The F2 motor MO9 is controlled to rotate to a position proportional to the time of flight *Tf*, thus the fuze order $F=Tf$. The computer operator watches the fuze number counter 1118, Fig. 11, and, when the selected fuze number is showing, presses the firing key to fire the gun.

*Defense against dive attack*

Dive attack by aircraft constitutes one of the grave dangers to ships in modern warfare. When the aircraft target begins a dive attack, the sudden change of course and speed changes all the components of target velocity and correspondingly changes the data to be used in prediction. In order for the aircraft to dive attack efficiently, it may be assumed that the aircraft will dive in a straight line towards the ship, that is, down the line of sight, and the prediction may be based on a single rate, the target speed Ss diving down the line of sight, which is a range rate. With the short time available for defense, the change from ordinary prediction must be made with the utmost speed; a dive attack switch is therefore provided in the director and the computing circuits are so arranged that when this switch is operated, all the rates in the computer resulting from prior use are discarded, and the prediction is based upon the value of the diving speed Ss. The value of Ss may be preset upon the known or estimated characteristics of a visible target or this rate may be automatically derived when radar range data is available during the dive. The fuzes of the shells may be continuously set by an automatic fuze setter, or the fuzes of a number of shells may be preset to different values and the shells having selected fuzes fired when the time of flight of the shell equals the fuze time.

The operation of the dive attack switch 1812, Fig. 18, completes a circuit from power supply through switch MC1, fourth position, through the windings of relays RY7, RY14, RY28, RY9, RY10, RY11, switch 1812 to power supply, operating these relays. A circuit is also completed through switch MC10, winding of relay RY18, switches 1838, MC5, 1812 to power supply, operating relay RY18. Another circuit is completed from power supply through switch MC1, resistor 1821, signal lamp 1820 and the break springs of relay RY28 in parallel, switch MC9 to power supply. The shunt on signal lamp 1820 is removed by the opening of the break springs of relay RY28.

Potentiometer PT73, Figs. 12, 14, 31, 36 may be manually preset by the type D knob 1128, Figs. 11, 12, 14, to the estimated value of the driving speed Ss of the target, as indicated on dial 1128, Figs. 11, 14.

The operation of relay RY7, Fig. 31, disconnects the sources 1931, 1930 from the $dH$ potentiometer PT16 and from the $Sh$ potentiometer PT7, grounds the source 1931 through resistor 3196, and grounds the source 1930 through resistor 3197, and through resistor 3199 and the winding of card 732, potentiometer PT73. The winding of card 732 provides a linear variation of voltage at the brush associated therewith which is connected through resistor 3480 to the input circuit of the motor amplifier MA26, controlling the $dR$ motor MO26.

The operation of relay RY14 disconnects the normal power supplies from the So potentiometer PT6, and grounds the winding of card 601 and connection 3127 through resistor 3198.

The operation of relays RY7, RY14, has thus replaced by the diving speed Ss, the rates $dH$, $Sh$, So normally used in controlling the $dR$ motor MO26. The operation of these relays has also cut off the inputs to the motor amplifiers MA27, MA28, controlling the $dE$ and $dB$ motors, MO27, MO28.

The operation of these relays also cuts off the power normally supplied by connections 3188, 3189, 3190, 3191, 3192 to the input circuit of line amplifiers LA31, LA40, Fig. 32. The brush associated with card 732, Fig. 31, is connected to ground by connection 3481, switch 1818, and resistors 3483, 3484, 3485. The junction of resistors 3484, 3485 is connected through resistor 3452 to the input circuit of amplifier LA40, and through resistor 3463 to the input circuit of amplifier LA31. The junction of resistors 3193, 3194, Fig. 31, is connected by connection 3482 through the upper break springs of relay RY5, Fig. 32, and resistor 3451 to the input circuit of amplifier LA40. The junction of resistors 3483, 3484 is connected by connection 3403 through resistor 3431, Fig. 34, to the input circuit of motor amplifier MA11. The effect of these changes is to replace with the diving speed Ss the advance range rate $dR2$ in Equation 29, so that the dead time correction, $Fg$, is properly computed for fire with continuous fuze setting.

In some cases, fire with selected fuzes against a diving target may be desired. The fuzes on a number of shells are preset to various desired values of time of flight. Switch 1818, Fig. 32, is operated by the switch lever 1130, Figs. 11, 13. The operation of switch 1818, Fig. 32, cuts off connection 3481, and grounds resistor 3483, thus removing the voltage proportional to Ss formerly supplied to amplifiers LA31, LA40, and motor amplifier MA11, Fig. 34.

The operation of switch 1818, Fig. 18, completes a circuit from power supply through switch MC1, windings of relays RY5, RY6 in parallel, lower make contacts of switch 1818, make contacts of relay RY28, switch MC9 to power supply, operating relay RY5, RY6. The operation of relays RY5, RY6, and switch 1818, Fig. 32, cut off the voltages proportional to $dR$, $dR2$ and Ss from amplifiers LA40, LA31 and from motor amplifier MA11, Fig. 34, so that motor MO11 is driven to make $Fg=0$, and motor MO9 is driven to make $F=Tf$. The computer operator may thus watch the fuze number counter 1118, Fig. 11, and, when the proper time of flight for the preset fuze of the shell in the gun is displayed, fire the gun by operating the firing key on the stable element.

The output transformer 3380, Fig. 33, of the $Tf$ amplifier LA25, is normally connected by connections 3301, 3302 to the $dH$ potentiometer PT16, Fig. 36, the A potentiometer PT13, and the $Br$ potentiometer PT4. The operation of relay RY9 cuts off the voltage from these potentiometers; grounds connection 3302 through resistor 3487; and grounds connection 3301 through resistor 3488, and through resistors 3698, 3699 in serial relationship. The junction of resistors 3698, 3699 is grounded through the winding of card 731, potentiometer PT73. The winding of card 731 produces a linear variation of voltage at the brush associated therewith proportional to $Tf/Ss$ which is connected through resistor 3486 to the input circuit of line amplifier LA36. The output voltage of amplifier LA36, which is normally proportional to generated range $cR$, is thus made proportional to advance range $R2=cR+Tf/Ss$. The terms depending upon the rates $dH$, $Sh$, So are also cut off from the rectangular coordinate amplifiers LA19, LA20, LA21.

Because of the change made in the method of prediction by the operation of relay RY9, the operation of relays RY10, RY11, Fig. 37, cut off from the motor amplifier MA10 the quantities based on $dH$, $Sh$, So, which together make up the range prediction $Rt$, and ground these inputs to motor amplifier MA10.

As previously described, the operation of relay 18, Fig. 28, sets the frequency of oscillators 2836, 2838 at 60 cycles, so that the shafts 1606, 1507 are motionless and the generation of $\Delta cE$ and $\Delta cB$ is stopped so as to prevent driving the director sights off the line of sight. The motion, proportional to $L+Zd/30$, of shaft 1729 is still transmitted through the differential gear DF3;

the motion, proportional to Co, of shaft 1502 is still transmitted through differential gear DF5 and the motion, proportional to ĵB'r, of shaft 1711 is still transmitted through differential gear DF4, to the director, to stabilize the director sights or radar antenna.

The operation of the lower break springs of relay RY28, Fig. 18, removes the short circuit from the signal lamp 1820, Figs. 11 and 18, to notify the computer personnel that the dive attack switch at the director has been operated. The lower make springs of relay RY28 prepare the circuit, previously described, for the operation of relays RY5, RY6, when switch 1818 is operated to the "Selected fuze" position. The operation of the upper break springs of relay RY28 opens the circuit of relay RY3, to prevent range rate correction by normal means; and the operation of the upper make springs of relay RY28 prepares a circuit from power supply through swtiches MC8, RC10, 1822, LS113, RO4, winding of magnetic clutch 1847, upper make springs relay RY28, switches RC2, RO2, upper make springs relay RY21, switch MC9 to power supply. Thus, with the main control MC switch in the third, "Rate control," or fourth, "On" positions; the rate control RC switch in the first, "Automatic" position; the radar-optical RO switch in the first or second "Radar range" positions; and the limit switch LS113 released, the operation of relay RY21 by the radar range rate switch 1809 in the director will energize the magnetic clutch 1847.

The operation of clutch 1847, Figs. 12, 14, connects the ĵR motor MO3, through gearing 1435 with the shaft 1450, geared to the brushes of the Ss potentiometer PT73. Thus, if there is a positional disagreement in the range ring dials 1430, the ĵR motor MO3 will be started to match the dials, and to correct the dive speed Ss setting of the brushes of potentiometer PT73.

The director tilt corrector is claimed in United States application, Serial No. 577,624, filed February 13, 1945, by S. Darlington and A. A. Lundstrom; the rate generator and corrector are claimed in United States application, Serial No. 577,627, filed February 13, 1945, by A. A. Lundstrom and W. A. Malthaner; the ballistic computer is claimed in United States application, Serial No. 577,621, filed February 13, 1945, by S. Darlington; the fuse number computer is claimed in United States application, Serial No. 577,625, filed February 13, 1945, by A. A. Lundstrom; the spot and wind correctors are claimed in United States application, Serial No. 577,630, filed February 13, 1945, by B. D. Holbrook, A. A. Lundstrom and W. A. Malthaner; the gun order computer is claimed in United States application, Serial No. 577,623, filed February 13, 1945, by S. Darlington and A. A. Lundstrom; the sight order computer is claimed in United States application, Serial No. 577,628, filed February 13, 1945, by B. D. Holbrook and A. A. Lundstrom; the variable frequency oscillator is claimed in United States application, Serial No. 577,622, filed February 13, 1945, by S. Darlington, now Patent No. 2,441,567; the limit switches are claimed in United States application, Serial No. 577,631, filed February 13, 1945, by E. D. Mead and F. M. Thomas, now Patent No. 2,417,434; the control knobs are claimed in United States application, Serial No. 577,632, filed February 13, 1945, by E. D. Mead and O. S. A. Mesch.

All of the above applications are assigned to the assignee of the present application.

What is claimed is:

1. In combination with computing means controlled by a ranger manipulating an optical range finder to measure the range to a target and thereby to rotate a first shaft proportionally to said range, and including a first motor rotated to an approximate value of the rate of change of said range, integrating means controlled by said first motor to rotate a second shaft proportionally to the integrated value of said rate, a second motor, a third shaft, means connected to said second shaft and the shaft of said second motor to rotate said third shaft proportionally to the sum of the rotations of said second shaft and said second motor and comparison means driven by said first and third shafts to supply voltages indicating positional disagreement between said shafts, first relay means operated at said computing means to lock up and connect said comparison means to control said second motor and disable said first motor, and second relay means operated by said ranger to retain said first relay means in operated condition, or, if operated prior to said first means, to prevent the operation of said first means and to connect said comparison means to control both said motors.

2. The combination in claim 1 with a pair of signal lamps to respectively indicate the operation of said relay means.

3. In combination with computing means controlled by a ranger manipulating either a radio or an optical range finder to measure the range to a target and thereby to rotate a first shaft proportionally to said range, and including a first motor rotated to an approximate value of the rate of change of said range, integrating means controlled by said first motor to rotate a second shaft proportionally to the integrated value of said rate, a second motor, a third shaft, means connected to said second shaft and the shaft of said second motor to rotate said third shaft proportionally to the sum of the rotations of said second shaft and said second motor and comparison means driven by said first and third shafts and connected to said motors to supply control voltages when there is a positional disagreement between said shafts, first relay means connected to said motors to disable said first motor and enable said second motor, a first switch at said computing means to operate and lock up said first relay means, second relay means connected to said motors to enable both said motors, a second switch at said range finder to operate said second relay means, and a third switch at said computing means having a first position corresponding to the use of a radio range finder which disables said first relay means and a second position corresponding to the use of an optical range finder which enables said first relay means.

4. In combination with computing means controlled by observations of the range, elevation and bearing of a target to respectively rotate first, second and third shafts proportionally to said range, elevation and bearing and including first, second and third motors, a source of voltage, means connected to said source and adjusted to form the sources of first and second voltages respectively proportional to the relative horizontal and vertical speeds of said target with respect to the point of observation, coordinate conversion means connected to the sources of said first and second voltages and said motors to respectively rotate said motors proportionally to the rates of change in range, elevation and bearing of said target, integrating means controlled by said first, second, and third motors to rotate fourth, fifth and sixth shafts respectively proportionally to the integrated values of said rates, fourth, fifth and sixth motors, seventh eighth and ninth shafts, means respectively connected to said fourth shaft and the shaft of said fourth motor, to said fifth shaft and the shaft of said fifth motor and to said sixth shaft and the shaft of said sixth motor to respectively rotate said seventh, eighth and ninth shafts proportionally to the sums of the motions of said shafts and motors, comparison means respectively driven by said first and seventh shafts, said second and eighth shafts and said third and ninth shafts to supply voltages to said first and fourth motors, to said second and fifth motors and to said third and sixth motors respectively indicating positional disagreements of said first and seventh shafts, said second and eighth shafts and said third and ninth shafts, fractionating means adjusted to select a third voltage proportional to the relative speed of said target with respect to the point of observation, first relay means operative to disconnect the sources of said first and second voltages from said source of voltage, second relay means operative to connect said fractionating means to said source of voltage and said first motor, a magnetic clutch attached to the shaft of said first motor and said fractionating means, third relay means operative to connect said clutch to said source of voltage, and switching means connected to said source of voltage and said relay means to operate all said relay means.

5. In combination with computing means controlled by observations of a target to form the sources of first, second and third voltages respectively proportional to the horizontal and vertical coordinates, with origin at a fictitious mean gun, of the present position of said target, and a fourth voltage proportional to the computed time of flight of a projectile from said gun to the future position of said target, including first fractionating means connected to the source of said fourth voltage to produce fifth, sixth and seventh voltages respectively proportional to the computed changes in said horizontal and vertical coordinates during said time of flight and other computing means connected to the sources of said first, second, third, fifth, sixth and seventh voltages, second fractionating means adjusted to select a voltage proportional to the relative speed of said target with respect to the point of observation connected to said other computing means, relay means operative to disconnect said first fractionating means from the source of said fourth voltage and to connect said second fractionating means to the source of said fourth voltage, a source of power, and switching means connected to said source of power and said relay means to operate said relay means.

BERNARD D. HOLBROOK.
ALEXIS A. LUNDSTROM.

No references cited.